(12) United States Patent
Haines

(10) Patent No.: US 11,599,407 B2
(45) Date of Patent: Mar. 7, 2023

(54) METHOD FOR DETERMINISTICALLY REPORTING CAUSE AND EFFECT IN SOFTWARE SYSTEMS

(71) Applicant: Siemens Healthcare Diagnostics Inc., Tarrytown, NY (US)

(72) Inventor: Derek Haines, Philadelphia, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 163 days.

(21) Appl. No.: 17/279,065

(22) PCT Filed: Sep. 26, 2019

(86) PCT No.: PCT/US2019/053296
§ 371 (c)(1),
(2) Date: Mar. 23, 2021

(87) PCT Pub. No.: WO2020/069218
PCT Pub. Date: Apr. 2, 2020

(65) Prior Publication Data
US 2022/0043702 A1    Feb. 10, 2022

Related U.S. Application Data

(60) Provisional application No. 62/737,691, filed on Sep. 27, 2018.

(51) Int. Cl.
*G06F 11/00* (2006.01)
*G06F 11/07* (2006.01)
*G06F 16/23* (2019.01)

(52) U.S. Cl.
CPC ........ *G06F 11/079* (2013.01); *G06F 11/0751* (2013.01); *G06F 11/0787* (2013.01); *G06F 16/2379* (2019.01)

(58) Field of Classification Search
CPC ............... G06F 11/079; G06F 11/0751; G06F 11/0787; G06F 11/321; G06F 11/324; G06F 11/327; G06F 11/328
See application file for complete search history.

(56) References Cited

U.S. PATENT DOCUMENTS 6,463,441 B1    10/2002  Paradies
9,298,535 B2 *   3/2016  Haines ................ G06F 11/0715
(Continued)

FOREIGN PATENT DOCUMENTS

EP    1 428 125 B1   11/2010
JP    H04-076633 A    3/1992
(Continued)

OTHER PUBLICATIONS

PCT International Search Report and Written Opinion dated Dec. 13, 2019 (11 Pages).

(Continued)

*Primary Examiner* — Katherine Lin

(57) ABSTRACT

Negative outcomes experienced by a user in a live software system can be automatically, deterministically, and contemporaneously traced back to the root conditions that caused those outcomes, by generating causal event entries in a database for those root conditions as they occur, assigning unique causal IDs to those causal events, and propagating causal IDs alongside the software system state changes that are known to produce negative outcomes and which are effected by those root conditions. By selectively passing causal IDs based on the input and output values of the operation, subsequent causal events and negative outcomes can be linked accurately to causal IDs of parent events, making it simpler to trace negative outcomes for the user back to their root cause events in a software system.

20 Claims, 64 Drawing Sheets

(56) References Cited

U.S. PATENT DOCUMENTS

| | | | |
|---|---|---|---|
| 11,347,212 B2* | 5/2022 | Hubauer | G05B 23/024 |
| 2003/0056199 A1 | 3/2003 | Li et al. | |
| 2006/0085689 A1 | 4/2006 | Bjorsne | |
| 2010/0318852 A1 | 12/2010 | Zheng et al. | |

FOREIGN PATENT DOCUMENTS

| | | |
|---|---|---|
| JP | 2002-362846 A | 12/2002 |
| JP | 2005-182465 A | 7/2005 |
| JP | 2010-181212 A | 8/2010 |
| JP | 2013-222313 A | 10/2013 |
| JP | 2016-004279 A | 1/2016 |

OTHER PUBLICATIONS

Scott et al. "What, where, and when: Software fault localization for sdn." In: EECS Department, University of California, Berkeley, Technical Report No. UCB/EECS-2012-178 Jul. 13, 2012 (Jul. 13, 2012) Retrievved on Nov. 17, 2019 (Nov. 17,2019) from <http://www1.icsi.berkeley.edu/~zarifis/pubs/w3_technical_report.pdf> entire document.

Extended EP Search Report dated Mar. 14, 2022 of corresponding European Application No. 19867567.0, 4 Pages.

* cited by examiner

Fig. 2C
(Prior Art)

| Time | Mechanism | Error Code |
|---|---|---|
| ▲ 2010-09-17 14:38:43 | Reagent Prep Probe - Horizontal Motor | Mechanism Failed Homing |
| ▲ 2010-09-17 14:38:43 | Reagent Shuttle 2 - Reagent Shuttle 2 | Mechanism Failed Homing |
| ▲ 2010-09-17 14:38:43 | Reagent Storage Ring - Reagent Storage Ring | Mechanism Failed Homing |
| ▲ 2010-09-17 14:38:43 | Reagent Server 1 - Reagent Server 1 | Mechanism Failed Homing |
| ▲ 2010-09-17 14:38:43 | Reagent Loader - Reagent Loader | Mechanism Failed Homing |

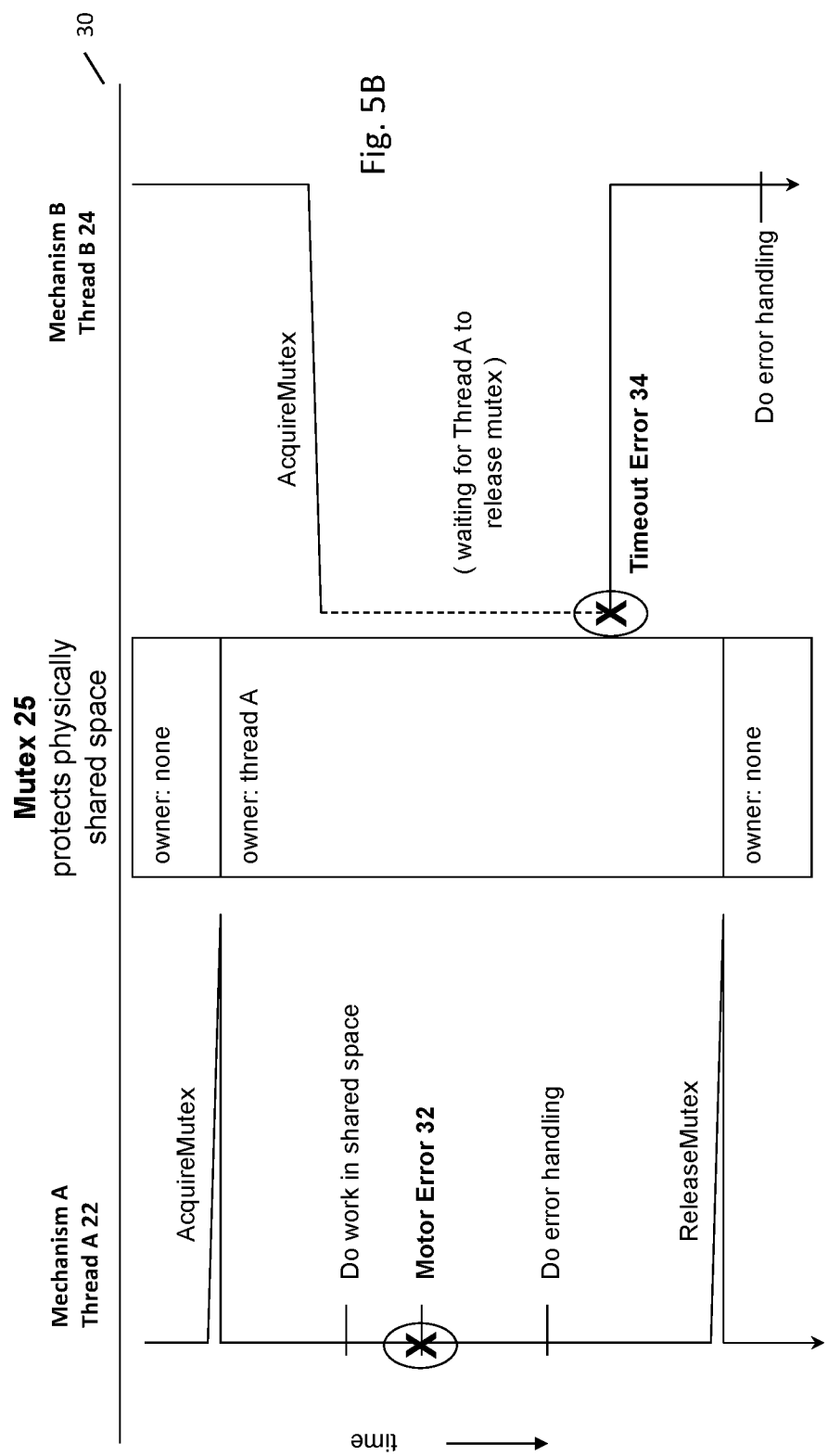

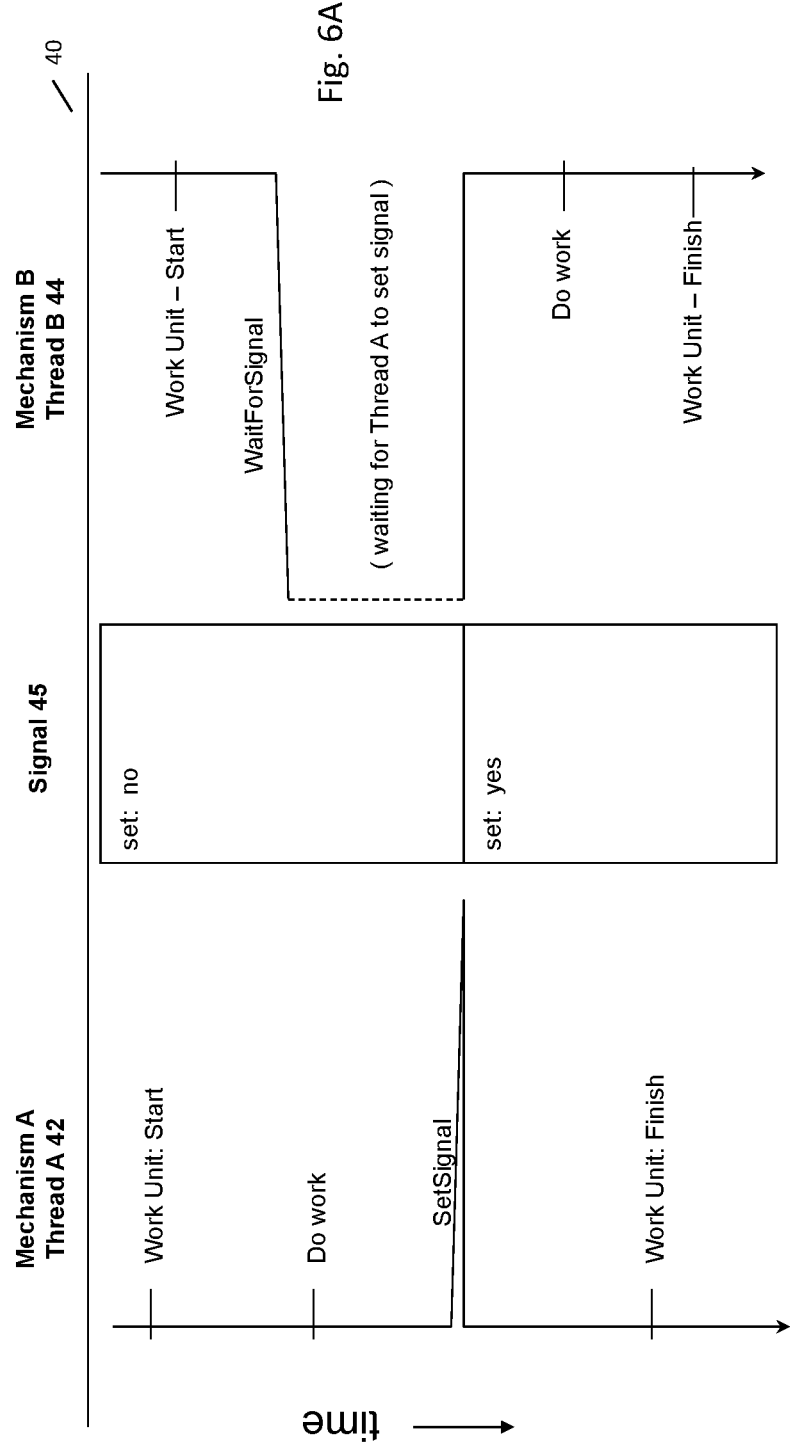

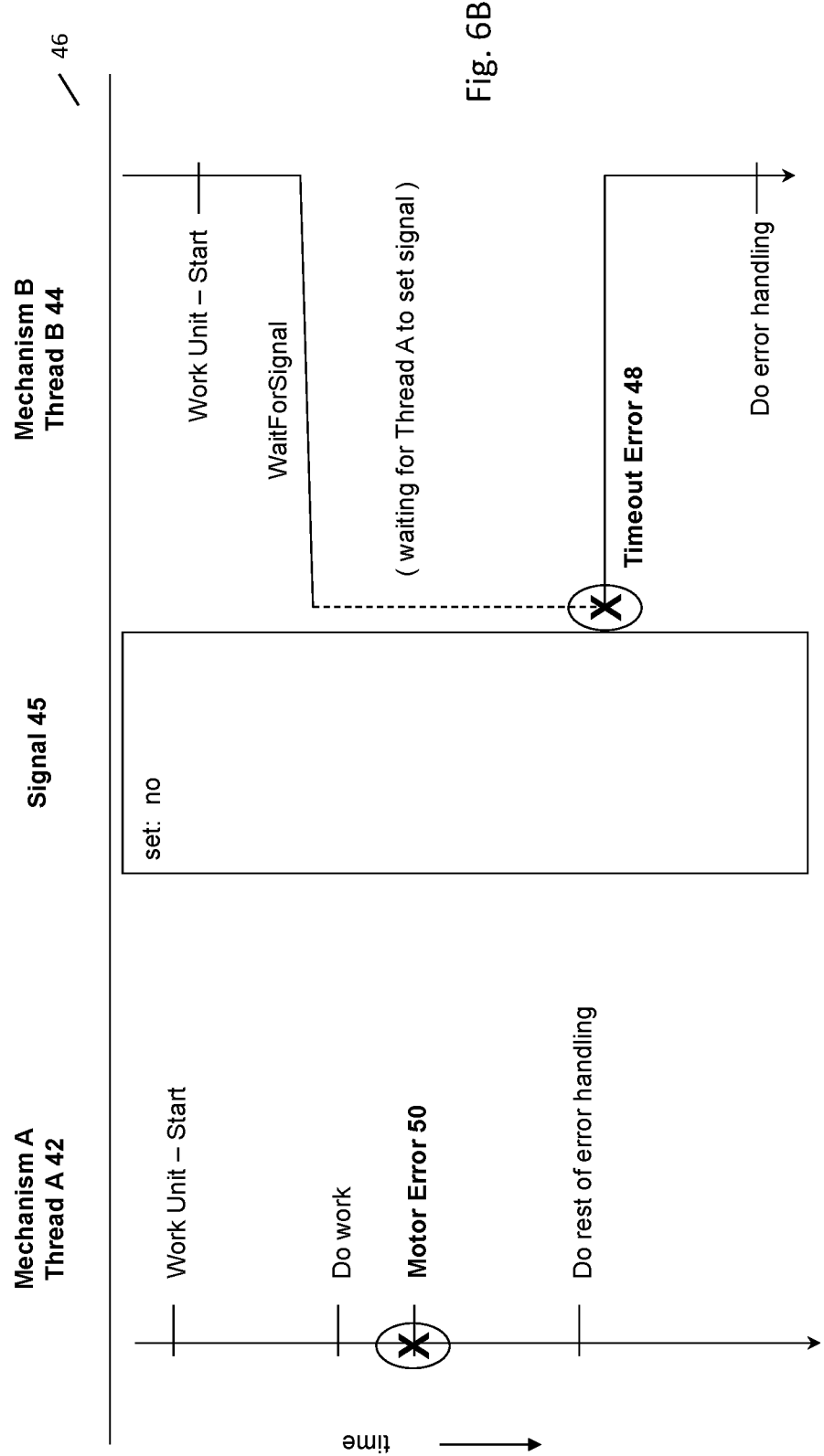

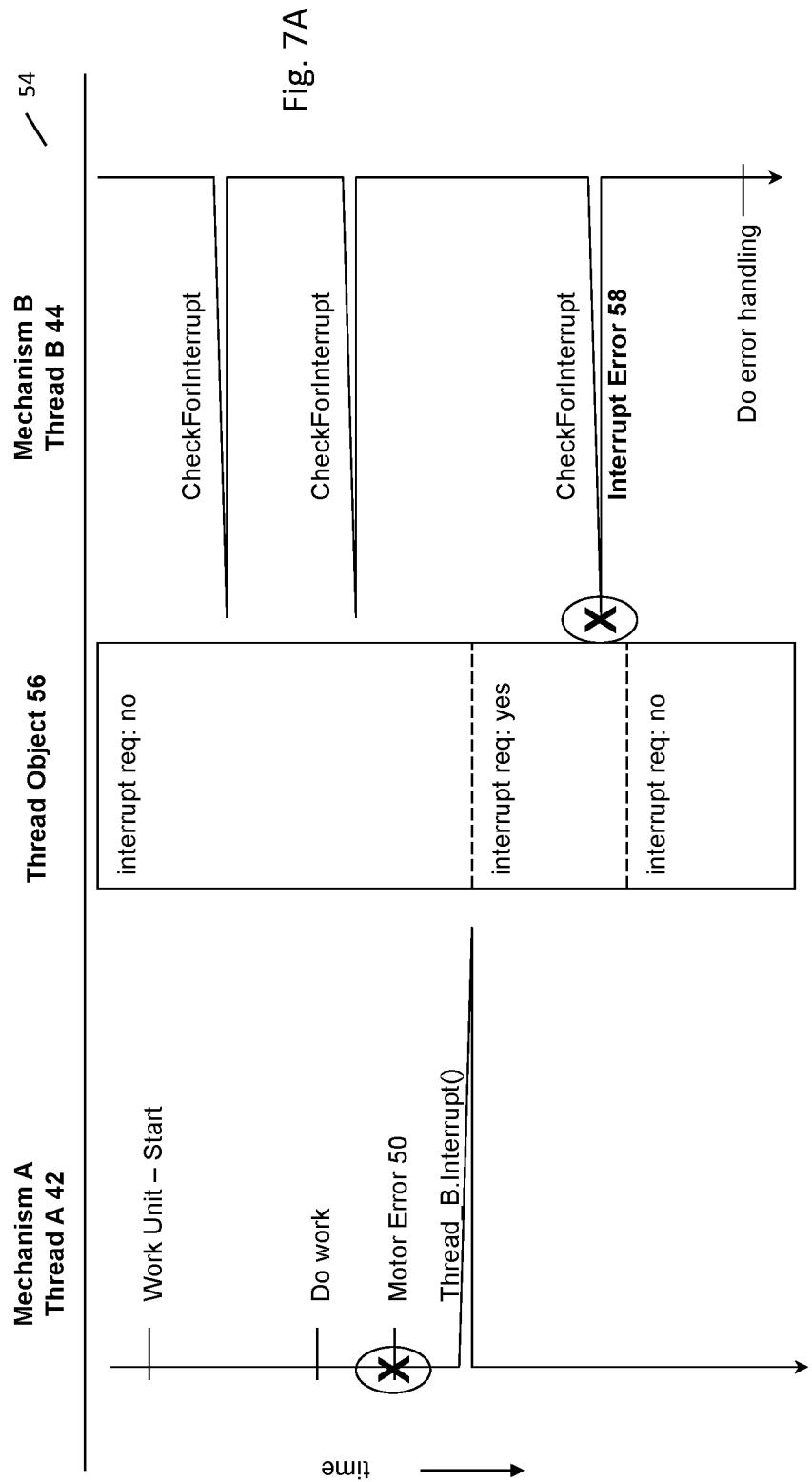

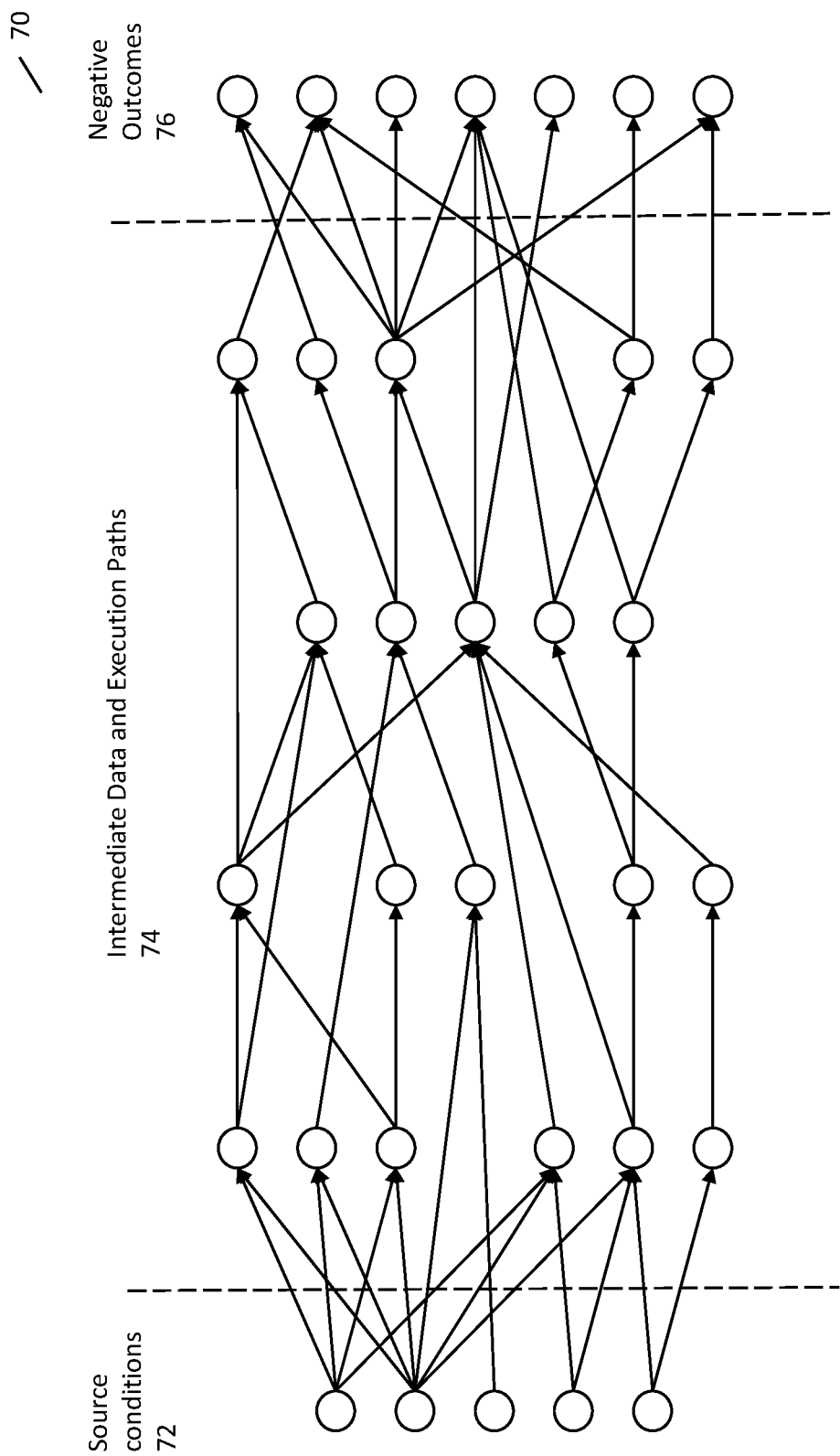

| Module State Variable Value | User Request To Module + Result | |
|---|---|---|
| | Patient Test | Diagnostics Test |
| Running | Success | Failure |
| Stopped | Failure | Success |

Fig. 12

| Identity | Idempotence: AND |
|---|---|
| {P, p} | {P, p} ∧ {P, p} |
| {false, p} | {false, [pp]} → {false, p} |
| {true, p} | {true, <pp>} → {true, p} (→ via causal ID term equivalencies) |

Fig. 14A

| Identity | Idempotence: OR |
|---|---|
| {P, p} | {P, p} ∨ {P, p} |
| {false, p} | {false, <pp>} → {false, p} |
| {true, p} | {true, [pp]} → {true, p} (→ via causal ID term equivalencies) |

Fig. 14B

Commutativity: AND

| Identity | | | |
|---|---|---|---|
| {P, p} | {Q, q} | {P, p} ∧ {Q, q} | {Q, q} ∧ {P, p} |
| {false, p} | {false, q} | {false, [pq]} | {false, [qp]} |
| {false, p} | {true, q} | {false, p} | {false, p} |
| {true, p} | {false, q} | {false, q} | {false, q} |
| {true, p} | {true, q} | {true, <pq>} | {true, <qp>} |

(→ via causal ID term equivalencies)

Fig. 14C

Commutativity: OR

| Identity | | | |
|---|---|---|---|
| {P, p} | {Q, q} | {P, p} ∨ {Q, q} | {Q, q} ∨ {P, p} |
| {false, p} | {false, q} | {false, <pq>} | {false, <qp>} |
| {false, p} | {true, q} | {true, q} | {true, q} |
| {true, p} | {false, q} | {true, p} | {true, p} |
| {true, p} | {true, q} | {true, [pq]} | {true, [qp]} |

(→ via causal ID term equivalencies)

Associativity: AND

| Identity | | | {P, p} ∧ ({Q, q} ∧ {R, r}) | | ({P, p} ∧ {Q, q}) ∧ {R, r} | |
|---|---|---|---|---|---|---|
| {P, p} | {Q, q} | {R, r} | {Q, q} ∧ {R, r} | {P, p} ∧ ({Q, q} ∧ {R, r}) | {P, p} ∧ {Q, q} | ({P, p} ∧ {Q, q}) ∧ {R, r} |
| {false, p} | {false, q} | {false, r} | {false, [qr]} | {false, [p[qr]]} ← {false, [pqr]} | {false, [pq]} | {false, [[pq]r]} ← {false, [pqr]} |
| {false, p} | {false, q} | {true, r} | {false, q} | {false, [pq]} | {false, [pq]} | {false, [pq]} |
| {false, p} | {true, q} | {false, r} | {false, r} | {false, [pr]} | {false, p} | {false, [pr]} |
| {false, p} | {true, q} | {true, r} | {true, <qr>} | {false, p} | {false, p} | {false, p} |
| {true, p} | {false, q} | {false, r} | {false, [qr]} | {false, [qr]} | {false, q} | {false, [qr]} |
| {true, p} | {false, q} | {true, r} | {false, q} | {false, q} | {false, q} | {false, q} |
| {true, p} | {true, q} | {false, r} | {false, r} | {false, r} | {true, <pq>} | {false, r} |
| {true, p} | {true, q} | {true, r} | {true, <qr>} | {true, <p<qr>>} ← {true, <pqr>} | {true, <pq>} | {true, <<pq>r>} ← {true, <pqr>} |

(← via causal ID term equivalencies)

Fig. 14F

Associativity: OR

| Identity | | | {P, p} ∨ ({Q, q} ∨ {R, r}) | | ({P, p} ∨ {Q, q}) ∨ {R, r} | |
|---|---|---|---|---|---|---|
| {P, p} | {Q, q} | {R, r} | {Q, q} ∨ {R, r} | {P, p} ∨ ({Q, q} ∨ {R, r}) | {P, p} ∨ {Q, q} | ({P, p} ∨ {Q, q}) ∨ {R, r} |
| {false, p} | {false, q} | {false, r} | {false, <qr>} | {false, <p<qr>>} ← {false, <pqr>} | {false, <pq>} | {false, <<pq>r>} ← {false, <pqr>} |
| {false, p} | {false, q} | {true, r} | {true, r} | {true, r} | {false, <pq>} | {true, r} |
| {false, p} | {true, q} | {false, r} | {true, q} | {true, q} | {true, q} | {true, q} |
| {false, p} | {true, q} | {true, r} | {true, [qr]} | {true, [qr]} | {true, q} | {true, [qr]} |
| {true, p} | {false, q} | {false, r} | {false, <qr>} | {true, p} | {true, p} | {true, p} |
| {true, p} | {false, q} | {true, r} | {true, r} | {true, [pr]} | {true, p} | {true, [pr]} |
| {true, p} | {true, q} | {false, r} | {true, q} | {true, [pq]} | {true, [pq]} | {true, [pq]} |
| {true, p} | {true, q} | {true, r} | {true, [qr]} | {true, [p[qr]]} ← {true, [pqr]} | {true, [pq]} | {true, [[pq]r]} ← {true, [pqr]} |

(← via causal ID term equivalencies)

Fig. 14G

| Identity | | Absorption (1) | | | Absorption (2) | |
|---|---|---|---|---|---|---|
| {P, p} | {Q, q} | {P, p} ∨ {Q, q} | {P, p} ∧ ({P, p} ∨ {Q, q}) | | {P, p} ∧ {Q, q} | {P, p} ∨ ({P, p} ∧ {Q, q}) |
| {false, p} | {false, q} | {false, <pq>} | {false, [p<pq>]} → | {false, p} | {false, [pq]} | {false, <p[pq]>} → {false, p} |
| {false, p} | {true, q}  | {true, q}      | {false, p}          → | {false, p} | {false, p}    | {false, <pp>}       → {false, p} |
| {true, p}  | {false, q} | {true, p}      | {true, <pp>}        → | {true, p}  | {false, q}    | {true, p}           → {true, p}  |
| {true, p}  | {true, q}  | {true, [pq]}   | {true, <p[pq]>}     → | {true, p}  | {true, <pq>}  | {true, [p<pq>]}     → {true, p}  |

(→ via causal ID term equivalencies)

(→ via causal ID term equivalencies)

Fig. 14H

Distributivity (1)

| | Identity | | | {P, p} ∧ ({Q, q} ∨ {R, r}) | | ({P, p} ∧ {Q, q}) ∨ ({P, p} ∧ {R, r}) | |
|---|---|---|---|---|---|---|---|
| {P, p} | {Q, q} | {R, r} | | {Q, q} ∨ {R, r} | {P, p} ∧ ({Q, q} ∨ {R, r}) | {P, p} ∧ {Q, q} | ({P, p} ∧ {Q, q}) ∨ ({P, p} ∧ {R, r}) |
| {false, p} | {false, q} | {false, r} | | {false, <qr>} | {false, [p<qr>]} | {false, [pq]} | {false, <[pq][pr]>} |
| {false, p} | {false, q} | {true, r} | | {true, r} | {false, p} | {false, [pq]} | {false, <[pq]p>} |
| {false, p} | {true, q} | {false, r} | | {true, q} | {false, p} | {false, p} | {false, <p[pr]>} |
| {false, p} | {true, q} | {true, r} | | {true, [qr]} | {false, p} | {false, p} | {false, <pp>} |
| {true, p} | {false, q} | {false, r} | | {false, <qr>} | {false, <qr>} | {false, q} | {false, <qr>} |
| {true, p} | {false, q} | {true, r} | | {true, r} | {true, <pr>} | {false, q} | {true, <pr>} |
| {true, p} | {true, q} | {false, r} | | {true, q} | {false, <pq>} | {false, <pq>} | {true, <pq>} |
| {true, p} | {true, q} | {true, r} | | {true, [qr]} | {true, <p[qr]>} | {true, <pq><pr>} | {true, <p[qr]>} |

(→ via causal ID term equivalencies)

Fig. 14I

Distributivity (2)

| | Identity | | | {P, p} ∨ ({Q, q} ∧ {R, r}) | | ({P, p} ∨ {Q, q}) ∧ ({P, p} ∨ {R, r}) | |
|---|---|---|---|---|---|---|---|
| {P, p} | {Q, q} | {R, r} | | {Q, q} ∧ {R, r} | {P, p} ∨ ({Q, q} ∧ {R, r}) | {P, p} ∨ {Q, q} | ({P, p} ∨ {Q, q}) ∧ ({P, p} ∨ {R, r}) |
| {false, p} | {false, q} | {false, r} | | {false, [qr]} | {false, <p[qr]>} | {false, <pq>} | {false, [<pq><pr>]} |
| {false, p} | {false, q} | {true, r} | | {false, q} | {false, <pq>} | {true, r} | {false, <pq>} |
| {false, p} | {true, q} | {false, r} | | {false, r} | {false, <pr>} | {false, r} | {false, <pr>} |
| {false, p} | {true, q} | {true, r} | | {true, <qr>} | {true, q} | {true, q} | {true, <qr>} |
| {true, p} | {false, q} | {false, r} | | {false, [qr]} | {false, p} | {true, p} | {true, p} |
| {true, p} | {false, q} | {true, r} | | {false, q} | {true, p} | {true, <p[pr]>} | {true, p} |
| {true, p} | {true, q} | {false, r} | | {false, r} | {true, p} | {true, <[pq]p>} | {true, p} |
| {true, p} | {true, q} | {true, r} | | {true, [qr]} | {true, [p<qr>]} | {true, <[pq][pr]>} | {true, [p<qr>]} |

(→ via causal ID term equivalencies)

| Identity | Universal Bounds | |
|---|---|---|
| | Smallest Element: false | Greatest Element: true |
| {P, p} | {false, f} ∧ {P, p} ≡ false | {false, f} ∨ {P, p} ≡ P | {true, t} ∧ {P, p} ≡ P | {true, t} ∨ {P, p} ≡ P |
| {false, p} | {false, [fp]} | {false, <fp>} | {false, p} | {true, t} |
| {true, p} | {false, f} | {true, p} | {true, <tp>} | {true, p} |

Fig. 14J

| Identity | Complementation | |
|---|---|---|
| | ¬{P, p} | {P, p} ∧ (¬{P, p}) ≡ false | {P, p} ∨ (¬{P, p}) ≡ true |
| {false, p} | {true, p} | {false, p} | {true, p} |
| {true, p} | {false, p} | {false, p} | {true, p} |

| Operation Name | Causal Input Values | | Causal Output Values | Intermediate Expressions / Values | | | Final De Morgan |
|---|---|---|---|---|---|---|---|
| | Identity | | AND | | | | AND |
| Expression | {P, p} | {Q, q} | {P, p} ∧ {Q, q} | ¬ {P, p} | ¬ {Q, q} | (¬ {P, p}) ∨ (¬ {Q, q}) | ¬((¬ {P, p}) ∨ (¬ {Q, q})) |
| Values | {false, p} | {false, q} | {false, [pq]} | {true, p} | {true, q} | {true, [pq]} | {false, [pq]} |
| | {false, p} | {true, q} | {false, p} | {true, p} | {false, q} | {true, p} | {false, p} |
| | {true, p} | {false, q} | {false, q} | {false, p} | {true, q} | {true, q} | {false, q} |
| | {true, p} | {true, q} | {true, <pq>} | {false, p} | {false, q} | {false, <pq>} | {true, <pq>} |

Fig. 14L 132                                                                                                                                            134

| Operation Name | Causal Input Values | | Causal Output Values | Intermediate Expressions / Values | | | Final De Morgan |
|---|---|---|---|---|---|---|---|
| | Identity | | OR | | | | OR |
| Expression | {P, p} | {Q, q} | {P, p} ∨ {Q, q} | ¬ {P, p} | ¬ {Q, q} | (¬ {P, p}) ∧ (¬ {Q, q}) | ¬((¬ {P, p}) ∧ (¬ {Q, q})) |
| Values | {false, p} | {false, q} | {false, <pq>} | {true, p} | {true, q} | {true, <pq>} | {false, <pq>} |
| | {false, p} | {true, q} | {true, q} | {true, p} | {false, q} | {false, p} | {true, p} |
| | {true, p} | {false, q} | {true, p} | {false, p} | {true, q} | {false, q} | {true, q} |
| | {true, p} | {true, q} | {true, [pq]} | {false, p} | {false, q} | {false, [pq]} | {true, [pq]} |

Fig. 14M

| | Causal Input Values | | Axiomatic Boolean Operations / Causal Output Values | | |
|---|---|---|---|---|---|
| Operation Name | Identity | | NOT | AND | OR |
| Expression | {P, p} | {Q, q} | ¬{P, p} | {P, p} ∧ {Q, q} | {P, p} ∨ {Q, q} |
| Values | {false, p} | {false, q} | {true, p} | {false, [pq]} | {false, ⟨pq⟩} |
| | {false, p} | {true, q} | {true, p} | {false, p} | {true, q} |
| | {true, p} | {false, q} | {false, p} | {false, q} | {true, p} |
| | {true, p} | {true, q} | {false, p} | {true, ⟨pq⟩} | {true, [pq]} |

| Input Expressions / Values | | Output Expressions / Values | | | |
|---|---|---|---|---|---|
| Common Name | | | 138 Always False | 140 NOR | 142 [n/a] | 156 NOT (on {P, p}) |
| Other Names | {P, p} | {Q, q} | contradiction, assigned false | not-or | converse nonimplication | negation (on {P, p}) |
| Expression | | | false | {P, p} ↓ {Q, q} | {P, p} ↛ {Q, q} | ¬{P, p} |
| Equivalencies | | | [n/a] | ¬({P, p} ∨ {Q, q}) | ¬({P, p} ∨ ¬{Q, q}) ¬({P, p} ← {Q, q}) | [n/a] |
| Values | {false, p} | {false, q} | {false, <ClauseId>} | {true, <pq>} | {false, p} | {true, p} |
| | {false, p} | {true, q} | {false, <ClauseId>} | {false, q} | {true, <pq>} | {true, p} |
| | {true, p} | {false, q} | {false, <ClauseId>} | {false, p} | {false, [pq]} | {false, p} |
| | {true, p} | {true, q} | {false, <ClauseId>} | {false, [pq]} | {false, p} | {false, p} |

Fig. 15B

| Input Expressions / Values | | Output Expressions / Values | | | |
|---|---|---|---|---|---|
| Common Name | | | 144 [n/a] | 158 NOT (on {Q, q}) | 146 XOR | 148 NAND |
| Other Names | {P, p} | {Q, q} | material nonimplication | negation (on {Q, q}) | exclusive-or, exclusive disjunction | not-and |
| Expression | | | {P, p} ↛ {Q, q} | ¬{Q, q} | {P, p} ⊕ {Q, q} | {P, p} ↑ {Q, q} |
| Equivalencies | | | {P, p} ∧ (¬{Q, q}) ¬({P, p} → {Q, q}) | [n/a] | ({P, p} ∧ (¬{Q, q})) ∨ ((¬{P, p}) ∧ {Q, q}) | ¬({P, p} ∧ {Q, q}) |
| Values | {false, p} | {false, q} | {false, p} | {true, q} | {false, <pq>} | {true, [pq]} |
| | {false, p} | {true, q} | {false, [pq]} | {false, q} | {true, <pq>} | {true, p} |
| | {true, p} | {false, q} | {true, <pq>} | {true, q} | {true, <pq>} | {true, q} |
| | {true, p} | {true, q} | {false, q} | {false, q} | {false, <pq>} | {false, <pq>} |

Fig. 15C

| Common Name | | | 160 AND | 150 XNOR | 130 Identity (on {Q, q}) | 152 [n/a] |
|---|---|---|---|---|---|---|
| Other Names | | | conjunction | exclusive-nor, biconditional, if and only if | projection (on {Q, q}) | material implication, if X then Y |
| Expression | {P, p} | {Q, q} | {P, p} ∧ {Q, q} | {P, p} ⇔ {Q, q} | {Q, q} | {P, p} → {Q, q} |
| Equivalencies | | | [n/a] | ({P, p} ∧ {Q, q}) ∨ ((~{P, p}) ∧ (~{Q, q})); ~({P, p} ⊕ {Q, q}) | [n/a] | (~{P, p}) ∨ {Q, q} |
| Values | {false, p} | {false, q} | {false, [pq]} | {true, <pq>} | {false, q} | {true, p} |
| | {false, p} | {true, q} | {false, p} | {false, <pq>} | {true, q} | {true, [pq]} |
| | {true, p} | {false, q} | {false, q} | {false, <pq>} | {false, q} | {false, q} |
| | {true, p} | {true, q} | {true, <pq>} | {true, <pq>} | {true, q} | {true, q} |

Fig. 15D

| Common Name | | | 132 Identity (on {P, p}) | 154 [n/a] | 162 OR | 136 Always True |
|---|---|---|---|---|---|---|
| Other Names | | | projection (on {P, p}) | converse implication, X if Y | disjunction | tautology, assigned true |
| Expression | {P, p} | {Q, q} | {P, p} | {P, p} ← {Q, q} | {P, p} ∨ {Q, q} | true |
| Equivalencies | | | [n/a] | {P, p} ∨ (~{Q, q}) | [n/a] | [n/a] |
| Values | {false, p} | {false, q} | {false, p} | {true, q} | {false, q} | {true, <ClauseId>} |
| | {false, p} | {true, q} | {false, p} | {false, <pq>} | {true, q} | {true, <ClauseId>} |
| | {true, p} | {false, q} | {true, p} | {true, [pq]} | {true, p} | {true, <ClauseId>} |
| | {true, p} | {true, q} | {true, p} | {true, p} | {true, [pq]} | {true, <ClauseId>} |

| Causal Input Values: Identity | | | Causal Output Values: Custom 3-input Boolean operation CustomOperation({P, p}, {Q, q}, {R, r}) | Does the output value change when the value(s) of these input term(s) change? | | | | | | | Unculled Causal ID(s) | Culled Causal ID(s) to propagate | Culled Causal ID(s) to propagate, simplified notation |
|---|---|---|---|---|---|---|---|---|---|---|---|---|---|
| {P, p} | {Q, q} | {R, r} | | [P] | [Q] | [R] | [PQ] | [PR] | [QR] | [PQR] | | | |
| {false, p} | {false, q} | {false, r} | {false, <r[pq]>} | N | N | Y | Y | N | Y | N | <[r][pq][qr]> | <[r][pq]> | <r[pq]> |
| {false, p} | {false, q} | {true, r} | {true, <pr>} | Y | N | Y | Y | Y | Y | N | <[p][r][pq][pr]> | <[p][r]> | <pr> |
| {false, p} | {true, q} | {false, r} | {false, <pr>} | Y | N | Y | N | Y | N | N | <[p][r][qr]> | <[p][r]> | <pr> |
| {false, p} | {true, q} | {true, r} | {true, <pr>} | Y | Y | N | Y | N | Y | Y | <[p][r][pq][qr][pqr]> | <[p][r]> | <pr> |
| {true, p} | {false, q} | {false, r} | {false, <q[pr]>} | N | Y | Y | N | N | N | Y | <[q][pr][pqr]> | <[q][pr]> | <q[pr]> |
| {true, p} | {false, q} | {true, r} | {false, <p[qr]>} | Y | N | Y | Y | N | N | N | <[p][pq][qr]> | <[p][qr]> | <p[qr]> |
| {true, p} | {true, q} | {false, r} | {true, <pqr>} | Y | Y | Y | Y | N | Y | Y | <[p][q][r][pq][qr]> | <[p][q][r]> | <pqr> |
| {true, p} | {true, q} | {true, r} | {false, <pr>} | Y | N | Y | N | N | N | N | <[p][r][pq]> | <[p][r]> | <pr> |

Fig. 15E

| Causal Input Values | | | Causal Output Values | CustomOperation() is equivalent to: $((\neg P') \wedge R') \vee ((P' \wedge Q') \wedge (\neg R'))$ | | | |
|---|---|---|---|---|---|---|---|
| Identity | | | Custom 3-input Boolean operation | | | | |
| {P, p} | {Q, q} | {R, r} | CustomOperation({P, p}, {Q, q}, {R, r}) | $(\neg P')$ | $((\neg P') \wedge R')$ | $(P' \wedge Q')$ | $(\neg R')$ | $((P' \wedge Q') \wedge (\neg R'))$ | $((\neg P') \wedge R') \vee ((P' \wedge Q') \wedge (\neg R'))$ |
| {false, p} | {false, q} | {false, r} | {false, <r[pq]>} | {true, p} | {false, r} | {false, [pq]} | {true, r} | {false, [pq]} | {false, <r[pq]>} |
| {false, p} | {false, q} | {true, r} | {true, <pr>} | {true, p} | {true, <pr>} | {false, [pq]} | {false, r} | {false, [r[pq]]} | {true, <pr>} |
| {false, p} | {true, q} | {false, r} | {false, <pr>} | {true, p} | {false, r} | {false, p} | {true, r} | {false, p} | {false, <pr>} |
| {false, p} | {true, q} | {true, r} | {true, <pr>} | {true, p} | {true, <pr>} | {false, p} | {false, r} | {false, [pr]} | {true, <pr>} |
| {true, p} | {false, q} | {false, r} | {false, <q[pr]>} | {false, p} | {false, [pr]} | {false, q} | {true, r} | {false, q} | {false, <q[pr]>} |
| {true, p} | {false, q} | {true, r} | {false, <p[qr]>} | {false, p} | {false, [pr]} | {false, q} | {false, r} | {false, [qr]} | {false, <p[qr]>} |
| {true, p} | {true, q} | {false, r} | {true, <pqr>} | {false, p} | {false, p} | {true, <pq>} | {true, r} | {true, <pq>r>} | {true, <pqr>} |
| {true, p} | {true, q} | {true, r} | {false, <pr>} | {false, p} | {false, p} | {true, <pq>} | {false, r} | {false, r} | {false, <pr>} |

Fig. 15F

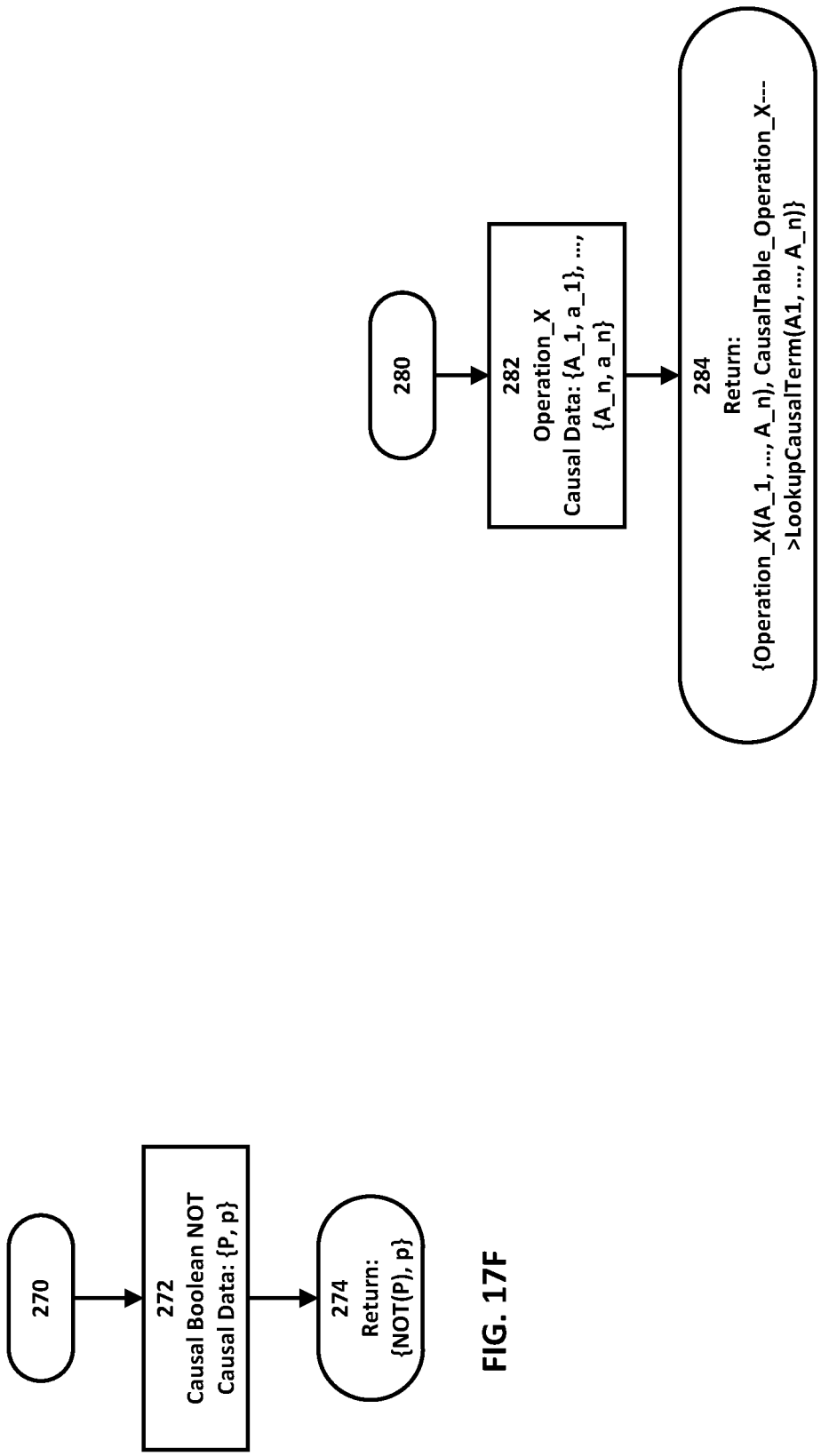

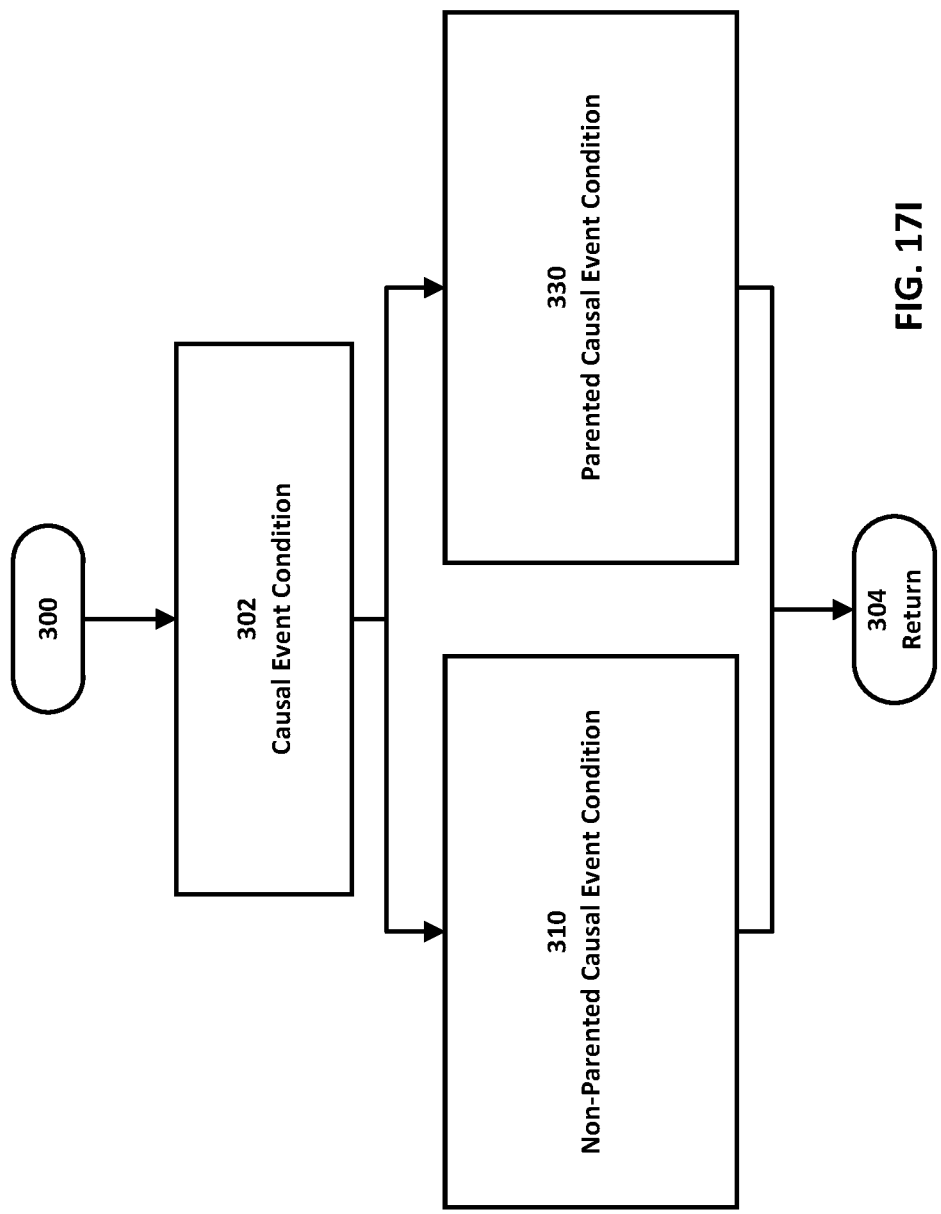

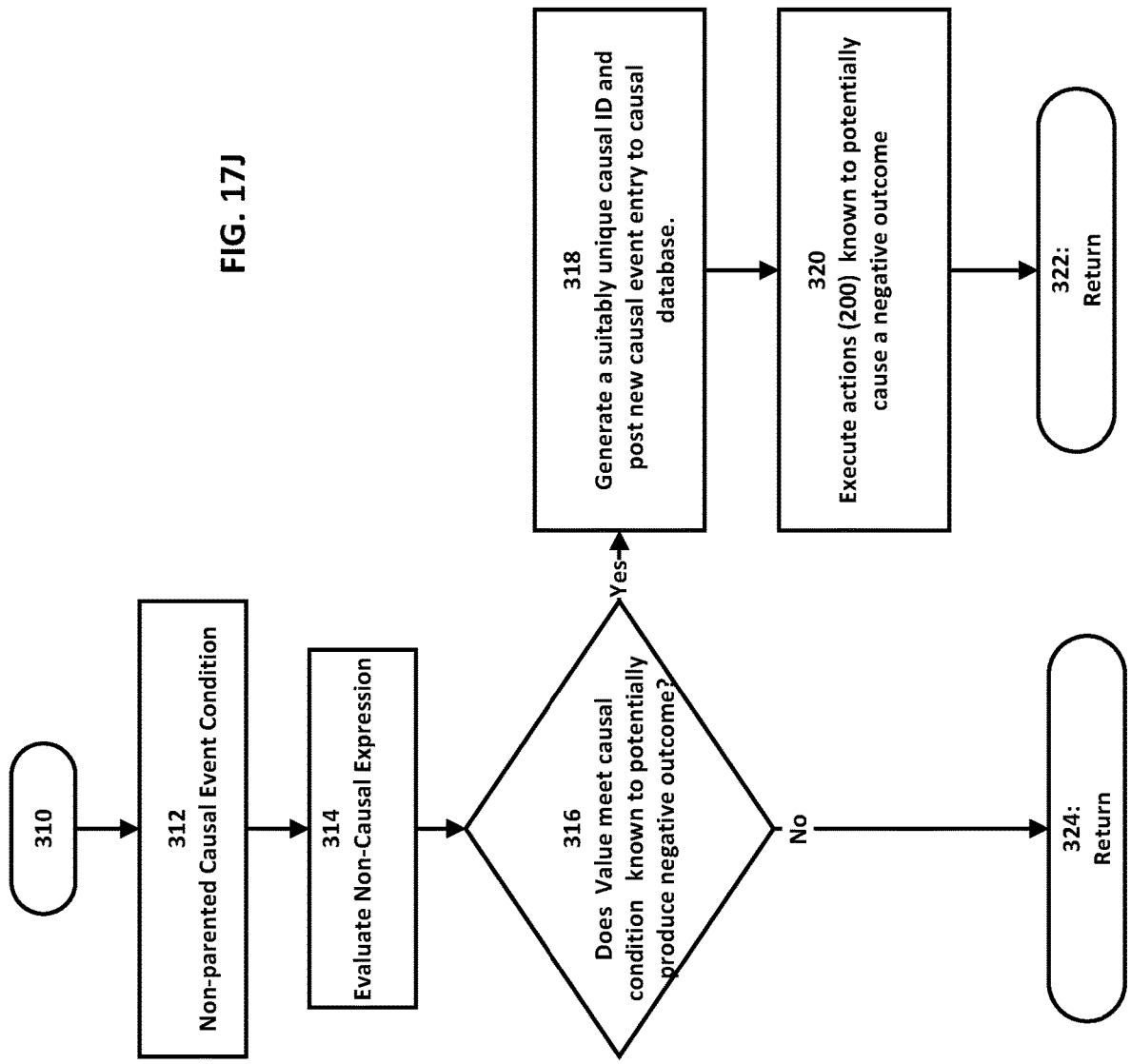

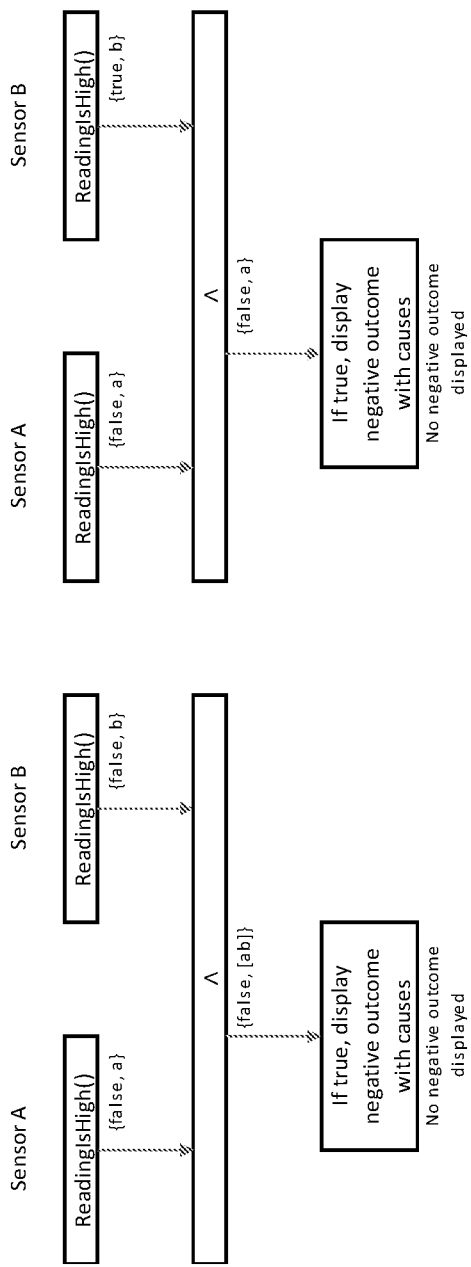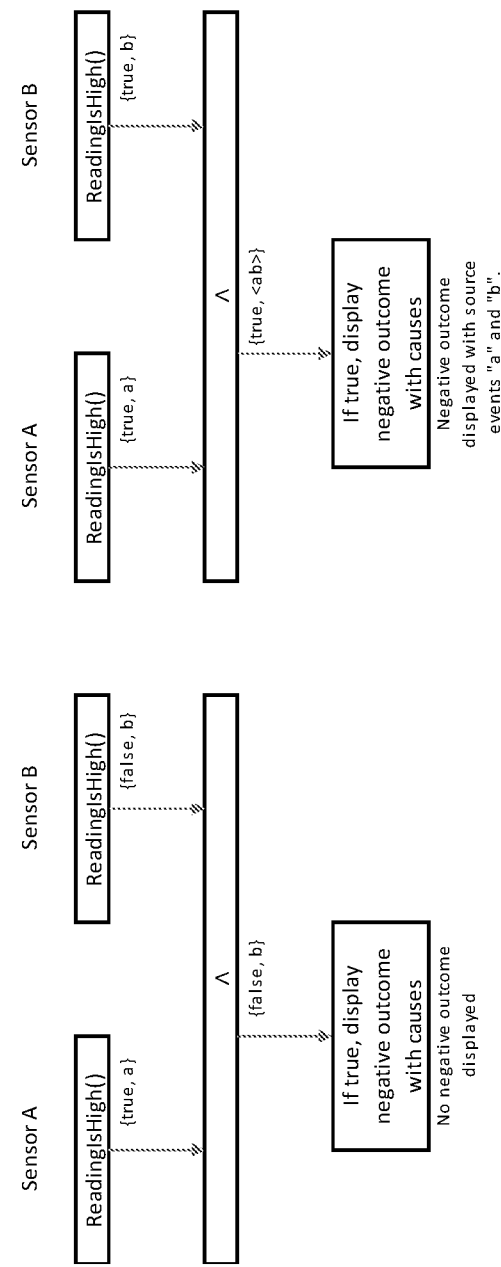
FIG. 18E

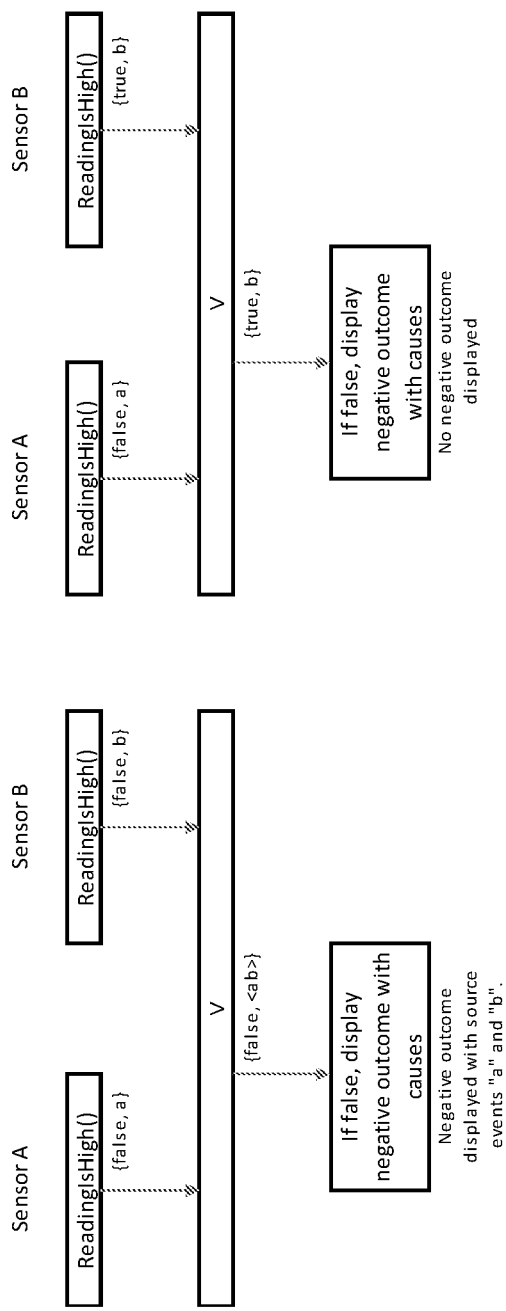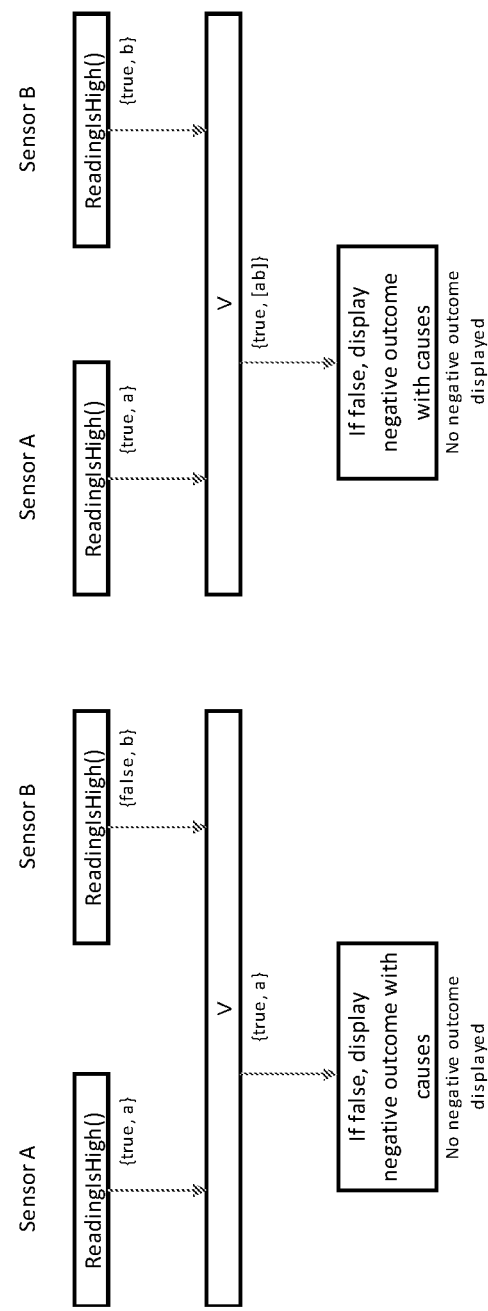
FIG. 18F

METHOD FOR DETERMINISTICALLY REPORTING CAUSE AND EFFECT IN SOFTWARE SYSTEMS

RELATED APPLICATIONS

This application claims priority to U.S. provisional application Ser. No. 62/737,691 filed Sep. 27, 2018, which is incorporated herein by its entirety.

FIELD OF INVENTION

The embodiments disclosed herein relate in general to reporting errors in software, including but not limited to passing causal IDs between functions and processes in software that can interact with or control hardware, such as clinical chemistry analyzers.

BACKGROUND

Root causes of errors reported by software can be difficult to track. This can be especially true when the software relates to a hardware system, where errors reported by the software can be caused by hardware errors in the real world, but where useful diagnostic information regarding the hardware errors are not necessarily fully communicated forward in the software to the error reporting point. Such systems, as well as most large software environments, where reported errors can more often be caused by pure software components unrelated to hardware, can benefit from better error tracking. While such error tracking methods have utility on many software or hardware/software systems, it is easiest to describe these concepts with a specific example, in this case a clinical chemistry analyzer. An exemplary clinical analyzer is a Dimension Vista Clinical Analyzer, available from Siemens Healthcare Diagnostics. Such an analyzer typically performs medical tests on patient fluid samples and accepts blood, urine, and plasma in test tubes, with an exemplary maximum average throughput of 1500 tests per hour. To accomplish this, the exemplary analyzer contains more than 400 computer-controlled hardware actuators and sensors including motors (for controlling arms, probes, pumps, positioners), solenoids (for activating valves, latches, locks), lights (for indicators), sensors (for applications such as photometer, nephelometer, electro-chemical, chemi-luminescence, pressure, barcode, obstruction, encoders, switches, etc.)

FIG. 1 shows an exemplary mechanism map of an analyzer to illustrate the interplay of physical components that can relate to one another and share a physical space that can cause collisions or thread locks. For example, a cuvette ring can interact with an IMT probe, multiple sample arms, and multiple reagent arms. Sample arms can interact with aliquot lanes, which interact with various aliquotter systems. Reagent arms can interact with reagent servers, which include various reagent subsystems.

FIG. 2A shows an exemplary prior art screenshot of a user interface for a clinical chemistry system displaying a failure to successfully complete execution of the user's prior request to run an NA test (i.e. sodium test) on patient Sample 04. The results for that test request display "Error" and "Measurement Error", but do not display the actual root cause of that error. In this particular system, there are literally millions of possible root causes for this general error outcome. While details of the actual root cause that caused this particular error, from among those millions of possibilities, are recorded and displayed elsewhere in the system, via general display of an event database, and via developer-oriented trace logs, there is no connection between the negative outcome displayed here to the user and that root cause information recorded elsewhere. This lack of connection between negative effect and specific root cause details is a common failing of software designs and systems for users.

FIG. 2B shows an exemplary prior art screenshot of a user interface displaying multiple "unavailable" conditions, where certain capabilities for the ESDSH module state are displayed with a red triangle, indicating that any future requests from the user which require these capabilities will fail until the root causes of non-availabilities are resolved. Again, there are literally millions of possible reasons the capabilities could be down, but no specific root cause information is made available for why the capabilities are down. Also, in this particular case, different capabilities are down for different root cause reasons. This is not made apparent at all. A user could easily and incorrectly assume that the capabilities are down for the same root cause reason. Again, this lack of connection between negative effect and specific root cause is a common failing of software designs and systems for users.

FIG. 2C shows an exemplary prior art screenshot of multiple errors where five different threads which control separate mechatronic hardware detected hardware "homing" errors at startup. In this particular case, only one hardware error was actually responsible for the entire set of failures. That is, one root cause physical hardware failure caused four other nearly identical hardware failures to be reported, all on different hardware mechanism subsystems. It is not clear from this prior art screen shot which error could be a root cause, as all errors occurred at the same time stamp and error code. Only one mechanism had a physical problem and is the root cause. The other four mechanisms encountered software time out errors waiting for the first mechanism to physically move out of the way. These problems can be made worse by extended dependency between mechanisms. This is a common scenario during system reset.

Many prior attempts to solve the main problem of reporting the actual root software conditions that caused any negative outcome experienced in a software system first start with an attempt to statically predetermine all possible paths of causes and effects in the software system, and therefore all possible failure modes and non-failure modes. The assumption in these attempts is that if all of the possible paths of causes and effects could be determined for a software system, or some "sufficient" subset of causes and effects could be determined, then some system could be built on top of this static list of causes and effects that would allow the cause for any negative outcome to be reported to the user.

However, for a complex system, attempting to determine all possible causes and effects in the system, and therefore all possible causes of negative outcomes in the system, can cause an intractable problem. That is, it is far too resource-intensive and therefore effectively impossible for any software development organization to determine all of the possible paths of cause and effect for software of even moderate complexity. Or it is frequently found that many, many different kinds of causes can each contribute to many, many different kinds of negative outcomes, which effectively renders the information useless for troubleshooting by a user.

Even if all the possible causes and effects, and all of the possible paths between them, were able to be determined for a software system, traditional methods for mapping these causes are insufficient. Consider a software system for which a static, directed graph of all possible causes and effects in the system is constructed, which diagrams every possible root cause and every possible negative outcome for each root cause. Often, such a graph will show overlapping paths between root causes and possible outcomes, where root causes may share one or more outcomes, and different outcomes may share one or more root causes. Arbitrary changes to data and execution states at runtime can, and often do, change the observed end results of a given root cause condition. That is, normal runtime changes of the various states in a program can cause different subsets of the static graph to be active at any given time. This can then cause different occurrences of the same root cause conditions to result in different negative outcomes at different points in time, in seemingly arbitrary ways. This effectively renders the knowledge captured in the static graph of all possible causes and effects useless: at runtime, the knowledge cannot be leveraged, since the paths of cause and effect at any given time are often variable. These problems often represent a hard "stopping point" to any solution that tries to build a system on top of a static list of causes and effects. Attempts to solve the problem simply cannot be built on top of static knowledge about all of the possible paths of cause and effect, because the actual paths of cause and effect observed in running software at any point in time are often not static. Instead, they are typically a varying subset of that total list of all possible paths of cause and effect. That is, how would the software know which possible path(s) were in effect, in order to inform the user what the ultimate root cause(s) were? What matters to the user when troubleshooting an observed issue is what actually happened (the list of causes and effects active at that time), not what could have happened (the list of all possible cause and effects at any time).

Details of root cause conditions are often logged out to a separate database or log file, but there is no direct connection for the user from the negative outcome displayed in the UI back to this detailed root cause information. Users are required to dig through these databases or logs and effectively make guesses on which of the listed possible root cause conditions caused their particular negative outcomes. Root cause conditions that occur in other applications or nodes make this problem even more difficult, since the users have to know which other applications or nodes may have an effect on the current application, and this is rarely easily known.

Root cause conditions may sometimes be displayed in a pop-up dialog window when they occur, but still often contain no direct connection back to possibly multiple downstream negative outcomes. Software developers also occasionally engage in trying to develop automated heuristics to report root cause conditions for negative outcomes, but by the nature of heuristic systems, the results are often inaccurate and prohibitively expensive to develop.

Based on the information provided in software by developers above, users and businesses attempt the following general classes of actions to troubleshoot: searching the root cause condition databases (event databases); manual heuristics (analyzing symptoms, user actions, and software output for known patterns); checking the documentation; looking at trace log files; and asking other people, including repeated escalations. All of these methods can have problems that result in highly incomplete coverage of the main problem, and therefore significant wasted time and money. First, events in event databases are often not connected by the software back to the negative outcome in any meaningful way for the user and often contain many unrelated events, which effectively hide the events of interest. The actual cause-and-effect relationship between any root cause event and its negative outcome may be highly obscure to the user and therefore non-obvious, resulting in troubleshooters ignoring the actual root cause event. Second, heuristics are by definition imprecise and subject to error (e.g., misdiagnosis). Effective heuristic analysis requires prior experience with (and memory of) the particular failure and its symptom patterns in order to diagnose. This is frustrated by many different types of root cause conditions exhibiting the same exact symptoms and negative outcomes at the user level, preventing them from being diagnosed heuristically. Third, documentation cannot adequately capture the multitude of combinations of arbitrary events. Fourth, operators typically do not have ready access to trace log files because they are intended for in-house use by software developers and often are not easily interpreted by users. Finally, asking others often adds communication delays and does not necessarily resolve the problem due to diagnostic limitations; this can be an expensive service cost for the manufacturer providing technical support.

SUMMARY OF THE INVENTION

One or more of the foregoing issues in the prior art can be addressed by using a system that maintained a causal event database wherein each causal event is assigned a substantially unique causal ID and may be linked to a parent causal event by referencing that causal ID. Boole operations that are aware of causal data can be used to propagate causal IDs to help link parent and child events.

On aspect of some embodiments includes a method for tracking causal events in a software system that includes steps of identifying (by a processor) a plurality of causal events that occur during operation of the system that meet one of a plurality of predefined causal conditions, assigning a substantially unique causal ID to each causal event and creating an entry for each causal event in a causal database. The processor continues by associating each causal ID with system state values describing a system state, by the processor, executing a plurality of causal Boolean operations that each take as input one or more input causal IDs and the associated system state values and output a Boolean value and a selected one or more of the input causal IDs. An input causal ID is selected by the processor for output if changing the system state values associated with the input causal ID would change the output Boolean value. The method further displays, to a user of the software system, an interface that conveys causal relationships of events to negative outcomes for the user in the software system based on the execution of the causal Boolean operations and the contents of the causal database.

In some embodiments, at least one of the causal Boolean operations is an AND operation that selects for output at least one causal ID associated with a false input state if the output is false and selects at least one input causal ID for output if the output is true. The AND operation can output all input causal IDs if the output is true. In some embodiments, at least one of the causal Boolean operations is an OR operation that selects for output at least one causal ID associated with a true input state if the output is true and selects at least one input causal ID for output if the output is false. The OR operation can output all input causal IDs if the output is false. In some embodiments, at least one of the causal Boolean operations is a NOT operation that selects for output at least one causal ID associated with a true input state if the output is false and selects at least one input causal ID for output if the output is true.

In some embodiments, the graphical interface allows a user to click a negative outcome to expand or collapse display of root cause events for that negative outcome. In some embodiments, the processor associates causal IDs with system state values by maintaining a plurality of objects that include both a causal ID and one or more data about a system state as variables of each state object.

In some embodiments, the method includes a step of executing non-Boolean causal operations that return an output value and selectively return any causal IDs associated with input values that are determined by processor to have contributed to the output value.

In some embodiments, the software system facilitates operation of a clinical analyzer.

Another aspect of some embodiments includes a method for tracking causal events in a software system that includes steps of identifying (by a processor) a plurality of causal events that occur during operation of the system that meet one of a plurality of predefined causal conditions and assigning a substantially unique causal ID to each causal event and creating an entry for each causal event in a causal database. The process further carries out steps of associating, via the causal database, each causal ID with system state values describing a system state that results from the causal event to which the causal ID is assigned and executing a plurality of causal functions that each take as input one or more input system state values and the associated causal IDs. These causal function output a result that is defined by the causal function of the input system state values and a selected one or more of the input causal IDs, the selected input causal value being a causal ID associated with system state values that, if changed, would cause the result to change. The method further displays, to a user of the software system, an interface that conveys relationships of events to negative outcomes for the user in the software system based on the one or more causal IDs associated with the one more states that led to the negative outcomes and the contents of the causal database.

In some embodiments, at least one of the plurality of causal functions is an AND operation that selects for output at least one causal ID associated with a false input state if the output is false and selects at least one input causal ID for output if the output is true. The AND operation can output all input causal IDs if the output is true. In some embodiments, at least one of the plurality of causal functions is an OR operation that selects for output at least one causal ID associated with a true input state if the output is true and selects at least one input causal ID for output if the output is false. The OR operation can output all input causal IDs if the output is false. In some embodiments, at least one of the causal Boolean operations is a NOT operation that selects for output at least one causal ID associated with a true input state if the output is false and selects at least one input causal ID for output if the output is true.

In some embodiments, the interface allows a user to click a negative outcome to expand or collapse display of root cause events for that negative outcome.

In some embodiments, the processor associates causal IDs with system state values by maintaining a plurality of objects that include both a causal ID and one or more data about a system state as variables of each state object in the causal database. In some embodiments, the plurality of causal functions includes non-Boolean causal operations that return an output value and selectively return any causal IDs associated with input values that are determined by processor to have contributed to the output value.

Another aspect of some embodiments includes a method for tracking causal events in a software system where a processor executes steps of maintaining a causal event database, where information about each of a plurality of causal events is stored, each with an assigned substantially unique causal ID, and at least a subset of causal events also identifying another causal event as a parent cause of that causal event, and identifying a first causal event that occurs during executing of a software sequence, that meets at least one predefined causal condition. The processor performs further steps of determining whether the first causal event is the result an existing parent causal event, assigning a first substantially unique causal ID to the causal event, and storing information about the first causal event, including the first substantially unique causal ID, related state information, and a causal ID of the parent causal event if one has been determined. The processor then passes the first substantially unique causal ID to an output of the software sequence, such that subsequent software sequences that encounter additional causal events can link the first causal event as a parent causal event to the additional causal events.

In some embodiments, the method displays, to a user of the software system, an interface that conveys causal relationships of causal events, based the contents of the causal database.

In some embodiments the processor executes a plurality of causal Boolean operations in the subsequent software sequences that take as input one or more causal data values that each include a state value and a causal ID, where the causal Boolean operations each evaluate to an output Boolean value and a selection at least one causal value of the one or more causal data values that, if the associated state value were changed, would result in a different output Boolean value. In some embodiments, the causal Boolean operations select as output all of the casual IDs associated with each input state value that, if changed, would result in a different output Boolean value. In some embodiments, the causal Boolean operations select as output only one casual ID when there are multiple input state values that, if changed, would result in a different output Boolean value.

In some embodiments, each causal event is assigned an effort value approximating the amount of effort needed to correct the causal event. In some embodiments, causal events are displayed to a user, via a user interface, and all parent causal events are linked in the interface to each child causal event. In some embodiments, the effort values of parent causal events are displayed to a user via the user interface, allowing the user to see an approximation of which parent causal events should take the least amount of effort to resolve.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 2A-C are user interfaces of an exemplary prior art approach to error reporting;

FIGS. 5A-5C are timing diagrams that show the interaction between threads in certain illustrative embodiments;

FIGS. 6A-C are timing diagrams that show the interaction between threads in certain illustrative embodiments;

FIGS. 7A-7B are timing diagrams that show the interaction between threads in certain illustrative embodiments;

FIGS. 8A-8E are dependency diagrams of exemplary runtime relationships illustrating state and error propagation in exemplary systems that can be used with some embodiments;

FIG. 12 is a table illustrating the differences between system states and positive/negative outcomes;

FIGS. 14A-14N are exemplary causal output tables illustrating the assignment of causal IDs to output Boolean value by software in certain embodiments and their logical properties;

FIGS. 15A-15F are exemplary causal output tables illustrating the assignment of causal IDs to output Boolean value by software in certain embodiments;

FIG. 17A-L are flow charts and the operation of some illustrative embodiments;

FIGS. 18A-H and 19A-C are logical diagrams of exemplary causal ID propagation through exemplary causal Boolean operations that are evaluated to determine whether a negative outcome should be displayed to a user and the root cause of that outcome.

DETAILED DISCUSSION

Figure 1:
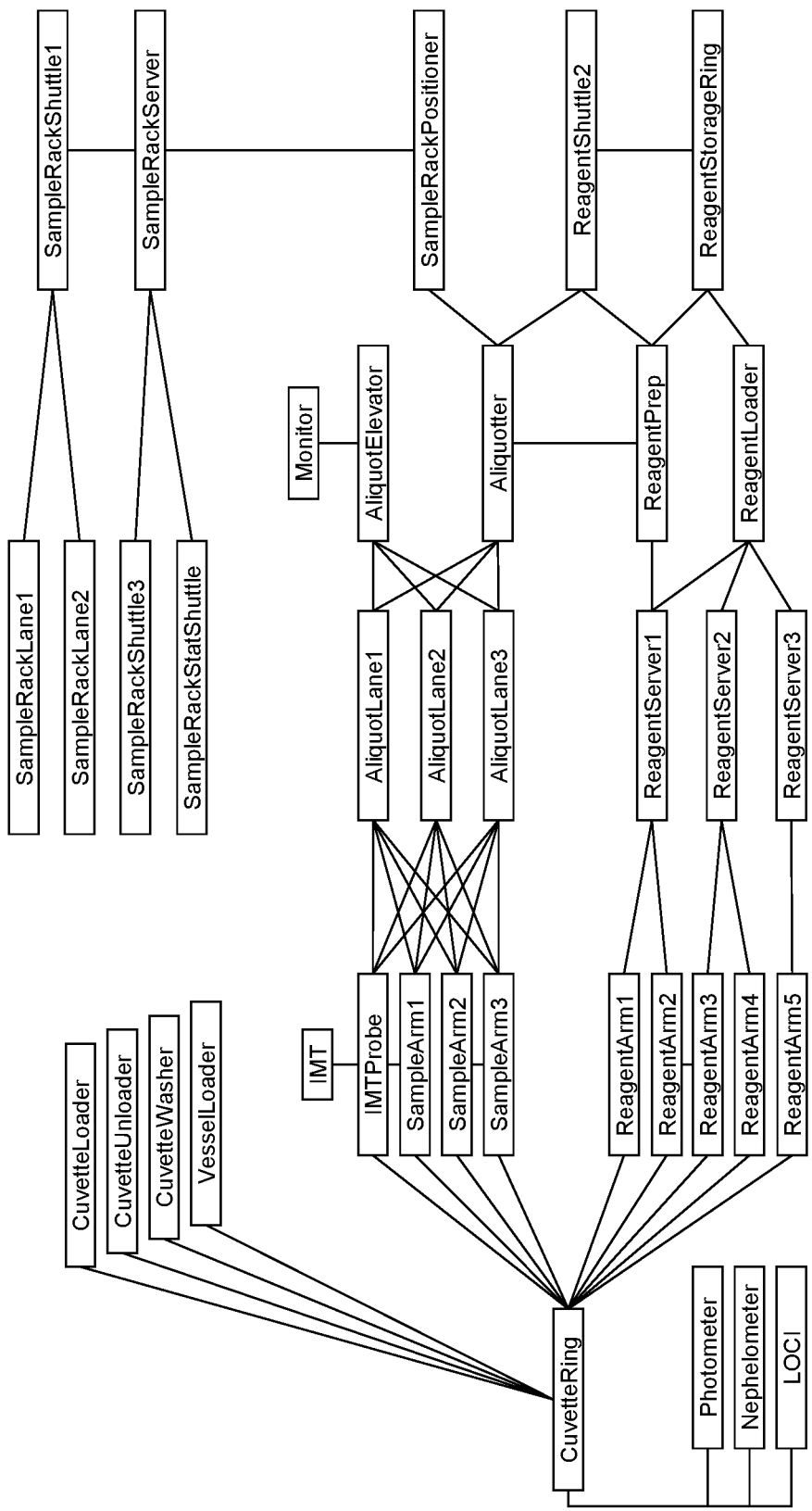
FIG. 1 is a system diagram of an exemplary system for use with some embodiments.
Figure 2A:
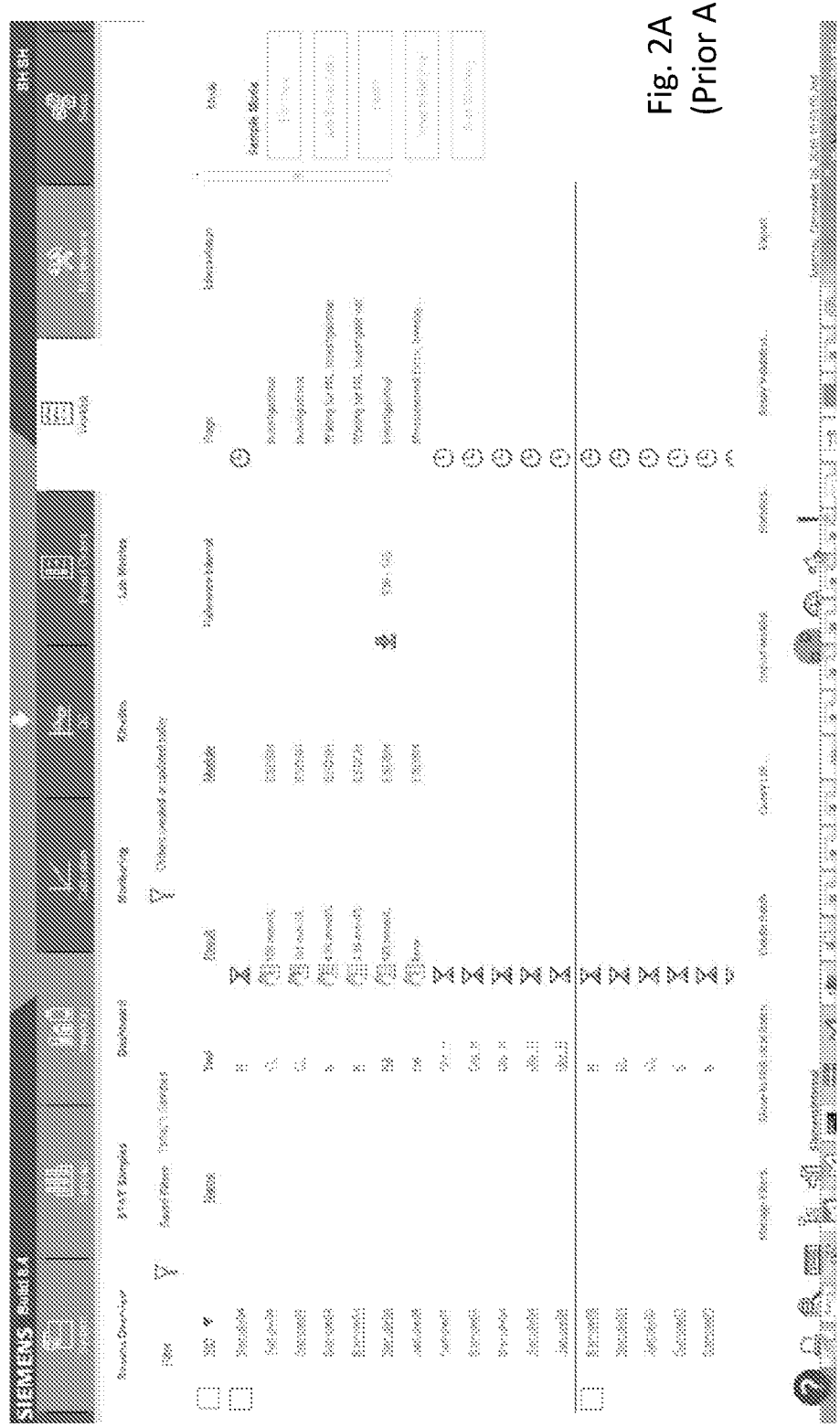
Figure 2B:
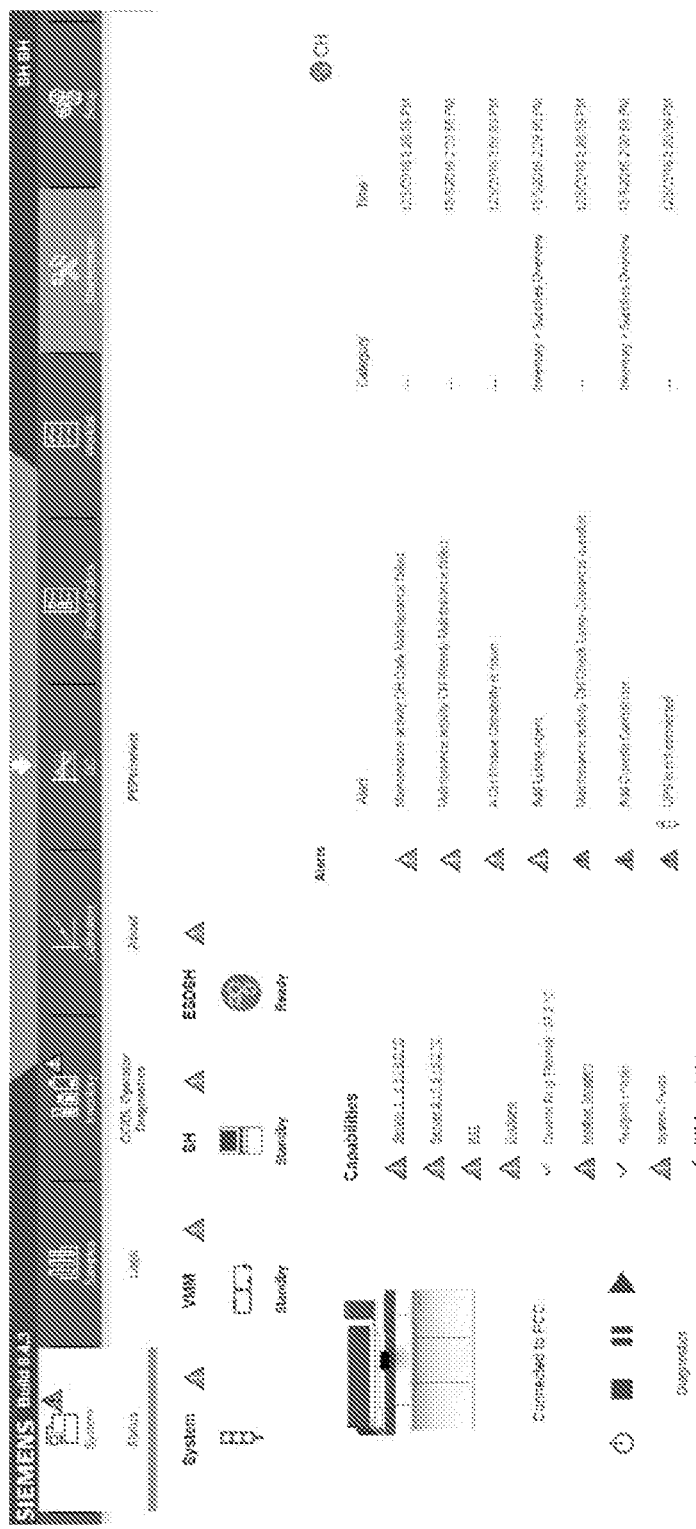

Software users spend tremendous amounts of time troubleshooting failure modes communicated by the software in order to diagnose and correct problems. A large amount of this time is spent trying to determine the detailed root cause conditions, as detected by the software, for any given failure that a user experiences.

That is, users are often told by the software that there is a basic failure or problem somewhere—that is, they experience a "negative outcome" in the user interface, where a request is reported to have failed, or a system is reported to be unavailable for processing future requests—and then those users spend a large amount of time trying to connect that negative outcome back to the root condition detected by the software that caused the negative outcome to be displayed. Here, a "failure mode" is defined as one possible root cause condition detected by the software combined with one possible negative outcome in the user interface resulting from that condition.

In order to remedy any given failure mode, users frequently need to make the causal connection back from the specific negative outcome experienced at the user interface level to the specific source condition detected by the software. Often, a user can only continue to use the software as intended after making this connection and remedying the inputs to the involved source conditions.

Two common properties of software are that a single root cause condition can cause many different types of different negative outcomes, sometimes occurring in parallel, and a single negative outcome can be caused by many types of root cause conditions, also sometimes occurring in parallel. Therefore, the total number of possible failure modes in the system is considered to be all possible combinations of source conditions and their possible negative outcomes. In software of even moderate complexity, the number of possible failure modes typically ranges into the millions, which is far too large to practically enumerate or document. That is, providing an exhaustive list of all possible failure modes for e.g., a troubleshooting guide is typically an intractable problem. Because of the intractably large number of possible failure modes, and other properties of software described below, the current techniques that users and developers utilize to make this diagnostic connection are often inadequate for an efficient user experience.

Consequently, this is an area where both software businesses and their customers spend huge amounts of resources: trying to answer which basic software condition caused a failure to be explicitly displayed to the user. The inability to quickly and effectively make the connection between any particular occurrence of negative outcome back to that occurrence's particular root cause condition(s) costs large amounts of time and money. It is common to witness multiple software operators and engineers spending hours or days trying to track a single on-screen failure back to a simple hardware error or user action in the logs.

For many reasons, described below, most software currently only provides relatively limited "success," "failure," or similar indicators for failure displays, with most of the detailed information about the actual failure conditions, which the user needs to remedy the problem, provided elsewhere, in a way that is extremely difficult for users to connect to the originally displayed negative outcome. Examples abound of this problem in typical clinical analyzers. For example, almost all UI displays can communicate negative outcomes to the user in some basic way (e.g., failed patient tests, unavailable modules, failed maintenance activities, unavailable capabilities, etc.), but the source conditions are often captured on a different display (e.g., in a combined, generic error log, or the operating system event logs). The problem is that software typically has no way to connect the negative outcomes shown on the various screens back to the detailed source condition information captured in the event log displays. This results in much guessing and escalation of the problem from the customer to the manufacturer, and frequently up through service and R&D organizations, which becomes extremely expensive. The reasons for the inability of software and users to easily make these connections to date are described below.

This problem is not limited to laboratory diagnostics products, nor even healthcare products or healthcare software in general. This problem affects almost all software systems that can report negative outcomes to the user, which is most software. This includes both operating systems and the applications that run on them.

Many of the source cause conditions that users are attempting to diagnose are actually detected internally by the software, but due to the complexity of data flows in almost all software systems, as well as misconceptions by software engineers about these data flows, current software designs do not accurately or effectively report these detailed source cause conditions to the user when and where the user sees the negative outcome displayed. This results in significant downtime for both software customers and software providers, due to the extended troubleshooting analysis required for what are sometimes considered minor, easily correctable problems, and the even greater analysis often required for more complex problems.

Examples of negative outcomes that can be communicated to the user in healthcare and other hardware instruments, or in general non-instrument software, include: patient tests not starting, or not completing; calibration or QC tests not starting, or not completing; reagent loading/unloading not starting, or not completing; manually requested maintenance activities, such as changing consumables, priming, cleaning, etc., not starting, or not completing; automated maintenance activities not starting, or not completing; consumables unexpectedly showing empty or otherwise unavailable; module states down or unavailable; module capabilities down or unavailable; subsystems down or unavailable; disabled (grayed out) user controls; any other manually or automatically requested functions not starting or completing; and any other system states or capabilities reporting down or unavailable.

Common root cause conditions that are detected by the software, but which are frequently not communicated out as the direct cause of any given negative outcome occurrence include: arbitrary hardware errors (such as actuator errors; actuator sensor feedback errors that report incorrect motor or solenoid positions, electrical current draws out of limits, etc.; data analysis errors that include multiple reading analysis from one or more sensors indicating chemistry, mechanical, or other problems; communication errors; logic problems); operator actions that cancel other requests and/or make systems unavailable (operator presses "Pause" or "Stop"); requests from operator to run maintenance sequences which make the system unavailable for other requests; requests from operator to start up or reset system which causes the system to be unavailable to process other requested functions while initializing; requests from operator or other higher priority effects that abort lower priority requests and/or makes systems unavailable for any period of time; operator switching system to a different system mode, such as an input mode, a review mode, etc., that causes arbitrary functions or controls to become unavailable; or the operator installing software, or resetting databased or other persisted data, which creates initial data conditions not yet suitable for processing future requests, which may indicate a default that no calibration is performed, a default that consumables are empty, etc.; automatically initiated activities that cancel other requests and/or make systems unavailable (such as automated maintenance activities, automated warm up or cool down periods, and automated system resets); cascading errors or events, where issues listed above cause one or more further detected issues downstream, which then cause negative outcomes (such as errors or other root cause conditions propagating across function calls, data paths, threads, processes, computers, and/or networks and network nodes, which then cause other errors or causal conditions in those subsequent entities, and recursive or iterative application of this cascading principle to zero or more downstream negative conditions)

Figure 3:
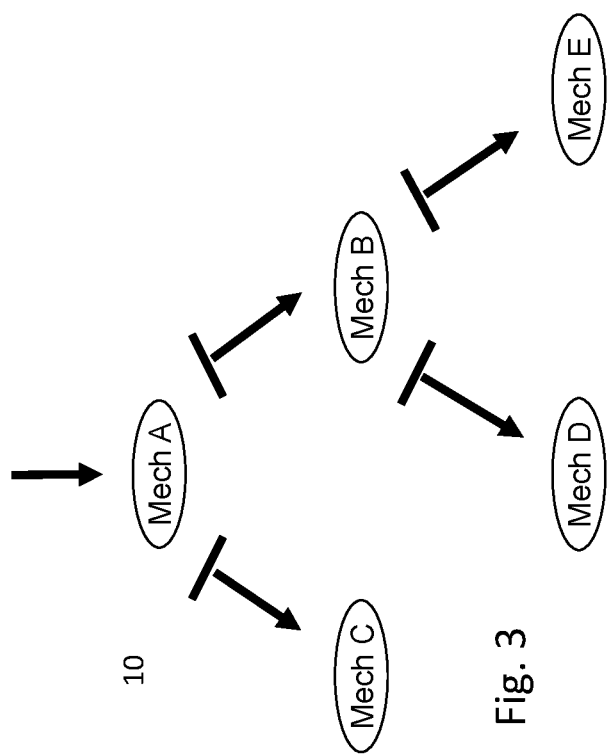
FIG. 3 is a symbolic system diagram of an exemplary system for use with some embodiments illustrating dependencies.

FIG. 3 shows an exemplary graph 10 of extended dependency between five hardware mechanism control threads. In the example shown in FIG. 3, mechanism A has a root cause error. All other mechanism threads eventually have their own errors because mechanism A did not finish, preventing the other mechanisms from completing their tasks. One solution to some of these problems is explained in U.S. Pat. No. 9,298,535, which is commonly owned and incorporated herein by reference.

One can also build a causality tree. By observing the branches in this tree, it can be quickly discerned which error is a root cause of the other branching errors. A parent is considered to be a cause of its child. Errors without parents defined (tree roots) are considered possible root cause errors. Errors with parents defined (branches or leaves) are considered definite non-root cause errors. When expressed as a downward branching graph, parents are the ultimate cause for all children underneath them.

Figure 4A:
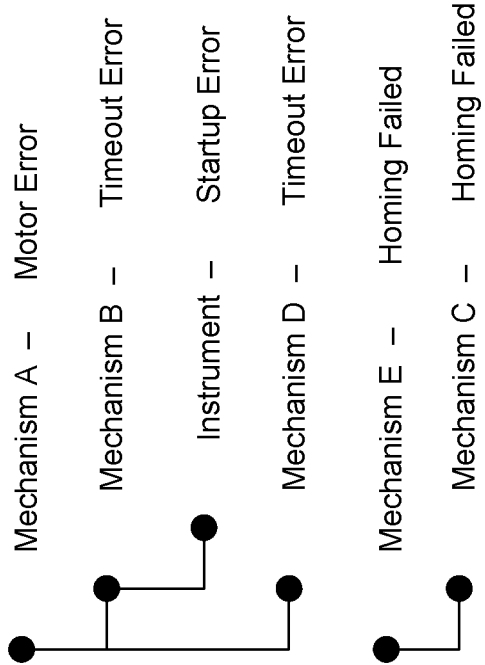
FIGS. 4A-4B are exemplary causality trees that may occur in exemplary systems for use with some embodiments.

FIG. 4A shows an exemplary root cause tree 14 with two parent errors (mechanism A motor error and mechanism E homing failed) that could be displayed as part of GUI to a user.

Figure 4B:

FIG. 4B shows an exemplary user interface, where buttons on the user interface allow the tree to collapse, hiding children errors, allowing the user to quickly see the possible root cause errors, creating a collapsed causality tree 18, which is a modified display of causality tree 14. Collapsing the tree can aid in rapidly assessing the root causes by a user.

To build a causality tree, software should create an ability to link errors together at build time and then link errors together at runtime. In the example of Dimension Vista, errors are represented by throwable class objects:

```
class ErrorClass
{
    int iErrorCode;
    string strErrorDescription;
    ...
};
```

To create linking ability, the error class can be extended with two new fields: 1) an iSerialNumber that uniquely identifies every error instance that is generated; and 2) an iParentSerialNumber that points to the parent of the current error, if a parent is known.

```
class ErrorClass
{
    int iErrorCode;
    string strErrorDescription;
    ...
    // unique ID for every object instance
    int iSerialNumber;
    // SN of parent instance. Equals 0 if no parent
    int iParentSerialNumber;
};
```

Using this example, the following code can be used to display errors in an unlinked manner.

```
void InitializeMechanism( )
{
    try
    {
        MoveMotor( );
    }
    catch ( ErrorClass originalError )
    {
        PostErrorToUserInterface( originalError );
        ErrorClass initializationError(
            INITIALIZATION_ERROR );
        PostErrorToUserInterface( initializationError );
    }
}
```

A linked version can be displayed by adding a parent serial number using the following exemplary code:

```
void InitializeMechanism( )
{
    try
    {
        MoveMotor( );
    }
    catch ( ErrorClass originalError )
    {
        PostErrorToUserInterface( originalError );
        ErrorClass initializationError(
            INITIALIZATION_ERROR );
        initializationError.SetParentSerialNumber(
            originalError.GetSerialNumber( ) );
        PostErrorToUserInterface( initializationError );
    }
}
```

There can be multiple solutions for linking errors using parent IDs. It may depend on the error type. A general strategy for linking errors is to find error creation points in the code, determine if an error could be a child caused by a parent error, and if so figure out how to get the parent's serial number to a child.

Figure 5A:
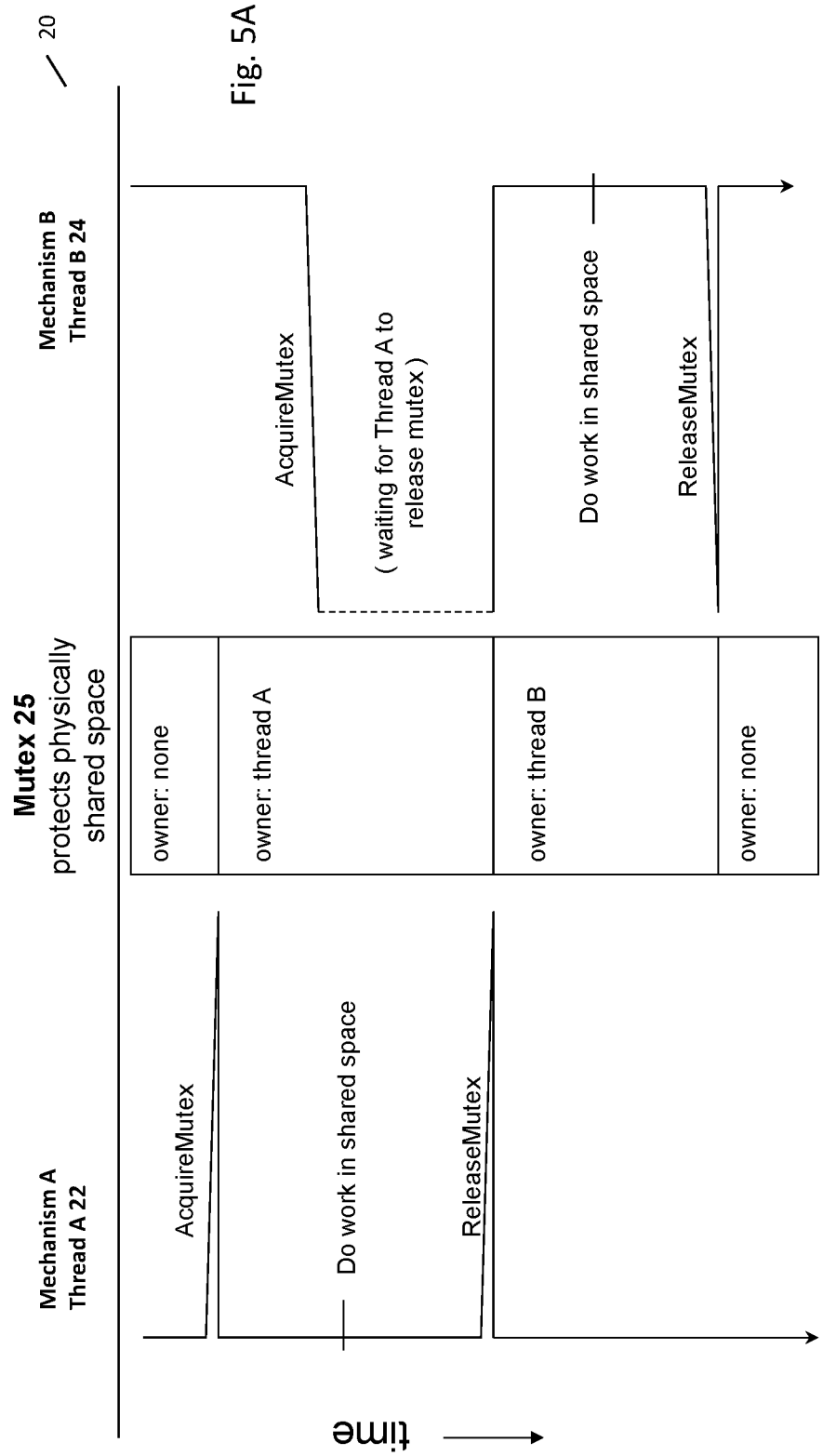

Links between single-threaded errors can be Achieved by passing serial numbers up and down the call stack alongside associated error codes and events. Cross-thread errors (timeouts, thread interrupts) tend to be a little trickier, but can be handled in some embodiments. Exemplary cross thread errors include timeout errors on, timeout errors on one-way signals, and thread interrupt errors FIG. 5A shows an exemplary interaction 20 between thread A 22 and thread B 24 using mutex 25 to protect physically shared space. In this figure, thread A 22 locks the mutex 25 while performing its work in the space and then releases the mutex. Thread B 24 waits for thread A 22 to release the mutex 25 before locking the mutex during its work in the space and then releases the mutex after its work is done.

FIG. 5B shows the exemplary interaction 30 when the mutex 25 results in a timeout error 34 in thread B 24 after thread A 22 encounters a motor error 32, because thread A 22 cannot release mutex 25 in time for thread B 24 to successfully operate.

To facilitate linking these errors, the Mutex class can be extended to store an error serial number and return the current error serial number on timeout. This concept is discussed in further detail in U.S. Pat. No. 9,298,535. This can be accomplished by including the following exemplary code.

```
class Mutex
{
    ...
    int iErrorSerialNumber;
    // If returns false then timeout, and iSerialNumber
    // equals parent error serial number.
    bool AcquireMutex( [out] int & iSerialNumber );
};
```

This can be used to push an error serial number into all mutexes acquired by the current thread once an error has occurred as part of any error handling routine. Then, when another thread attempts to acquire the mutex, when the AcquireMutex routine returns a timeout, it can also return the active error serial numbers saved into the mutex, as a parent error. This can then be passed along to any error handling routine in that second thread.

Each thread can keep track of all acquired mutexes using an intent list. An intent list can be used to represent all objects held by the current thread that any other thread might be waiting for a signal on. This can be called the "intent-to-signal" list, or "intent" list. An intent list can keep track of items that other threads might be waiting on. Each list can be thread local, and one list per thread. All items in the intent list should implement an ability to save error serial numbers to propagate errors to other threads that may be relying on those same items. Some exemplary commands (with self-descriptive names) that can be used with an intent list:

a) On acquiring the mutex: AddToIntentList(signalable_item) e.g., mutex, signal, event;

b) On releasing the mutex: RemoveFromIntentList(signalable_item) and SetSnOnIntentList(serial number) (Save the special "no error" error serial number (e.g. the null or zero serial number) to each item currently in list).

c) On encountering any error: SetSnOnIntentList(error.GetSerialNumber( ) ) (Save error serial number into all items in intent list, i.e., all mutexes currently acquired by current thread).

d) On encountering mutex timeout error: Use serial number saved in mutex as parent of timeout error.

Figure 5C:
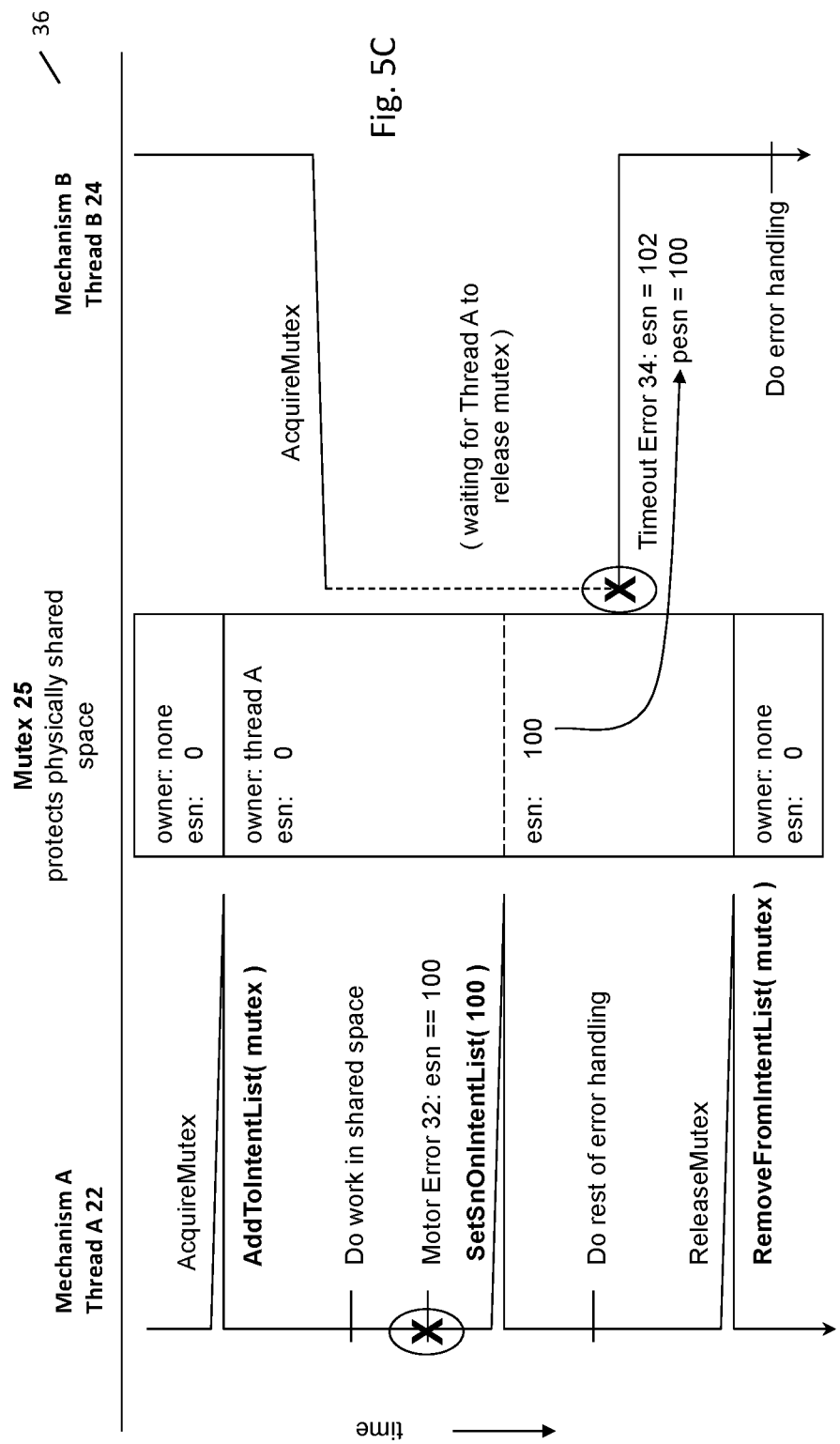

FIG. 5C illustrates how some of these commands can be used to propagate errors with a mutex and a motor error. In situation 36, when thread A 22 encounters motor error 32, it places an error serial number into mutex 25. When thread B 24 encounters a timeout error waiting for Mutex 25, it can then take the error serial number and pass that serial number along with the error notification, allowing the motor error 32 to be linked as a root cause error of timeout error 34 during later analysis.

Signalable objects can also be enhanced with error propagation. FIG. 6A shows an exemplary interplay 40 between two threads using a signal object. In this example, the signaling object 45 is used to pass a signal from thread A 42 to thread B 44. This can act like a handshake letting thread B know that thread A has completed certain work. Thread B 44 waits for a signal that is later sent by thread A 42 before proceeding to do resulting work. Thread B 44 can have a timeout threshold so that the amount of time thread B 44 will wait for thread A 42 to signal can be bounded.

FIG. 6B shows an interplay 46 with an example of a timeout error 48 in thread B caused by a motor error 50 in thread A where no signal is sent from thread A to thread B due to the motor error. Linking a signal timeout is very similar to linking a Mutex timeout. The signal class can be extended to allow a serial number to be set, like in the Mutex class. The signal object can be added and removed from an intent list at appropriate points during each work unit.

Figure 6C:
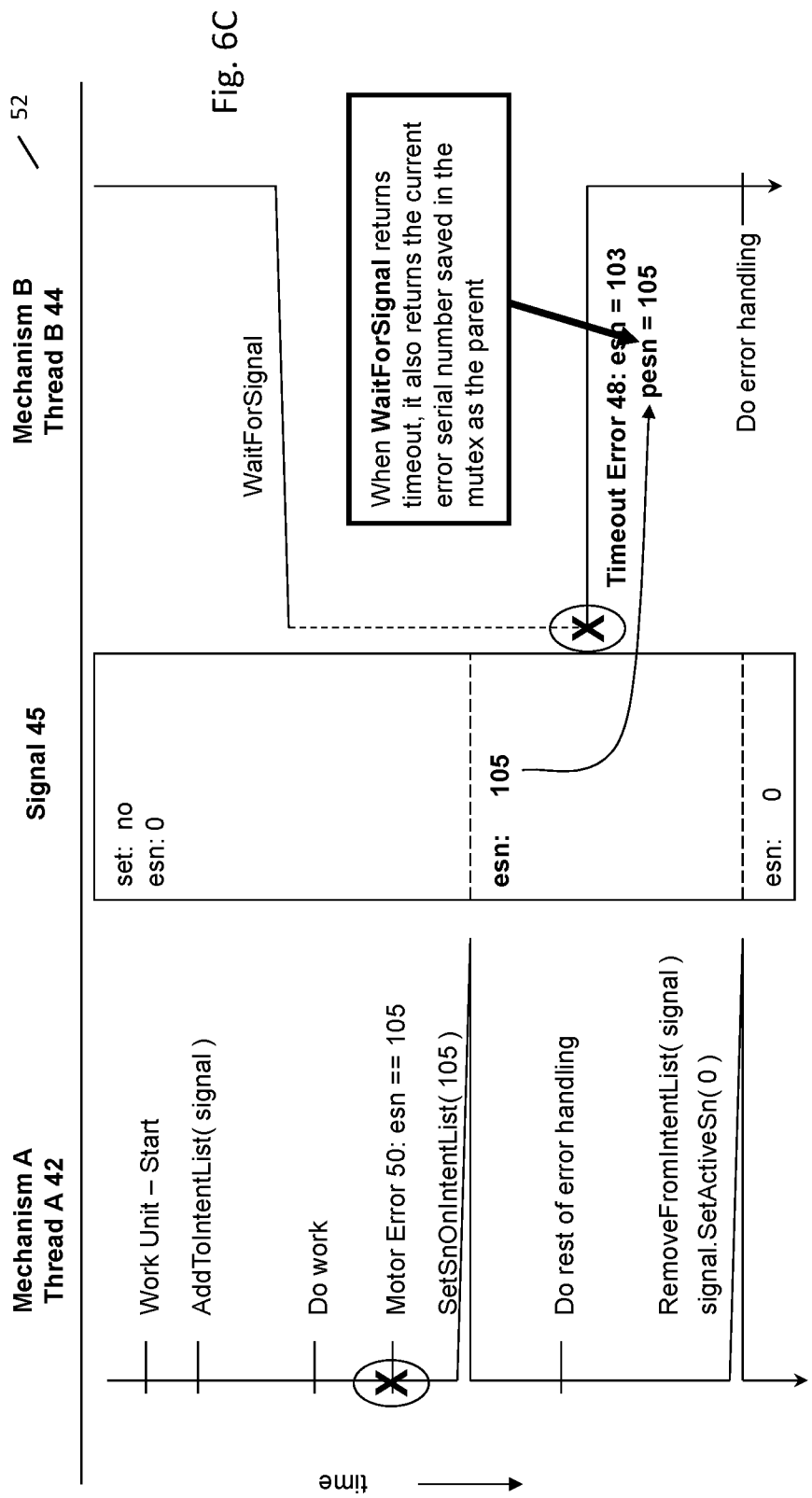

FIG. 6C shows an interplay 52 with an example of a signal object that has been modified to allow the passing of an error serial number from thread A 42 to thread B 44. In this example, the first thread A 42 adds the signal object to its intent list. When a motor error occurs, the thread passes the error serial number (105) to each object (such as signal 45) in its intent list, which includes passing the error serial number to the signal object. Thread A 42 then removes the signal object from its intent list when it has finished any error handling that delayed signaling of the object. When the second thread encounters a timeout error waiting for the signal object, it can find that error serial number and pass that information along in an error handling routine. On starting work unit that will signal, an exemplary thread will execute AddToIntentList(signal). On setting signal, the thread will execute RemoveFromIntentList(signal) and set the serial number in signal object to 0. On encountering any error, the thread will execute SetSnOnIntentList(sn), which saves the error serial number into all items in intent list (i.e., all mutexes and signals intended to be signaled by current thread). On finishing any error handling, the thread will execute RemoveFromIntentList(signal). On encountering a signal timeout error, each thread will use the serial number returned from a signal object as parent of timeout error.

Threads can also encounter thread interrupt errors. Thread interrupts typically are used to abort thread operations in response to another error or event. These errors often manifest as thrown exceptions or returned error flags and consequently often are treated with error handling by the thread that is interrupted. It is therefore desirable to link any parent errors or events that cause the interrupt to abort the thread.

FIG. 7A shows an example of a traditional problem of tracing thread interrupt errors. In situation 54, Thread A can send an interrupt request to thread B's thread object 56 after a motor error 50 has occurred. Thread B, meanwhile, polls its thread object 56 for interrupts on a regular basis. Upon encountering the interrupt, thread B aborts and performs error handling for interrupt error 58.

Figure 7B:
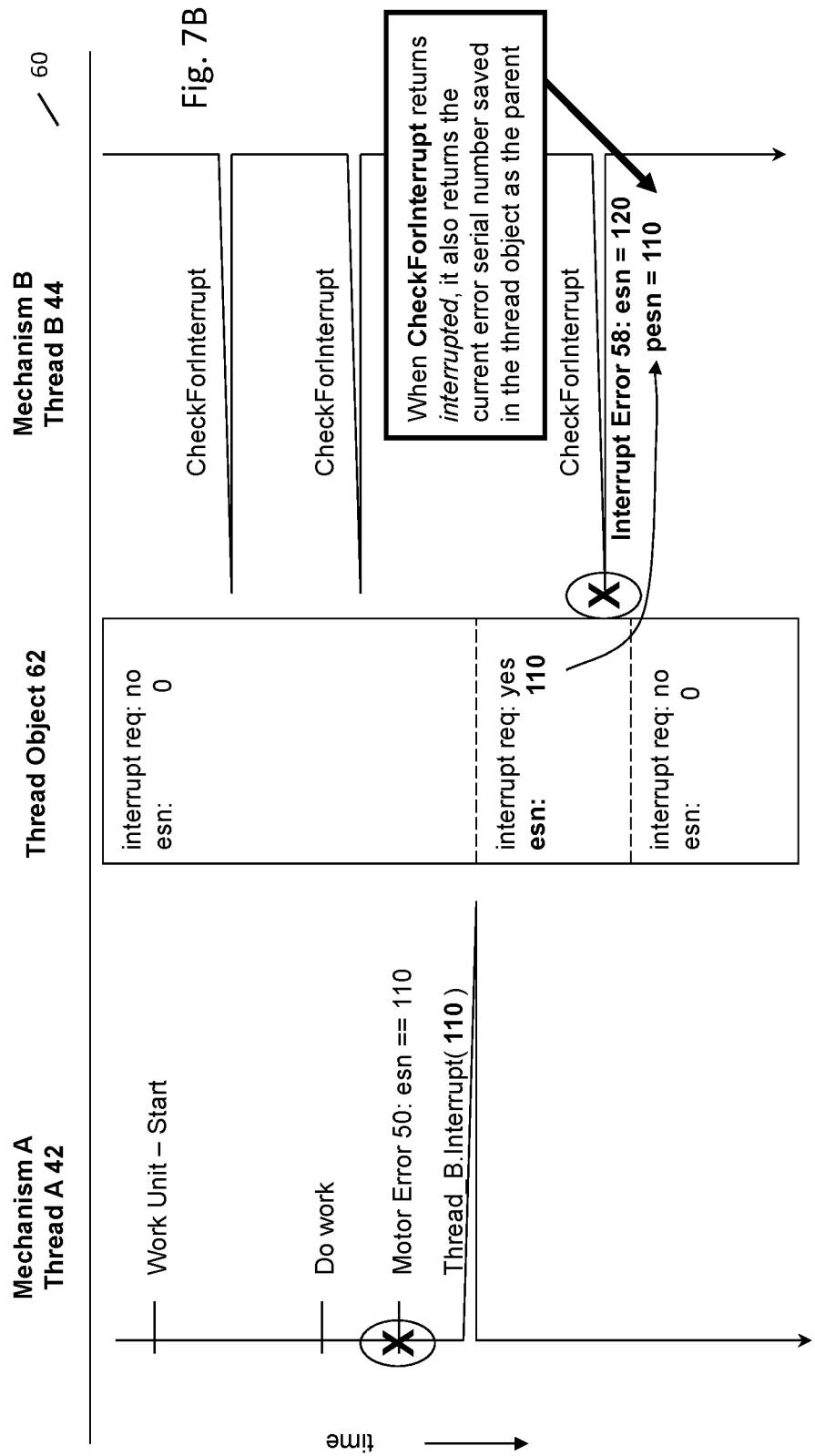

FIG. 7B shows a similar process 60 with a modified thread object 62 that receives an error serial number as an argument when thread A sends an interrupt, allowing thread B to receive the error serial number from thread object 62 upon encountering the interrupt. Thus, when handling interrupt error 58, thread B can causally link the interrupt to thread A.

To modify the thread class that implements interrupt system to allow a serial number to be set with an interrupt request and to return the received serial number when the thread receives interrupt, an exemplary thread class can be defined to include the following functions.

```
class Thread
{
    ...
    int iInterruptErrorSerialNumber;
    void Interrupt( int iSerialNumber );
    // If returns true then interrupted, and
    // iSerialNumber equals parent error serial number.
    bool CheckForInterrupt( [out] int & iSerialNumber );
};
```

It should be noted that, while the foregoing can allow error serial numbers to be passed between threads, allowing parent and child events to be identified and displayed to a user in a manner that identifies parent event in a nested fashion, this solution can include a race condition. Namely, a timeout can occur before another thread has a chance to set an error serial number in a shared synchronization object. In this case, a parent is not identified for the child, such that the child will be considered a root of the tree. Because these systems interface with motors and other hardware, timeout limits can be substantially longer than traditional software applications.

Furthermore, race conditions may not be particularly problematic because the behavioral contract offered by the software to the user is that any error identified as a child when searching for a root cause (versus searching for any cause) is considered to definitely not be a root cause, and parent errors, while known to be the cause of their children, may or may not be the ultimate root cause of their children (e.g. a parent could be a child result of another root cause that could not be identified by the software, particularly in a hardware system where physical interaction of components causes errors in other components, where the interaction is not anticipated by software). Thus, while all errors in the lineage from a child to its tree root are considered causes of that child, the ultimate root of that lineage may or may not be the final root cause. Often, it is still helpful to know at least some of the parental lineage, because that moves the user closer and that much more quickly to discovering the true root cause.

Errors can be understood as a mismatch between an expected state and an actual state. When an error causes a state to change to something that might cause future errors, software can communicate the serial number of that error alongside the state for any future errors based on that state. Even when the unexpected state is not normally considered an error itself. Traditionally, timeout errors can be problematic because they do not necessarily daisy chain; dependent threads may timeout before the threads they depend on. This can be mitigated by including code that immediately trips an error in dependent threads upon the placement of an error serial number into a shared object. Thus, child errors can be thrown before a timeout limit is hit. This can be implemented using enhanced thread synchronization classes. Furthermore, if primitive operations are modified in the system to atomically store data not traditionally stored in those primitives, such as event or error serial numbers, then error/event serial numbers can be more extensively propagated. While using modified primitive classes can add a performance overhead to the system, systems that control mechanical mechanisms may not have high performance requirements relative to the computing power of the system, allowing ample computing time to handle the additional burden of enhanced primitives.

While these basic concepts have been described with respect to errors, it should be appreciated that these principles can be applied to any type of events that have causality in the system. Thus, errors that are caused by user action or other events that are not necessarily or normally considered erroneous, can be tracked to events that are not necessarily errors.

An exemplary graph that simplifies the possible pathways of cause-and-effect for an arbitrary software system is the cause-and-effect graph 70 shown in FIG. 8A. Each node (circle) in the diagram on the far left represents a possible type of root cause condition (source conditions 72) detected by the software per the examples listed above (e.g., hardware errors, operator actions, etc.) Real software systems can have tens, hundreds, or more of these possible conditions. Each node on the far right (Negative outcomes 76) represents a possible type of negative outcome displayed to the user per the examples listed above (failures to process different user requests, different subsystems unavailable, etc.) Real software systems can have tens, hundreds, or more of these possible negative outcomes. Each node in the central area (intermediate data and execution paths 74) represents a data or execution pathway—a data variable, data object, persisted data, network data, function call, conditional statement, code block, etc.,—that is affected by the source conditions on the left, either directly or indirectly, and can cause a negative outcome on the right, either directly or indirectly. Real software systems can and often do have hundreds, thousands, or more of these intermediate pathways. The arrows represent the paths of cause and effect between the nodes, where the node pointed from (left end of) an arrow represents a causal source, and the node pointed to (right end) represents a causal outcome. Practically, a node affected by a causal outcome would indicate a change to the state of that node: a change to a data value represented by that node, or a change to the execution or non-execution of a function, condition, code block, operation, etc., represented by that node.

Note that the diagram in FIG. 8A is highly simplified. Real software systems often also have feedback loops with arrows pointing from nodes on the right back to nodes on the left to cause additional cascading event conditions and more possible paths. As demonstrated by the diagram, in any given software system, there are many complex paths of cause and effect, broken up into many sub-paths and sub-segments.

Figure 8B:
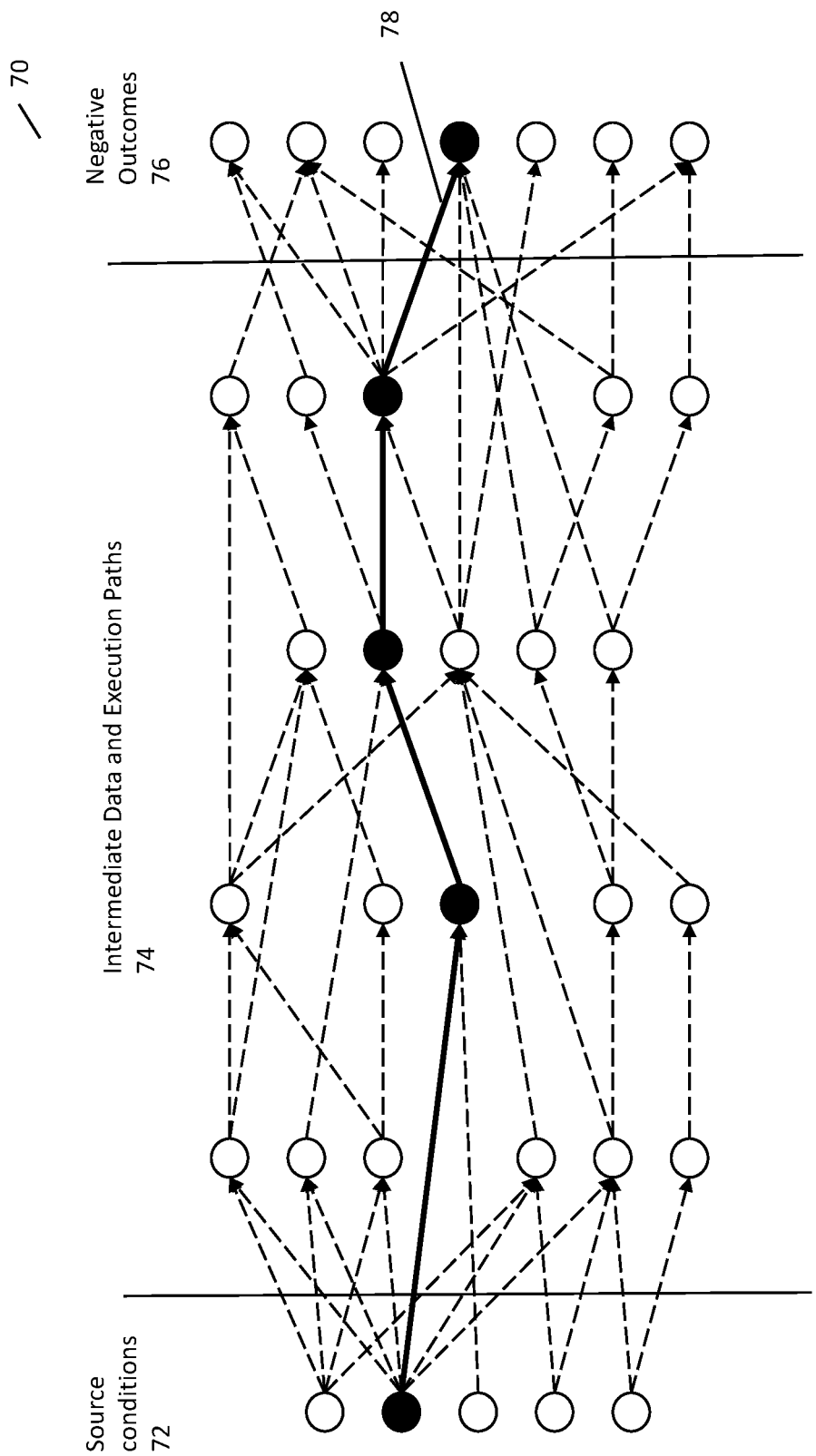

Per the definition of "failure mode" above, any single path from source condition to negative outcome indicates a single type of failure mode, as illustrated by single failure path 78 in FIG. 8B.

There are multiple technical sub-problems of the overall problem of automatically connecting negative outcomes for the user back to root cause events that contribute significantly to the complexity of solving that overall problem.

Figure 8C:
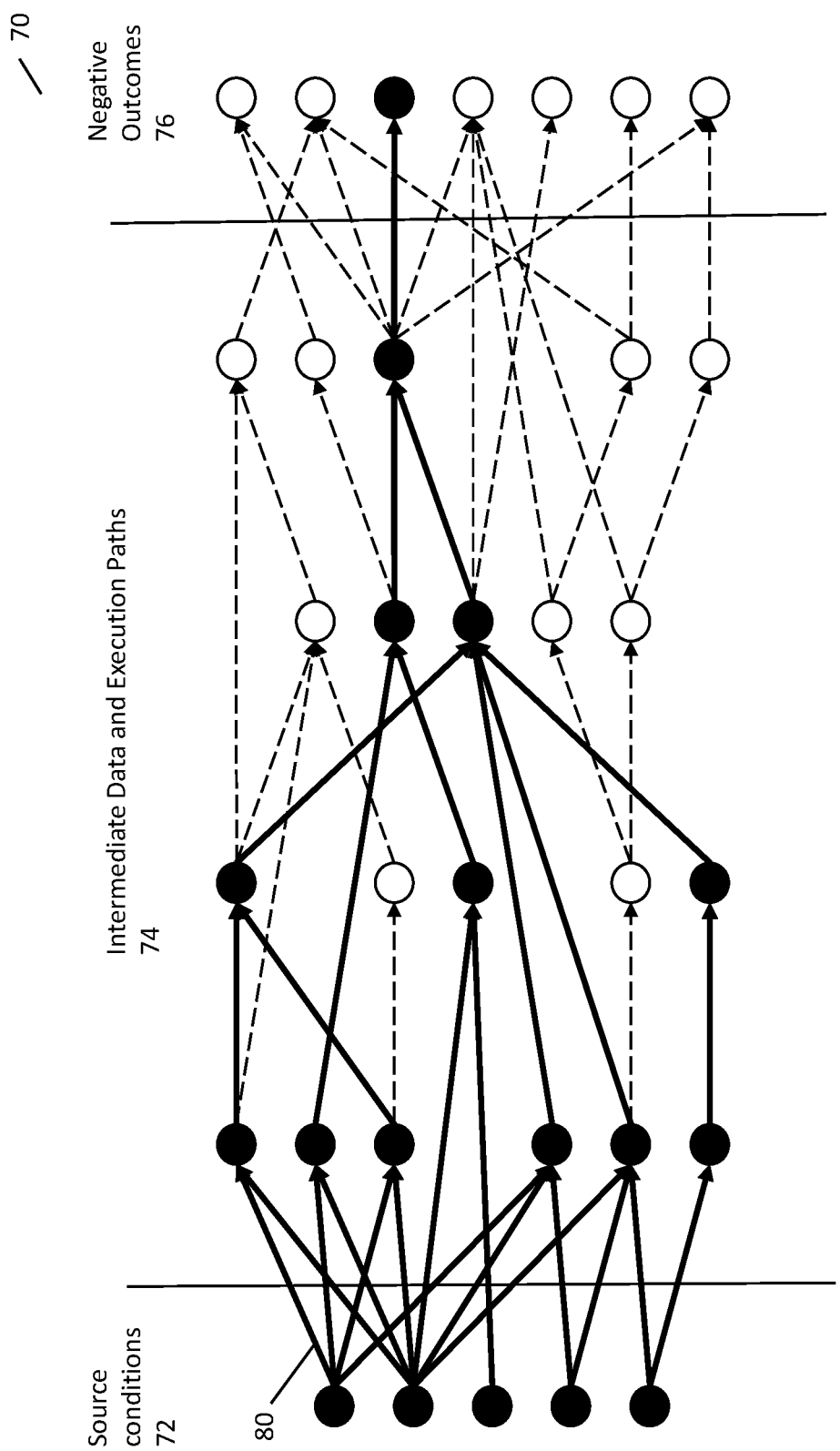

Sub-Problem #1: Causal path complexity. The relationships between root cause (source) conditions and negative outcomes can and often do exhibit many-to-one, one-to-many, and shared-path behaviors. For an example of a many-to-one relationship, the source conditions associated with just one type of negative outcome are shown by multi-source failure path 80 in FIG. 8C. In FIG. 8C, the source conditions were found by picking a negative outcome on the right and tracing backward to the left all possible causes of that outcome.

Figure 8D:
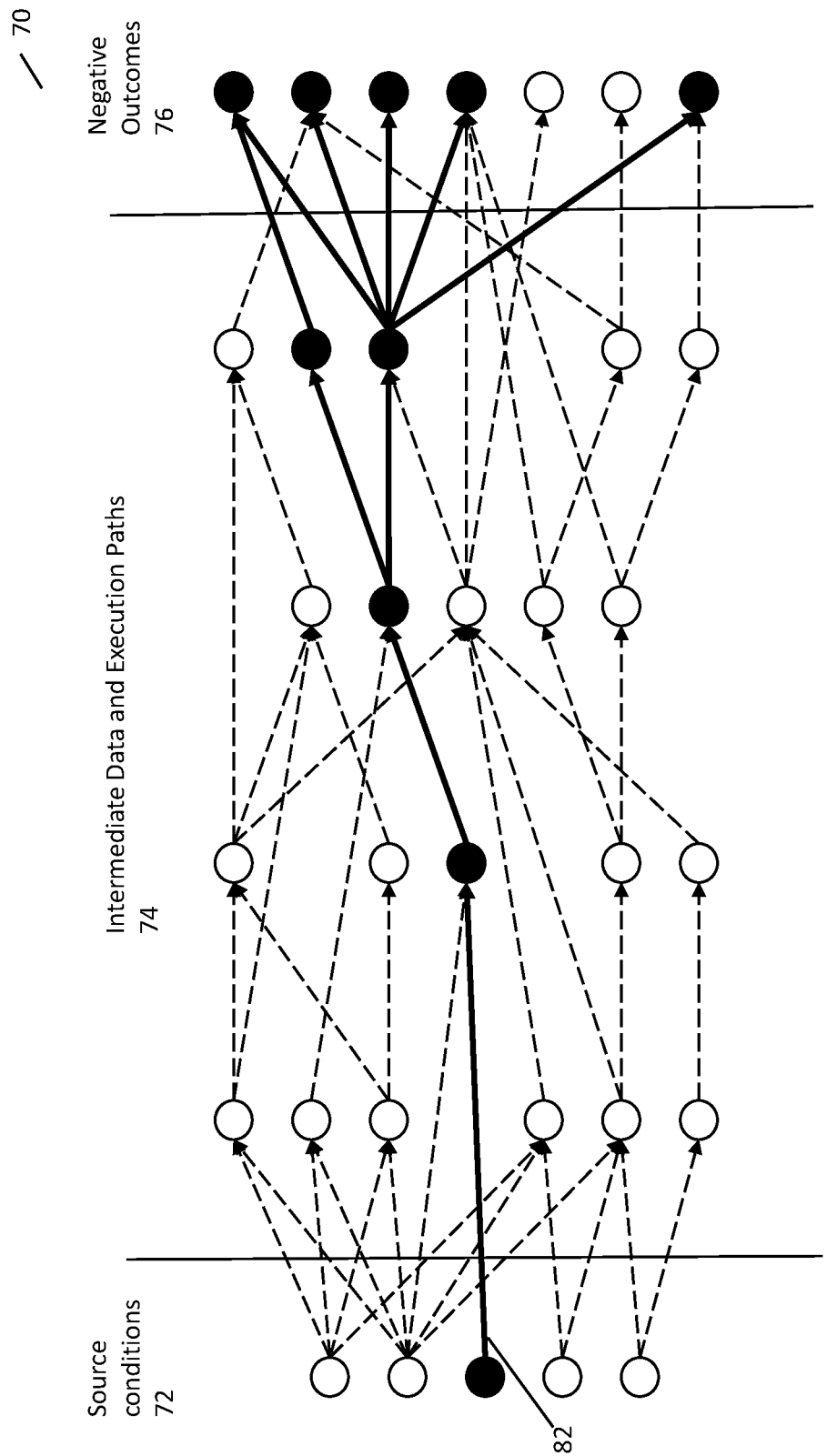

FIG. 8D is an example of a one-to-many relationship. On the right are the negative outcomes associated with just one type of source condition on the left. The negative outcomes were found by picking a source condition on the left and tracing forward to the right all possible outcomes of that source condition. Single-source, multi-error failure path 82 illustrates that a single root cause can cause many errors.

Figure 8E:
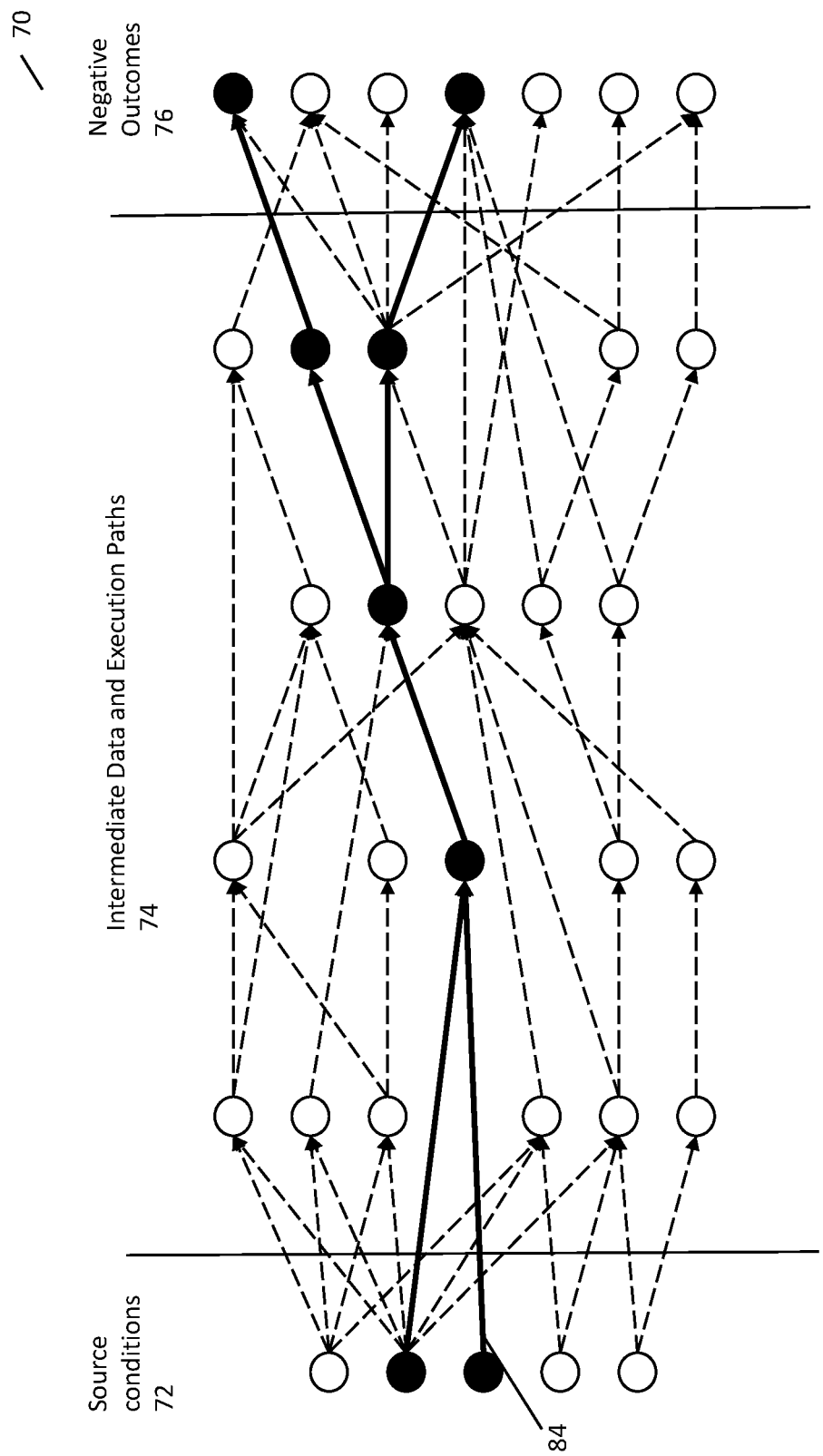

FIG. 8E is an example of shared-path behavior, where two different source conditions can each result in two different negative outcomes, but share one or more causal pathways between them. The central nodes have a shared pathway. Multi-source, multi-error failure path 84 illustrates that multiple root causes can cause many errors and can share a single failure path in intermediate nodes.

Any single one of these properties of cause and effect in software would represent a significant impediment to solving the overall problem of accurately reporting the actual source condition(s) to the user for any given negative outcome occurrence. All of them together produce profoundly complex behavior—to the point of intractability for traditional attempts at a solution—that must be solved for the fundamental problem.

Figure 9:
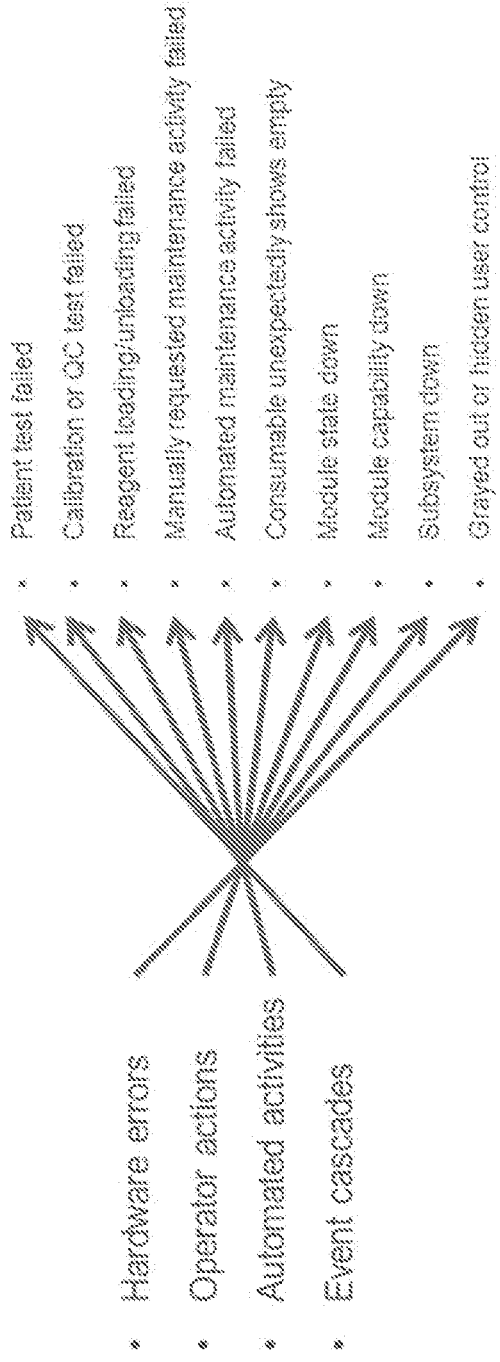
FIG. 9 is a relationship diagram illustrating the types of negative outcomes that can be displayed to a user based on certain root cause conditions in some illustrative embodiments.

Sub-Problem #2: Too many possible failure modes. FIG. 9 is an illustration of how different root cause conditions 86 can cause a number of different types of negative outcomes 88. Each root condition listed in root cause conditions 86 represents a general class of condition, where each class could include hundreds or thousands of more detailed, actual root conditions. Each negative outcome listed in negative outcomes 88 represents a general class of negative outcome, where each class could include hundreds or thousands of more detailed, actual negative outcomes. For software systems of moderate complexity or more, this creates literally millions of possible combinations of root cause conditions and negative outcomes for the user. These millions of possible combinations prevent effective documentation from being produced to describe all of the possible failure modes, which prevents the documentation route from being a viable avenue for truly comprehensive troubleshooting. The large number of combinations also prevents all possible combinations from being explicitly enumerated or otherwise captured in the software for automated display, which contributes significantly to the complexity of solving the problem in software.

Figure 10A:
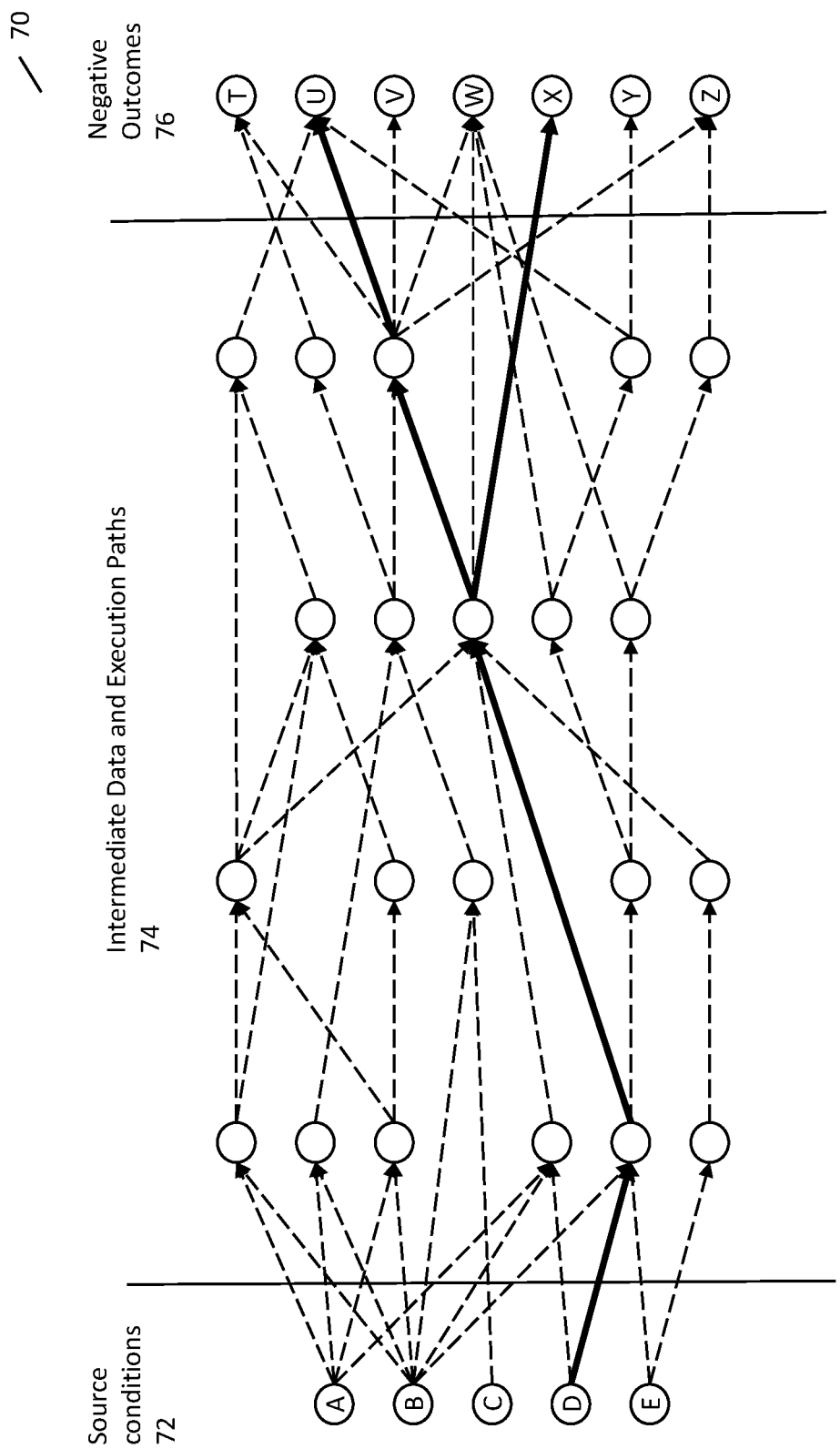
FIGS. 10A-10C are dependency diagrams of exemplary runtime relationships illustrating state and error propagation in exemplary systems that can be used with some embodiments.
Figure 10B:
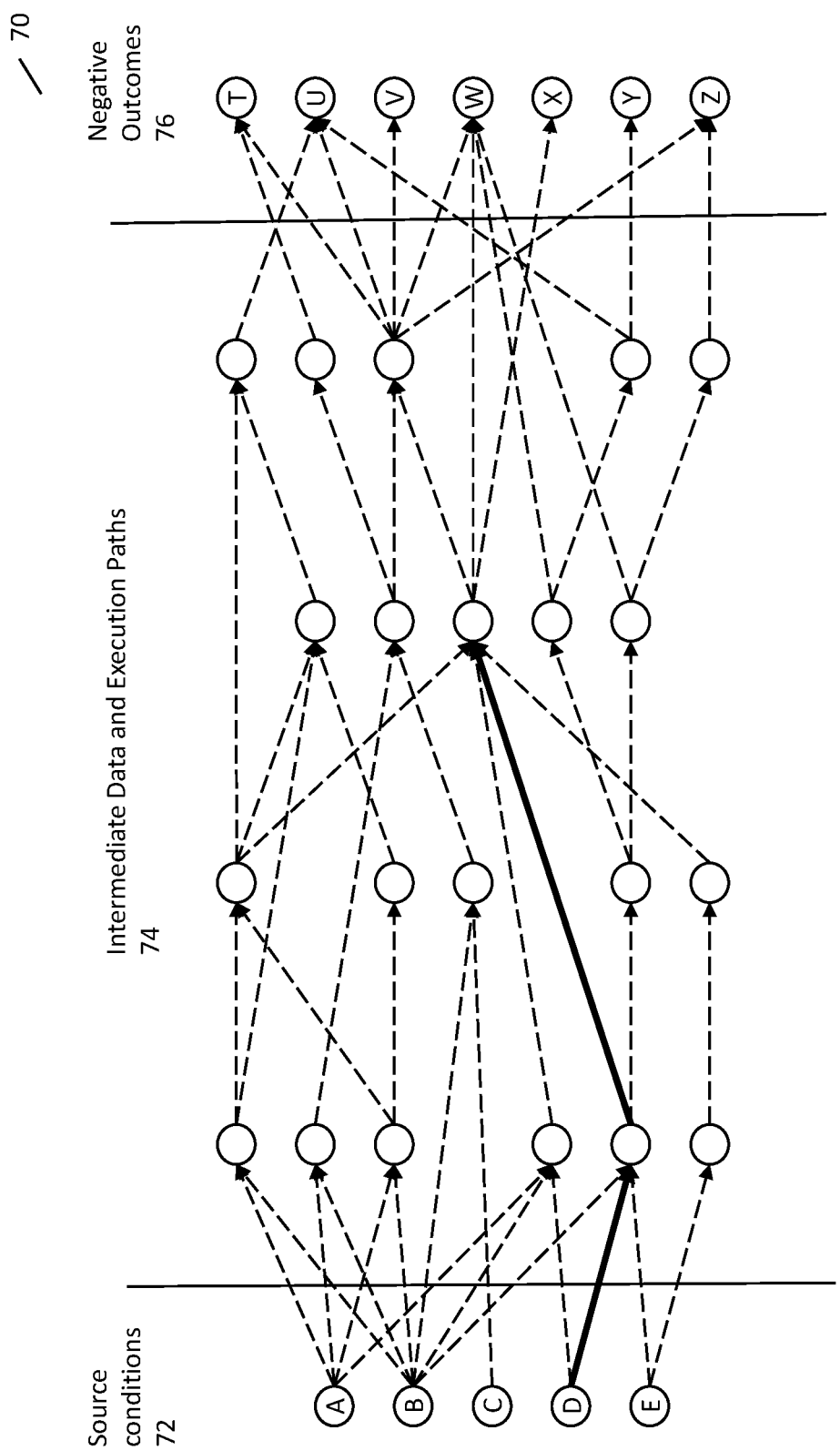
Figure 10C:
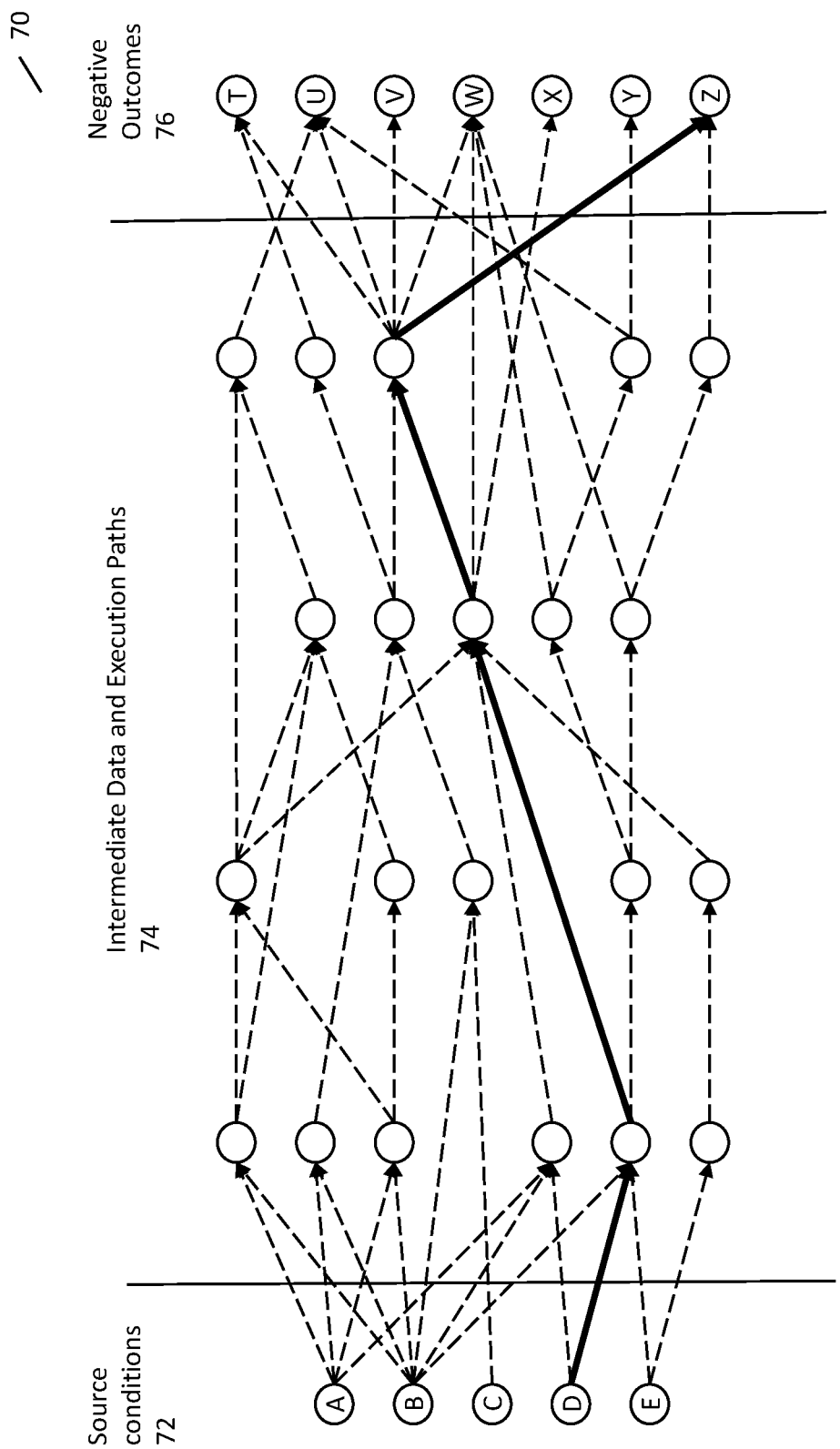

Sub-Problem #3: Actual cause-and-effect can vary depending on surrounding system state. Different occurrences of the same, single root cause condition being detected can arbitrarily cause 0, 1, 2, or more negative outcomes, depending on the current state of the rest of the system. That is, the relationship of root cause conditions to negative outcomes is often seemingly random at any given time, based on other arbitrary operating conditions or states existing at the time. FIGS. 10A-10C is an example where the same exact source condition "D" occurs three different times, but with three different overall outcomes each time. FIG. 10A shows the effects of source condition D occurring the first time. In this case, the first occurrence of D happens to cause the two negative outcomes of type "U" and "X". FIG. 10B shows a case where, due to some arbitrary difference in an intermediate state or condition, the second occurrence of source condition D does not lead to any negative outcomes occurring at all. FIG. 10C shows a third case where the third occurrence of source condition "D" causes yet a third overall type of outcome to occur, which was the negative outcome "Z". Note that this single negative outcome of Z was different than in the first occurrence of D which caused the two outcomes U and X to occur. An example of this is a motor that is starting to degrade and intermittently sticks, generating intermittent errors, which are then automatically recovered from without user intervention. If the motor error occurs while two patient tests "U" and "X" are being run that require that motor, then U and X will fail due to the motor. In this case, we want to report the motor error as the cause of the two patient test failures. Later, if the system is sitting idle, and the motor has an error during a relatively unimportant automatic rinsing routine, and it automatically recovers, then there is no negative outcome for the error, and the motor error does not need to be reported directly to the user (though in general it would still be logged internally.) Later again, if the entire system is going through a startup initialization process, where it is defined that any error will cause a total system halt "Z", and the motor error occurs, then the entire system will halt, and we want to report the motor error as the cause of that total system halt. These are examples where the same shared source condition—the software code that checks whether the motor is having a problem—can cause different outcomes, depending on other states in the system. Thus, the outcome of a given source condition cannot always be predicted a priori.

In general, just because a root cause condition occurs does not mean a negative outcome will always occur because of it, nor will the same negative outcome(s) occur every time when it does produce a negative outcome. Therefore, always displaying every possible root cause condition occurrence to the user, and in particular those conditions that did not happen to cause negative outcomes, can produce a lot of misleading information to the user, and consequently potentially increase the troubleshooting load instead of reducing it.

Ideally, the solution to this problem should only directly report root cause conditions to the user when appropriate, and not report them when they have no effect at all, or no effect on the negative outcome currently being diagnosed by the user. This issue derives from how root cause conditions propagate through various code designs, and the number of other conditions which factor into the intermediate states that also govern any given failure mode. This represents a significant complicating factor that must be dealt with to provide a reliable solution to the overall problem.

Sub-Problem #4: Effects of root cause conditions are open-ended. The relationship of root cause conditions to negative outcomes is open-ended relative to time. A root-cause condition that happened seconds, minutes, hours, or days in the past can continue to generate new negative outcomes as new requests are made on the system. For example, consider a source condition whose effects of a single occurrence initially stop at some intermediate node, (e.g., as in FIG. 10B), but sets some state on that node that can cause future delayed failures to occur (e.g., FIG. 10C, but for a single occurrence of condition D). For example, one hour after the source condition occurred, the user makes a request that needs to check the state in that node, and because that state was set by the source condition to something negative for the request, the user experiences a negative outcome (such as negative outcome Z in FIG. 10C). In this example, further forward in time, one full day after the source condition occurred, the user makes another kind of request, and experiences another type of negative outcome, (for instance, resulting in negative outcome V in addition to outcome Z). And finally, one month later, the same thing happens again with another user request, which fails because the intermediate state has still not been resolved (for instance causing negative outcome W, as well). This issue derives from how the effect of a root cause condition on any give data or execution state can persist indefinitely: the amount of time that a root cause condition can produce negative effects is determined by how long any intermediate negative states caused by that root condition persist, which is often unknown, unpredictable, and/or open-ended, based on the design of the software in question. This represents a significant complicating factor that must be dealt with to provide a reliable solution to the overall problem: the causes of negative outcomes can stretch back to occurrences of root cause conditions that happened much farther back in time than might be expected by a user trying to troubleshoot the problem.

Figure 11:
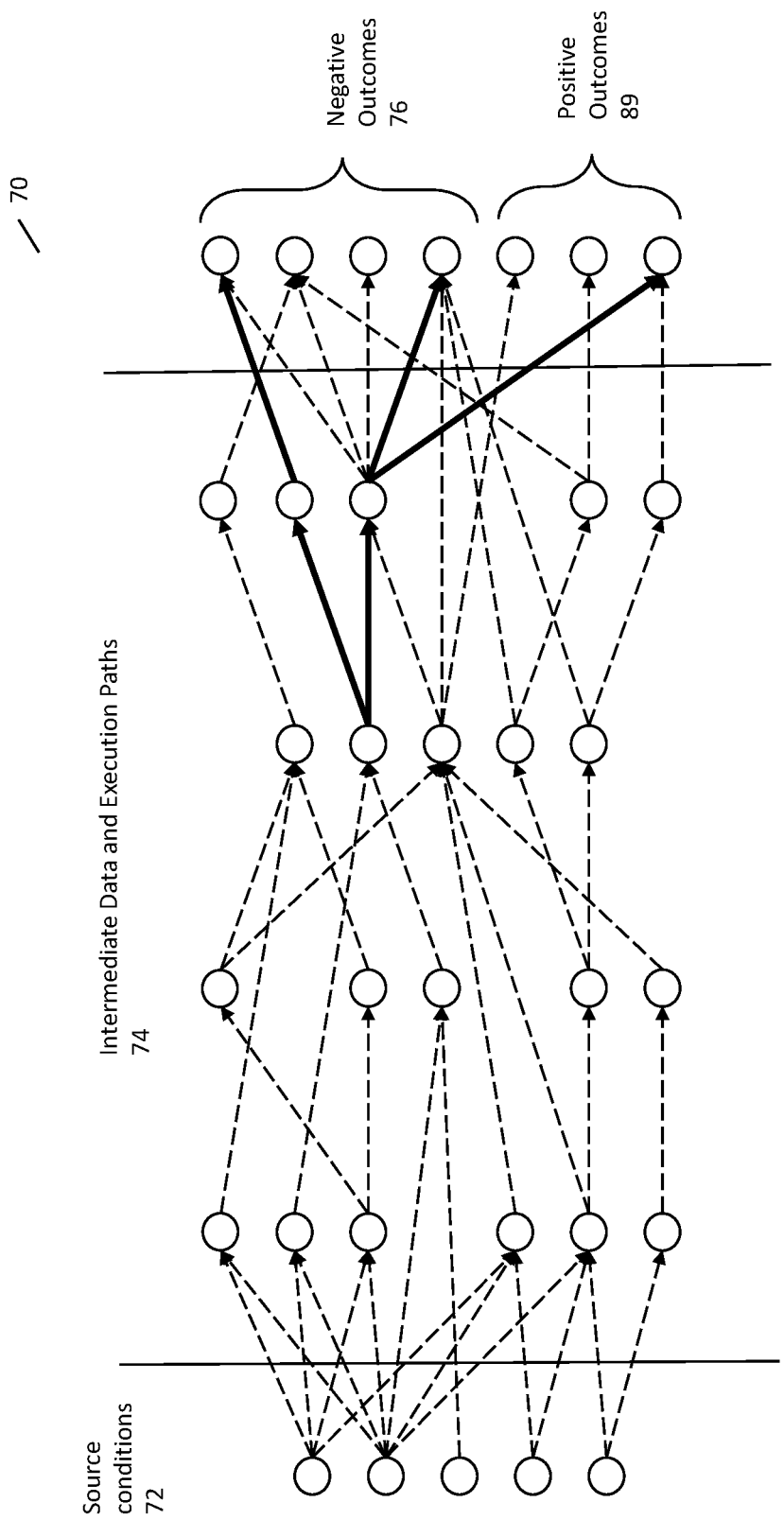
FIG. 11 is a dependency diagram of exemplary runtime relationships illustrating causal state propagation in exemplary systems that can be used with some embodiments.

Sub-Problem #5: Dual-nature causal pathways. Failure modes can also be caused by "positive path conditions" such as startup, initialization, automated maintenance activities, higher-priority user requests, etc., that, while they may be accomplishing some desired positive outcome in one area, may also be simultaneously contributing to a negative outcome in some other area. FIG. 11 is a graph of exemplary paths between source conditions and both positive outcomes 89 and negative outcomes 76, rather than just negative outcomes. As can be seen, a single source condition can lead to a combination of both positive and negative outcomes. This can be difficult to trace because it is often unclear how to classify or report a root cause condition that can cause both positive and negative outcomes, and whether or when it should even be reported. Positive outcomes are defined as scenarios for the user that do not represent any problem that needs to be remedied: e.g., the user interface displayed to the user that their request succeeded as expected, or that the subsystem state is as expected, etc. The dual nature of root cause conditions potentially being both positive and negative at the same time contributes significantly to the complexity of solving this problem.

For a more specific example, consider a software module with the following simple properties. The module has two functions that can be requested on it: it can either run Patient Tests, or it can run Diagnostics Tests. The module has a "module state" variable with two possible states: Running or Stopped. For the module to run a Patient Test, the module must be in the state Running. Therefore, if the user requests a Patient Test to run, and the module is in the state Running, then a success is displayed; if the module is not in the state Running, then a failure is displayed.

For the module to run a Diagnostics Test, the module must be in the state Stopped. Thus, if the user requests a Diagnostics Test to run, and the module is in the state Stopped, then a success is displayed; if the module is not in the state Stopped, then a failure is displayed.

Here, the "module state" variable represents a dual-nature causal condition for whether Patient Tests or Diagnostic Tests can run. When the module is in the Running state, this is good for running Patient Tests, but bad for running Diagnostics Tests. Conversely, when the module is in the Stopped state, this is bad for running Patient Tests, but good for running Diagnostics Tests.

The table shown in FIG. 12 demonstrates the dual nature of this variable, where its two different possible values can each result in positive outcomes and negative outcomes. Whether the value of the module state variable is good or bad at any given time depends exclusively on the context of what's being demanded of it downstream at any given time. That is, the root cause of any error based on the value of that state variable may not normally be considered an error itself, if the current value of the state variable can also lead to positive outcomes. This typically confuses the developer who attempts to solve the overall problem of communicating out the causal conditions for negative outcomes, because the same causal conditions can also arbitrarily contribute to positive outcomes. Real life examples can be and frequently are more complicated than this, with more than two values possible on a given variable, and more than 1 variable contributing to any given positive and negative outcome scenario. Consequently, this complicating factor of dual-nature, simultaneously positive/negative, context-dependent values has represented a significant impediment to providing a solution to the overall problem.

Sub-Problem #6: Propagation of correct causal metadata across operations and expressions of arbitrary composition and complexity. Some embodiments solve the main reporting problem described above by leveraging and expanding on techniques described in U.S. Pat. No. 9,298,535, incorporated herein by reference. An exemplary technique involves attaching unique "error serial numbers," redefined and re-termed here to "causal IDs," to various code paths to help establish parent-child causal connections between multiple error instances, primarily by passing causal IDs through objects shared by multiple threads. Implementing this reveals another sub-problem on how to correctly calculate and propagate the correct causal ID(s) of interest when multiple causal path inputs converge in an operation or operations to produce a combined causal path output, where the state of the single combined output is arbitrarily dependent on the states of the multiple inputs.

Many of these convergence points are expressions of arbitrary composition and complexity, such as compound expressions made up of Boolean, comparison, arithmetic, and other operations. The top-level expression, its sub-expressions, and its sub-operations are normally expected to produce an output value that represents some combined manipulation of the input values. The overall expression then needs to attach the appropriate causal ID(s) from the input value(s) to the output value. In these cases, there can be, and often are, multiple different causal IDs associated with the different multiple input values to the expression. Therefore, the expressions and operations should determine which causal ID(s) from among the multiple inputs to include for propagation to the output value, and just as importantly, determine which causal ID(s) from the inputs to exclude from the output value in order to prevent incorrect root causes from being communicated to the user.

Examples of the operations and expressions that causal paths flow through are the various Boolean operations and expressions, comparison operations and expressions, enumerated state operations and expressions, arithmetic operations and expressions, etc. Most of these individual operations take two or more inputs from potentially different causal sources and produce a single causal output. Attaching causal IDs to the data and execution paths then means the expression or operation needs to propagate none, some, or all of the causal IDs to the output. Many expressions in software are made up of two or more of these operations, resulting in compound expressions often made up of three or more inputs. Accumulating or "fold" expressions can often be made up of tens, hundreds, or more of inputs.

These convergence points of multiple-input-causes-to-single-output-effect must sometimes deliberately discard causal information in order to avoid reporting the wrong causes for the output's effect. Note that, significantly, these include/exclude decisions can differ across multiple evaluations of the same expression, as input values and output values may differ between evaluations. It is not traditionally clear (or even considered) how these decisions should be made on which causal metadata to propagate through any given operation.

Sub-problem 5 above complicates this problem, where the actual value of a single data state (or expression) can sometimes have the dual nature of contributing to both positive outcomes and negative outcomes at the same time. Attempting to individually track whether any given compound expression's inputs and/or outputs are positive-outcome-producing and/or negative-outcome-producing as they cross that expression is an intractable problem: as a general solution, it can be prohibitively complex and expensive from a development standpoint.

To illustrate this issue, consider the following two-input example, which funnels down to a simple Boolean expression based on two input variables. Consider a software module that throws an error exception when some system is unavailable. The function that determines whether the system is available is arbitrarily defined here to just return the value of a simple Boolean expression based on two basic Boolean variables. The following pseudo-code illustrates this.

```
// Two values that are factored into determining if
// the system is available.
bool bValue1 = ...;
bool bValue2 = ...;
//////////////////////////////////////////////////
//
// Return whether the system is available.
//
bool IsSystemAvailable( )
{
    return (bValue1 && bValue2);
}
//////////////////////////////////////////////////
//
// Throw an exception if the system is unavailable.
// (E.g., check before running a patient test.)
//
void ThrowErrorIfUnavailable( )
{
    bool bSystemAvailable =IsSystemAvailable( );
    if ( ! bSystemAvailable )
    {
        Exception AvailabilityError(
            "System is unexpectedly unavailable.");
        throw AvailabilityError;
    }
}
//////////////////////////////////////////////////
//
// Throw an exception if the system is available.
// (E.g., check before running a diagnostics routine.)
//
void ThrowErrorIfAvailable( )
{
    bool bSystemAvailable =IsSystemAvailable( );
    if ( bSystemAvailable)
    {
        Exception UnavailabilityError(
            "System is unexpectedly available.");
        throw UnavailabilityError;
    }
}
```

Here, ThrowErrorIfUnavailable( ) is nominally called before some function which requires general availability, such as running a patient test, and ThrowErrorIfAvailable( ) is nominally called before some function which requires unavailability, such as running a diagnostics test. From the user's perspective, the goal here is to report the source reason why the system is unexpectedly unavailable when requesting a patient test, and to report the source reason why the system is unexpectedly available when requesting a diagnostic test.

From the source code perspective, both of those reasons flow through the same function IsSystemAvailable( ) which is called in both ThrowErrorIfAvailable( ) and ThrowErrorIfUnavailable( ) Note that the two throw functions also differ in their "if" state which checks the return value of IsSystemAvailable( )—one checks the return value directly, and the other checks a negation of the return value. Further, the value returned by IsSystemAvailable( ) regardless of which of the two diametrically opposed contexts it is called in, ultimately derives from the exact same values of bValue1 and bValue2, and the exact same Boolean AND expression that combines them. If bValue1 and bValue2 can be modified independently of each other via different source failure mode conditions, which they typically might be in any normal software application, then the software should be able to communicate whichever of those source reason(s) are responsible for the value returned by IsSystem- Available( ) and it should exclude reasons that were not causal factors this time around. IsSystemAvailable( ) effectively takes those two input causal variables and returns a single causal variable, and the two possible values of that output variable can each represent failure or success depending on why IsSystemAvailable( ) is being called.

Consider a more complex example with 5 inputs that are processed together with multiple types of operations, which is more typical of many causal paths in actual software.

```
// Five values that are factored into determining
// if the system is available.
bool bValue1 = ...;
bool bValue2 = ...;
enum StateEnum
{
  Initializing,
  Running,
  Stopped,
  Resetting,
  Diagnostics
};
StateEnum enState_SubSysA =...;
StateEnum enState_SubSysB =...;
float fSensorReading =...;
////////////////////////////////////////////
//
// Return whether the system is available.
//
bool IsSystemAvailable( )
{
  return
    (bValue1 && bValue2) ||
    (((enState_SubSysA == StateEnum::Running) &&
      (enState_SubSysB != StateEnum::Diagnostics))
    ((fSensorReading <= 5000.0) &&
      (fSensorReading > 100.0)));
}
// ... include same "ThrowErrorIf...( )" functions
//     from above ...
```

Now, the expression in IsSystemAvailable( ), which calculates availability, is a complex nested expression that contains nine operators of the following six types: Boolean AND; Boolean OR; equality; inequality; less-than-or-equal-to; and greater-than. These combine five separate data value inputs: bValue1; bValue2; enState_SubSysA; enState_SubSysB; and fSensorReading. The data is made up of three different data types: bool; StateEnum; and float. Not expressed directly here in the source code are the temporary values that the compiler generates when evaluating individual operations in the overall expression. These represent intermediate outputs from lower-level expressions and inputs to higher-level expressions, and therefore may need to carry causal ID information as well.

As with the two-input versions above, if these five different data inputs can be set in different ways from different source failure mode conditions, which they typically might be in any normal software application, then the software again needs to be able to communicate whichever of those source reason(s) are responsible for the value returned by IsSystemAvailable( ) and needs to exclude reasons that were not causal factors on any particular evaluation of that main expression.

The problem of how software can automatically determine which inputs of an arbitrary expression causally contributed to its output on any given evaluation of that expression is not a trivial problem to solve from any known, traditional software engineering perspective. While not all causal expressions in software are directly as complex as the 5-input example, there are many that are often equivalently complex and/or even more complex, since expressions are often implicitly broken up into different sub-expressions that are calculated in different functions, blocks, or areas of the code. Even if one does not observe an expression as complex in their software, there are usually implied expressions of equivalent complexity that need to be handled in the same or similar ways.

Previously, there was no widely known way to handle this sub-problem of propagating causal information across arbitrary source code expressions in a correct way, where correctness here is defined as providing the appropriate source causes to the user, and not providing inappropriate source causes to the user.

Sub-Problem #7: Mixed software architectures. Most software systems of medium or larger scope are made up of many different subsystems that communicate with each other, each with different internal data, event, and error handling representations and designs. This makes it more difficult to track the causal effects of arbitrary root cause conditions as they propagate across the input/output and architectural boundaries of these different subsystems. This factor also combines with sub-problem #2 to create another major hurdle to solving the overall problem for the user: many different subsystem implementations often contain and define many different root cause conditions (e.g. error or event types), and any individual subsystem often does not, and cannot, know all of the possible external root conditions or root events in other subsystems which interact with the individual subsystem, which can then cause the individual subsystem to produce negative outcomes. This has traditionally made it extremely difficult for an individual subsystem to report any specific external causes of its negative outcomes.

Summary of sub-problems: all of these factors together create an overall technical problem whose nature is complex enough that it has not been solved in any general or efficient manner to date. Usually, the perception of the overall problem by developers is that the behaviors of cause and effect in a software system are so severely complex that the solutions must necessarily also be severely complex, and therefore developers conclude that the problem is intractable by its nature. That is, they conclude that the problem is far too resource-intensive to solve in terms of development resources and/or computing power, and therefore make only limited attempts at solving it, if they make any attempt at all. Therefore, these sub-problems are significant complicating factors that have collectively, fundamentally, and traditionally created a major technical barrier between the user experiencing a negative outcome, and the user being able to quickly and effectively identify the root cause condition(s) for that outcome.

Known prior art solutions generally require all of the software sub-systems involved to share significant underlying architectural and implementation details (such as shared error representations at the low level), which is generally not feasible or cost-effective in the highly mixed software and product environments that real-world software almost always operates in. These solutions also only cover a small portion of all possible causal scenarios in the software.

An ideal solution should automatically connect arbitrary negative outcomes which are displayed to the user back to the arbitrary causal events detected in the software that caused those outcomes. A system that properly traces causal events to root causes should produce and display this connection back to the causal event(s) in live software immediately as the negative outcome is experienced, or in as near-immediate fashion as possible. It should not require any "post-mortem" tool or analysis to be run after the negative outcome has been experienced. Feedback and detailed information on root causes should be as immediate and simple to acquire as possible. The system should display to the user the causal event(s) responsible for any given negative outcome right where the negative outcome is displayed, or as closely as possible, to minimize or eliminate the need for the user to search additional areas of the user interface (e.g., other screens, applications, or files) for the cause(s). This ideal solution should minimize the impact on other aspects of the software's architecture, design, and implementation. It should allow causal events and negative outcomes to be connected across as many causal paths as possible between initial root cause conditions and negative outcomes for the user, in order to maximize problem coverage. It should support the commonly encountered relationships between causal event conditions and negative outcomes of many-to-one, one-to-many, and the common shared-pathway property, and be as deterministic as possible, and avoid heuristics as much as possible, in order to both maximize troubleshooting accuracy and minimize the cost of implementation. Embodiments attempt to achieve one or more of these goals, but are not required to achieve any given combination of these goals.

Overview of Some Embodiments

Note that most software systems can display a negative outcome to the user. Generally, there should already be at least one conditional operation somewhere in the overall software system that internally detects an initial cause and then acts on that conditional detection in at least one way to ultimately cause a negative outcome to be displayed. That is, a general property of software is that all negative outcomes displayed to a user ultimately connect back to one or more conditions in the overall software system.

Any software condition that can drive the display of a negative outcome is defined here as a "causal event condition." An instance of a causal event condition being met and its output clause consequently executing is considered a "causal event." Causal event conditions that cause negative outcomes can be, for example: any kind of check for an error condition; (sensor data analysis, network data analysis, user-provided data analysis, logic checks, system availability checks, checks on status(es) or state(s), etc.); any kind of check for user action (check for user pressing a "stop" button to abort other actions, check for user installing new software, check for user starting up the software, check for user resetting the system, check for user initializing or reinitializing persisted or in-memory data such as a database or portions thereof, etc.); any other kind of check (checks to start engaging in automated versions of any of the above user actions, e.g., based on elapsed time interval or other system counts, checks for exhaustion or expiration of a needed resource, etc.)

Depending on the software involved, all of those conditions can commonly lead to negative outcomes. Embodiments can leverage this general property of software, where negative outcomes are ultimately sourced from a condition within the software, to generically display arbitrary causal events to the user as the reason for negative outcomes. Note that causal event conditions in the software may be triggered by physical events external to the software, such as physical button pushes by an operator, fluidic interactions with sensors, failing hardware, etc. Therefore, "true" root causes for negative outcomes may extend past the causal event condition detected by the software, back into the physical (non-software) realm. Consequently, to truly remedy a problem, the user may be required to diagnose the physical causes of the condition(s) being triggered in the software code. The description here, however, is only concerned with expressing the root conditions as detected in the software (in the form of causal events) as the causes for negative outcomes, and reporting those exact causal events to the user in the most accurate and effective manner possible.

Once a causal event condition is identified as the cause of a negative outcome, for software that includes help for the user in the form troubleshooting guides, etc., those guides often start with the assumption that the causal event condition has already been identified (even if they do not identify those conditions with that terminology), and provide help in the form of remedying that specific condition. Embodiments can target the gap between experiencing the negative outcome and finding the causal event condition, and do not target how to remedy that causal condition once it is determined—that is highly software- and system-specific, and software systems that include troubleshooting guides often target those remedying steps already.

It is not uncommon for multiple conditions to be involved in driving display of a negative outcome. That is, the chain of causality from a software root cause condition to a negative outcome can involve more than one condition being evaluated and met. Whether any conditional operation in the code can be considered a causal event condition depends on whether there is a causal path between that condition being met and a negative outcome being displayed in the UI.

The conditions in a set of causal event conditions that can contribute to a negative outcome can be classified into two general groups: "root cause conditions", and "intermediate conditions." Any condition that can initiate a negative outcome, either in whole or in part, where no other condition exists before it in the chain of causality, is considered to be a root cause condition, whether that condition is considered a negative condition or not. Any condition that is subsequent to a root cause condition in the chain of causality is considered to be an intermediate condition.

To illustrate these concepts, consider the following example C++ code, which demonstrates a simple set of positive and negative outcome behaviors. The "// [N]" comments are tags used to reference lines in the description below:

```
class Sensor
{
public:
    bool CheckSensor( )
    }
        int 1 nSensorReading = GetReading( );
        bool 1_bSuccess = true;
        if( 1_SensorReading > SENSOR_READING_MAX ) // [1]
        {
            // Return sensor out of limit.
            1_bSuccess = false;
        }
        if( 1_SensorReading < SENSOR_READING_MIN_WARNING )
        // [2]
        {
            // Sensor is still considered in limit, but
            // log a warning to disk.
            Log("Sensor below expected minimum");
        }
        return 1_bSuccess;
    }
};
void Verify Sensor( )
```

```
{
  Sensor 1_Sensor;
  if( 1_Sensor.CheckSensor( ) ) // [3]
    {
      Display Success( "Sensor OK.");
    }
  else
    {
      DisplayFailure( "Sensor failed."); // [4]
    }
}
void VerifyAllSensors
{
  Sensor 1_Sensor1;
  Sensor 1_Sensor2;
  if( 1_Sensor1.CheckSensor( ) && 1_Sensor2.CheckSensor( )) // [5]
    {
      Display Success( "All sensors OK.");
    }
  else
    {
      DisplayFailure( "One or more sensors failed."); // [6]
    }
}
```

Here, the function Sensor::GetReading( ) is defined to acquire a reading from some hardware sensor associated with an instance of the Sensor class. The function Log( ) writes a message to disk. For the sake of discussion, any messages written to disk with this function are not considered negative outcomes for this particular software. The functions DisplaySuccess( ) and DisplayFailure( ) are defined to be user interface functions. Whenever Display-Success( ) is called, it displays a positive outcome to the user. Whenever DisplayFailure( ) is called, it displays a negative outcome to the user. The functions VerifySensor( ) and VerifyAllSensors( ) can nominally be called by some external code at some point. They acquire readings from the sensors, and, based on those readings, display success or failure directly to the user.

Therefore, any conditions leading up to DisplayFailure( ) being called are considered to be causal event conditions. Examining the code, DisplayFailure( ) can be called in VerifySensor( ) at line [4], and in VerifyAllSensors( ) at line [6].

Examining the VerifySensor( ) case, DisplayFailure( ) is only called if the condition at line [3] evaluates to false, which only happens if Sensor::CheckSensor( ) returns false. Sensor::CheckSensor( ) only returns false if the condition at line [1] returns true. Since there are no more conditions in this chain of causality before the condition at line [1], then the condition at line [1] is a root cause condition for the DisplayFailure( ) negative outcome at line [4].

Similarly, examining the VerifyAllSensors( ) case, DisplayFailure( ) is only called if the condition at line [5] evaluates to false, which only happens if Sensor::Check-Sensor( ) returns false. Again, Sensor::CheckSensor( ) only returns false if the condition at line [1] returns true. The condition at line [1] is also a root cause condition for the DisplayFailure( ) negative outcome at line [6].

In this overall example, the condition at line [1] in Sensor::CheckSensor( ) is a root causal event condition for two different failure modes—the DisplayFailure( ) negative outcome at line [4], and the DisplayFailure( ) negative outcome at line [6]. The conditions at lines [3] and [5] are considered to be intermediate conditions. They are each in a path to drive one or more negative outcomes, but they cannot be met without one or more other, root cause conditions being met first. The condition at line [2] is not considered to be a causal event condition, since there are no paths between it being triggered and any defined negative outcomes, per the definitions above of what is considered a negative outcome in this particular software. If, however, "logging a warning to disk" is changed to be considered to be a negative outcome, then the condition at line [2] would be considered a causal event condition, and a root cause condition at that.

Back to software in general, multiple conditions in a chain of causality may be arranged in a "serial" configuration, where evaluation and meeting of a Condition A causes evaluation and potential meeting of a Condition B, and so on, until the negative outcome is displayed. In this case, the conditions together behave as a "logical AND", where meeting all of the conditions in the serial configuration are required to cause the negative outcome to be displayed. Similarly, multiple conditions can be arranged in a "parallel" configuration, where either of the evaluation and meeting of a Condition A or the evaluation and meeting of a Condition B can cause the negative outcome to be displayed. In this case, the conditions behave as a "logical OR", where meeting any of the conditions in the parallel configuration will cause the negative outcome to be displayed.

Often, a chain of causality is made up of multiple conditions that are arranged both in serial and in parallel. This is the case in the example code above. The root cause condition at line [1] is serial with each of the later intermediate conditions at lines [3] and [5]. Additionally, the condition at line [5], and in particular its negated version, which is implied for the "else" clause of the "if/else" statement, contains a parallel configuration of two root cause conditions. Real code also often has far more complex chains of causality and combinations of conditions.

Another important thing to note is that some causal event conditions may be "explicit", where they and their direct output clause are accessible for modification by the developer in first-party code. Other causal event conditions may be "implicit", where the basic condition and its direct output clause is inaccessibly buried in code that cannot be reasonably modified by the developer. Common examples of such code are closed source, pre-compiled third-party code such as proprietary operating systems, external libraries, or other difficult-to-modify software. Regardless of their relative modifiability by or accessibility to developers, implicit root cause conditions in third-party code can still drive displays of negative outcomes in first-party code via function calls or data deliveries from the third-party code which contains the root cause condition, to the first-party code which will eventually drive display of a negative outcome.

Common examples of implicit conditions in third-party code include process startup (e.g., a main( ) process startup function in the first-party software being called due to an external condition detected by the operating system), and user input events (keyboard and mouse input conditions detected by the operating system creating notifications in the first-party software). These examples can potentially drive negative outcomes: a process's basic functionality may not be available at startup until initialization completes, temporarily producing "unavailable" reports to the user, and user inputs may cause cancellations of previous requests and/or "unavailable" states. Both of these conditions can result in inadvertent frustrations for a user, even if they were initiated by that user. While they represent positive paths for some areas of the software, they can also produce negative outcomes in other areas of the software.

Therefore, in some embodiments, these callbacks and data deliveries in first-party code that can drive negative outcomes can be considered an extended output clause of the original, third-party condition's direct output clause. Descriptions here that refer to the "output clause" of a condition refer to the direct output clause associated with a causal condition in the first-party code, and/or the "extended" output clause in first-party code that is indirectly executed by a causal condition in third-party code, as appropriate.

Note that there may be many layers and many boundaries of dataflow between a root cause condition and the negative outcome(s) that are ultimately displayed from it. These layers can include: multiple data instances of different types and different values, different function calls, different parameters, different classes, objects, threads, processes, computers, etc.

From the software user's perspective, in some embodiments, any time the UI displays a negative outcome to the user, the UI can also lookup and display the specific root-cause condition instance that caused that negative outcome, if the software was able to track it. That is, the software tracks causal events as they occur, and reports specific instances of causal events as the reasons for negative outcomes.

Some embodiments desirably avoid and circumvent the massive and intractable technical problem of trying to analyze the highly complex complete graph of cause and effect in any software system and avoid listing or otherwise capturing all of the possible failure modes for a software system. That is, at least one embodiment does not attempt to identify, classify, or enumerate how every possible root cause condition does or does not contribute to every possible negative outcome in any given software system, since it simply is unfeasible to do so practically. Instead, in order to automatically determine the actual root cause of any given occurrence of a negative outcome in a live software situation, such an embodiment leverages and relies on the structure of that software's code itself, which is ultimately what defines the graph of cause and effect for that software, to automatically pass along the causes for any intermediate effects it generates, and therefore any eventual negative outcomes that it generates.

More specifically, embodiments can modify root cause conditions in the code, such as conditions that detect errors, conditions that detect user actions, or other detections of system states or inputs that are known to potentially cause negative outcomes, to record every instance of their execution (i.e., every causal event) to a database, and identify those instances immediately with a new, unique, dynamically generated causal ID value. Then, each causal node in the causal graph, (i.e., each data variable, object instance, function call, code block, etc., that can contribute to a negative outcome), is modified to attach and pass along a variable causal ID term. The value of this attached variable causal ID term effectively "points" to the causal event(s) in the database that are known to be the "reason" for that node's current data or execution state. Depending on desired system behavior and system constraints, the causal ID term can be implemented either as a single causal ID variable that is equal to either a nil or non-nil causal ID value, or a container that can variably contain zero, one, two, or more non-nil causal ID values. When a root cause condition propagates an effect into one or more downstream nodes by changing their state (i.e., by modifying data or executing some operation), it passes the causal ID value that identifies the current causal event generated by that root cause condition to the affected node, via placement into the affected node's attached causal ID term, for storage with the node's new state. The values of the causal ID(s) in the node's attached causal ID term then describe the reason for the current state and effect on the node at any given time. That is, a causal ID term attached to a causal node serves as metadata about the current state of that node. Intermediate nodes also propagate their variable causal ID terms as appropriate to their output effects. That is, if the value or state of a current intermediate node causes a new value or state to occur in another downstream node, then the current node's causal ID term is also passed to and stored in that downstream node, potentially overwriting the value of previous causal ID term in that node. Note that the causal ID term metadata for each node is variable and its value will often change as the state of each causal node changes.

If a node's current state or effects then cause a negative outcome to occur, then the code that processes display of that negative outcome uses the values of the causal ID(s) in the causal ID term attached the input node of that negative outcome, to look up and display the root causal event(s) of that negative outcome from the database, which are now known to be the cause of that outcome. This represents the solution from the user's perspective: that when the user views a negative outcome, the software can display the arbitrary root cause condition, in the form of a causal event from the database, which is now known to cause that outcome.

This basic design allows and relies on the inherent, arbitrary structure of the software in question to accurately, dynamically, and automatically communicate out the actual causes of any given effect, without either the developer or the software ever needing to know or understand the totality of all possible causes, all possible outcomes, or all possible connections between them in the system.

Some embodiments naturally scale up to handle software of arbitrary complexity without each embodiment's implementation itself becoming significantly more complex. While these examples may be simple, they should accurately reflect the power and elegance of the invention.

Note that any given area of real code may be described by one or more of the following types of causal code. That is, any given section of code may contain some functional overlap between these areas, in that it may contain one or more of causal event conditions, causal pathways, and/or user interface displays.

In some embodiments, when a causal event occurs, i.e., when the output clause of a causal event condition executes in response to predetermined conditions, it ensures that whatever other actions it takes, it also always writes a causal event entry to the causal event database describing that event instance. This entry should include system state information that led to the casual event. Before writing the event entry to the database, or as part of it, the clause dynamically generates a new and unique causal ID value to identify the event and its entry in the database. This locally-generated causal ID value is then written as part of the entry in the database. At this point, the causal ID value can be considered a "pointer" to a specific causal event that is now in the database, or that will soon be in the database. Only the user interface-level code will ever "de-reference" this pointer to look up and display the event, but all of the other code in between the causal event condition and the UI display can pass this pointer along and store it as needed, in order to get it to any associated negative outcomes in the UI. Therefore, the new causal ID value just generated in the causal event condition's output clause is also held on to locally in the clause for further transmission as needed.

If another causal event was known to cause the current event being generated, as determined by whether another causal pathway led in part or in whole to the current causal event condition, then the output clause may also set a "parent causal ID" field of the current event to the other event, as appropriate, to reflect the causal relation between those events. This supports the "cascading error" or "cascading event" scenarios, where causal events can sometimes be caused by other causal events.

Note that the output clauses in first-party code for implicit causal event conditions that exist in third-party code can and should generally generate causal events as well, if they can possibly generate a negative outcome. Examples of local, first-party output clauses are function callbacks in first-party code that are called by third-party code, or data deliveries into first-party code from third-party code. First-party code is defined to be code that the developer is able to modify, and third-party code is defined to be code that the developer is not able to modify. In these cases, in general, the first line of first party code exercised by the third party condition should post the causal event to the database. This solves the general problem that the actual conditionals and main clauses for some causal event conditions exist outside of the first-party code. Typically, causal event conditions correspond to error conditions, operator actions, and other detections of system states or inputs that are known to potentially cause negative outcomes for the user.

Any data or execution path between a causal event condition and user interface code which determines whether a negative outcome should be displayed is considered a causal pathway. Causal pathways should attach a variable causal ID term parameter as necessary to ensure that the causal ID(s) for any displayed negative outcome make it to the UI system.

Therefore, whenever the causal event condition's output clause takes one or more actions that can result in the UI potentially displaying a negative outcome to the user, the clause should pass the new causal ID value along as part of the action. This causal ID value describes the "reason" the action(s) are being taken, and therefore the reason why the UI is displaying a negative outcome (if it does end up displaying a negative outcome). That is, the causal ID describes which causal event in the database (or soon to be in the database) is the reason for the negative outcomes being observed by the user.

Actions can include calling functions and triggering other executions, and/or modifying data of any kind, including state variables, local variables, objects and/or their member variables, persisted data, etc.

In various embodiments, the current value(s) of the causal ID(s) in a causal ID term describe the reason for the current value of the data that will lead to the negative outcome, and/or the reason for the current code execution that will lead to the negative outcome. The goal is to ensure that any action and/or data which causes the UI to trigger a negative outcome to be displayed also includes a correct causal ID term pointing to the event reason(s) for that negative outcome to be displayed.

Passing along the causal ID term value can happen in any number of ways: as a direct function parameter, as an additional data member added to an object instance that is being passed along, as a value bound to a variable that is being passed along (e.g., via a wrapper class implemented with generics or templates), as a value bound to a state variable, as a return value, as a separate variable next to an existing variable, etc. When attached to actions and data in this way, causal ID terms become metadata about those actions and data, such that the causal ID term for an action or piece of data represents the "reason" that the specific action currently is being taken, or the "reason" that the data has its particular value at that particular moment, where the "reason" is considered to be one or more causal events stored in the database.

Additionally, any operations that combine more than one input causal pathway into a lesser number of output causal pathways should choose the appropriate input causal ID term, if any, to include in the output. This also implies that some causal ID terms from the input may be deliberately excluded from the output when they are known to not be a cause of the output value or action.

If a user interface determines that a negative outcome must be displayed to the user due to data analysis (such as examination of a success/failure value), or a direct action request (such as a function call to display an error), and there is a causal ID term attached to that data or action request, and that causal ID term contains one or more non-nil causal ID values, then the UI looks up the causal event entry(ies) in the event database specified by those non-nil causal ID value(s), and considers those one or more associated event entry(ies) as candidate event(s) for reporting to the user as the cause(s) of the negative outcome to be displayed.

If the parent causal ID of a candidate event is the nil causal ID, then the UI reports that candidate event's information to the user alongside the negative outcome display as the reason for the negative outcome. If the parent causal ID of a candidate event is not the nil causal ID, then the UI looks up the parent causal event associated with that parent causal ID, and this parent causal event then becomes a new candidate event. This process repeats—traversing up the parent-child event tree as implied by each event's parent causal ID's—until a candidate event is found with a parent causal ID equal to the nil causal ID, at which point that last candidate event's info is displayed to the user alongside the negative outcome display as a reason for the negative outcome. Note this supports multiple events potentially being displayed as root causes for a single negative outcome, which can occur in reality.

If an event entry for a causal ID that is being looked up is not in the database yet, the lookup can either wait for the event to show up, and/or fail with a timeout and return a display such as "information not available yet". By definition, all causal IDs that are not the nil causal ID should ultimately point to an event entry in the database, such that the event entry in the database is expected to be present eventually.

Any operations that combine more than one input causal pathway into a lesser number of output causal pathways must choose the appropriate input causal ID terms, if any, to include in the output. This also implies that some causal ID terms from the input may deliberately be excluded from the output when they are known to not be a cause of the output value or action. A general and common example is a compound expression that takes multiple inputs values from more than one causal data path, and then applies various operations to those input values such as equality comparisons, Boolean ANDs, ORs, and NOTs, arithmetic operations, etc., to calculate a single output value, which then becomes part of the causal pathway to the UI. If one or more of the inputs had causal ID terms attached to them, then the expression needs to correctly choose which of those causal ID terms to propagate to the output value, and which to exclude from the output value. This is done by modifying or overloading the operations involved to analyze the input values and select the causal ID term(s) for the output value from the inputs with values that were known to result in the given output value.

If that output then serves as input to another operation, as often happens in compound expressions, then per most programming languages' specified behavior, temporary values and other automatic handling by the language take care of propagating the appropriate causal ID terms up through each operation in the expression. Once an operation has been generically modified to handle causal ID terms using the concepts of embodiments of the present invention, most expressions that involve that operation then automatically "take care of" themselves from the causal reporting perspective.

If at any time the software requires a causal ID term value to be filled in, e.g., as part of an action or data assignment, and no causal ID or causal ID term is available, because e.g., the inputs or outputs to that causal action or data modification have not been modified for causal event reporting yet, then the nil causal ID value should be specified instead. This indicates "no known reason" for the attached data or action, and is always considered to be a safe value to fill in. A nil causal ID will result in no causal event information being displayed to the user, which is better than the wrong causal event information being displayed to the user.

Some embodiments will report a single causal event at a time for any single negative outcome occurrence. This typically turns out to be more than sufficient for the user. However, in some embodiments, it is also possible to report multiple causes at a time for any one outcome. The support of either mode of reporting is accomplished by how the causal ID term, which is attached to causal pathways, is implemented. For simplicity, most of this description describes attaching a generic causal ID term to causal pathways. If the causal ID term is implemented as a single causal ID value, then this generally supports reporting at most zero or one root cause events for any given negative outcome. In this case, the nil causal ID value indicates "no known reason" for the current state of the node that the causal ID term is attached to, and a non-nil causal ID value refers to the causal event that is responsible for the value of the node (and consequently any downstream negative outcomes due to that node). If the causal ID term is implemented as a container of zero, one, two, or more causal ID values, then this generally supports reporting zero, one, two, or more causal events for any given negative outcome. If the causal ID term container is empty (i.e., contains no causal ID values), then this indicates "no known reason" for the current state of the node that the causal ID term is attached to. If the causal ID term container is not empty, then each causal ID value in the container represents the causal event(s) responsible for the value of the node (and consequently any downstream negative outcomes due to that node).

EXAMPLES

Figure 13A:
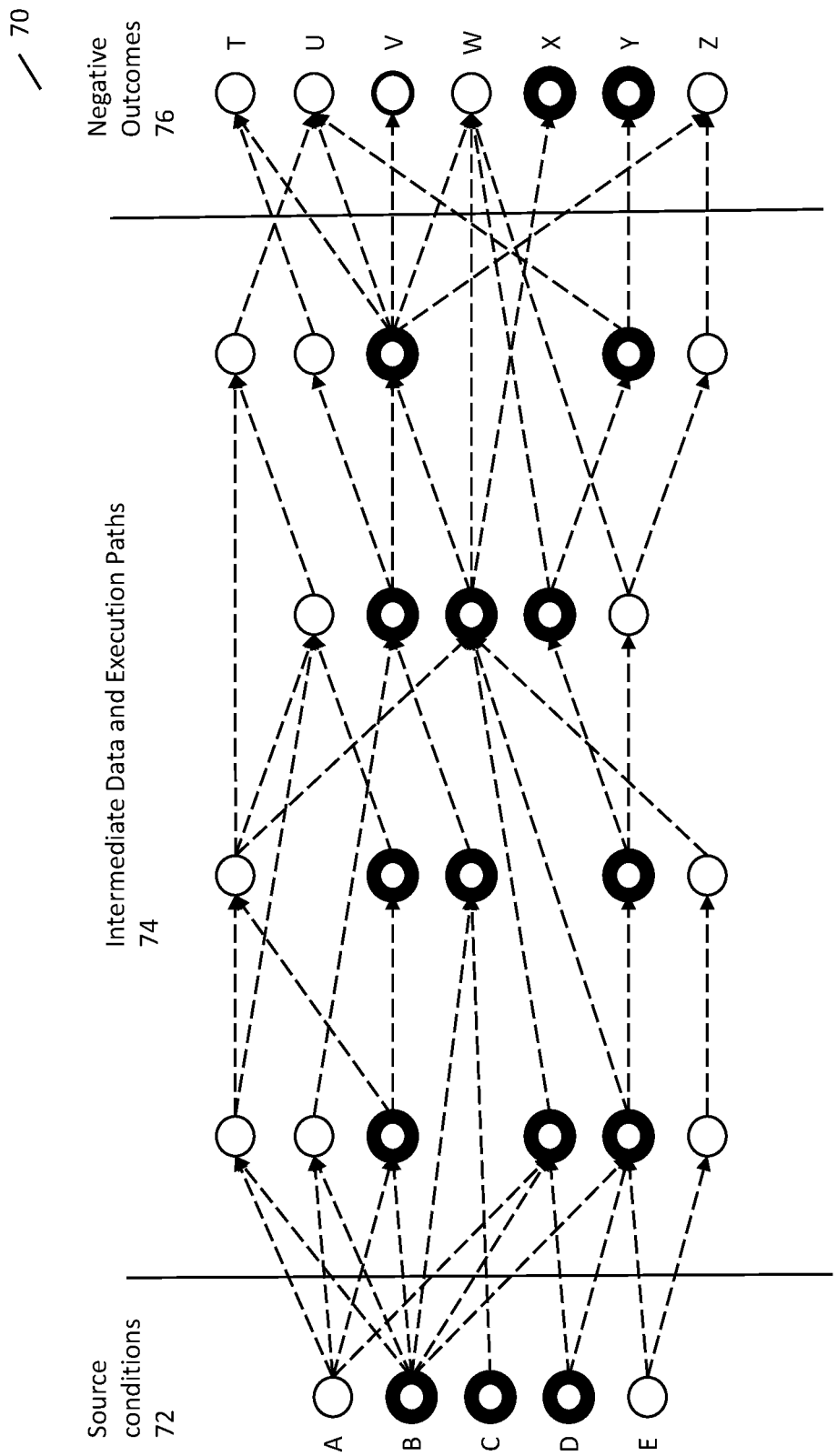
FIGS. 13A-13D are dependency diagrams of exemplary runtime relationships illustrating causal ID propagation in exemplary systems that can be used with some embodiments.

Various important techniques to minimize its impact on the code, are described with respect to FIGS. 13A-13D. FIG. 13A shows a simple cause and effect in an embodiment. The bold round nodes represent instances of data or execution pathways with attached causal ID term variables (parent/root nodes B, C, D, child/leaf nodes V, X, and y, and intervening child nodes). In this example, for discussion simplicity, each node is defined as a causal function/functional object within the software that carries out a computational step, generally generating a value/result that is then used by the next node. For clarity, the value/result of each function is not shown here—only the causal ID term for each function that is passed to subsequent functions. For the source conditions (causal event conditions 72), the bold nodes (B, C, and D) represent a root cause source condition that, when executed, will generate a causal event in the database, and an associated unique causal ID value to identify that event (in additional to any functional values), where the causal ID value will be passed downstream to the causal ID terms of any subsequent functions (nodes) that use the result of that upstream node as a functional input, and when the value of that upstream node was known to cause the value or state of the downstream node. For the intermediate path nodes (those functions that use the outcome of the upstream functions/nodes or functions that take those values as input), the bold nodes show the causal ID term variable attached to that respective data or execution path. The bold nodes would also contain any functional values, but these are not displayed here. The value of the variable causal ID term for each node at any given time indicates the causal event reason(s) for that node's current state. In general, if each downstream node (V, X, Y) is associated with a negative outcome (e.g., having a functional value that deviates from a nominal system state), that downstream node's causal ID term can be used to look up the causal event(s) in the database for that negative outcome and present them as the reason(s) for the negative outcome via the UI display.

Figure 13B:
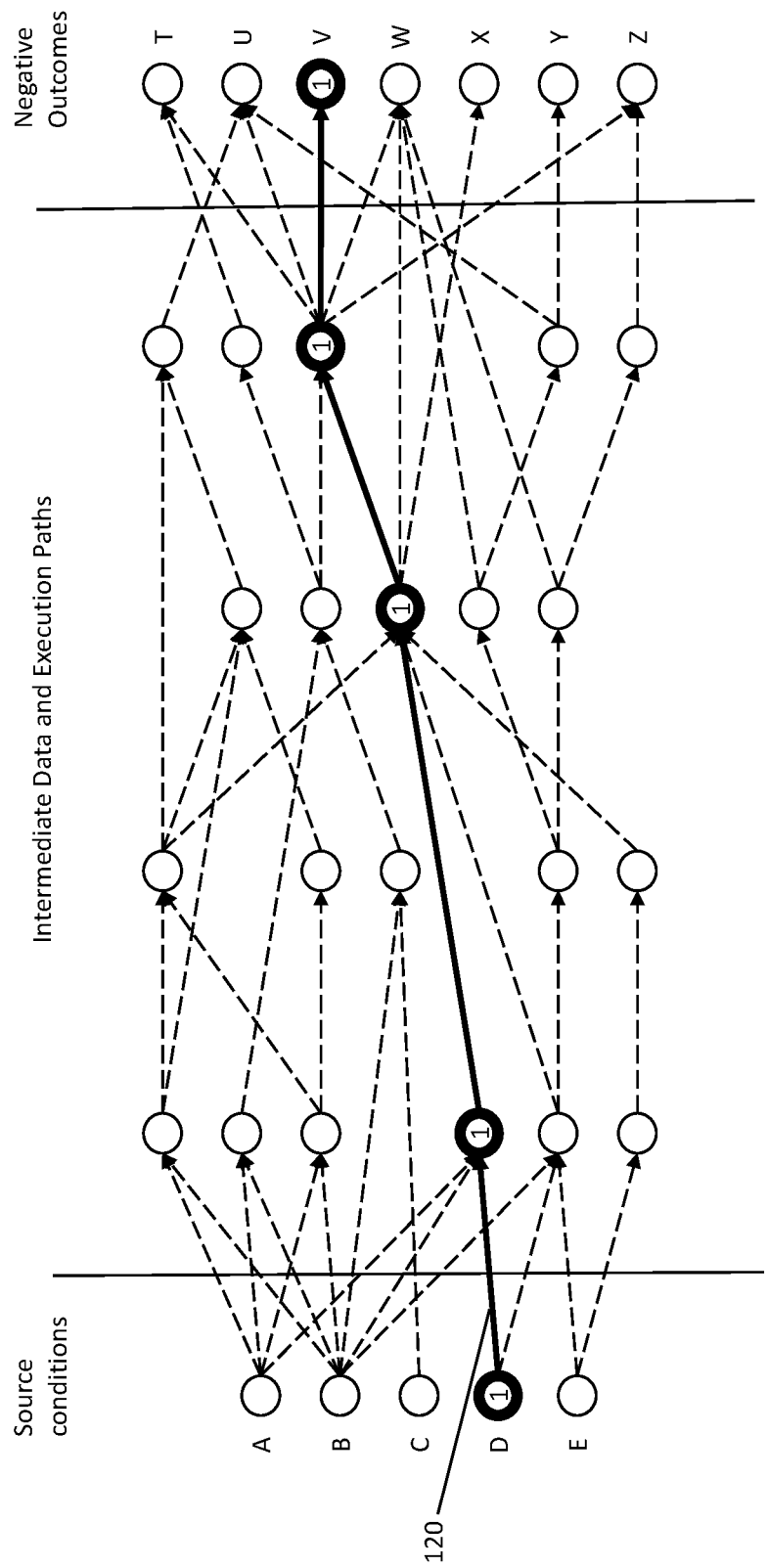
Figure 13C:
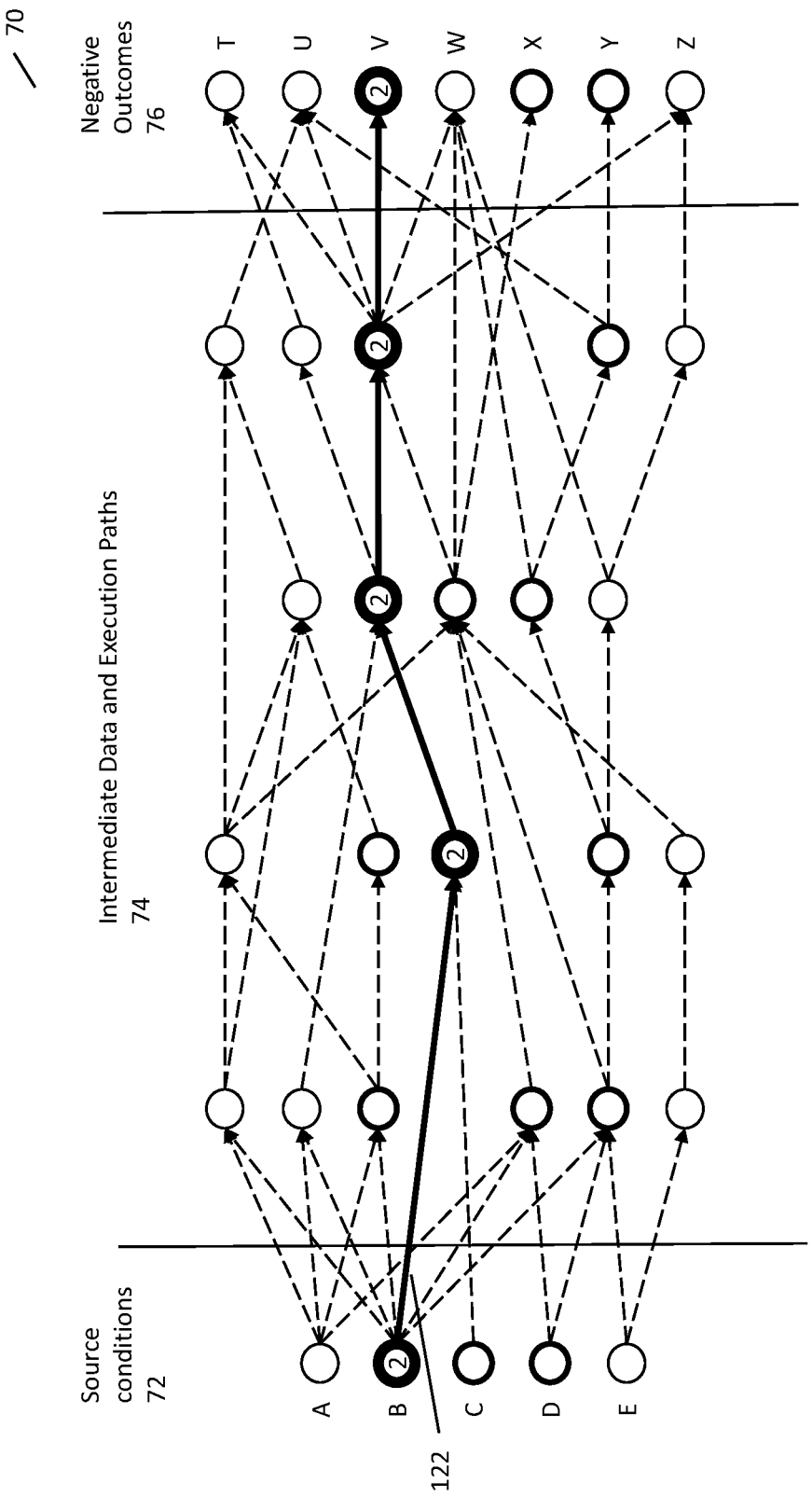

FIG. 13B is a cause and effect graph of an example where a source condition of type "D" occurred a first time, generated a causal event instance with unique causal ID "1" arbitrarily generated for it, and passed that causal ID along to (some of) the causal ID terms of its output effects. All nodes along bold path 120 happen to share the common causal ID term "1" because their current states all happened to be caused by the event condition referred to by causal ID "1", and this causal ID term was set on them when their current states were set, as a result of causal event condition D's output clause. On preparing to display the negative outcome "V" that resulted, and seeing the non-nil causal ID term "1" attached to the data or action responsible for driving display of the outcome, the UI knows there should be a causal event in the database, or soon to be in the database, that can be looked up and displayed as the reason for the negative outcome. In this case, it would display the causal event instance associated with the causal ID of "1", which was the event instance of type D that was posted to the database FIG. 13C is a cause and effect graph of an example where a different source causal event condition of type "B" executes, generates a new causal event, and identifies it with the dynamically generated and unique causal ID "2." This source condition occurrence causes another instance of the same type of negative outcome "V" that occurred in the first case of source condition D above. In this case, this second occurrence of the same type of negative outcome displays the causal event associated with "2", which was an event instance of type B, and not the causal event instance associated with "1" as before (the type D event). This causal ID propagates along bold path 122, which links error V with the causal event instance generated by source condition B.

Figure 13D:
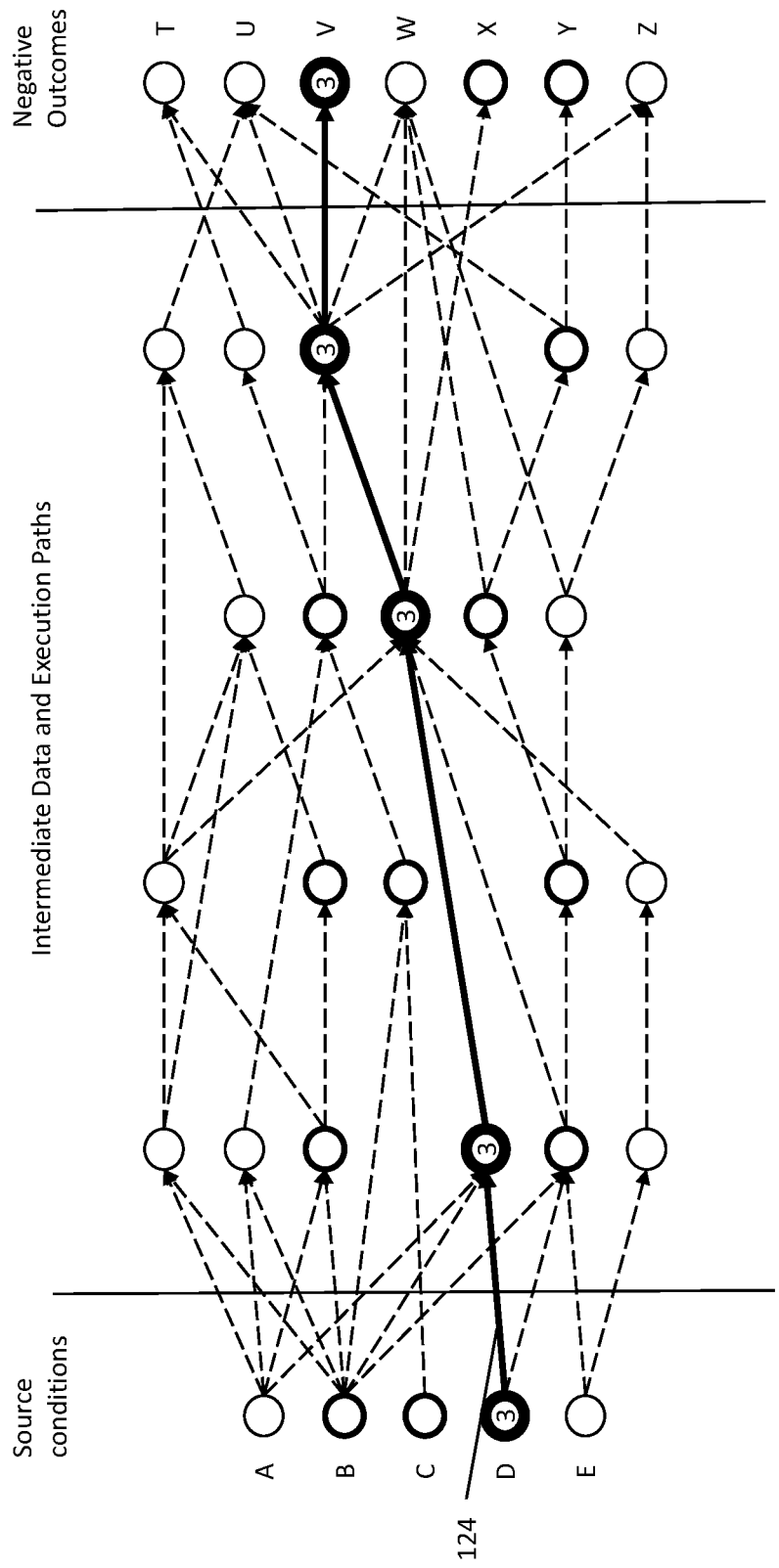

FIG. 13D is a cause and effect graph of an example where the same source causal event condition D (as in FIG. 13B) executes again, which was the same condition as in the first case. It generates the same exact pattern as in the first case of cause, effect, and negative outcome V. Note that since this is a separate occurrence of the source condition, a new causal event instance entry is generated in the database, with a new, unique causal ID value arbitrarily generated to be "3." This causal ID propagates along bold path 124, which links error V with the newest causal event instance generated by source condition D.

Here, this third occurrence of the negative outcome V would display the causal event associated with causal ID "3" instead of "1" from the first case above. If there were different core data values triggering or associated with this occurrence of causal event condition D, such as different sensor readings causing the error, or a different date and time stamp associated with the occurrence, then the displayed event would reflect this different information about the different instances of root cause condition D to the user.

If a node stays at the same state, long after a causal event condition had an effect on it, then the value of the causal ID term attached to that node will stay as well. Any future negative outcome effects that node has will then still report the appropriate causal ID term as the reason for the outcome. This takes care of the problem where the effects of source conditions are open-ended with respect to time.

The number of conditions, data pathways, and execution pathways in a software system that are actually causal and can produce a negative outcome, versus non-causal and do not produce any negative outcomes, is typically a minority. While it appears from the diagram that many heavy modifications are required to implement causal event reporting, in many embodiments, it does not constitute a major impact on the software or software development.

In some embodiments, a causal event database is used to record each causal event (i.e., each instance of a casual event condition being met and its output clause executing). Each causal event entry in the database represents one execution of a causal event condition's output clause, and contains at least the following fields:

Description: A code, string, or similar field describing the type of event.

Causal ID: A causal ID value to uniquely identify the causal event instance. The causal ID should always be equal to a unique/pseudo-unique (unique within the database with a guaranty or sufficiently low chance of being non-unique), non-nil causal ID value.

Parent Causal ID term: A parent causal ID term field that, if other causal event(s) were known to cause the current causal event, contains the causal ID term of those other causal event(s). If no other causal event(s) were known to cause the current event, then the parent causal ID field is set to the nil causal ID.

Other Relevant Information: Other fields and information should ideally be added as well to provide further diagnostic information for the user when troubleshooting the event instance. Examples include: relevant inputs to the event condition, such as relevant sensor readings, logic check inputs, relevant types of user or automated actions, etc.; surrounding operational context, such as a date/time stamp of when the event occurred, the user that originated the relevant even condition input or that was logged in at the time of the event or, source hardware identifiers, source network identifiers, etc.

Every time a causal event occurs, the output clause associated with the causal event's condition does the following invention-specific actions, in addition to whatever other application-specific actions the output clause does. Causal ID generation: the output clause dynamically generates a new, unique causal ID value to identify that causal event instance and distinguish it from other executions of that causal condition (i.e., other causal event instances produced by that condition) or any other causal event instances produced by any other causal conditions. Causal event posting to database: the output clause writes or initiates writing a new causal event record to the causal event database. The fields of the database event entry to be added can include: the type of the event to describe the basic causal event condition; the causal ID of the event, set to the causal ID generated; if the event is known to have been caused by other event(s), via an upstream causal pathway, then the parent causal ID term of the current event is set to the causal ID term associated with the causal pathway, as appropriate, otherwise the parent causal ID term of the current event is set to the nil causal ID or empty set; other relevant information for the event. When the output clause modifies data or takes other actions that can cause a negative outcome, it passes along the causal ID value generated as part of the data or action, which initiates communicating the causal ID along the relevant causal pathway(s).

Any software pathway between the causal event condition's clause and the UI code that finally displays the negative outcome, where certain data values and/or executions are required to cause the negative outcome, is defined here to be a "causal pathway". Causal pathways can be generally divided into data pathways and execution pathways. As part of the solution, causal ID term variables are bound (or attached) to causal pathways. The value of a causal ID term variable attached to a causal pathway represents the "reason" for the current state of that pathway—i.e., the reason why a piece of data has its current value, or the reason why an execution pathway is currently executing. The "reason" is considered to be the causal event(s) pointed to by the current value of the causal ID term that is attached to the pathway. Note that there can be significant interaction and overlap between data pathways and execution pathways; execution pathways often modify data, and data pathways often trigger execution pathways.

A causal data pathway is defined as any piece of data such as a simple variable, an object instance, a database entry, a complex data structure, etc., where one or more possible values of the data can eventually yield a negative outcome. Causal data can be represented in many different forms, per the norms of any data in software engineering. For example, data can exist as simple Boolean values, integer values, floating point values, enumerated values, pointers to other data, other native types; in aggregates such as classes, structures, arrays, containers, more complex data structures; etc. For each causal data pathway between the event clause and UI code that displays a negative outcome, a causal ID term variable is introduced to be associated with (attached to) that piece of data. As discussed herein, a causal ID value stored in a causal ID term is described as unique or pseudo-unique. In general, a causal ID value should be at least substantially unique. That is, a causal ID should be either assigned a known-unique value (e.g., one that is not currently in use by any processes and one that is not currently stored in any persisted data to be used by any processes, as assigned by a process that keeps track of IDs to verify uniqueness) or a pseudo-unique value with sufficiently low probability of colliding with other pseudo-unique IDs (e.g., a randomly generated value with sufficient total value range such that there is a statistically insignificant probability that for any given system state there will be multiple causal events inadvertently using the same causal ID.) Generally, the required bit-size of any pseudo-unique causal ID will depend on the maximum number of causal IDs assigned to root cause events at any time in the causal event database. For example, for some simple embodiments, a random 32 bit value will be sufficient, but for more complex embodiments, a 64 bit (or 128 bit) value may be preferred. A sufficient generator for substantially unique causal ID values is one designed such that the odds of a system having two inadvertently identical causal IDs in use at any given time is less than 1% over the combined lifetimes of all system instances, although it will be appreciated that the lower the chance, the better.

The current value of a causal ID term that is bound to a piece of data effectively describes the "reason" for the current value of that piece of data. The "reason" is considered to be the causal event(s) in the database (or causal event(s) soon to be in the database) that the causal ID term refers to. The current value of the causal ID term points to the causal event(s) which are known to describe why the piece of data has the value that it currently does. In some embodiments, the value of the causal ID term does not refer in any general sense to the non-value aspects of the piece of data. The value of the causal ID term does not refer to the piece of data's general type, variable name, storage type or location, or any other general property or metadata regarding the target piece of data. The causal ID term's value only describes a source event or events for the data's current value. Because the value of a causal ID term variable describes the reason for the value of the piece of data that it is associated with, the value of that causal ID term can change whenever the value of its associated piece of data changes.

The causal ID term associated with causal data can be represented and bound to that causal data in different ways, as is convenient for development of the software, in various embodiments. Exemplary forms of data that can make up a causal data pathway can include: simple variables, objects, database entries and other data pathways. For simple causal data variables, such as a Boolean flag or enum state or status variable, a causal ID term variable can be introduced to "live" alongside the simple data variable. Various programming languages may provide more ways to easily or efficiently bind a causal ID value to an arbitrary variable. For instance, in languages that support it, a causal ID term may be bound to the causal data using a generic causal class which includes a templated variable for the target causal data and an associated causal ID term variable. For object instance data, the object's class can be modified to include a causal ID term field. Or, as for simple variables, the variable that holds the object reference or value could also be bound to a causal ID using a generic causal class, or a new causal ID variable can be introduced to "live" alongside that variable. For database entry data, the table can be modified to include a causal ID field for the entry. Note this is referring to data in databases other than the causal events stored in the causal event database. Similar or other techniques are used to bind causal ID parameters to other types of data as necessary, in some embodiments.

A causal execution pathway is defined as any operation that the system may take which may yield a negative outcome. Execution pathways include function calls, operators, blocks of code, and other actions and groups of actions taken by the software system. Execution pathways may directly result in a negative outcome being displayed, such as a function in the UI whose job it is to actually display the negative outcome. They may also indirectly result in a negative outcome by triggering other causal pathways and/or modifying causal data. Execution pathways may also change the value of data to values which may eventually yield negative outcomes.

For each execution pathway that can yield a negative outcome, whether by indirectly modifying data, or by directly effecting UI changes, a causal ID term parameter is usually introduced to be attached to that pathway. The current value of a causal ID term that is bound to an execution pathway effectively describes the reason that pathway is currently executing. The current value of the causal ID term points to the causal event(s) in the database (or causal event(s) that will soon be in the database) that are known to describe why current execution of that pathway was initiated. Because the value of a causal ID term variable describes the reason the current execution pathway is running, the value of that causal ID term can change whenever the reason for calling that execution pathway changes.

For function calls that output or modify causal data, or that call other causal execution pathways, a causal ID term parameter can be added to the parameter list of the function. Alternately, a thread-local last-in-first-out (LIFO) data stack may also be introduced, where a causal ID term can be pushed onto the front of the stack before making a function call or series of calls, and where the front-most causal ID term can be read within the function call(s), and where the causal ID term is popped off of the stack after returning from the function call. While not generally recommended from an implementation perspective, since it essentially hides the fact that the function accepts a causal ID term, it can be useful if many functions in a very deep call stack need to be modified and are acting mostly as pass-throughs. If a function can accept more than one causal input, then it may need to select from among multiple input causal ID terms when modifying causal data or executing other causal pathways, in some embodiments. In some embodiments, causal functions are adapted to identify the causal inputs responsible for the output state and include one or more of the causal ID terms of those inputs with the output. Choosing the responsible causal input(s) correctly is described below.

Software functional operators often have well-defined behaviors that are closely associated with data modification. Consequently, they tend to straddle execution and data pathway boundaries. Operators that are used to compose and evaluate data expressions do not typically have a new causal ID term parameter attached them, in some embodiments. Instead, their job in the causal realm is usually to selectively propagate the appropriate causal ID term(s) from their input value(s) to their output value(s), according to the specifics of each operator's fundamental behavior, and the specific input values provided on that current execution of the operator.

If the programming language supports operator overloading, then operators can be overloaded to, in addition to performing the underlying core operation being requested, also provide processing of causal input and output values, and to select the appropriate causal ID term(s) for automatic propagation to the output value. If the language does not support operator overloading, then new functions can be defined that behave as the operators and also perform the appropriate and automatic propagation of input causal ID term(s) to their output value. If an operator can accept more than one causal input, then it may need to select from among multiple input causal ID terms when outputting causal data or executing other causal pathways.

In some embodiments, blocks of code typically use the causal ID term passed into the surrounding function call, or may use a causal ID term returned by another execution pathway or data pathway as necessary to describe the reason for the actions within the block. In some embodiments, other execution pathways as may exist in different programming languages or custom source code can be modified in similar or appropriate ways as needed to pass along an appropriate causal ID term that describes why the pathway is being executed.

Propagating Causal IDs across Operations

When a causal pathway requires selection of an input causal ID term value to attach to its output, such as during assignment of causal data downstream from that pathway, or on triggering execution of another causal execution pathway, or for selecting which causal ID term(s) to assign to output data or actions when processing the results of an operation with multiple causal inputs, it is necessary to provide the correct causal ID term(s) for that pathway's output, in order to correctly describe the reasons for the current state of any further pathways that were caused by the current pathway. In general, since the purpose of a causal ID term is to describe the reason for the current state of a causal pathway, which for data pathways is represented by the current value of the data, the selection of which causal ID term(s) to propagate across an operation depends on the actual input and output values on each execution of that operation and can vary by embodiment.

Application of the causal ID propagation rules below is sufficient to correctly propagate appropriate source causal event information across expressions of arbitrary complexity and composition in order to accurately inform the user of which source conditions need to be remedied to change the outcome on future evaluations of those expressions. Consequently, application of the causal ID term propagation rules allows the system to accurately inform the user which source conditions need to be remedied to change the future outcomes of any negative outcomes that were dependent on those expressions.

Each time a causal pathway is assigned or triggered (e.g., a piece of causal data is assigned a value or a causal execution pathway is executed), the causal ID term attached to that causal pathway is also assigned (or overwritten). Relative to the causal handling needed for other arbitrary operations, assignment is considered a special case operation with rules that can supersede those used to handle the other operations. (This reflects that normal assignment and the assignment operators in software tend to be special cases as well, in that they behave differently than say the addition operator, or the Boolean AND operator, etc.) Per the norms of software, the source of an assignment—the input value that is being copied to the output variable—can generally be either a literal value, a named variable value, or a compiler-generated unnamed temporary variable value. The value of an assignment's input variable (particularly when it is a temporary variable) may be the result of an expression of arbitrary composition and complexity.

Normally, the causal ID term that is assigned when causal data is assigned, or causal execution pathway is triggered, is sourced directly from the input causal expression that is being assigned or that is triggering the execution. However, there are cases when the input expression's causal ID term is ignored, and instead the nil causal ID term is assigned when copying the underlying data for the assignment. The rules used with some embodiments for assignment are listed here and describe when to use the causal ID term attached to the input expression, and when to use the nil causal ID term. Note that while these rules describe assignment to a "piece of data" (causal data pathway), they also apply when selecting which causal ID term to attach to a causal execution pathway, where the causal ID term may or may not be specified directly as a causal-ID-term-type parameter with no attached data. Other rules can be used in some embodiments, taking into account processing efficiency or other desirable traits.

Assignment with negative outcome: if a piece of causal data is assigned to a value that is known to always eventually cause a negative outcome, then the causal ID term attached to that piece of data should also simultaneously be assigned to the causal ID term that represents the causal event(s) that caused the new data value to be assigned. If the assignment's input value is a literal value, then the causal ID term should normally be sourced from either (a) the causal ID of a causal event generated in the causal event condition's output clause, if the assignment is happening as part of an output clause, or (b) the causal term of another causal expression or piece of data that is responsible for the assignment. If the assignment is from another piece of causal data, then the source data's causal ID term is typically assigned straight over to the target of the assignment.

Assignment with no negative outcome: If a piece of data is assigned to a value known to eventually not cause any negative outcomes, then the causal ID term associated with that piece of data should simultaneously be assigned to the nil causal ID term value. This typically occurs in code outside of an event condition clause, where the data value may be changed to states that do not cause negative outcomes, e.g., due to some form of reset, recovery, initialization, new request, etc. It can also occur in event condition clauses as well when they are clearing (or resetting) other negative outcome conditions in the process of initiating their own negative outcome(s). This may also mean that a non-nil causal ID term attached to the assignment's input value may be deliberately ignored in favor of assigning the nil causal ID term instead. If an "assignment with a possible negative outcome" value (described in the next paragraph) is finally known to not cause a negative outcome in the current context, then the causal ID term associated with that "sometimes" value is finally ignored in favor of the nil causal ID term.

Assignment with possible negative outcome: If a piece of data is assigned to a value that sometimes causes a negative outcome, but does not always, and it is not known in the current execution context which outcome will occur, then, in some embodiments, the causal ID term associated with that piece of data should be assigned to the causal ID term of the causal event(s) that ultimately caused that data value to be assigned, similar to negative outcome assignments. If it becomes known at a later point in execution that the value of the data does not represent a negative outcome, then the affected expressions will ignore the causal ID term assigned here and propagate or assign the nil causal ID term instead because the data value is now known to produce no negative outcome.

Assignment with negative outcome but no source causal ID term: If a piece of data is assigned to a value known to cause a negative outcome, but the causal ID term representing the causal event(s) that caused that value cannot be communicated to the data assignment, then the causal ID term associated with that piece of data should be assigned to the nil causal ID term. This prevents the UI from displaying inaccurate causal information to the user. It is considered better to display no causal information than incorrect causal information.

Often, a causal variable, defined here as a variable piece of data with a variable causal ID term attached, is assigned the output of some composite expression, where the value assigned is made up of one, two, or more operations operating on one, two, or more input values. If one or more parts of the expression are themselves causal values (causal variables or causal literals), regardless of whether they are temporary variables or named variables, then the causal ID term assigned from the expression should reflect which actual sub-expression and/or input data values in the expression contributed to the final value being output. This allows the correct reasons for negative outcomes to be selected for and flow through the system from source conditions to UI displays. The value of the causal ID term attached to the output causal variable should reflect which causal event(s) led to that output variable's current value, and therefore which event(s) caused the actual negative outcome of interest.

In effect, a composite expression or operation that contains two or more causal inputs implies that two or more different causal event conditions could contribute to any single negative outcome. (This makes conventional efforts to trace root cause difficult, as the complexity of possible causes grows quickly.) Additionally, in some cases, it may be that only a subset of the different causal inputs contribute to the expression's result, implying that any causal ID terms associated with inputs that did not contribute to the actual result value should not be attached to that result value. This is important to prevent false root causes for negative outcomes from being reported to the user. To handle arbitrary expressions in a causal manner, each individual operation within the expression should be modified to handle its causal inputs and outputs appropriately. Each operation needs to select the correct causal ID term(s) from its input(s) to propagate to its output(s), and correspondingly which causal ID term(s) from its input(s) to exclude from its output(s). Once this is done, then the typical nature of how compilers handle complex, nested expressions—e.g., with intermediate temporary values—typically allows the causal output for the overall expression to be calculated "automatically", with no special intervention needed by the developer.

For the following description, let a "causal value" be defined as an aggregate of (1) an "underlying value" (an application specific piece of data with arbitrary type that is also set to a value) plus (2) a causal ID term value that describes the causal event(s) that are ultimately responsible for why the underlying value is set the way it currently is. The underlying value here is essentially the normal data type and value that the operation of interest is operating on. That is, it is the normal operand for the unmodified operation. The value of the causal ID term aggregated with that underlying value describes the causal event or causal events that caused that specific underlying value to be set.

To calculate which input causal ID term(s) to an arbitrary operation should be included for propagation to that operation's output value(s), and which causal ID terms(s) should be excluded for propagation, a "causal table" is first defined for the operation, per the rules below, that declares which input causal ID term(s) to propagate to the operation's output for which input-output value combinations. Then the operation implementation is modified to exhibit the causal ID term propagation behavior specified by the causal table. Because the purpose of a causal ID term attached to a data pathway is to describe the "reason" (causal event(s)) for the current value or state of that pathway, the causal table is determined based on analyzing and classifying all of the possible input values for the operation, their combinations when there are multiple possible simultaneous inputs, and their corresponding output values. Specifically, the causal table for an operation first classifies, from a causal perspective, all possible combinations of input values for the operation, along with their corresponding output values. The causal table then defines which input causal ID term(s) to propagate for each listed classification of input values. The causal ID term(s) selected to propagate to the output value for each possible classification of input values is determined by analyzing which input value(s) caused the observed output value(s), per the rules below.

After the causal table for an operation is determined, the operation is then modified in the code from its conventional operation counterpart to implement the additional causal behavior defined by the table, on top of the base operation. The goal of the modified operation overall is to apply the original base (non-causal) operation to all of its input causal values' underlying values, as if they were not causal inputs, and then output the same value as the base operation, except making it a causal value, where the correct input causal ID term(s) are attached to it. The causal ID term(s) to be attached to the output are determined based on the causal table that was developed for the operation.

Embodiments can modify the operation in whatever form is most convenient in their programming environment. For example, to modify built-in operators, such as C++'s "&&", "||", "*", operators, etc., the developer may provide operator overloads (when available) that accept causal values as input, and produce causal values as output, where the causal value is an aggregate of the underlying item type that the operator would normally operate on, plus a causal ID term variable. If operator overloading is not available, then the developer may provide equivalent functions, such as CausalAnd( ), CausalOr( ), CausalMultiply( ), etc. If the operation in question is already defined in a custom function, such that the custom function now needs to process causal inputs and outputs, then either the function can be modified directly, or function overloads or alternatives can be provided to handle when causal inputs are provided and causal output is expected.

For many embodiments, the following modifications are made to traditional operations to add causal functionality. The operation is modified to accept one or more inputs which are "causal values." For any inputs that are not causal values, the operation is modified to temporarily promote the input to a causal value (usually via an intermediate local or temporary variable), with the underlying value equal to the original input's value, and the causal ID term equal to the nil causal ID term. The operation is modified to output causal values when one or more of its inputs is a causal value. The output causal value is then an aggregate of an underlying value equal to applying the base, non-causal operation to the underlying values of the inputs, and a causal ID term value that describes the causal event(s) that are ultimately responsible for why the underlying output value was set the way it currently is. A counterfactual approach is utilized to determine which observed input values are considered to be the cause of the observed output value: if changing all of the observed values of an arbitrary subset of inputs would change the observed value of the output, then that subset of input values together is considered to be one cause of the observed output. If changing all of the observed values of a subset of inputs would not change the observed value of the output, then that subset of input values together is not considered to be a cause of the observed output. In general, each possible subset of observed input values, for each possible output value, is analyzed to determine which subset(s) of input values are responsible for the observed output, (i.e., which input subsets are considered a cause of that particular output, and which subset(s) of inputs are not responsible for that particular output, and which input subsets are not considered a cause of the output). After all input subsets responsible for the observed output have been identified, the causal ID terms associated with the inputs in the subsets are propagated to the output. Before that propagation to output happens, the responsible causal ID terms are collapsed where possible to reduce duplicates and simplify the output. Additionally, further semantics about that final subset of input causal ID terms can be collected and included as part of the overall output causal ID term. These additional semantics can then be used later on to provide more detailed troubleshooting logic and approaches for the user.

A causal ID term, in addition to containing the causal ID values which describe the causal event(s) responsible for the current state of an associated causal pathway, can also describe additional causal semantics of the causal ID(s) contained in the term. A causal ID term can be represented by one of the following forms: a single causal ID "x1"; a list of peered causal ID terms with "square bracket semantics", i.e. "[x1 ... xn]"; a list of peered causal ID terms with "angle bracket semantics", i.e. "<x1 ... xn>"; or a mixed (i.e. compound) list of peered causal ID terms in brackets, where one or more of the individual causal ID terms in a square or angle bracket set can themselves be a nested peered causal ID term, and where this nesting can be arbitrarily deep. That is, the causal ID term may be a causal ID, or another causal ID term of a nested square or angle bracket set of causal IDs or more causal ID term(s), e.g. "[x1 x3 x5<[x4 x2] x4>]". The causal ID terms in any list may be duplicated any number of times, such as the causal ID term x4 in the last example, which appears twice. The meaning of the causal ID term forms above is described in the next paragraphs.

Note that the actual software representation of the causal ID bracket semantics need not use brackets in the code. The brackets are used here to represent certain semantics. In some embodiments, the semantics could be indicated by the type of the container containing the peered causal ID terms, an enumerated value associated with the peered causal ID terms, etc.

Each causal ID term here x1, x2, ... xn represents the causal ID term attached to one of the underlying value input terms X1, X2 ... XN of the operation. That is, x1 represents the causal ID term attached to main input term X1, x2 represents the causal ID term attached to main input term X2, and so on. So, for example, if an operation had only 2 inputs, then it is only concerned with the causal ID terms x1 and x2 associated with main input terms X1 and X2.

Let the square bracket main input term notation with uppercase letters "[Aj ... Ak]" represent a subset of the variable main input terms observed for the execution of some causal operation, where changing the values all of the terms in the subset [Aj ... Ak] simultaneously would change the observed output of the causal operation. The input terms "[Aj ... Ak]" are then collectively together considered to be one single cause of the observed output of the causal operation.

Consequently, let the square bracket causal ID term notation with lowercase letters "[aj ... ak]" represent the set of causal ID terms associated with main input terms [A ... Ak]. Since the input term subset [Aj ... Ak] is said to collectively together be a cause of a particular observed output, then the causal ID term subset [aj ... ak] associated with main input terms [Aj ... Ak] represents the causal events that collectively together caused the particular observed output of the causal operation.

Since all causal events represented by the causal ID terms [aj ... ak] were required together to cause the observed output, then the following equivalent Boolean expression can be constructed to represent which causal events (i.e. main input terms) must change in order for the observed output to change: OutputWillChange=Change(aj) AND ... AND Change(ak).

Change(x) represents whether the input term represented by causal ID term x is changed, due to changing the inputs of it associated underlying causal event condition(s), and returns true if it is changed. Consequently, OutputWillChange will then be true only if all of the conditions associated with the causal events associated with causal ID terms [aj ... ak] are changed.

Let the angle bracket notation with uppercase letters "<Bj ... Bk>" represent a subset of the variable input terms observed for the execution of some causal operation, where changing any single input Bi in the subset <Bj ... Bk>, and only that input, would change the observed output of the causal operation, and where this is true for all input terms in <Bj ... Bk>. Each input term in <Bj ... Bk> in then considered to be an independent cause of the observed output of the causal operation.

Consequently, let the angle bracket main input term notation with lowercase letters "<bj ... bk>" represent the set of causal ID terms associated with main input terms <Bj ... Bk>. Since each main input term in the subset <Bj ... Bk> is said to be an independent cause of a particular observed output, then the causal ID term subset <bj ... bk> associated with main input terms <Bj ... Bk> represent causal events that, independently of each other, caused the particular observed output.

Since each causal event represented by each of the causal ID terms in <bj ... bk> was considered to be an independent cause of the observed output, then the following equivalent Boolean equation can be constructed to represent which causal events (i.e. main input terms) must change in order for the observed output to change: OutputWillChange=Change(bj) OR ... OR Change(bk). As with the square bracket notation, Change(x) represents whether the input term represented by causal ID x is changed, due to changing the inputs of it associated underlying causal event condition(s), and returns true if it is changed. Consequently, OutputWillChange will then be true if any one or more of the conditions associated with the causal events associated with <bj ... bk> are changed.

In short, the square bracket notation [ ... ] indicates that all causal events referred to directly to inside the square brackets must be remedied in order for the output to change, and the angle bracket notation < ... > indicates that only one (or more) causal events referred to directly inside the square brackets must be remedied for the output to change. For example, a causal ID term notated by "[pqr]" indicates that the underlying value associated with that causal ID term would change only if all of the conditions associated with the causal events referred to by p, q, and r are reversed (i.e., changed to not occur). In contrast, a causal ID term notated by "<pqr>" indicates that the underlying value associated with that causal ID term would change if any one or more of the conditions associated with the events referred to by p, q, or r are reversed (i.e., changed to not occur).

The input terms and causal ID terms within the bracket notation can be nested. For example, the notation "<pq[rst]>" indicates that either the event associated with causal ID p by itself, or the event associated with q by itself, or the events associated with [rst] all together, must change in order for the output to change. This nesting can be arbitrarily deep.

The equivalent Boolean expressions are then also nested. For example, <pq[rst]> can be expressed as: OutputWillChange=Change(p) OR Change(q) OR (Change (r) AND Change(s) AND Change(t)). These Boolean expressions relating which causal events need to change in order to change an output, via the causal ID terms and contained causal IDs, can also be converted back to the causal ID term notation (i.e., the bracketed notation). For example, the expression: OutputWillChange=Change(r) AND (Change(s) OR Change(t)) is equivalent to the bracket notation: [r<st>].

These Boolean equivalencies of causal ID terms can be used to determine other equivalent causal ID lists, by first converting the causal ID term form to the equivalent Boolean expression, then using the laws of Boolean algebra to transform expression to the desired form, and then converting back to the causal ID term form. For example, the causal ID term: <[pq][pr]> is equivalent to OutputWillChange= (Change(p) AND Change(q)) OR (Change(p) AND Change (q)).

By the Boolean law of Distributivity, this is equal to: OutputWillChange=(Change(p) OR (Change(q) AND Change(q))). This can then be converted back to: [p<qr>]. This demonstrates that <[pq][pr]> is semantically equal to [p<qr>].

Another even simpler example uses the commutative law:
<pq>→OutputWillChange=Change(p) OR Change(q)
→OutputWillChange=Change(q) OR Change(p)
→<qp>

The following causal ID term equivalencies can be derived as well from the laws of Boolean algebra. Since the causal ID term notation, which describes which causal events must be remedied in order to change a negative outcome, can be represented with Boolean algebra, it is subject to the same properties as regular Boolean algebra, and therefore can leverage the identities and laws of Boolean algebra to achieve various transforms on the causal ID list. The software may choose to perform these transforms to simplify output to the user and/or improve performance. They are also used to simplify further aspects of the causal event reporting methods that are described below:

|  | Causal ID term equivalency | Underlying Boolean equivalency |
|---|---|---|
| Idempotence: AND | [pp] = p | (p ∧ p) = (p) |
| Idempotence: OR | <pp> = p | (p ∨ p) = (p) |
| Commutativity: AND | [pq] = [qp] | (p ∧ q) = (q ∧ p) |
| Commutativity: OR | <pq> = <qp> | (p ∨ q) = (q ∨ p) |
| Associativity: AND | [p[qr]] = [[pq]r] | (p ∧ (q ∧ r)) = ((p ∧ q) ∧ r) |
| Associativity: OR | <p<qr>> = <<pq>r> | (p ∨ (q ∨ r)) = ((p ∨ q) ∨ r) |
| Absorption: outer AND | [p<pq>] = p | (p ∧ (p ∨ r)) = (p) |
| Absorption: outer OR | <p[pq]> = p | (p ∨ (p ∧ r)) = (p) |
| Distributivity: outer AND | [p<qr>] = <[pq][pr]> | (p ∧ (q ∨ r)) = ((p ∧ q) ∨ (p ∧ r)) |
| Distributivity: outer OR | <p[qr]> = [<pq><pr>] | (p ∨ (q ∧ r)) = ((p ∨ q) ∧ (p ∨ r)) |

Note that a set of brackets that contains only 1 term, such as [aj] or <aj>, is equivalent to that term without brackets: aj.

The following procedure is used to build the causal table for an arbitrary operation. This will use the Boolean AND operation as an example.

Step 1: List out all input terms to the operation, then all possible combinations of input values for those input terms, and their corresponding outputs from the operation. Use one column for each input term, plus one column for the output, and one row for each combination of possible input values and corresponding output for those input term(s):

| Causal Input Values Identity | | Causal Output Values AND |
|---|---|---|
| {P, p} | {Q, q} | {P, p} ∧ {Q, q} |
| {false, p} | {false, q} | {false, ??} |
| {false, p} | {true, q} | {false, ??} |
| {true, p} | {false, q} | {false, ??} |
| {true, p} | {true, q} | {true, ??} |

The braced notation {X, x} represents a causal value, where causal ID term "x" is associated with underlying value "X". Here, the general input terms to the causal operation Boolean AND are specified as {P, p} and {Q, q}, where P and Q are the underlying Boolean input terms (e.g. variable that can represent true or false), and p and q are the variable causal ID terms currently associated with those underlying input values, respectively. The "??" in the "Output Values" column represents the target causal IDs to propagate that we are determining with the method. Note that this essentially corresponds to classic a Boolean table description, expanded to attach causal IDs to its inputs and output.

Step 2: Add a column for each possible subset (combination) of input terms (e.g., P, Q, PQ, etc.) that describes whether changing the value(s) of the listed input terms, and only those input terms, would cause the output of the operation described on that row to change. For an operation with M input terms, start with all possible 1-input combinations, followed by all possible 2-input combinations, then 3-input combinations, etc. up to all M-input combinations, of which there should be only one. In this example, the operation Boolean AND contains 2 input terms, so its table is expanded to look like this:

| Causal Input Values Identity | | Causal Output Values AND | Does the output value change when the value(s) of these input term(s) change | | |
|---|---|---|---|---|---|
| {P, p} | {Q, q} | {P, p} ∧ {Q, q} | [P] | [Q] | [PQ] |
| {false, p} | {false, q} | {false, ??} | N | N | Y |
| {false, p} | {true, q} | {false, ??} | Y | N | N |
| {true, p} | {false, q} | {false, ??} | N | Y | N |
| {true, p} | {true, q} | {true, ??} | Y | Y | Y |

Here, the square bracket notation [X1 . . . Xn] is used to group input terms in all of their different possible subsets (combinations), with the purpose of tracking what happens when the values of all input terms grouped together in a single set of brackets, and only those input terms, are changed simultaneously. In this case, there are two possible 1-input subset, [P] and [Q], and there is one possible 2-input subset, [PQ]. This is the complete set of all possible input subsets, which is correspondingly listed in the table.

These columns are used to track the answers to the following question: would the output value of the operations specified by a row change if the value of all the terms listed in the bracket change, and only those terms listed in the bracket change. "Y" ("Yes") represents that the output value would change from the current output value in that row if the value(s) of the specified input term(s) change, and only those terms(s) change. "N" ("No") represents that the output value would not change from the output value in that row if the value(s) of the specified input term(s) change, and only those term(s) change. This represents a novel use of the counter-factual approach to solving the problem of determining which input values (and consequently input terms) caused the observed output on any given evaluation of the operation.

For example, let us consider each of the four rows, which collectively specify all possible value inputs to the AND operation, starting with the first row (with the column headers included):

| {P, p} | {Q, q} | {P, p} ∧ {Q, q} | [P] | [Q] | [PQ] |
|--------|--------|-----------------|-----|-----|------|
| {false, p} | {false, q} | {false, ??} | N | N | Y |

This row specifies the AND operation "P AND Q" with inputs "false AND false" and corresponding output "false." The [P] column gets an "N" ("no"), because changing the value of P from false to true will not change the output of the operation from false to true. That is, the original operation for that row (specified by the three columns on the left) is "false AND false", which yields the output "false." Changing it to "true AND false", by changing P from false to true, still yields the output "false", which does not change the outcome. Therefore, the [P] column gets an "N".

Similar to the [P] column, the [Q] column also gets an "N" because changing the value of Q from false to true would not change the output of the AND operation on that row from false to true. Lastly, the [PQ] column gets a "Y" ("yes"), because changing both P from false to true, and Q from false to true, together at the same time, would change the output of the operation on that row from false to true. That is, the original operation for that row is (still) "false AND false", which yields the output "false". Changing it to "true AND true" by changing both P and Q would yield the output "true", which changes the outcome. Therefore, the [PQ] column gets a "Y".

Here is the second row (with the column headers included):

| {P, p} | {Q, q} | {P, p} ∧ {Q, q} | [P] | [Q] | [PQ] |
|--------|--------|-----------------|-----|-----|------|
| {false, p} | {true, q} | {false, ??} | Y | N | N |

This row specifies the AND operation "P AND Q" with inputs "false AND true" and corresponding output "false." In this case, the [P] column gets a "Y", because changing the operation from "false AND true" to "true AND true" (by changing P) would change the outcome from false to true. The [Q] column gets an "N" because changing the operation from "false AND true" to "false AND false" (by changing Q) would not change the outcome of false. The [PQ] column also gets an "N" because changing the operation from "false AND true" to "true AND false" (by changing both P and Q) would not change the outcome of false"

Here is the third row (with the column headers included):

| {P, p} | {Q, q} | {P, p} ∧ {Q, q} | [P] | [Q] | [PQ] |
|--------|--------|-----------------|-----|-----|------|
| {true, p} | {false, q} | {false, ??} | N | Y | N |

This row specifies the AND operation "P AND Q" with inputs "true AND false" and corresponding output "false." The [P] column gets an "N" because changing the operation from "true AND false" to "false AND false" (by changing P) would not change the outcome of false. The [Q] column gets a "Y", because changing the operation from "true AND false" to "true AND true" (by changing Q) would change the outcome from false to true.

The [PQ] column gets an "N" because changing the operation from "true AND false" to "false AND true" (by changing both P and Q) would not change the outcome of false.

Here is the fourth row (with the column headers included):

| {P, p} | {Q, q} | {P, p} ∧ {Q, q} | [P] | [Q] | [PQ] |
|--------|--------|-----------------|-----|-----|------|
| {true, p} | {true, q} | {true, ??} | Y | Y | Y |

This row specifies the AND operation "P AND Q" with inputs "true AND true" and corresponding output "true." The [P] column gets a "Y" because changing the operation from "true AND true" to "false AND true" (by changing P) would change the outcome from true to false. The [Q] column also gets a "Y", because changing the operation from "true AND true" to "true AND false" (by changing Q) would change the outcome from true to false. The [PQ] column also gets a "Y" because changing the operation from "true AND true" to "false AND false" (by changing both P and Q) would change the outcome from true to false.

Step 3: Add a column that provides an initial, "unculled" list of causal IDs to propagate, based on the information in the columns added and calculated in Step 2:

| Causal Input Values Identity | | Causal Output Values AND | Does the output value change when the value(s) of these input term(s) change? | | | Unculled Causal ID(s) to propagate |
|---|---|---|---|---|---|---|
| {P, p} | {Q, q} | {P, p} ∧ {Q, q} | [P] | [Q] | [PQ] | |
| {false, p} | {false, q} | {false, ??} | N | N | Y | <[pq]> |
| {false, p} | {true, q} | {false, ??} | Y | N | N | <[p]> |
| {true, p} | {false, q} | {false, ??} | N | Y | N | <[q]> |
| {true, p} | {true, q} | {true, ??} | Y | Y | Y | <[p] [q] [pq]> |

To fill this column in, the following rules are applied. For each row, if one or more cells are set to "Y," then the unculled list is built by the following. For each cell that is set to "Y," the causal ID term(s) associated with that cell's associated square bracket term(s) "[ . . . ]", are themselves put in square brackets, and added to the list for that row. The list of all bracket causal IDs is itself contained in an outer set of angle brackets "< . . . >." The angle brackets are used to represent what would happen if the value of any of the associated terms changed. (Compare this to the square brackets which represent what would happen if all of the associated terms changed.)

For example, if the cells for a row with headers "[A]", "[B]", "[AC]", "[CD]" and "[DB]" are all set to "Y", then the unculled list is set to "<[a] [b] [ad] [cd] [db]>." Similarly, if the cells "[QS]" and "[PQRS]" are set to "Y", then the unculled list is set to "<[qs] [pqrs]>."

If all cells in a row are set to "N", then the unculled list is set to "<Clause ID>".

Step 4: Add a column to store the "culled" list of causal ID(s) to propagate to the output, which is derived by applying causal ID term conversions on each unculled list:

| Causal Input Values Identity | | Causal Output Values AND | Does the output value change when the value(s) of these input term(s) change | | | Unculled Causal ID(s) | Culled Causal ID(s) to propagate |
|---|---|---|---|---|---|---|---|
| | | | [P] | [Q] | [QP] | | |
| {P, p} | {Q, q} | {P, p} ∧ {Q, q} | | | | | |
| {false, p} | {false, q} | {false, ??} | N | N | Y | <[pq]> | <[pq]> |
| {false, p} | {true, q} | {false, ??} | Y | N | N | <[p]> | <[p]> |
| {true, p} | {false, q} | {false, ??} | N | Y | N | <[q]> | <[q]> |
| {true, p} | {true, q} | {true, ??} | Y | Y | Y | <[p][q][pq]> | <[p][q]> |

To fill this column in, in some embodiments, copy the unculled list for each row into its corresponding culled list cell and apply the following rules, in order, to each list in the culled cell. If the list equals "<Clause ID>," then there is no change. This is the culled "list." This indicates that no input terms had any effect on the output value, and any output causal ID term should be sourced from a clause external to the operation. That is, the causal ID term for the output value in that row should be assigned manually (as appropriate) by the developer via a surrounding source code clause. (This is generally equivalent to assignment from a constant or literal.) In some embodiments, no causal ID terms from the inputs are propagated to the output, at least not automatically by the modified operation. (The developer may decide that propagating one of the input causal ID terms is the correct thing to do in context of the clause, but that is application-specific and outside the scope of the method here.)

In some embodiments, if the list contains square-bracketed terms (i.e., the list does not equal <Clause ID>), then remove any bracketed "[ . . . ]" sub-list of causal ID terms for which a subset of its causal ID terms is also in the list. This is essentially an application of the absorption and associative equivalencies to simplify the list, which also produces more accurate results by removing unimportant causal ID terms.

For example, if the unculled list is <[p] [s] [pq] [qr] [rs]>, then [pq] and [rs] should both be removed, converting the list to <[p] [s] [qr]>. [pq] is removed because [p] is in the list, and [p] is a subset of [pq]; [rs] is removed because [s] is in the list, and [s] is a subset of [rs]. If the unculled list is <[qs] [pqrs]>, then [pqrs] should be removed, converting the list to <[qs]>. [pqrs] is removed because [qs] is in the list, and [qs] is a subset of [pqrs].

Step 5: To improve human and computer understanding by highlighting only the necessary information, add a column that simplifies the notation of the culled list. This column also reflects the final causal ID terms to output for each operation, and their semantic properties. Thus, the "??" causal ID terms can finally be filled in with the information from this column:

| Causal Input Values Identity | Causal Output Values AND | Does the output value change when the value(s) of these Input term(s) change? | | | Unculled Causal ID(s) | Culled Causal ID(s) to propagate | Culled Causal ID(s) to propagate, simplified notation |
|---|---|---|---|---|---|---|---|
| | | [P] | [Q] | [QP] | | | |
| {P, p} | {Q, q} | {P, p} ∧ {Q, q} | | | | | |
| {false, p} | {false, q} | {false, [pq]} | N | N | Y | <[pq]> | <[pq]> | [pq] |
| {false, p} | {true, q} | {false, p} | Y | N | N | <[p]> | <[p]> | p |
| {true, p} | {false, q} | {false, q} | N | Y | N | <[q]> | <[q]> | q |
| {true, p} | {true, q} | {true, <pq>} | Y | Y | Y | <[p] [q] [pq]> | <[p] [q]> | <pq> |

To fill this column in, copy the culled list for each row into its corresponding simplified list cell and apply the following rules, in order, to each list is the culled cell. For each "[ . . . ]" bracketed list of causal ID terms, if there is only one causal ID term in the "[ . . . ]" bracket, then remove the surrounding "[ . . . ]" brackets from that causal ID term. For example, <[p] [s] [qr]> is converted to <ps [qr]>; <[p] [q] [r] [s]> is converted to <pqrs>, <[pq] [prs] [qs]> requires no conversion; and <[q]> is converted to <q>.

For the "< . . . >," if there is only one causal ID term or one "[ . . . ]" bracket in the "< . . . >", then remove the surrounding "< . . . >" brackets. For example, <[qr]> is converted to [qr]; <p> is converted to p; <[pq] [prs] [qs]> requires no conversion; <pq> requires no conversion.

At this point, the method is complete, and the final list of causal ID terms to propagate for each possible set of input values is complete. Here is the final table for Boolean AND, with just the final, desired information:

| Operation Name | Causal Input Values Identity | | Causal Output Values AND |
|---|---|---|---|
| Expression | {P, p} | {Q, q} | {P, p} ∧ {Q, q} |
| Values | {false, p} | {false, q} | {false, [pq]} |
| | {false, p} | {true, q} | {false, p} |
| | {true, p} | {false, q} | {false, q} |
| | {true, p} | {true, q} | {true, <pq>} |

"{P, p}" and "{Q, q}" are causal value expressions, or non-causal value expressions that have been temporarily promoted to causal values, and that can be operated on by Boolean AND. "{underlying_value, causal_id_term}" is an aggregate that represents a causal value, where underlying_value is some value that can be operated on by the original Boolean AND, and causal_id_term is a causal ID term currently associated with that underlying value. Note that the same value of underlying_value can be associated with different causal IDs at different times. The current value of the causal_id_term value describes why the underlying_value has its current value. There can be different reasons at different times why underlying_value might have the same value at those different times. Therefore, the value of a causal_id_term can be different between applications of the operator, even when the associated input value of underlying_value is the same at different times.

For purposes of the table, causal_id_term can have one of the following values:

"p", which represents the causal ID term that was attached to the causal input value P. For the output values on the right side of the table, this indicates that the current value of the output underlying_value is solely dependent on the causal event(s) associated with p, such that if the underlying_value of the input P were to have been different, then the value of the output underlying_value in question would be different as well (depending on the specifics of the operation).

"q", which represents the causal ID term that was attached to the causal input value Q. For the output values on the right side of the table, this indicates that the current value of the output underlying_value is solely dependent on the causal event(s) associated with q, such that if the underlying_value of the input Q were to have been different, then the value of the output underlying_value in question would be different as well (depending on the specifics of the operation).

"<pq>", which represents both of the causal ID terms p and q that were attached to the causal input values P and Q respectively. For the output values on the right side of the table, the use of the angle brackets "< >" here indicates that the current value of the output underlying_value is dependent on both of the causal events associated with p and q, such that if either one of the inputs P or Q were to have been set to a different value, then the value of the output underlying_value in question would be different as well (depending on the specifics of the operation). This means that to change the value of this particular output, only one of the causal conditions associated with p or q would potentially need to be remedied. Some embodiments choose to select just one of p or q and return that as the causal ID associated with the output (see below).

"[pq]", which represents both of the causal ID terms p and q that were attached to the causal input values P and Q respectively. For the output values on the right side of the table, the use of the square brackets "[ ]" here indicates that the current value of the output underlying_value is dependent on both of the causal events associated with p and q, such that if and only if both of the inputs P or Q were to have been set to a different value, then the value of the output underlying_value in question would be different as well (depending on the specifics of the operation). This means that to change the value of this particular output, both of the causal conditions associated with p and q would potentially need to be remedied. Some embodiments choose to select just one of p or q and return that as the causal ID associated with the output (see below).

Note that p and q represent the causal ID terms associated with P and Q respectively. They may each equal either the nil causal ID value, a non-nil causal ID value that references a causal event, a list of one or more non-nil causal ID values, or another, nested causal ID term. What they are set to specifically at any given time depends on the specifics of the software application. In some embodiments, the underlying_value part of the aggregate causal value is set at one or more points to a literal true or false value in the software, and it is at these points that either nil or non-nil causal ID terms are deliberately specified and set alongside the true or false. For example, if a causal Boolean value is set to a literal "true" or "false" outside of a causal event condition clause, then the causal ID term will typically also be set to the nil causal ID term at that point as well. The only place assignment of a literal would normally also set a non-nil causal ID term would be in a causal event condition clause, where a causal event was just posted and its causal ID is to be used to describe why the Boolean is being set to true or false at that time, or as part of a downstream causal pathway. This is all per the rules described above on when, how, and where causal events and their causal IDs are generated, and what their basic purpose is. For the operation output values in the table above, the causal_id_term describes which of the input causal ID term(s) are propagated to the output value. This also implies which input causal ID term(s) are deliberately not propagated.

The primary difference between <pq> and [pq] is that: <pq> indicates that the output value will change if either of the input values P or Q change (this means that to change this particular output, only one of the causal conditions associated with p or q would nominally need to be remedied) and [pq] indicates that the output value will change if and only if both of the input values P and Q change (this means that to change this particular output, both of the causal conditions associated with p or q would nominally need to be remedied). Regardless of that semantic difference though, <pq> and [pq] share in common that both indicate that the values of both P and Q are direct causal reasons for the output value, versus just "p", which indicates that only the value of P had an effect on the output value, or just "q", which indicates that only the value of Q had an effect on the output value. In some embodiments an indication of whether the causal nature is <pq> or [pq] can also be propagated to provide further information on the minimal set(s) of causes that need to be remedied to change the negative outcome on a future attempt.

Note that the number of causal IDs within brackets is not limited to 1 or 2. There can be as many causal IDs in a single set of brackets as there were input terms to the operation. For example, if an operation accepted four different inputs, A, B, C, and D, then the causal IDs in the output terms could include many different combinations, including <abcd>, <ac>, [abcd], [cd], etc.

In some embodiments, when encountering <pq>, [pq], or other outcomes that specify propagating multiple causal ID terms, the software will pick only one of p or q to return as the causal ID term to associate with the output value. This may occur particularly often when the causal ID term is implemented as a single causal ID value, and not as a container of causal ID values or other causal ID terms. This can be done for performance reasons. The alternate action of returning both p and q (and therefore associating a list of multiple causal IDs with a single causal value), performed by some embodiments, can potentially introduce performance issues, particularly for real-time applications, since arbitrarily and variably long lists, and arbitrarily and variably deep lists of items can require dynamic storage to be utilized. In some embodiments, propagating one causal ID value per single causal data value is sufficient, for two reasons. First, more often than not, there is usually only one causal condition contributing to any given failure mode actually experienced. Second, if there is more than one causal event for a negative outcome, it can be sufficient to display just one of the events to the user. The user can remedy that one source of failure, try the action again, and if a negative outcome continues to occur due to another causal event that is still occurring, then that other causal event will now be displayed (because the earlier causal event has been remedied and is therefore no longer contributing to the negative outcome), and the user can then remedy that next condition, try the action again, and so on, until all conditions causing the negative outcome are rectified.

In embodiments that choose to return only a subset of the multiple causal ID terms that may be specified for an operation's output, such as returning only one of the causal ID terms p or q when the causal table specifies returning [pq], a set of rules for determining which of subset of causal ID terms to select from the specified output causal ID terms help ensure that the most useful causal information makes it to the user can be: If the output specified by the causal table includes both nil and non-nil causal ID terms, then give preference to returning non-nil causal ID terms over nil causal ID terms; if two or more of the causal ID terms are non-nil, always give preference to the "left-most" or "right-most" input of the operation. In these cases, a non-nil causal ID term is returned, which will at least one relevant source event to be displayed to the user. Selecting the same one of the left-most or right-most input to the operation also allows software developers some control in choosing at a lower level which causal event may get displayed, based on how they arrange the expressions in terms of the order of inputs, via e.g., which expressions are on the left or right side of an operator.

In some embodiments, software can propagate multiple causal ID values per causal ID term, via implementing the causal ID term as a list of causal IDs, and possibly a nested tree structure of causal ID terms, instead of associating a single causal ID value with the overall causal ID term. Should, for example, a pq-type causal ID list that was output from a previous operation serve as the input causal ID term to another, new operation, then the causal ID list in that causal ID term is treated as a single unit, e.g. NewInput: p=OldOutput:pq. If selected for output in the new operation, then this can have a nesting effect, resulting in all contributing causal events being appropriately captured. This has the advantage of being able to simultaneously display at the UI all causal events that led to the negative outcome, instead of just one event at a time. Displaying one root cause event at a time when multiple events were the cause requires the user to repeat the sequence multiple times of viewing a single root cause event for the negative outcome, remedying that single event, re-attempting the main action, experiencing the negative outcome again, viewing the next root cause event, remedying that next root cause event, re-attempting the main action again, and so on, until all root cause events are remedied. In comparison, displaying all root cause events at the same time allows the user to attempt to remedy all root cause events at once before re-attempting the main action, which could save time.

If implementing causal ID terms as nested trees of causal ID terms, then software can also propagate the semantic difference between a <p . . . q> result (i.e. "all these events were required to have occurred") versus a [p . . . q] result (i.e., "any of these events were required to have occurred") as part of each nested causal ID term (tree node), to provide more information to the user about the nature of the causal conditions involved in the negative outcome. This is useful to the user such that they may be made aware as part of the UI display whether they will need to remedy all causal events or just a subset of them. Per the secondary Boolean equivalencies described above of [p . . . q] with OutputWillChange=Change(P) AND . . . AND Change(Q), and <p ... q> with OutputWillChange=Change(P) OR ... OR Change(Q), the software can utilize these "bracket" semantics included in each causal ID term to calculate the minimum number of events that need to be remedied for the outcome to change. In the description of this technique here, the term "node" will refer to a causal ID term in the causal ID term tree.

To calculate the minimum number of events that need to be remedied in order to rectify a negative outcome for the user, the system performs a recursive, descending analysis on the causal ID term's internal sub-term tree from the root node (root causal ID term), and tracks, counts, and builds subsets of the child nodes and events (i.e. causal IDs in the node) under each current node that must be remedied for the current node to be rectified, taking into account whether all child nodes at a given node need to be remedied for the parent term to be considered remedied (for [ ] nodes), or whether any one or more sub-terms in that node need to be remedied for the parent term to be considered remedied (for < > nodes). It does this recursively, until all nodes in the tree are accounted for, and all root terms and sub-terms have lists of all the possible ways that they can be remedied by remedying different subsets of the causal IDs contained within them and their subtrees.

For example, if the causal ID term for a negative outcome is "<abc[de<af>]>", then the invention, without this additional aspect, would report the following causal events all as root causes of the negative outcome (assuming no parent-child relationships between the events, which would remove child events from displayed list): a, b, c, d, e, and f. With this additional aspect though, the invention can then also report that the user only needs to remedy the conditions in one of the following subsets of that total root cause event list in order to rectify the overall negative outcome: a, b, c, dea, or def. Each of these subsets can be considered a "solution subset." That is, remedying only the event conditions in a single subset is sufficient to alter the user's negative outcome. For example, remedying event a, and event a alone, is sufficient to rectify the negative outcome, or the same goes for remedying only event b, or c: remedying any of a, b, or c alone will alter the negative outcome. The same also goes for the collected event conditions in all of events dea, or all of def, where remedying all of the events in either subset, and that subset alone, is sufficient to alter the negative outcome. Further analysis can also allow removal of the subset dea from the list of displayed solutions, since by the absorption principle of the causal ID Boolean equivalencies shown below, the presence of event a on its own is enough to obviate dea as a useful solution.

At this point, the number of events in each solution subset can be counted, and the subset with the least number of events (or the subsets tied for the least number of events) can be displayed as the "likely easiest" solution to the negative outcome. A variation involves displaying all solution subsets to the user, in sorted order from least number of events to most number of events, in order to present different possible remedy scenarios from least events to remedy to most events to remedy.

A further enhancement to this is if the real-world effort needed to remedy each single type of causal event condition is already known or able to be estimated, e.g. through external, application-specific analysis (e.g., as may typically be captured in a troubleshooting guide or service manual for resolving root cause event conditions), then these effort values can be factored into the analysis results as mathematical weights on each event type. Then, the system can add up the weights of each event in a solution subset, instead of adding up the number of events, which results in calculating an actual or estimated real-world effort required for each possible solution, which can then be used for ordering recommended solutions for the negative outcome from least real-world effort to most real-world effort.

For example, if it was predetermined that the individual event types above required the following amount of time to fix: a=60 minutes, b=45 minutes, c=120 minutes, d=10 minutes, e=10 minutes, f=5 minutes, then the software can calculate the actual effort involved in remedying each solution subset: a=60 minutes, b=45 minutes, c=120 minutes, dea=80 minutes, def=25 minutes. In this case, even though there are subsets with less events to remedy total (that is, subsets a, b, and c each have 1 event), it is discovered that the solution subset that will likely require the least amount of real-world effort is def, which requires 25 minutes. Solution subsets a, b, and c will each require 60, 45, and 120 minutes of effort respectively. Therefore, the software can recommend to the user to try remedying def first in order to fix the negative outcome, since that will likely require the least amount of effort of all possible solutions.

The following exemplary operations describes some specific common types of operations in detail, and gives the causal interpretation and intuitive understanding for each set of causal ID rules.

Boolean Operations: These are operations that act on Boolean values of "true" and "false." In particular the operations described here operate only on input values of a single bit. By way of background, here is the standard truth table for the core Boolean operations of logical-NOT (negation), logical-AND (conjunction), and logical-OR (disjunction). The same basic conventions are used as for the tables above. The table shows all possible combinations of inputs for the unary NOT operation, and the binary AND and OR operations.

TABLE 5

| Operation Name | Input Values | | Core Boolean Operations/Output Values | | |
| --- | --- | --- | --- | --- | --- |
| | Identity | | NOT | AND | OR |
| Expression | P | Q | ¬ {P, p} | P ∧ Q | P ∨ Q |
| Values | false | false | true | false | false |
| | false | true | | false | true |
| | true | false | false | false | true |
| | true | true | | true | true |

Here is the same table again, this time updated for causal propagation per the rules above. Again, the same basic conventions are used as for the generic causal tables above. All input and output values in the table are now considered to be causal Boolean values. A causal Boolean value is an aggregate of a standard Boolean value ("true" or "false") plus some causal ID term value that represents why the standard Boolean value has its specific current value. The following describes each operation in the table in detail, and gives the rationale for each causal ID term output. They each include the relevant excerpt from the causal table below.

TABLE 6

| | Causal Input Values | | Core Boolean Operations/Causal Output Values | | |
|---|---|---|---|---|---|
| Operation Fame | Identity | | NOT | AND | OR |
| Expression | {P, p} | {Q, q} | ¬ (P, p) | {P, p} ∧ {Q, q} | {P, p} ∨ {Q, q} |
| Values | {false, p} | {false, q} | {true, p} | {false, [pq]} | {false, <pq>} |
| | {false, p} | {true, q} | | {false, p} | {true, q} |
| | {true, p} | {false, q} | {false, p} | {false, q} | {true, p} |
| | {true, p} | {true, q} | | {true, <pq>} | {true, [pg]} |

Boolean "NOT" operation: Boolean NOT is a unary operation (single input term), with only two possible input values: "true" and "false. The following table describes the causal ID term that should be returned from a Boolean NOT operation, with the intermediate steps from the method above.

TABLE 7

| Causal Input Values Identity {P, p} | Causal Output Values NOT ¬ {P, p} | Does the output value change when the value(s) of these input term(s) change? [P] | Unculled Causal ID(s) | Culled Causal ID(s) to propagate | Culled Causal ID(s) to propagate, simplified notation |
|---|---|---|---|---|---|
| {false, p} | {true, p} | Y | <[p]> | <[p]> | p |
| (true, p} | {false, p} | Y | <[p]> | <[p]> | p |

In all cases, changing the value of the input term P will change the output value, so for all cases, the input causal ID term "p" is always simply propagated to the output.

Boolean "AND" operation: The following table describes the causal ID term(s) that should be returned from a binary (two input term) Boolean AND operation, with the intermediate steps from the method above.

TABLE 8

| Causal Input Values Identity | | Causal Output Values AND | Does the output value change when the value(s) of these input term(s) change? | | | Unculled Causal ID(s) | Culled Causal ID(s) to propagate | Culled Causal ID(s) to propagate, simpliffed notation |
|---|---|---|---|---|---|---|---|---|
| {P, p} | {Q, q} | {P, p} ∧ {Q, q} | [P] | [Q] | [PQ] | | | |
| {false, p} | {false, q} | {false, [pq]} | N | N | Y | <[pq]> | <[pq]> | [pq] |
| {false, p} | {true, q} | {false, p} | Y | N | N | <[p]> | <[p]> | p |
| {true, p} | {false, q} | {false, q} | N | Y | N | <[q]> | <[q]> | q |
| {true, p} | {true, q} | {true, <pq>) | Y | Y | Y | <[p] [q] [pq]> | <[p] [q]> | <pq> |

In the first row of values, where inputs P and Q both equal false, the output is set to false, per normal AND operation. Here, for the output to be false, either P or Q must be false, and in this case, both are false. That is, the output will switch to true if and only if both of the inputs switch to true. The input causal ID term "[pq]" is propagated to the output to represent that the output value was dependent on the specific value of both inputs, and that if and only if both of those input values were different, the output value would be different as well.

In the second row of values, where input P equals false, and input Q equals true, the output is set to false, per normal AND operation. Here, if Q were set to false, then there would be no change to the output. If P were set to true, then the output would change to true. The input causal ID term "p" is propagated to the output to represent that the output value was dependent solely on the value of P. This also reflects that the value of Q did not factor into the output value.

In the third row of values, where input P equals true, and input Q equals the false, the output is set to false, per normal AND operation. Here, if P were set to false, then there would be no change to the output. If Q were set to true, then the output would change to true. The input causal ID term "q" is propagated to the output to represent that the output value was dependent solely on the value of Q. This also reflects that the value of P did not factor into the output value.

In the fourth row of values, where inputs P and Q both equal true, the output is set to true, per normal AND operation. Here, for the output to be true, it is required that both inputs also be true. That is, if either of the inputs were to switch values to false, then the output value would also change to false. The input causal ID term "<pq>" is propagated to the output to represent that the output value was dependent on the specific value of both inputs, and that if either of those input values was different, then the output value would also be different.

Boolean "OR" operation: The following table describes the causal ID term(s) that should be returned from a Boolean OR operation, with the intermediate steps from the method above.

TABLE 9

| Causal Input Values Identity | Causal Output Values OR | {P, p} ∧ {Q, q} | Does the output value change when the value(s) of these input term(s) change? | | | Unculled Causal ID(s) | Culled Causal ID(s) to propagate | Culled Causal ID(s) to propagate, simplified notation |
|---|---|---|---|---|---|---|---|---|
| {P, p} | {Q, q} | {P, p} ∧ {Q, q} | [P] | [Q] | [PQ] | | | |
| {false, p} | {false, q} | {false, <pq>} | Y | Y | Y | <[p] [q] [pq]> | <[p] [q]> | <pq> |
| {false, p} | {true, q} | {true, q} | N | Y | N | <[q]> | <[q]> | p |
| {true, p} | {false, q} | {true, p} | Y | N | N | <[p]> | <[p]> | q |
| {true, p} | {true, g} | {true, [pg]} | N | N | Y | <[pq]> | <[pq]> | [pq] |

In the first row of values, where inputs P and Q both equal false, the output is set to false, per normal OR operation. Here, for the output to be false, it is required that both inputs also be false. That is, if either of the inputs were to switch values to true, then the output value would also change to true. The input causal ID term "<pq>" is propagated to the output to represent that the output value was dependent on the specific value of both inputs, and that if either of those input values was different, then the output value would also be different.

In the second row of values, where input P equals false, and input Q equals true, the output is set to true, per normal OR operation. Here, if P were set to true, then there would be no change to the output. If Q were set to false, then the output would also change to false. The input causal ID term "q" is propagated to the output to represent that the output value was dependent solely on the value of Q. This also reflects that the value of P did not factor into the output value.

In the third row of values, where input P equals true, and input Q equals false, the output is set to true, per normal OR operation. Here, if Q were set to true, then there would be no change to the output. If P were set to false, then the output would also change to false. The input causal ID term "p" is propagated to the output to represent that the output value was dependent solely on the value of P. This also reflects that the value of Q did not factor into the output value.

In the fourth row of values, where inputs P and Q both equal true, the output is also set to true, per normal OR operation. Here, for the output to be true, either P or Q must be true, and in this case, both are true. That is, the output will switch to false if and only if both of the inputs switch to false. The input causal ID term "[pq]" is propagated to the output to represent that the output value was dependent on the specific value of both inputs, and that if and only if both of those input values were different, the output value would be different as well.

Composite Boolean Expressions and Causal Equivalency: Causal ID terms can be easily and correctly propagated across Boolean expressions of arbitrary composition and complexity by using temporary values to store the intermediate results of the sub-operations in an expression, in some embodiments. This is demonstrated by showing that causal ID term propagation is consistent across all of the basic rules required for Boolean algebra: idempotence, commutativity, associativity, absorption, distributivity, universal bounds, and complementation. The following tables show the calculation of all of these equivalencies: they show that the causal ID terms output for different but equivalent forms of each Boolean expression type are themselves equivalent, where appropriate. (Note that these Boolean equivalencies are now being applied at the main operation level, not at the causal ID term level described above.)

Idempotence of causal AND and OR is shown in FIGS. 14A and 14B, respectively. The marked columns within each table should be equal to each other in order to demonstrate causal propagation equivalency during idempotent operations, which they are.

Commutativity of causal AND and OR is shown in FIGS. 14C and 14D, respectively. The marked columns within each table should be equal to each other in order to demonstrate causal propagation equivalency.

Associativity of causal AND and OR. is shown in FIGS. 14E and 14F, respectively. The marked columns within each table should be equal to each other in order to demonstrate causal propagation equivalency.

Absorption of causal AND and OR, and of OR and AND is shown in FIG. 14G. The marked columns within each table should be equal to each other in order to demonstrate causal propagation equivalency.

Distributivity of causal AND and OR, and of OR and AND is shown in FIGS. 14H and 14I, respectively. The marked columns within each table should be equal to each other in order to demonstrate causal propagation equivalency.

Universal Bounds of causal AND and OR is shown in FIG. 14J.

Complementation of causal AND and OR is shown in FIG. 14K

De Morgan's laws can be used as a further test to the above rules. De Morgan's Laws state the following equivalencies for the Boolean operations AND and OR:

$$P \land Q \equiv \neg((\neg P) \lor (\neg Q))$$

$$P \lor Q \equiv \neg((\neg P) \land (\neg Q))$$

The first equivalency states that the AND operation can be expressed as a composite expression of OR and NOT operations. Similarly, the second equivalency states that the OR operation can be expressed as a composite expression of AND and NOT operations. These equivalencies can be used to help test the consistency and practicality of the causal tables determined above for the core Boolean operations, and therefore help test the consistency and practicality of the causal rules overall. This is done by applying the causal tables generated to the compound expression on the right-hand side of each equivalency, by applying them to each sub-expression and building the results up to the final output values, and then verifying that the causal ID terms output by the right-hand side of the equivalency match the causal ID terms declared for the core operations on the left-hand side of the equivalency.

The table in FIG. 14L breaks down calculating AND via De Morgan's equivalency. The left AND column 128 shows the axiomatic (core) causal table presented here in the invention for AND, and the right AND column 130 shows the final causal values calculated using De Morgan's equivalency after applying the causal rules presented here in the invention for OR and NOT. The causal ID terms returned for each set of inputs, including the semantic types of the [pq] and <pq> combinations, match exactly.

The table in FIG. 14M breaks down calculating OR via De Morgan's equivalency. The left OR column 132 shows the axiomatic (core) causal table presented here in the invention for OR, and the right OR column 134 shows the final values calculated using De Morgan's equivalency after applying the causal rules presented here in the invention for AND and NOT. The causal ID terms returned for each set of inputs, including the semantic types of the [pq] and <pq> combinations, match exactly.

These causal propagation equivalencies during axiomatic Boolean equivalency operations indicate that the causal ID term rules are consistent with each other, and that the causal propagation works as intended in the illustrative embodiments. As seen in FIGS. 14A-B, in many embodiments, the causal output used with Boolean expressions is consistent with its De Morgan equivalency. The foregoing Boolean operations and their resulting causal output values for use with some embodiments are summarized in FIG. 14N.

Other Boolean Operations: Note that there are more Boolean operations beyond AND, OR, and NOT. There are 16 possible operations total when operating on two Boolean inputs. These include operations such as XOR, NAND, NOR, XNOR, and other less common ones. The causal tables for these operations can be derived directly using the method above. Some of these operations can also be expressed equivalently in terms of AND, OR, and NOT, and therefore their causal truth tables can also be derived by evaluating the equivalencies and applying the causal rules along the way, as was done for De Morgan's Laws above.

The causal output tables in FIGS. 15A-D is a full set of 16 Boolean operations with all causal behavior included, as derived from the rules above, or as derived from equivalencies to the core AND, OR, and NOT operations.

In FIGS. 15A-D, the operations Always False, Not on P, Not on Q, AND, Identity on P, Identity on Q, OR, AND, OR, and NOT implement the core causal rules. The two "Identity" operations (operation 130 and 132) are equivalent to simple assignment from, or expression of, a variable input, where the Boolean value does not change between input and output and they simply select the input causal ID term as the output causal ID term. The "Always True" ("tautology" operation 136) and "Always False" ("contradiction" operation 138) operations are essentially equivalent to simple assignment from, or expression of, a literal or other constant value (such as an explicit "true" or "false" in the source code). In this case, the output causal ID term is specified as "<ClauseId>", which indicates that the causal ID term should normally be manually acquired and set from the surrounding source code block or clause. These operations essentially represent the "entry points" of data and their causes into Boolean variables and other data sets and operations. Therefore, the causal ID term is set according to the rules stated above regarding when, where, and how to set causal ID terms when assigning causal values. If the literal is in a causal event condition output clause, then the causal ID term value may or may not (depending on the specifics of the application) be set to the causal ID of the event. If the literal is outside of a causal event condition output clause, then the causal ID term may or may not (again, depending) be set to the nil causal ID term.

The causal ID term rules for the other operations behave similarly. For example, the causal ID term rules for XOR 146, behave such that for all value outcomes, the causal ID returned is specified as <pq>. This indicates that for all XOR input cases, changing either input will cause the output to change.

As described above, the technique for building the causal table can apply to operations with an arbitrary number of inputs, i.e., to operations with more than 2 inputs. Here is an example of using the technique to build a causal table for some custom 3-input Boolean operation, shown in FIG. 15E.

Here, the CustomOperation( ) function accepts three input causal Boolean terms, {P, p}, {Q, q}, and {R, r}, and outputs a single causal Boolean true or false value for each possible combination of input values, according to the table. The output values were chosen here arbitrarily as an example.

Note that this custom operation also happens to be equivalent to the arbitrary compound expression $((\neg P') \wedge R') \vee ((P' \wedge Q') \vee (\neg'))$, which is made up of standard 2-input Boolean operations. Note that the mathematical "prime" mark ' (single apostrophe) is used as shorthand here to indicate a causal value. So, the CustomOperation( ) function could be practically implemented in at least two basic, different ways: as a lookup table, or as a compound expression of 2-input Boolean operations. If it is implemented as a lookup table, then the causal ID terms to return would be determined and encoded as above. If it is implemented as the compound expression, then the causal versions of the 2-input Boolean operations will automatically derive the correct causal outputs. The table above demonstrates that the raw technique for building causal tables is again fully consistent with implicitly deriving the table via equivalencies.

For Step 2 of building the causal table, there are 7 possible combinations of input terms to examine: P, Q, R, PQ, PR, QR, and PQR, and hence the 7 corresponding columns in the middle of the table.

Note the more complicated causal ID terms that are returned for some outputs.

In the first row, the output causal ID term "<r[pq]>" indicates that to rectify this particular outcome, the user can either rectify the event condition associated with causal ID r (i.e., change the input R) by itself, or rectify the event conditions associated with causal IDs p and q together (i.e., change the inputs P and Q together). Note that changing all of inputs R, P and Q together will not change the outcome. If that was a valid resolution, it would have been derived and reflected as "[pqr]".

Similarly, in rows 5, 6 and 7, the output causal ID terms are <q[pr]>, <p[qr]>, and <pqr>, respectively. Even though these three different rows (outputs) contain the same causal IDs, the semantics are different for each. In row 5, <q[pr]> indicates the user must change Q by itself, or change P and R together, in order to change the outcome. In row 6, <p[qr]> indicates the user must change P by itself, or change Q and R together, in order to change the outcome. In row 7, <pqr> indicates that the user can change any one of P, Q, or R, in order to change the outcome.

This also demonstrates the nesting of causal semantic reporting that can occur when nested or compound operations occur. That is, if the causal table for this custom operation is derived via the equivalency stated above of $((\neg P') \wedge R') \vee ((P' \wedge Q') \vee (\neg R'))$, (which can reasonably occur either directly or indirectly in source code), then these same "nested" causal outcomes will occur. FIG. 15F is the causal table derived via the equivalency, similar to the De Morgan's derivations above:

Note that in row 7, the causal output "<pqr>" in column 10 derives directly from the causal output "<<pq>r" of the subexpression in column 9. These two causal output representations are equivalent. This is because <<pq>r> means "to change the outcome, rectify any one of r or <pq>, where <pq> means rectify any one of p or q", and <pqr> means "rectify any one of p, q, or r". Both of these statements result in identical semantics, and therefore identical instructions to the user should they wish to rectify the overall outcome. In row 2, column 9, the reference to "[r[pq]]" for that subexpression has a similar effect in that it is equivalent to [pqr]: it means that to change the outcome of that subexpression, all of r, p, and q must be changed together. In that case however, that particular sub-outcome did not make it to the final output: it was masked and eliminated by some other causal effect in the overall expression.

Arithmetic and Bitwise Operations: This generally includes all arithmetic operations that operate on numeric types, which can affect the entire bit pattern in the output causal variable, such as addition, subtraction, multiplication, exponentiation, etc. Beyond the arithmetic operations, this also includes bitwise operations which do Boolean operations on collections of all bits in a variable, not just on a single bit as for the Boolean operations.

TABLE 10

| Operation Name | Causal Input Values | | Causal Output Values Arbitrary Arithmetic |
|---|---|---|---|
| | Identity | | |
| Expression | {P, p} | {Q, q} | {P, p} ⊚ {Q, q} |
| Values | {M, p} | {N, q} | {M ⊚ N, <pq>} |

The symbol "⊚" represents some generic arithmetic operation.

"M" and "N" represent all possible input values.

Table 10 represents a basic, "fallback" causal table for general arithmetic operations that assumes any change to either input will always change the output. Note that the number of possible inputs for arithmetic and bitwise operations is often too large to be practically enumerated in a causal table. If desired, more specific causal tables for these operations can often still be generated.

First, causal ID term propagations only need to be determined for output values that are known to cause a negative outcome. For arithmetic operations, often only a single value or small set of output values can cause a negative outcome, whereas the vast majority of output values do not represent a negative outcome. Only the causal table rows associated with those output values known to potentially cause a negative outcome need to have their propagated causal ID terms identified: the other, non-causal output values can be ignored.

Second, the output values of arithmetic operations that can cause negative values are often confined to values that have the property of being a "forcing element". A forcing element value is any input value for a particular operation that is known to force the output value to a single, specific value, regardless of the value(s) of the other input(s). Let any input value that satisfies the property of forcing the output value to a single, specific value, regardless of the values of the other inputs, be known as a "forcing element" (or "forcing input value"). Examples of forcing elements for different operations are:

"0" (zero) for multiplication: Multiplying any value by 0 always results in an output of 0. That is, any input of 0 always forces the output to be 0, regardless of the value of the other input.

$$(M)*(0)=0$$

$$(0)*(M)=0$$

where M equals any number.

"0" for the base input of exponentiation, and "0" for the exponent input of exponentiation: Raising 0 to any exponent value results in an output of 0, and raising any base value, except 0, to an exponent value of 0 results in an output of 1. Note that the exponentiation operation has two elements that will force output values, and that the forced output values differ from each other. If all of the candidate forcing elements have a predictable precedence relative to each other (which they do here, since a base input of 0 takes precedence over an exponent input of 0), then they are considered forcing elements. Their precedence can be factored into determining causation and appropriate causal ID term selection.

$$(0)\char`\^(M)=0$$

$$(N)*(0)=1$$

where M equals any number, and N equals any number except 0.

Values that satisfy the mathematical concept of an "absorbing element" for an operation are considered forcing elements. An absorbing element is an input value which forces the output value to be the same value as the absorbing element. All of the examples above are considered absorbing elements, except for the case of 0 for the exponent input of exponentiation, because it forces the output to be 1, and not 0.

IEEE 754 standard special values, such as "sNaN" ("signaling not a number"), "qNaN" ("quiet not a number"), "+INF" (positive infinity), and "−INF" ("negative infinity") values. These values act as forcing elements. For example, adding any number via floating-point addition to a qNaN value will result in an output qNaN value.

The causal table only needs to propagate causal ID terms for output values that cause negative outcomes, such that if any of these forcing elements cause a negative outcome for an operation, then the causal table can often be greatly simplified. An example would be IEEE 754 floating point multiplication. In addition to the NaN and INF forcing elements described above, the value 0 is also a forcing element. If the software in question never used the INF or 0 values in multiplication to represent a negative outcome separate from the NaN values, and only ever used the NaN values to represent negative outcomes, then separate listing of the INF and 0 values could be excluded from the causal table, and those excluded values could be implicitly included in the non-forcing element value rows:

| Operation Name | Causal Input Values Identity | | Causal Output Values Partial IEEE 754 Multiplication |
|---|---|---|---|
| Expression | {P, p} | {Q, q} | {P, p} * {Q, q} |
| Values | {NaN, p} | {NaN, q} | {NaN, [pq]} |
|  | {NaN, p} | {N, q} | {NaN, p} |
|  | {M, p} | {NaN, q} | {NaN, q} |
|  | {M, p} | {N, q} | {M * N, <pq>} |

In this table, M and N are any input values except NaN. (This ignores the difference between qNaN and sNaN for description simplicity's sake), Similarly, if an operation contains forcing elements, but none of the forcing elements are ever used to produce a negative outcome separate from the non-forcing elements, then the operation can be treated as having no forcing elements.

In some embodiments, avoiding implementation of unnecessary forcing element processing improves reliability, maintainability, and computational performance. In some embodiments, software that has had causal event reporting added to it does not need to implement any of the tables in this section. The arithmetic and bitwise operations here can be generally divided into the following categories, which generally share common causal tables within each category.

Arithmetic operations with no forcing elements: Examples are common implementations of integer addition and subtraction, and the bitwise operations. It also includes operations which may have forcing elements, but don't distinguish outcomes between forcing elements and non-forcing elements. The causal table (Table 11) for these operations is usually very simple: it propagates the causal ID term(s) from the input(s) to the output(s) with <pq> semantics.

TABLE 11

| Operation Name | Causal Input Values Identity | | Causal Output Values Arbitrary Arithmetic |
|---|---|---|---|
| Expression | {P, p} | {Q, q} | {P, p} ⊙ {Q, q} |
| Values | {M, p} | {N, q} | {M ⊙ N, <pq>} |

The symbol "⊙" represents some generic arithmetic operation.

"M" and "N" represent all possible input values.

Arithmetic operations with forcing elements: Examples include floating point operations implemented per the IEEE 754 standard and include the following operations which have forcing elements regardless of whether they are implemented as IEEE 754 floating point operations: multiplication, division, exponentiation, etc., explained in more detail as follows.

Multiplication: Table 12 shows causal relationships for integer multiplication where the only forcing element is zero and for IEEE 754 floating point multiplication, with forcing elements 0 and NaN (ignoring the difference between qNaN and sNaN for simplicity's sake), and ignoring the +INF and −INF forcing elements). This table would be used when NaN or 0 are known to possibly caused negative outcomes. The need to use this particular causal variant of the multiplication table in any given software system is likely very rare, however it is included here to show that it is possible.

TABLE 12

| Operation Name | Causal Input Values Identity | | Causal Output Values Partial IEEE 754 Multiplication |
|---|---|---|---|
| Expression | {P, p} | {Q, q} | {P, p} * {Q, q} |
| Values | {NaN, p} | {NaN, q} | {NaN, [pq]} |
|  | {NaN, p} | {0, q} | {NaN, p} |
|  | {NaN, p} | {N, q} | {NaN, p} |
|  | {0, p} | {NaN, q} | {NaN, q} |
|  | {0, p} | {0, q} | {0, [pq]} |
|  | {0, p} | {N, q} | {0, p} |
|  | {M, p} | {NaN, q} | {NaN, q} |
|  | {M, p} | {0, q} | {0, q} |
|  | {M, p} | {N, q} | {M * N, <pq>} |

"M" and "N" represent the sets of all other possible input values not explicitly listed on another row.

Arbitrary IEEE 754 floating point operations: table 13 is a generic base causal table for arbitrary IEEE 754 floating point operations, with forcing elements qNaN, sNaN, and INF (ignoring the difference between +INF and −INF for simplicity). This table would be used for a system where the output values sNaN, qNaN, and Inf could cause a negative outcome.

TABLE 13

| Operation Name | Input Values Identity | | Output Values IEEE 754 Arbitrary Operation |
|---|---|---|---|
| Expression | {P, p} | {Q, q} | {P, p} ⊙ {Q, q} |
| Values | sNaN | sNaN | {sNaN, [pq]} |
|  | sNaN | qNaN | {sNaN, p} |
|  | sNaN | Inf | {sNaN, p} |
|  | sNaN | N | {sNaN, p} |
|  | qNaN | sNaN | {sNaN, q} |
|  | qNaN | qNaN | {qNaN, [pq]} |
|  | qNaN | Inf | {qNan, p} |
|  | qNaN | N | {qNan, p} |
|  | Inf | sNaN | {sNaN, q} |
|  | Inf | qNaN | {qNaN, q} |
|  | Inf | Inf | {Inf, [pq]} |
|  | Inf | N | {Inf, p} |
|  | M | sNaN | {sNaN, q} |
|  | M | qNaN | {qNaN, q} |
|  | M | Inf | {Inf, q} |
|  | M | N | {M ⊙ N, } |

IEEE 754 floating point addition: Table 14 is a causal table for IEEE 754 floating point addition, with forcing element NaN (ignoring the difference between sNaN and qNaN for simplicity), and ignoring other forcing elements in the standard. Contrast this with the causal table for integer addition which has no forcing elements and is therefore simple, sending p or q each time. This table would be used for a system where the output value NaN could cause a negative outcome.

TABLE 14

| Operation Name | Causal Input Values Identity | | Causal Output Values Partial IEEE 754 Addition |
|---|---|---|---|
| Expression | {P, p} | {Q, q} | {P, p} + {Q, q} |
| Values | {NaN, p} | {NaN, q} | {NaN, [pq]} |
|  | {NaN, p} | {N, q} | {NaN, p} |
|  | {M, p} | {NaN, q} | {NaN, q} |
|  | {M, p} | {N, q} | {M + N, <pq>} |

Division: integer division is explained with respect to Table 15, which is a causal table for integer division, where 0 in the numerator and 0 in the denominator are both forcing elements, but with different effects. IEEE 754 floating point division is explained via the Table 16, which is a causal table for division, expanded to include NaN inputs per the IEEE 754 standard (ignoring the difference between sNaN and qNaN). Table 15 would be used for a system where the undefined behavior ("undef/inf/err") or 0 could cause a negative outcome.

TABLE 15

| Operation Name | Input Values Identity | | Output Values Division |
|---|---|---|---|
| Expression | {P, p} | {Q, q} | {P, p} ÷ {Q, q} |
| Values | 0 | 0 | {undef/inf/err, q} |
|  | 0 | N | {0, p} |
|  | M | 0 | {undef/inf/err, q} |
|  | M | N | {M ÷ N, <pq>} |

TABLE 16

| Operation Name | Causal Input Values Identity | | Causal Output Values Partial IEEE 754 Division |
|---|---|---|---|
| Expression | {P, p} | {Q, q} | {P, p} ÷ {Q, q} |
| Values | {NaN, p} | {NaN, q} | {NaN, [pq]} |
|  | {NaN, p} | {0, q} | {NaN, p} |
|  | {NaN, p} | {N, q} | {NaN, p} |
|  | {0, p} | {NaN, q} | {NaN, q} |
|  | {0, p} | {0, q} | {NaN, q} |
|  | {0, p} | {N, q} | {0, p} |
|  | {M, p} | {NaN, q} | {NaN, q} |
|  | {M, p} | {0, q} | {NaN, q} |
|  | {M, p} | {N, q} | {M * N, <pq>} |

Exponentiation: Table 17 is a causal table for exponentiation, expanded to handle NaN values (ignoring the difference between qNaN and sNaN). This would be used for a software system where the output values NaN and 0 could cause a negative outcome.

TABLE 17

| Operation Name | Causal Input Values Identity | | Causal Output Values Partial IEEE 754 Exponentiation |
|---|---|---|---|
| Expression | {P, p} | {Q, q} | {P, p} ∧ {Q, q} |
| Values | {NaN, p} | {NaN, q} | {NaN, [pq]} |
|  | {NaN, p} | {0, q} | {NaN, p} |
|  | {NaN, p} | {N, q} | {NaN, p} |
|  | {0, p} | {NaN, q} | {NaN, q} |
|  | {0, p} | {0, q} | {0, p} |
|  | {0, p} | {N, q} | {0, p} |
|  | {M, p} | {NaN, q} | {NaN, q} |
|  | {M, p} | {0, q} | {1, p} |
|  | {M, p} | {N, q} | {M ∧ N, <pq>} |

Note that the designs of most software systems do not require implementing causal versions of the arithmetic operators to achieve good causal reporting to the user. Therefore, use of any arithmetic causal tables should be generally rare, and therefore of no impact to most software systems. If a causal arithmetic operation is required, the specific table used for any given operation will depend on which output values or classes of output values can lead to negative outcomes in the software system in question.

Comparison operations: This includes the following operations: equality, inequality, greater-than, greater-than-or-equal-to, less-than, less-than-or-equal-to, etc. Note first that comparison operations should only compare the underlying values. The causal ID terms associated with the underlying values should not be compared. Note also that often the output type can be different than the input types. For example, most equality operations in software output a Boolean type, regardless of the input type(s). Generally speaking, changing any input in a comparison operation will cause the output to change. Therefore, the causal table for any comparison is typically a straightforward propagation of the causal ID term(s) from input value(s) to the output value, with <pq> semantics. This satisfies the causal behavior needed for most comparison operations, regardless of the type of the underlying input values.

TABLE 18

| Operation Name | Causal Input Values Identity | | Causal Output Values Arbitrary Comparison Operation |
|---|---|---|---|
| Expression | {P, p} | {Q, q} | {P, p} ⊚ {Q, q} |
| Values | {M, p} | {N, q} | {M ⊚ N, <pq>} |

When implementing embodiments, the first step is generally to determine the causal tables, such as those above. After the causal table has been built, the operation should be modified to output the specified input causal ID terms for the specified input values. Most embodiments do not need to modify every possible operation in the system, nor need to modify the operations extensively to cover every input value combination. In general, only those output values in an operation that can cause a negative outcome need to have causal IDs propagated for them. Some embodiments only modify the common Boolean operations, and the comparison operations. In software languages and development environments that support it, use of generics and operator overloading can greatly simplify these implementations.

Following is an example implementation for Boolean AND. Here, the C++ class Causal is a template class that wraps an arbitrary data type specified by the developer and attaches a causal ID term to it. In this case, the causal ID term is implemented as a single causal ID value that can either be the nil causal ID value, or some non-nil causal ID value. It also contains operator overloads to do causal reporting and automatic downcasting to the underlying type value. It also contains a function GetFirstCause( ) that returns whichever of the two specified input's causal ID parameters is a non-nil ID, giving preference to the first parameter if both are non-nil, or returning the nil ID if both are nil. This supports picking a single causal ID for the output in the <pq> and [pq] situations, according to some embodiments. This exemplary code can easily be modified for use with embodiments that return both p and q, when appropriate.

```
// Logical AND operator, where both operands are causal types.
template< typename t_ItemType1, typename t_ItemType2 >
  decltype(auto)
  operator&& (
    const Causal<t_ItemType1> & a_rCausalOperand1,
    const Causal<t_ItemType2> & a_rCausalOperand2)
{
  // ? && ?
  if (t_ItemType1(a_rCausalOperand1))
```

```
{
    // true && ?
    if (t_ItemType2(a_rCausalOperand2))
    {
        // true && true
        return Causal(
            t_ItemType1(a_rCausalOperand1) &&
            t_ItemType2(a_rCausalOperand2),
            GetFirstCause(a_rCausalOperand1, a_rCausalOperand2));
    }
    else
    {
        // true && false
        return Causal(
            t_ItemType1(a_rCausalOperand1) &&
            t_ItemType2(a_rCausalOperand2),
            a_rCausalOperand2.GetCausalId( ));
    }
}
else
{
    // false && ?
    if (t_ItemType2(a_rCausalOperand2))
    {
        // false && true
        return Causal(
            t_ItemType1(a_rCausalOperand1) &&
            t_ItemType2(a_rCausalOperand2),
            a_rCausalOperand1.GetCausalId( ));
    }
    else
    {
        // false && false
        return Causal(
            t_ItemType1(a_rCausalOperand1) &&
            t_ItemType2(a_rCausalOperand2),
            GetFirstCause(a_rCausalOperand1, a_rCausalOperand2));
    }
}
}
```

Here is an exemplary code for implementing causal multiplication, where any value may cause a negative outcome.

```
// Multiplication operator, where both operands are
//causal types.
template< typename t_ItemType1, typename t_ItemType2 >
    decltype(auto)
    operator* (
        const Causal<t_ItemType1> & a_rCausalOperand1,
        const Causal<t_ItemType2> & a_rCausalOperand2)
{
    return Causal(
        t_ItemType1(a_rCausalOperand1) *
        t_ItemType2(a_rCausalOperand2),
        GetFirstCause(a_rCausalOperand1, a_rCausalOperand2));
}
```

Other causal functions discussed throughout can be implemented using a similar approach. Note that since this causal multiplication operator implementation does not track the effects of any specific output values (such as 0 (zero) or NaN), both its implementation and the equality operator implementation are identical in terms of causal ID propagation. The only difference in the two functions is application of the * operator versus the=operator for the underlying value of the output.

User Interface Causal Display: If the UI determines that a negative outcome should be displayed, based on an action requested on it, or data passed to it, and if there is a non-nil causal ID term associated with that execution pathway or data pathway that is causing the negative outcome to be displayed, then the UI looks up the causal event(s) associated with that causal ID term in the causal event database, and then considers those events as the current candidate events to display as the cause for the negative outcome. If a candidate event has a non-nil parent causal ID term associated with it, then the parent event(s) are looked up from that parent causal ID term, and the parent event(s) replace their child event as new candidate events. This process of finding the parent events for the current candidate repeats until all candidate events found have a nil parent causal ID term.

When all candidate events are found to have a nil parent causal ID term, then those events are displayed in the UI as the reason(s) for the negative outcome. Ideally, the event display should be closely associated with the negative outcome display, such that the user has to do no or minimal searching to find out the reason for the negative outcome. If the causal ID term associated with the execution or data pathway that caused the UI to display the negative outcome is set to the nil causal ID term value, then this indicates "no cause known" for the negative outcome. In this case, the UI displays no additional causal event information for the negative outcome. Or, it displays an indicator equivalent to "no cause known", etc. This behavior, along with the rules for when to set or not set a nil causal ID term, ensure that the user is not displayed incorrect root cause events for a negative outcome.

Note that based on multithreaded and other forms of parallel processing, the causal event for any causal ID may not be in the causal event database yet when a lookup on that causal ID occurs. If this is the case, then the event display functionality should ideally wait until the event arrives in the database and the lookup succeeds (by either retrying the lookup periodically or utilizing some wait functionality available in the database implementation), and/or, on failure to find the causal event associated with the causal ID, declare a timeout at some point, or a logic problem, or similar. This is because any non-nil causal ID should by definition of the solution here always refer to an event in the database, or to an event soon to be in the database. Any causal ID for which the causal event cannot be found after some reasonable period of time would indicate a logic, communications, or other similar problem outside of the causal event reporting system.

Terminology

Negative outcome: Any failure status displayed by the UI to the user. Typically, the failures displayed fall into two general categories: failures by the software system to successfully execute a user request (when success is expected by the user), and non-availabilities of one or more parts of the software system to process any new future requests (when availability is expected by the user). A general property of a negative outcome is that it is always caused by one or more causal event conditions somewhere in the overall software system, and therefore is conceptually traceable back to those one or more event conditions. Some negative outcomes as defined here may not actually be considered severe, or may even normally be considered a "positive path" from the user's perspective, such as the system temporarily not being available at startup due to system initialization procedures running for an extended time, but since they represent a non-availability of the system or can cause requests to be rejected or fail, and are therefore potentially frustrating to the user (even if temporarily), they are included here in the definition of negative outcomes. That is, it is really the root causes in these cases which are considered positive path and/or not severe—e.g. the system starting up due to a user action—and the outcomes which are considered negative and therefore still frustrating for the user—e.g. (temporarily) unable to process any new future requests. These types of positive path negative outcomes also significantly benefit from the causal event reporting invention, since it can help reduce user frustration here as well by reporting the source of the unavailability.

Causal event condition (or event condition): A conditional branching point in the software, and an associated output clause that executes when the branching point's conditional is met, where the output clause can ultimately cause the UI to display a negative outcome to the user. Typically, causal event conditions correspond to conditions that detect errors, conditions that detect user actions, and other system detections or inputs that can cause negative outcomes for the user. The conditional branching point can be any of the usual conditional constructs available in software programming, e.g., an "if" statement, "if/else" statement, "switch" statement, the ternary operator "?:", various loop conditions, the machine instruction implementations of such, etc. These conditional constructs typically include a conditional expression which is evaluated to determine which output clauses, if any, are executed.

The output clause associated with the condition can be a single statement, or block of statements, including sub-calls to other functions or executive code of arbitrary depth. The output clause also includes the calls and outputs to other arbitrary parts of the software system. The term output clause is used here to generally encompass the downstream effects of the condition being met. Note that a single conditional statement in the code may contain multiple causal event conditions, because conditional statements in some software languages can contain more than one output clause. For example, the "if/else" statement, with its single explicit conditional expression, contains two output clauses. The "if" part contains an explicit conditional expression and clause, and the "else" part with its clause implies a second conditional expression which is equal to the negation of the explicit expression contained in the "if" part. As another example, the "switch" statement can contain an arbitrary number of output clauses: each "case" clause of a "switch" statement also specifies an additional condition. In these cases, the combination of any output clause with its explicit or implicit condition is considered a separate causal event condition, as long as execution of that clause can result in a negative outcome. Similarly, only some of the multiple clauses of a single conditional statement in the code may be causal event conditions. If a clause is not known to contribute to a negative outcome, then it does not form a causal event condition. Likewise, if none of the clauses associated with a conditional statement are known to cause negative outcomes, then that conditional statement and its clauses are not causal event conditions.

In some embodiments, it does not matter how "distant" the displayed negative outcome in the UI is from the causal condition and clause, nor whether the clause always causes the UI to display a negative outcome or not. If a condition and its associated output clause can even only sometimes contribute to generating a negative outcome for the user, then it is considered a causal event condition. What is required to be a causal event condition is that the condition and clause be part of a known negative outcome, such that executing the clause was necessary to cause the negative outcome. This is true even if the condition was necessary only in part (i.e., there could be other conditions and clauses that were also required to execute to cause the negative outcome—these would be other causal event conditions as well).

Explicit causal event condition: a causal event condition where the conditional statement and its direct output clause are expressed in code available for modification by the developer.

Implicit causal event condition: a causal event condition where the conditional statement and its direct output clause are expressed in code not available for modification by the developer, but where the condition's clause can cause code which is under the developer's control to display a negative outcome. This is typically any event condition in code that is not available for the developer to modify, but which can cause the developer's application to display negative outcomes. Typical examples are: user input events, such as mouse clicks, keyboard typing, and other user-initiated hardware inputs, where external code in a third-party operating system or other external environment contains the conditions that detect and feed these events to callback functions or other input systems in the first-party application code; network input events and data, where third-party software contains conditions that result in sending network or other data to the first-party code that then causes negative outcomes; application startup, where third-party operating system software contains the conditions used to detect the application process startup request, which consequently calls the "main( )" or similar function of the new application process as part of the condition's output clause, and where application startup and initialization can be a valid reason for the system to be temporarily unavailable, which is also considered a (temporary) negative outcome for our purposes.

In all of these cases, in some embodiments, the first local code where the external system calls into the first-party software (such as into a local, developer-defined function callback), as a result of the external condition, can be considered part of the implicit event condition's output clause. This is even though the conditional part actually exists in external, third party code. Therefore, the first local first-party code (clause) affected by the implicit causal condition should nominally behave as a causal event condition, which means it should post a causal event and initiate transmission of the causal ID with the local downstream effects as appropriate. This allows causal events to still be generated and tracked by the causal event database for external conditions.

Output clause: The actions taken by a conditional statement when its conditional expression is evaluated and met. In this definition, the output clause generally encompasses all of the downstream actions that result from the condition. This includes the "direct" output clause, which is defined here to be the "top-most" code of the clause, often expressed in code as a single statement or block of statements next to or near the conditional expression and at same level of source code, as well as the "indirect" output clause, which is the downstream code and actions called and triggered by the direct output clause. This can stretch across various software boundaries, such as function, object, process, or computer boundaries.

Note there may be more than one output clause associated with a condition, such as the separate "if" and "else" clauses of an "if/else" statement, and the multiple "case" clauses of a "switch" statement. In this case, uses of the phrase "output clause" usually refers to whichever clause was executed in the discussion context. When an output clause is known to potentially cause a negative outcome, then the clause and its condition are considered a causal event condition.

Causal event (or event): An instance of a causal event condition being met and its output clause executing. In some embodiments, all causal events should ideally create an entry in the causal event database to record the instance of the causal event. Creation of this entry in the database typically occurs in or is initiated directly by the output clause. Each causal event and its event entry in the database should have a unique causal ID identifying it. The new causal ID for a new causal event should be generated or acquired locally in the causal event condition's output clause, so that it can be immediately referred and passed to other actions in the clause. Each causal event and its event entry should also have a parent causal ID term property and/or field which can be used to specify whether other causal event(s) were known to cause the current causal event. If no other causal event(s) were known to cause the current event, then the parent causal ID term field should be set to the nil causal ID term.

Child causal event (child event): A causal event that was known to be caused, in whole or in part, by one or more other causal events. The other events that caused the child event are considered to be the parent causal events of the child event.

Parent causal event (parent event): A causal event that was known to cause another causal event to occur, in whole or in part. The other causal event that was caused by the parent event is considered to be a child causal event.

Causal ID: A data type or data value that uniquely identifies a causal event and its associated entry in the causal event database. Each causal event and causal event entry in the event database is generally identified by a unique causal ID value. Causal IDs in some embodiments are implemented as a standard 128-bit UUID. Unique causal IDs are therefore generated as randomized 128-bit UUIDs (i.e., unique or pseudo unique). In some embodiments, causal IDs are implemented as a monotonically increasing integer.

Except for the nil causal ID value, there is a 1-to-1 correspondence between a causal ID value and an event entry in the event database. A causal ID value represents exactly one causal event, and a causal event is represented by exactly one causal ID value. Note that "causal event" refers to a single instance of execution of a causal event condition. Every time a causal event condition executes, whether it has executed before or not, it generates a new causal event, with a new, unique causal ID to identify that new event instance. A non-nil causal ID value may exist and be passed along as an associated causal ID before its associated event is entered into the database. In this case, the associated event should always eventually make its way to the database. That is, a non-nil causal ID refers to an event entry that is either already in the event database or will at some point in the future be in the database. In practice, in generalized embodiments, there should never exist a causal ID value, besides the nil causal ID value, that does not refer to an event that occurred and which is already in the event database, or will eventually be in the event database. A causal ID can be thought of as a generic, universal pointer to a causal event.

Causal ID term: a set of causal IDs and/or other causal ID terms to be attached or bound to a causal pathway, where the values of causal IDs in the causal ID term describe the causal events that were known to cause the current state of that causal pathway. A causal ID term is generally implemented in one of two basic forms, depending on the needs and requirements of the software system. The first form is as a single causal ID value which can equal either the nil causal ID or a non-nil causal ID value. The second form is as a container of zero, one, two, or more elements, where each element of the container can be either a causal ID, or another causal ID term, which can then be a nested container. Nesting of container causal ID terms forms a tree, and may be of arbitrary depth. Each container causal ID term, including nested container causal ID terms, may also include semantic information regarding the causal properties of the elements it directly contains. In particular, information on "square bracket" or "angle bracket" semantics may be stored with the container, to allow for further analysis and conclusions regarding root causes to be automatically calculated and displayed to the user.

Nil causal ID: A single, unique causal ID value that is reserved to mean "no known causal event." In some embodiments, which implement causal IDs with UUIDs, the nil causal ID is represented by the nil UUID, which is the all-zero UUID value "00000000-0000-0000-0000-000000000000." In some embodiments, which implement causal IDs as a monotonically increasing integer, the nil causal ID is represented with the value zero "0." The nil causal ID value does not correspond to any causal event or associated entry in the causal event database. Its purpose is to provide a fill-in value to use when a causal ID is expected to describe the reason for a causal pathway's current state, but no specific causal event is currently known to have caused that pathway.

Nil causal ID term: a causal ID term value that represents "no known cause" for the current state of the causal pathway with the causal ID term is attached to, or "no known causal event." In cases where causal ID terms are implemented as a single causal ID value, the nil causal ID term is a causal ID term where the underlying causal ID is equal to the nil causal ID value. In cases where causal ID terms are implemented as a container which can contain zero, one, two, or more elements, the nil causal ID term is equal to the case where the container contains zero elements (the container is empty), where if the container contains one or more elements, or all elements equal the nil causal ID value. A nil causal ID term attached to a causal pathway indicates "no known cause" for the current state of that causal pathway.

Parent causal ID term: The causal ID term of any parent causal event(s).

Causal event database (or event database): A database that records causal events. That is, the database records whenever the output clause of a causal event condition executes. Each database entry represents a causal event. Event entries can be displayed by the UI as reasons for negative outcomes. Consequently, fields for the entry table should generally reflect the best information possible for the user to diagnose the failure mode. Common fields are: an application-specific code and/or string description of the basic condition that caused the failure mode; the date and time the event occurred; variable data parameters associated with that particular event, such as which hardware or software component(s) generated the error, information about the hardware or software commands that were being executed at the time, the values of any sensor readings involved, the user that was logged in at the time, etc.; and/or other useful data and context as known and available at the time of the event generation and/or event entry generation.

The entry table should also contain a field to record the causal ID of each event. This is a unique ID value generated for each event. It is used to uniquely identify that causal event instance. Note that the database does not normally generate this causal ID value automatically—it should be generally generated and sourced from the causal event condition's output clause, and typically comes along with all of the other information about the event entry that is being added to the database table. The entry table should also contain a field to record the parent causal ID term of each event. If other event(s) are known to have caused the current event (in whole or in part), then those other event(s) are considered parent causal event(s) of the current event, and the current event is considered to be a child causal event of those parent(s). In this case, the parent(s)' causal ID term should then ideally be recorded in the database entry for the child event, when possible. If no other event(s) were known to have caused the current event, or if the parent causal ID term cannot be communicated to the child event in the software, then the parent causal ID term for the child event in the database should be set to the nil causal ID term.

The database should be writable directly or indirectly from any software subsystem that contains a causal event condition clause. The database should be readable from any software UI that can display negative outcomes to the user. Note that in some embodiments there can actually be more than one physical database located in more than one software or hardware module, so long as any associated UI(s) that can display negative outcomes are able to access and read any and all databases needed to find and report the causal event(s) of interest. That is, any software UI that displays negative outcomes to the user generally should be able to look up the causal event for any causal ID received.

Failure mode: The combination of a causal event condition and a resulting negative outcome. A general property of software is that there is rarely a 1-to-1 correspondence between causal event conditions and negative outcomes. That is, a single causal event condition can often cause more than one type of negative outcome, and a single type of negative outcome can often be caused by more than one causal event condition. Therefore, different causal event conditions often result in different types of negative outcomes, which produces myriad possible failure modes. The total list of failure modes for any software of even moderate complexity is often incalculable and un-enumerable.

Note that some failure modes may result from combinations of two or more causal event conditions being met. Similarly, different combinations of causal event conditions may cause different negative outcomes. In general, each of these possible combinations of causal event condition that produces a negative outcome may also be counted as a single failure mode. Note that different failure modes may then contain overlapping subsets of causal event conditions, which results in even more analysis difficulty when trying to enumerate all possible failure modes.

Implementation Features of Select Embodiments

Exemplary feature of some embodiments: only add causal ID terms where necessary. Not all pathways in the code are causal pathways. That is, not all data and execution pathways can lead to negative outcomes. Therefore, not all pieces of data nor all execution pathways need causal ID terms associated with them. In these embodiments, only data or execution pathways that lead to negative outcomes should have causal ID terms associated with them. That is, only pathways that are known to be causal pathways should be modified for causal reporting. Typically, causal pathways are only a minority of pathways in the code. Not adding causal ID terms where they are not needed helps system performance, reliability, and maintainability.

In some embodiments, implementations do not modify conventional operations to be causal if they don't need to be causal. When modifying an operation to be causal, the implementation need not wire up all output values in the operation for causal processing if those output values cannot represent a negative outcome. For example, if a zero output is not a causal factor when the result of a multiplication, but a NaN value is, then an implementer may consider wiring up only the NaN value. If no output values for an operation can cause a failure at all in the specific software system (i.e., are not needed at all for causal reporting), but the underlying value can still represent a negative outcome through comparisons (e.g., "integer values 3, 5, and 6 can cause a failure"), some embodiments can modify the operation to always output "<pq>" causes, and provide causal comparison operators that do the same, to handle reporting the failure modes.

Exemplary feature of some embodiments: implement causal IDs with a dedicated class type. Regardless of the underlying implementation of a causal ID, some embodiments use a dedicated class to represent the causal ID, such as "class CausalId {UUID m_Uuid; . . . }." For example, a causal ID may be implemented with a standard UUID (a.k.a. GUID) type. However, it can be better to wrap that UUID in a CausalId class to indicate to developers exactly what any parameter of CausalId means: that it is only safe to specify the nil causal ID value (i.e., nil UUID), or a causal ID value (UUID) that refers to a causal event that was generated. (Wrapping the implementation in a dedicated class is also a general recommended practice in case the underlying implementation ever changes.)

Exemplary feature of some embodiments: leveraging generics and operator overloading to automatically handle causal id terms: For software languages that support it, leveraging generics (a.k.a. templates) and/or operator overloading to automatically handle the attachment and propagation of causal ID terms across expressions can vastly simplify the overall implementation. For example, a generic C++ class "Causal" can be created that binds a causal ID variable to an arbitrary data type.

In this example, to convert a simple C++ Boolean success flag to a causal type that also includes a causal ID term, one can convert the type of the Boolean variable from bool to Causal<bool>. One can then set the underlying bool value of the Causal<bool> variable to false to indicate failure, and set the causal ID term of the Causal<bool> variable to equal the causal ID of the causal event that was just posted. The Causal class can include automatic type conversion operators to make the wrapped class behave as much as possible like the underlying value type in expressions, by automatically converting expressions of the variable to and from the underlying data type where possible. Operator overloads can be provided for built-in operators to make them causal when needed. That is, they are modified to accept causal inputs and return causal outputs with the correct causal ID terms:

Consider a routine for implementing fluid tests in a clinical analyzer. A GetFluidLevelStatus( ) function can return a Causal<bool> success result. The result will contain the causal ID term of any causal events that caused the success return value to equal "false" or "true", as automatically determined by how those events fed the causal operators in the expression (i.e., the causal pathway that led to) assignment of the result variable. Note also that the result can be used directly in an "if" condition as it would be in a plain bool value. This is because an implicit cast conversion operator to the underlying item type has been provided in the Causal class, allowing the result to act as a simple boolean where appropriate or possible.

Because of this implementation, adding causal event reporting to many types of data variables can be done easily.

A large chunk of work and code complexity is eliminated simply by converting them from a type of e.g. "bool" to "Causal<bool>", or "StateEnum" to "Causal<StateEnum>". Causal ID association, causal ID storage, up-casting from and down-casting to the wrapped data type, and operator overloading to correctly propagate causal IDs across expressions of arbitrary composition and complexity, are all usually automatically taken care of by wrapping the target variable in the Causal<> class. Additionally, when causal ID terms are implemented as single causal ID values, the behavior can easily be made real-time, so that it may be used safely in real-time code.

Exemplary feature of some embodiments: two input example. Consider the two input Boolean operation discussed previously. A function IsSystemAvailable( ) returns true if the result of the AND operator "&&" on the two input conditions (bValue1 and bValue2) is true. Function ThrowErrorIfUnavailable( ) can be called during normal system operation and ThrowErrorIfAvailable( ) can be called during a diagnostics mode. Each can use the output of IsSystemAvailable( ) differently—throwing an error if the system state is unavailable or available respectfully. Thus, when one of these errors is thrown, the error should include a reference to any causal ID output of IsSystemAvailable( ) if a causal output is available.

The goal of exemplary embodiments is to link the two possible exceptions back to the source causal reason. In this example, the Exception class will be posted as an intermediate causal event on being caught, and allows a parent causal ID term to be set. Here, the variables bValue1 and bValue2 are the earliest part of the causal pathway. If no generics or operator overloading are used, and no operation-specific utility functions are created to handle common causal operations, then modifying the code to manually add causal reporting on an expression-by-expression basis can be done by getting the casual ID term from each of the relevant causal inputs in accordance with the appropriate casual tables discussed throughout. Thus, when ThrowErrorIfUnavailable( ) or ThrowErrorIfAvailable( ) is called, it will report the appropriate causal ID terms of bValue1 and/or bValue2.

A simple expression return (bValue1 && bValue2) in a causal implementation of IsSystemAvailable( ) can then use a complex, doubly nested if-else structure to determine which input causal ID to propagate to the output value, per the causal table built for the Boolean AND operation. This may not be a desirable implementation, since these nested if-else structures may need to be added to every causal expression in the software. This can increase the complexity of the code, reduce reliability and maintainability, and consequently cost too much to develop. Additionally, four explicit variables have to be added to store "attached" causal IDs alongside bValue1, bValue2, and the values returned from the two calls to IsSystemAvailable( ). This is also not ideal, since it introduces complexity where developers need to know which causal ID variables are associated with which target variables.

The following code, used in some embodiments, uses a Causal class to wrap the causal values. The Causal class is a generic "wrapper" class with operator overloads for common causal operations. The class binds a causal ID term value to the target data value, where the causal ID term is implemented as a single CausalId value, provides operator overloads to automatically handle the Boolean expressions and other built-in operators, and provides automatic type conversion operators to automatically cause the Causal<> value to behave like its underlying wrapped type in expressions that don't require causal behavior, such as the "if" conditions in ThrowErrorIfUnavailable( ) and ThrowErrorIfUnavailable( ).

```
// Two values that are factored into determining
// if the system is available.
Causal<bool> bValue1 = ...;
Causal<bool> bValue2 = ...;
// Return whether the system is available.
Causal<bool> IsSystemAvailable( )
{
    return (bValue1 && bValue2);
}
// Throw an exception if the system is unavailable.
// (E.g., check before running a patient test.)
Void ThrowErrorIfUnavailable( )
{
    Causal<bool> bSystemAvailable = IsSystemAvailable( );
    if( ! bSystemAvailable )
    {
        Exception AvailabilityError(
            "System is unexpectedly unavailable.");
        AvailabilityError.SetParentCausalId(
            bSystemAvailable.GetCausalId( ) );
        throw AvailabilityError;
    }
}
// Throw an exception if the system is available.
// (E.g., check before running a diagnostics routine.)
void ThrowErrorIfAvailable( )
{
    Causal<bool> bSystemAvailable = IsSystemAvailable( );
    if( bSystemAvailable )
    {
        Exception UnavailabilityError(
            "System is unexpectedly available.");
        UnavailabilityError.SetParentCausalId(
            bSystemAvailable.GetCausalId( ) );
        throw UnavailabilityError;
    }
}
```

Thus, utilizing a causal wrapper class to automatically handle causal behavior can be simpler to implement and maintain than adding explicit casual code to existing non-causal functions. In particular, the function IsSystemAvailable( ), which contains the core causal expression of interest, required almost no modification. The Causal class's operator overload for the C++ Boolean AND operator "&&" automatically takes care of selecting the correct causal ID from its two inputs, and assigns it to the temporary variable that is then returned from the function. Also, the automatic type conversions make checking the value of the now Causal<bool> bSystemAvailable variable in the "if" conditions in ThrowErrorIfUnavailable( ) and ThrowErrorIfAvailable( ) simple. No change is required to extract the underlying true/false value.

Exemplary feature of some embodiments: five input example. Consider the conventional five input operation with no causal reporting discussed previously. If no generics or operator overloading is used, and no utility functions are created to handle common causal operations, then modifying the code to manually add causal reporting on an expression-by-expression basis can be done. However, many intermediate values need to be explicitly calculated for the causal expression in IsSystemAvailable( ), and many nested if-else blocks are required in order to determine the correct causal ID to return. In a better implementation, the function can be modified to do causal event reporting using the Causal class, which is a generic "wrapper" class with operator overloads for common causal operations, according to some embodiments.

```
// Five values that are factored into determining if the system is available.
Causal<bool> bValue1 = ...;
Causal<bool> bValue2 = ...;
enum StateEnum
{
  Initializing,
  Running,
  Stopped,
  Resetting,
  Diagnostics
};
Causal<StateEnum> enState SubSysA = ...;
Causal<StateEnum> enState SubSysB = ...;
Causal<float> fSensorReading = ...;
//////////////////////////////////////////////////////////
//
// Return whether the system is available.
//
Causal<bool> IsSystemAvailable( )
{
  return
    (bValue1 && bValue2) ||
    (((enState SubSysA == StateEnum::Running) &&
       (enState SubSysB != StateEnum::Diagnostics)) ||
    ((fSensorReading <= 5000.0) && (fSensorReading > 100.0)));
}
// ... include same modified "ThrowErrorIf...( )" functions
//     from above ...
```

In this embodiment, the Causal class takes a practically intractable problem of adding numerous nested causal input value checks, to make the involved operations causal, and instead makes it feasible and easy. Note that the function IsSystemAvailable( ), with its complex expression, requires almost no modification. In particular, the expression part of it now requires no modification whatsoever. The only change applied in this embodiment to a conventional function is to modify the type of its inputs and its return value by wrapping them in the Causal class.

Exemplary feature of some embodiments: causal event condition example. Consider the following example of code that includes a causal event condition in an electro-mechanical system, such as a clinical analyzer, modified to do causal event reporting, using an exemplary sensor.

```
class Sensor
{
public:
  Causal<bool> CheckSensor( )
  {
    int 1_nSensorReading = GetReading( );
    Causal<bool> 1_bSuccess = true;
    if( 1_SensorReading > SENSOR_READING_MAX ) // [1]
    {
      // Return sensor out of limit.
      CausalEvent 1_CausalEvent(
          "Sensor reading of" + 1_SensorReading
          + "is above maximum limit of" + 1_nSensorReading
          + "." );
      PostCausalEventToDatabase( 1_CausalEvent );
      1_bSuccess = Causal<bool>(
          false,
          1_CausalEvent.GetCausalId( ) );
    }
    if( 1_SensorReading < SENSOR_READING_MIN_WARNING ) //
[2]
    {
      // Sensor is still considered in limit, but
      // log a warning to disk.
      //
      Log( "Sensor below expected minimum");
    }
    return 1_bSuccess;
  }
};
```

```
void Verify Sensor( )
{
  Sensor 1_Sensor;
  Causal<bool> 1_bSensorOk = 1_Sensor.CheckSensor( );
  if( 1_bSensorOk ) // [3]
  {
    Display Success( "Sensor OK.");
  }
  else
  {
    DisplayFailure(
        "Sensor failed.", 1_bSensorOk.GetCausalId( ) ); // [4]
  }
}
void VerifyAllSensors
{
  Sensor 1_Sensor1;
  Sensor 1_Sensor2;
  Causal<bool> 1_bSensorsOk =
      1_Sensor1.CheckSensor( ) && 1_Sensor2.CheckSensor( );
  if( 1_bSensorsOk ) // [5]
  {
    Display Success( "All sensors OK.");
  }
  else
  {
    DisplayFailure(
        "One or more sensors failed.",
        1_bSensorsOk.GetCausalId( ) ); // [6]
  }
}
```

The class CausalEvent and function PostCausalEventToDatabase( ) are added as general purpose library utilities for creating and posting causal events. The CausalEvent class automatically generates a unique CausalId for itself (randomized 128-bit UUID) whenever an instance is constructed. This causal ID can be retrieved with CausalEvent:: GetCausalId( ) DisplayFailure( ) has been modified to accept a causal ID and to look up and display the associated causal event from the database.

The assignment of "true" to 1_bSuccess just above [1] implies a nil causal ID term being assigned as well. It also leverages automatic type conversions to make 1_bSuccess behave like a plain bool as much as possible until the associated causal ID term is needed. This demonstrates how easy it typically is to add causal event reporting to various code in some embodiments.

Exemplary feature of some embodiments: replacement for operator overloads. If operator overloading is not available, or if the operations to be modified are not implemented with operators, then providing dedicated functions to do the equivalent, such as CausalAnd( ) CausalOr( ), CausalNot( ), CausalEquals( ), etc., can still make this technique entirely feasible, in some embodiments. Here are the IsSystemAvailable( ) functions for the two-input and five input examples rewritten to use causal operator-like functions. In this case, the generic Causal class only provides binding to a causal ID term value, and does not contain any operator overloads.

```
// Return whether the system is available. (Two-input example)
Causal<bool> IsSystemAvailable( )
{
  return CausalAnd(bValue1, bValue2);
}
// Return whether the system is available. (Five-input example)
Causal<bool> IsSystemAvailable( )
{
  return
    CausalOr(
```

```
        CausalAnd(bValue1, bValue2),
        CausalOr(
            CausalAnd(
                CausalEqual(
                    enState_SubSysA,
                    StateEnum::Running),
                CausalNotEqual(
                    enState_SubSysB,
                    StateEnum::Diagnostics)),
            CausalAnd(
                CausalLessThanEqual(fSensorReading, 5000.0),
                CausalGreaterThan(fSensorReading, 100.0))));
}
```

While not as simple and low-impact as when using operator overloads, this can be highly preferable to manually writing if-else structures and intermediate computations to determine the output causal ID term. This example demonstrates the causal event reporting technique is still feasible even if operator overloading is not available. Note that typically only a minority of expressions in any given software application will desire causal reporting, such that constructions like the above should be less common. For software systems that can frequently report negative outcomes, the effort to write and maintain the above expressions may be acceptable given collective troubleshooting time saved across all users of the software.

Exemplary feature of some embodiments: representing multiple causes: single causal ID versus multiple causal IDs. A general property of cause-and-effect in both physical, non-software outcomes and software outcomes is that there can be more than one cause to any given outcome. Normally, any positive outcome will have a near-infinite number of causes. There are many, many things that have to "go right" for a positive outcome to occur. Missing any one of those causes of the positive outcome, or in some cases a specific collected subset of those causes, would then cause a negative outcome to occur. Consequently, for a negative outcome to occur, there is typically only one cause or a handful of causes. There is typically only one or a small number of things that "go wrong" when a negative outcome occurs. In most cases, there is actually only one root cause.

When the causal ID term is implemented as a single causal ID value, the current invention reports at most one single causal event at a time for each negative outcome occurrence. This is termed here as "monocausal reporting" If desired, multiple causes can be represented and reported with some embodiments. This is termed here as "polycausal reporting". To represent multiple causes for an outcome, instead of attaching a single causal ID at a time to a causal pathway, the causal ID term may attach more than one causal ID as a collected set or as a pointer to a set of IDs. The current set of causal IDs attached to a pathway at any given time represents the current collected set of causes for that pathway's current data or execution state. Typically, this set of causal IDs would be implemented with classic "set" container semantics, where the causal IDs representing the current set of causes for the pathway are contained in a set-type container that has the following properties: duplicate IDs are disallowed (duplicate IDs are quietly collapsed into just one copy of the ID), and an empty set is the equivalent of a nil causal ID.

When the causal ID term is implemented as a container of multiple causal ID or causal ID term values, the causal tables are used in the following way. The "p" value represents the causal ID term attached to the input operand "P", and the "q" value represents the causal ID term attached to input operand "Q". The "p" and "q" output cases both then just propagate the causal ID term specified (either p or q) from that input operand to the output value. The "<pq>" and "[pq]" output cases both merge the "p" and "q" input sets causal ID terms and attach the resulting merged term to the output value.

When the UI goes to display the cause for a negative outcome, if the causal ID term associated with the negative outcome is implemented as a set or tree of causal ID values, and is non-empty, then the UI looks up the event for each causal ID in the causal ID term, finds each event(s)'s root event(s) (recursive parent lookup), collapses any duplicate root events into a final list of non-duplicate root events, and then displays each root event as the cause of the negative outcome. If the causal ID term associated with the negative outcome is instead empty, then nothing extra is displayed, just as with a nil causal ID. One implementation option in some embodiments is to maintain the semantic difference between the <pq> and [pq] output cases on the resulting attached causal IDs and/or causal ID sets, in order to provide more information to the user on whether they will need to remedy all displayed causes of certain subsets (those propagated through a [pq] relationship) and/or only some displayed causes of certain subsets (those propagated through a <pq> relationship).

Some embodiments store each set of causal IDs in a tree fashion, where the <pq> and [pq] output cases that merge inputs are assembled into a tree that literally reflects the hierarchal buildup of conditions necessary to cause the outcome, and where duplicate IDs are not collapsed. Potential performance impacts that can affect the decision of which embodiment to implement include, when attaching multiple causal IDs, the usual real-time and memory fragmentation considerations if memory management for the causal ID set containers are heap-based, as is common in many software libraries, and general timing considerations due to the additional list processing added to operations modified for causal reporting.

Because of the potential performance impacts associated with propagating multiple causal IDs, some embodiments simply attach a single causal ID to a causal pathway. An additional advantage of the single causal ID implementation is it is very easy to implement in a real-time fashion. Attaching a single causal ID turns out to be more than sufficient for the user for the vast majority of cases. As stated earlier, most negative outcomes are only caused by a single condition, so reporting a single causal ID is sufficient to report the cause of most problems. In the cases where a negative outcome is caused by more than one causal event, it is still usually sufficient to display just one of the causes. This is because the user can remedy that one cause, and then attempt the operation again. If the operation is still failing due to one or more other causes, then one of those other causes will be displayed on the re-attempt of the operation, and the user can then remedy that cause, and try again. This repeats until all causes have been remedied.

Note also that it is possible to use embodiments to report the causes for positive outcomes, not just negative outcomes. However, for reporting the causes of positive outcomes to be practically useful to the end user, the implementation should nominally do polycausal reporting (multi-event reporting) not monocausal reporting (single-event reporting). This is because of the general cause-and-effect observation above that any given positive outcome is typically the result of many, many input causes. In the case then where positive outcome reporting is accomplished with this invention using polycausal reporting, there would likely be a flood of causal input events reported for each positive outcome. This requires developing special classification and causal event tree traversal filters to highlight the causal events most likely to be of interest to the user. For these filters to be useful, "events of interest to the user in positive outcomes" also need to be defined for each type of positive outcome, and/or made configurable at run time on a per-outcome-occurrence basis.

This highlights that some embodiments can be more useful for reporting the causes of negative outcomes than reporting the causes of positive outcomes. Part of the reason for this though is that the nature of cause-and-effect for positive outcomes is far more complex, and of less interest for the normal use cases, than that of negative outcomes.

Exemplary feature of some embodiments: do not generate causal events entries for intermediate causal event conditions. Causal event conditions in the code can be classified as either root cause conditions or intermediate conditions. Some embodiments will only post causal events in root cause conditions, and avoid posting causal events in intermediate conditions. Posting causal events in intermediate conditions is often at least partially redundant, and can produce a flood of useless information or database entries if the intermediate event's condition clause is constantly being re-executed against the standing effect of an earlier root cause effect.

There are at least two notable circumstances where it may be desirable for one or more intermediate conditions to post causal events. First, when an actual root cause condition cannot be identified by the software as such, then it may be desirable to post intermediate causal events in order to provide at least some kind of causal feedback for the user, instead of no feedback at all, even if it is not optimal. This kind of feedback serves as a partial trace back to the actual root cause event, and tends to narrow the list of possible root cause conditions for the user to investigate, even if it does not point to the specific root condition that caused the problem. Second, it may be desirable sometimes for intermediate conditions to deliberately post causal event conditions even when the upstream root cause conditions are also posting events, in order to provide more information to the user on the context, state, and intermediate effects of the overall failure mode. In these cases, the intermediate event should ideally set its parent causal ID term to the causal ID term passed in from the root cause condition (if available), in order to potentially suppress display of the intermediate event on a negative outcome in favor of displaying the root cause event, or to potentially display the hierarchy of cause and effect as it occurred.

Exemplary feature of some embodiments: do not treat causal ids or causal ID terms as an error code or other type of success status. Causal IDs and causal ID terms are metadata about some other value or state, including metadata about some other value that represents e.g., an error or not, or the potential to create an error or not. Casual IDs and causal ID terms themselves do not represent possible error or failure states, and therefore should not be used to represent any kind of error/non-error status themselves. Instead, embodiments rely on the values of the other states or statuses to which causal IDs are attached to indicate whether the state of any given causal pathway will eventually result in a positive and/or negative outcome.

This is useful because the state of causal pathways can sometimes simultaneously represent or cause both positive and negative outcomes. Incorrectly using causal IDs directly as positive or negative status values will break the solution to that sub-problem, and therefore break the solution to the overall problem of providing accurate causal event reporting.

The nil causal ID term (and nil causal ID) have a specific meaning when it comes to displaying root causes, where a nil causal ID term value may be validly attached to a failure state value, indicating "no known reason" for that failure state. If a causal ID term variable is improperly used to directly indicate a success or failure value, e.g. by having a non-nil ID term represent failure, and the nil-ID term represent success, (instead of the causal ID describing the reason for a separate but attached success or failure value), then the causal case of "no known cause of this failure" cannot be correctly represented. This is because there is no way in this case to attach a cause of "no known reason" to that failure state, because the semantically overloaded causal ID here cannot be both nil (representing "no known reason for this state") and non-nil (representing some negative-outcome producing state) at the same time.

A similar problem also applies in a hypothetical implementation where a nil causal ID term is used to represent a failure state instead. This particular implementation simply breaks the basic ability of the solution to represent the reason for the failure, since a non-nil ID term is also required to represent the source causal event for the failure, and the causal ID term can't be nil (failure state) and non-nil (failure reason) at the same time. Thus, treating causal ID terms as negative states themselves will result in frequent reporting of the wrong root causes, or frequent failure to report any root causes, both of which are to be avoided in some embodiments. Instead, code should be written to return some other success/failure status value, such as, at minimum, a "success/failure" bool, or an error code enum, and then ideally make that value causal, by attaching a separate causal ID value to it, if it is known to potentially cause negative outcomes.

Instead of returning a causal ID term to indicate whether a failure occurred or not, an exemplary MoveMotor( ) function returns a bool to indicate success or failure, and attaches a causal ID term to it via the Causal< > wrapper to indicate the reason for whichever particular value was returned, be it true or false. Therefore, the causal ID term attached to result is metadata about that result, which is the correct implementation for most embodiments.

Other Exemplary features of some embodiments. Embodiments generally define for the causal operations whether each possible input value is known to be a cause or non-cause for each possible output value of that operation, and then have each arbitrary execution of the operation analyze its input value(s) to select the causal metadata to propagate based on which combination of input values was found. Instead of requiring determination of all possible causes and effects in the software system, embodiments leverage the existing arbitrary structure of the software system to link arbitrary sub-causes and sub-effects to each other via linking them to the specific value changes they cause in the system, as they occur. This can then automatically yield reporting of the correct, ultimate cause for any effect (negative outcome) in the overall software system in question, since the arbitrary sub-structures of the software system and their effects on the current values and states in the system are what ultimately defines all of the possible causes and effects of that particular system, and which particular causes are in effect at any given time.

This is done by: identifying causal event conditions in the software, both explicit and implicit, as arbitrary sources of arbitrary negative outcomes for users; generating a database event entry and unique causal ID value to point to that event entry on each occurrence of a causal event condition; attaching those causal ID value(s) as metadata to the arbitrary live data value pathways and live execution pathways that occur as a result of that causal condition, and propagating the inputted causal ID value(s) from any affected pathway that effects a causal change on some other pathway to that other pathway, where the causal ID(s) to propagate are determined by counterfactual pre-analysis of the operations involved. This then allows each causal pathway at any given time to "point" to the causal event(s) recorded in the database as the causal reasons for the current value or state of that pathway, and consequently if a pathway then acts as the direct cause of a live negative outcome result, allows the negative outcome to point to the source cause event in the database that was responsible for the outcome.

Embodiments can dynamically report specific instances of root cause condition occurrences as the reasons for negative outcomes experienced by the user, not just simple "success/failure" status codes, and/or not just static error codes. This means that when different instances of the same type of root cause condition (e.g., an error condition or operator action condition) are reported for different negative outcomes, variable information specific to each root cause instance, which can be optionally collected, such as a date/time stamp of the root cause occurrence, sensor data specific to that root cause occurrence, the operator logged in at the time of that root cause occurrence, etc., can be dynamically reported as well for the negative outcome.

Some embodiments produce immediate results in live, actively running software for negative outcomes as they are experienced by the user without requiring any pre-outcome preparation or post-outcome analysis to be run by the user. Embodiments can produce highly accurate and deterministic results for the user, and avoid heuristic approaches that can lead to inaccurate results or excessively high development costs. When software implementing embodiments can report the specific causal event for a negative outcome, it does so, otherwise, it provides no additional information, instead of false information.

Results derived from heuristic solutions are known to be frequently inaccurate, which can increase the troubleshooting load for the user, and therefore increase the fundamental problem of long troubleshooting times, instead of decreasing it. Embodiments generally avoid heuristic approaches because heuristic solutions can be infeasibly expensive to develop. Many attempts to produce heuristic solutions in different problem domains simply fail to achieve their goals and are never put into use. That is, they are never shipped to customers or even used partially in-house, resulting in failed projects and significant wastes of business resources.

In general, when using embodiments, users do not need to search through independent lists of event reports to guess at root causes, nor dig into unfamiliar trace files that represent unfamiliar and arbitrary internal software designs, nor escalate solving the problem to others, nearly as frequently as otherwise in order to determine the root cause condition(s) for an arbitrary negative outcome. Root cause conditions are nominally reported right at the negative outcome display.

Embodiments can also be implemented in preexisting software in a piece-by-piece fashion as development resources permit. This can be done by converting individual causal paths and sub-paths to do causal event reporting. Unconverted paths effectively fall back to prior behavior of not reporting any additional information to the user for the negative outcome of interest. Each causal pathway that is converted helps reduce troubleshooting time, even when not all pathways are finished being converted.

Since the causal reporting implementations in sub-paths are designed to be interoperable, via use of common causal ID type, a positive "critical mass" side effect occurs where as more individual root-causal-condition-to-negative-outcome paths are converted, it tends to become easier to convert each new path, since complete paths from root to outcome often share intermediate sub-paths in the code.

Some embodiments that implement their substantially unique causal IDs (e.g., ID collisions have less than a one-in-a-billion chance of occurring for each ID) with standard, randomized 128-bit UUIDs, and that report their causal events to a common database accessible from the affected UI, or to a logically common set of databases accessible from the affected UI, can propagate cause-and-effect information between them, regardless of their individual subsystem architectures or internal causal event (e.g., error or operator action) representations. This means that software can often be implemented to accurately track cause and effect across multiple disparate software threads, software processes, software applications, computers, network nodes, etc.

Embodiments generally support tracking individual occurrences of causal event conditions by generating a new, substantially unique causal ID value for each occurrence, writing a new causal event instance identified by that new unique causal ID with occurrence-specific data to a database for each occurrence, attaching a "current" causal ID term variable to track the effects of that and other causal events on the actual current data values and actual current executions in the software system up to their arbitrary negative outcomes in the user interface, and propagating the unique causal ID values originally generated in the causal event condition occurrences via the causal ID term variables attached to intermediate pathways up to the display of negative outcomes Various embodiments leverage the causal pathways already in conventional software code to automatically track cause and effect as it occurs, by adding a simple piece of metadata to those pathways (a causal ID variable), and do not rely on any external analysis of all possible failure modes (all possible combinations of casual event conditions and negative outcomes, which often can range into the millions) in order to determine cause and effect.

Adding a causal ID term to each segment or node of a causal pathway in a cause-and-effect chain effectively adds live state-driven "self-tracking" to the system, and as the output of each node affects or doesn't affect one or more other nodes' states, the propagation of the causal ID term from one node to the next on an effected causal state change, and the non-propagation of the causal ID term on a non-effected state change, naturally takes care of reporting the reason(s) for the multitude of possible failure modes, automatically. This also automatically takes care of the many failure modes that often share overlapping intermediate paths and outcomes.

Implementing causal IDs as randomly generated, substantially unique, 128-bit UUIDs, and outputting causal events to a common database, contributes to tracking causal errors, by using an event (e.g., error) representation denominator (a UUID) that is far more likely to be implementable and low-impact across different software architectures. Most software languages and systems are able to deal with UUIDs, and many software systems already include an event database of some form that the different software subsystems are required to report their events-of-interest to, regardless of their internal event representations (e.g., error representations).

Figure 16:
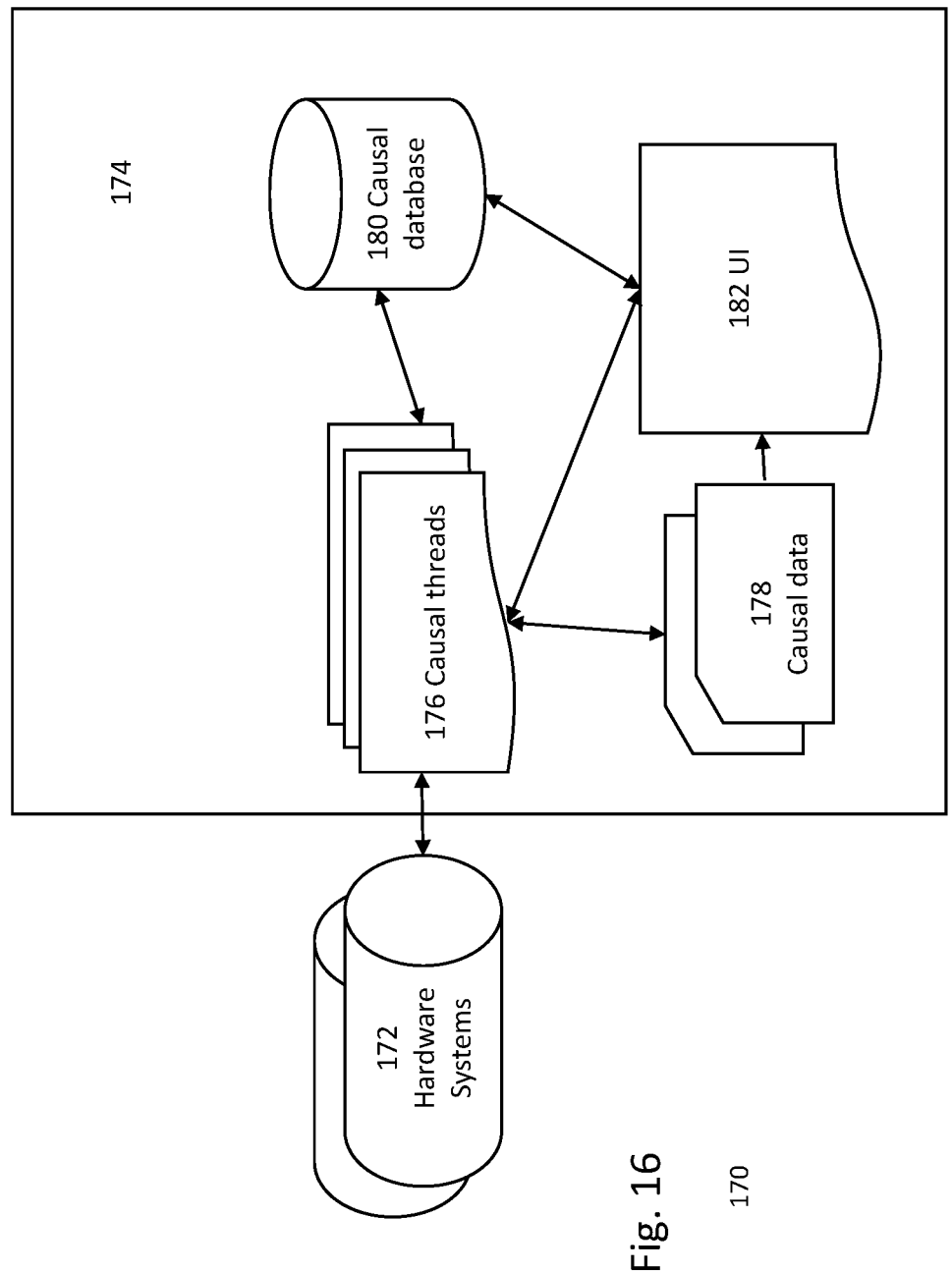
FIG. 16 is a system diagram of a system suitable for implementing some embodiments.

FIG. 16 is a system diagram of an exemplary system 170 that can be used to implement various embodiments of causal event reporting disclosed herein. Various hardware systems 172 can be controlled by processor 174. In some embodiments, system 170 is a clinical analyzer used to perform patient sample tests. In other embodiments, hardware systems 172 can be any hardware from automotive, manufacturing, computer peripherals, etc., as the concepts discussed herein can be used outside the clinical chemistry arts, as clinical analyzers are just one embodiment that can benefit from these concepts. Hardware systems 172 can include various motors, sensors, test systems, etc., that are used to perform and manage patient tests. Processor 174 can be part of any suitable computing system having one or more processors and associated computing hardware, as well as microcontrollers for other circuitry needed to control and interact with hardware systems 172. Executing on processor 174 are plurality of causal threads 176. These causal threads include causal execution pathways, such as causal functions, as disclosed herein. Various causal threads 176 interact with causal data pathways, such as simple variables, objects, persisted data, etc. 178. Causal data 178 are used by threads 176 interacting with hardware systems 172, computing systems, or the user via UI 182 to perform the desired, application-specific functions of the software system. As discussed, these causal threads may encounter causal root conditions, generate causal events, and attach and assign selected causal IDs to causal data on specific state changes.

Causal threads 176 also utilize causal database 180 to track system events in a causally linked manner, as discussed. Causal threads 176 interact with user interface 182 to seek user input and to display errors or other information. With respect to errors, UI 182 can respond to errors reported by threads 176 and causal data 178 and access causal database 182 to report root cause events of negative outcomes to the user, determine parent-child relationships, and display causal trees. This allows a user to easily remedy negative system states based on their causal nature.

Figure 20:
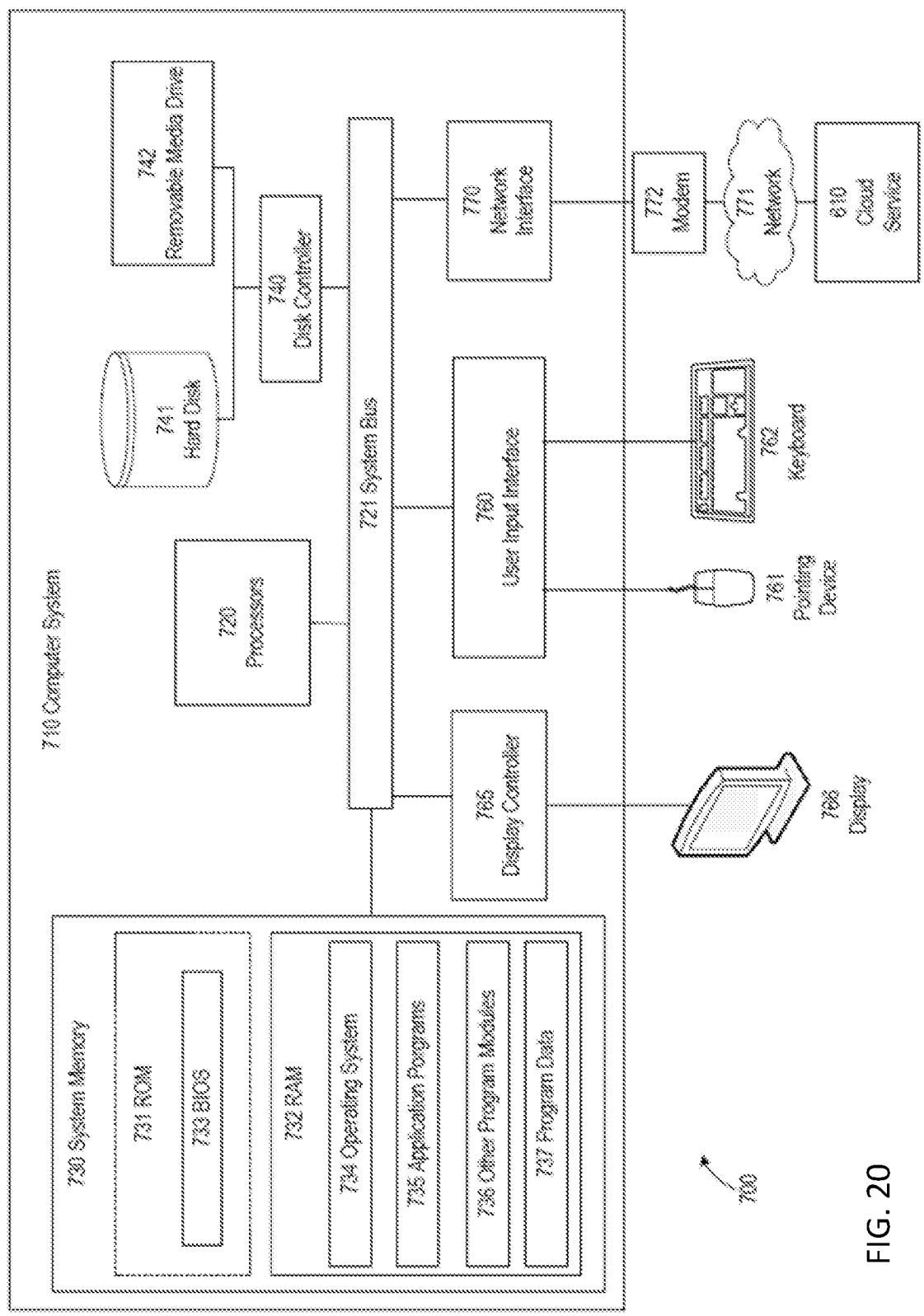
FIG. 20 is a system diagram of an exemplary computing system for use with certain embodiments.

Embodiments utilize software implementations that execute on a computer (and by extension a processor). This software can be implemented on any suitable computer and in any suitable programming language. While certain embodiments are described for use with clinical analyzer hardware and systems, this is simply an example of a system that can benefit from the concepts of these embodiments. Some embodiments are suitable for use with any computer or computer and hardware system. FIG. 20 illustrates an exemplary computing environment 700 within which may be used to implement the embodiments described herein. The computing environment 700 includes computer system 710, which is one example of a computing system upon which embodiments of the invention may be implemented. Computers and computing environments, such as computer system 710 and computing environment 700, are known to those of skill in the art and thus are described briefly herein.

Figure 17A:
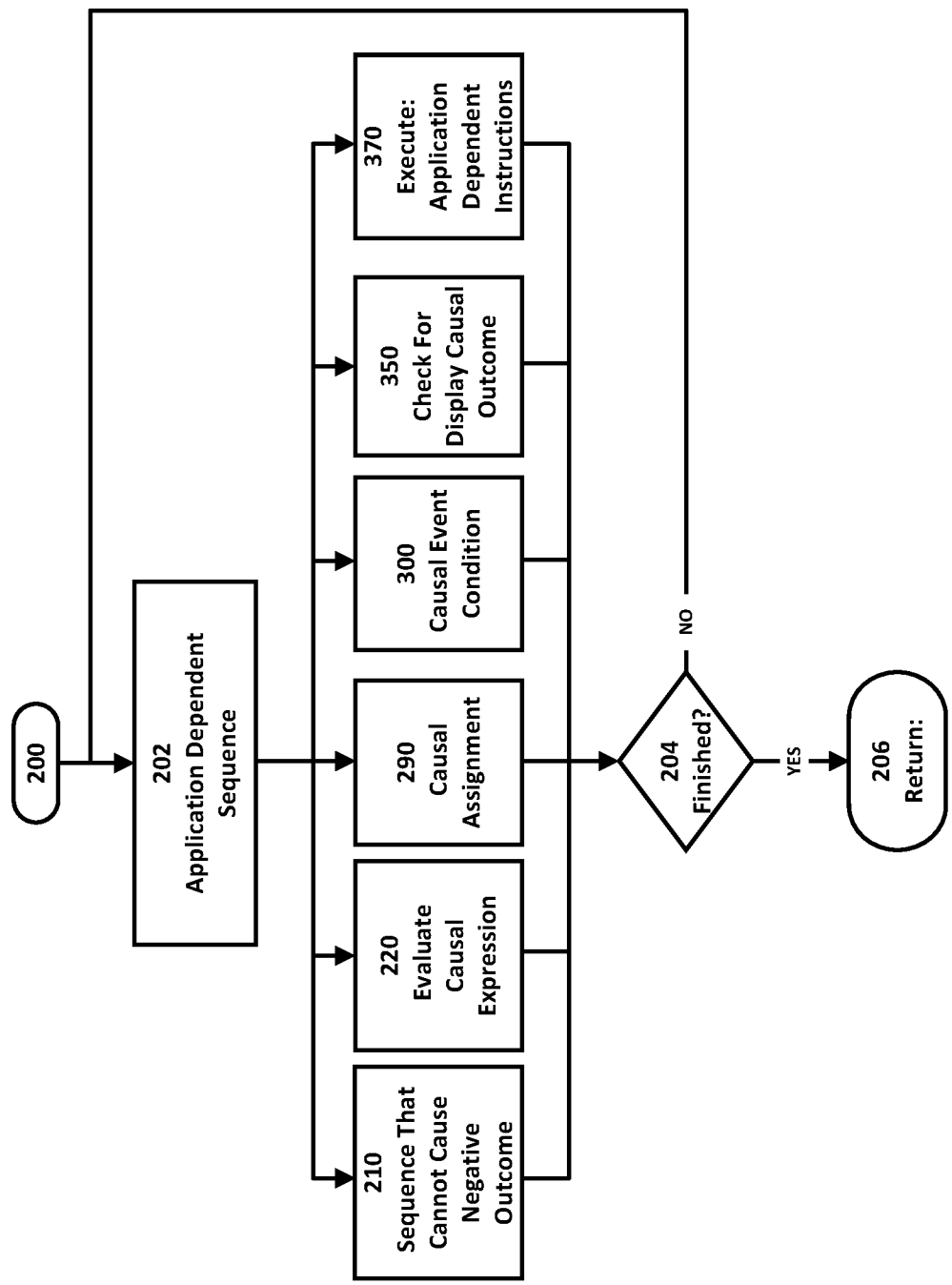

FIG. 17A is a high-level flow chart showing the steps involved in executing software modules having causal functionality, by a processor. Method 200 begins at step 202, where the processor encounters an application dependent sequence. A software application that employs a causal functionality can include a variety of different functionality that is specific to the actual functions implemented in the application. Thus, each function encountered, and how it is handled, is application dependent. The steps below step 202 are the exemplary types of functional sequences that can be encountered within the application. Each dependent sequence of an application encountered at step 202 can include input parameters that can include any combination of causal data and non-causal data. Software can include any of the following application dependent sequences, each being expressed as a step in FIG. 17A. Note that all of these types of sequences are explained here, but a given application can use any subset of these application dependent sequences in steps 210, 220, 290, 300, 350, and 370. If any of these types of application dependent sequences are encountered, the corresponding process will be executed by the processor.

At step 210, the processor may encounter a sequence that cannot cause a negative outcome. These are sequences that, by design, cannot result in an erroneous or negative outcome. For example, many arithmetic operators or functions can execute without ever causing a negative outcome. In many instances, even an error in the execution of such a function may not result in a negative outcome for the system as a whole. A software engineer implementing a system can treat any given function to operate consistent with step 210. Step 210 is further explained with respect to FIG. 17B.

Figure 17B:
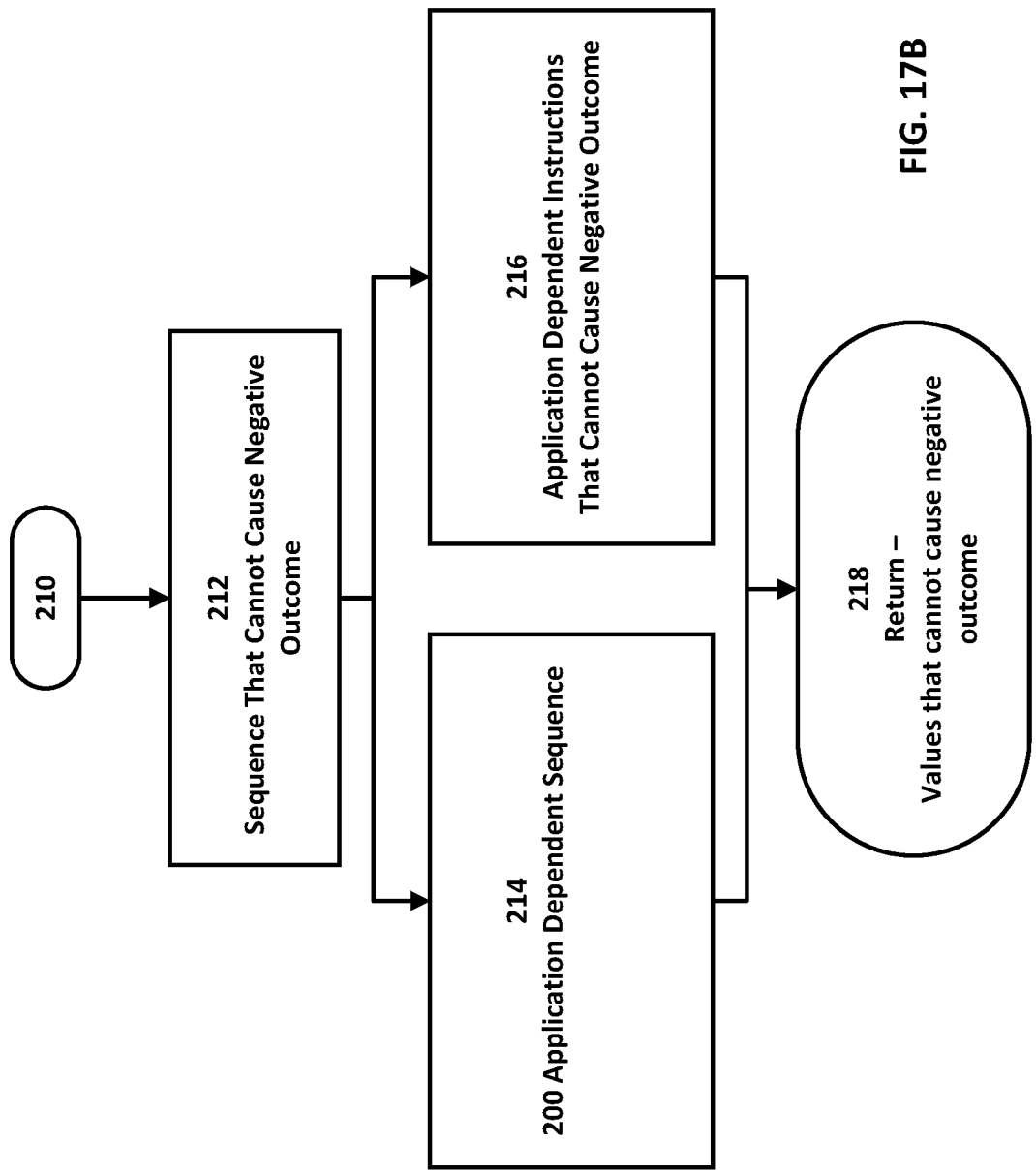
Figure 17C:
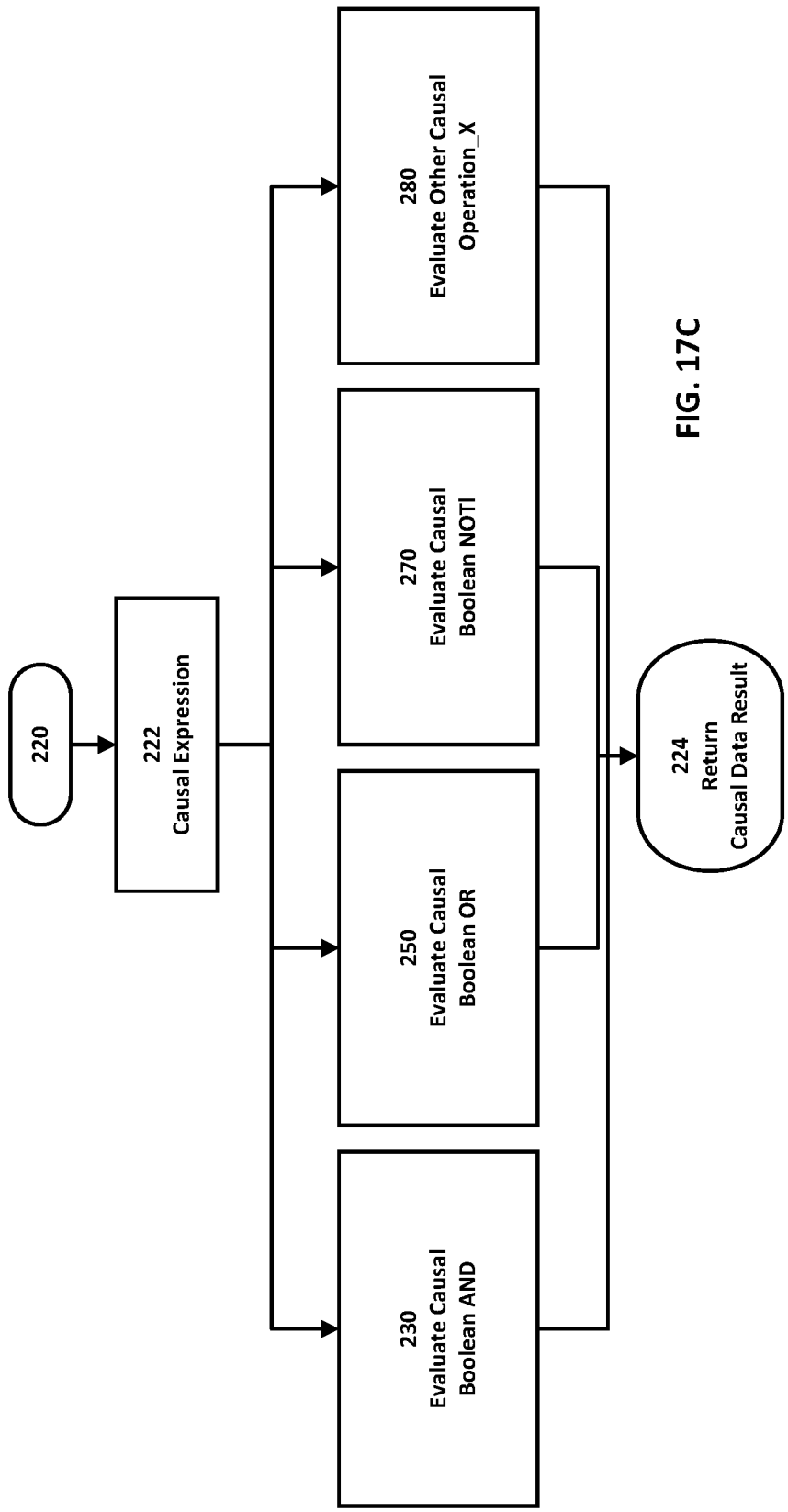

At step 220, the processor may encounter a causal expression, whereby the processor will evaluate this causal expression in accordance with FIG. 17C. Some functions may result in a causal assignment, at step 290, which is explained in FIG. 17H. The processor may also encounter an application dependent sequence that results in a causal event condition, at step 300, as explained in FIG. 17I. If the application dependent sequence encountered by the processor is one that requires displaying a casual outcome, such as a function that could result in an outcome that needs to be displayed to a user, processing proceeds to step 350, which is shown in FIG. 17L. Often, application dependent sequence includes no causal functionality, such as conventional functions, in which case processing proceeds to step 370 where conventional application dependent instructions are executed. Each of these steps are executed using arguments that can be any combination of causal data or non-causal data, as defined by the functions used in each application dependent sequence.

Once a given application dependent sequence is executed, the processor checks the application code, at step 204, to determine if execution is finished or if there are additional application dependent sequences to be executed. If execution is finished, the processor completes the processing of the application dependent sequence, and returns any combination of causal and non-causal data, at step 206.

It should be noted that almost any sequence in FIG. 17A can call any other sequence. In some embodiments, most sequences accept both causal data parameters with an attached causal ID term and non-causal data parameters. Any input parameters for one sequence may or may not form arguments for other sequences. Causal properties can utilize the property that when one sequence calls another, it may or may not convert causal data arguments non-causal data arguments and vice versa. Sequence calls may or may not modify the causal ID term sent along with those arguments. Sequences typically do one or more of the following to the causal ID term(s) being passed as arguments to the next sequence: leave it alone; remove it when converting causal data to non-causal data; or set it to the nil causal ID term when converting non-causal data to causal data. The causal event condition (process 300) is the only place a causal ID term is filled with a new causal ID value. Other than that, the causal ID terms are either propagated along, set initially to nil, overwritten with nil, or dropped.

FIG. 17B shows the process 210 for a sequence that cannot cause a negative outcome. At step 212, the processor begins execution by passing causal or non-causal data parameters to initiate a sequence that cannot cause a negative outcome. The designation as a function that cannot cause such an outcome is done by the drafting of the functionality of the application. For example, data aggregation or basic UI display functions often cannot result in negative outcomes. Typically, software functions that control external hardware can result in negative outcomes, while much of the pure computational instructions may not be able to result in a negative outcome. Execution can then proceed recursively, at step 214, which results in the initiation of a new application dependent sequence 200. It should be noted, that if a sequence that cannot cause a negative outcome has been initiated at step 212, the result of any application dependent sequence initiated at step 214, also cannot result in a negative outcome. Therefore, any resulting causal IDs that are returned by the recursive call to step 200 will be removed or replaced with a nil causal ID because, by definition, any sub-functions called by process 210 cannot result in a negative outcome. The call to process 200 can include arguments that are non-causal data converted to causal data that have a nil causal ID or causal data converted to non-causal data, thus removing the causal ID terms, or non-causal data.

Alternatively, the processor may encounter application dependent instructions that cannot cause a negative outcome that do not result in a recursive call to process 200. This can be any defined functions that cannot cause a negative outcome, and may use arguments that are causal and non-causal data. Once the instructions or recursive calls are evaluated, the processor will return a result that includes a values that cannot cause a negative outcome. These values may include non-causal data converted to causal data with a nil causal ID, causal data converted to non-causal data, or non-causal data.

Process 220, the evaluation of a causal expression, is explained in FIG. 17C. At step 222, the processor begins evaluation of a causal expression, which can include parameters that are any combination of causal and non-causal data. This can proceed in any of four possible manners. If the causal expression is a Boolean AND, evaluation proceeds to step 230 where the processor evaluates the Boolean AND. If the causal expression is a Boolean OR, evaluation proceeds to step 250 where the processor evaluates the Boolean OR. If the causal expression is a Boolean NOT, evaluation proceeds to step 270 where the processor evaluates the Boolean NOT. If the causal expression is any other operation, evaluation proceeds to step 280 where the processor evaluates the operation (labeled Operation_X). Each of these processes can take as arguments causal data or non-causal data that is converted to causal data by setting the causal ID terms to nil. These processes are explained with respect to FIGS. 17D-G. At step 224, once the causal expression has been evaluated, the processor returns the causal data result.

Figure 17D:
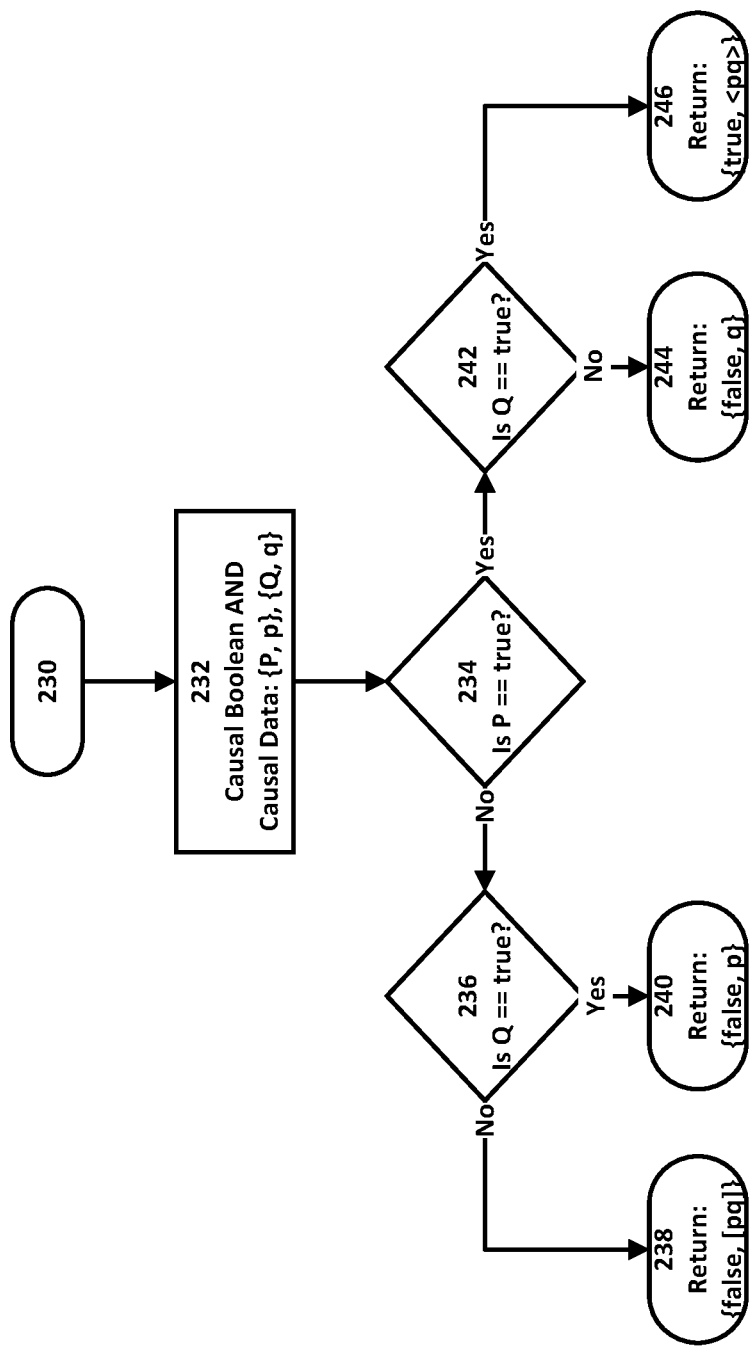

FIG. 17D shows the details of an exemplary process 230 to execute a causal AND. At step 232, the processor initiates execution of the Boolean AND, passing parameters that include causal forms of variables P and Q (or any other variables for a multiway AND). At step 234, the processor evaluates the non-causal values of causal value P, to determine if the non-causal part of P (labeled P) is true. At steps 236 and 242, the processor determines if the non-causal portion of causal value Q (labeled Q) is true. If neither is true, at step 238, the processor returns false and a new causal ID term that contains the causal ID terms for both P and Q or any subset thereof. If P is false and Q is true, at step 240, the processor returns false and the causal ID term for P. If P is true and Q is false, the processor returns false and the causal ID term Q. If both P and Q are true, the processor returns true and a new causal ID term that contains the causal terms for both P and Q or any subset thereof. This is consistent with the tables explaining how a causal AND function works, explained throughout.

Figure 17E:
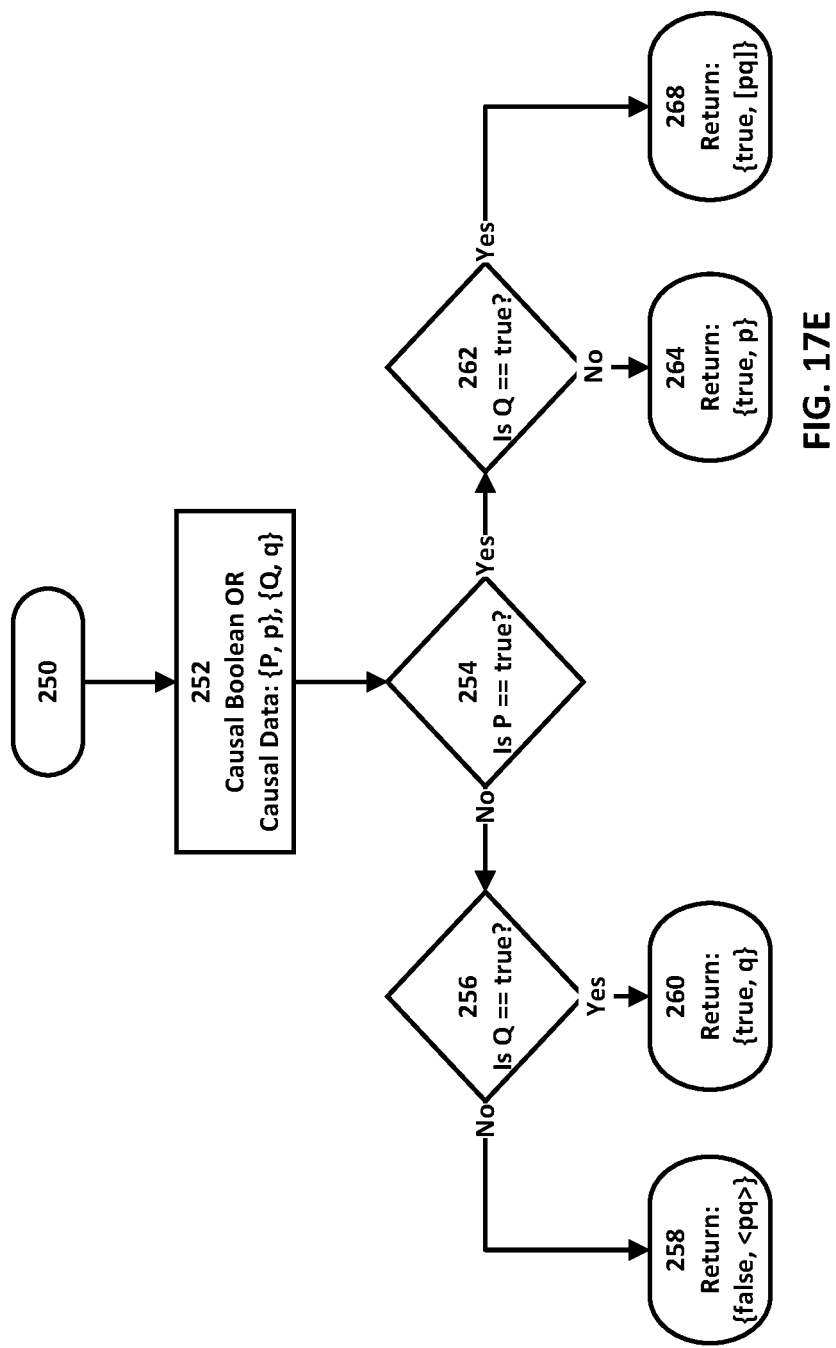

As shown in FIG. 17E, the exemplary process 250 to execute a causal OR also behaves consistent with the tables explained throughout. At step 252, the processor initiates the causal Boolean OR operation, taking causal values as parameters. At step 254, the processor evaluates whether P is true. At steps 256 and 262, the processor evaluates whether Q is true. Consistent with the tables, if neither P nor Q are true, at step 258, the process will return false and a new causal ID term that contains the causal ID terms for both P and Q, or any subset thereof. If P is false and Q is true, at step 260, the process will return true and the causal ID term for Q. If P is true and Q is false, at step 264, the process will return true and the causal ID term for P. If both P and Q are true, at step 268, the process will return true and a new causal ID term that contains the causal ID terms for both P and Q, or any subset thereof.

As shown in FIG. 17F, the exemplary process 270 to execute a causal NOT also behaves consistent with the tables explained throughout. At step 272, the processor initiates the causal Boolean not operation, taking causal value P as a parameter. The NOT operation simply returns the logical NOT of the value P and the causal ID term for P, at step 274.

FIG. 17G shows the catchall process 280 for executing a generic causal function (labeled Operation_X). This can include comparisons, arithmetic, etc. A software developer should provide a causal table according to the methods described herein to create the causal functionality. At step 282, processor initiates Operation_X, receiving a defined number of causal values $\{A\_1, a\_1\}, \ldots, \{A\_n, a\_n\}$. At step 284, Operation_X is executed according to its definition, and returns a causal value having a non-causal component determined by the definition of the operation and a causal ID term consistent with the causal table created for Operation_X by the software developer.

Figure 17H:
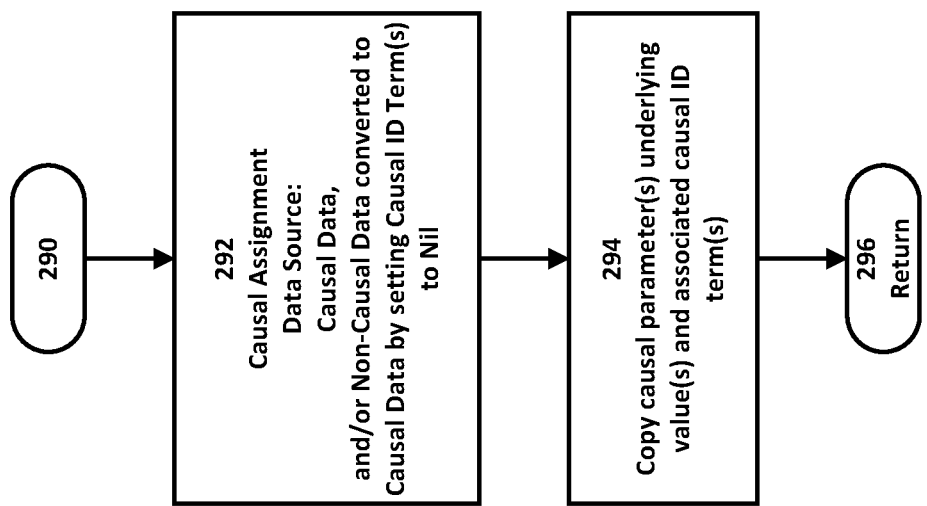

FIG. 17H shows the process 290 for the simple case of a causal assignment, where a function copies, sets, or initializes a causal data value. Processor will simply copy both the underlying value in the causal ID term together. When a causal data value is assigned from a literal value, which is then cast as a causal value, a nil causal ID term can be specified if there is no known cause for the literal value, or the causal ID term can be sourced from a causal data associated with the executing causal event condition clause if the clause is known to the developer to be a cause of the literal value being assigned. When a causal data value is assigned from non-causal data, which is then cast as a causal value, a nil causal ID term can be specified if there is no known cause for the non-causal data value, or the causal ID term can be sourced from causal data associated with the executing causal event condition clause if the clause is known to the developer to be a cause of the literal value being assigned. At step 292 the processor initiates the causal assignment, assigning causal or non-causal data converted to causal data to a location in memory of the new causal value. At step 294, the processor copies causal parameters, underlying values, and associated causal ID terms to the assignment target data location, overriding any previous values. At step 296, the process returns.

FIG. 17I shows process 300 for evaluating a causal event condition. There are generally two kinds of causal event conditions: non-parented causal events that do not have a parent event sent (stemming from a core condition expression that is not a causal expression), and causal events that do have a parent, where a parent ID may be sent when triggered by an expression that is a causal expression. At step 302, the processor begins executing a causal event condition that may take causal data or non-causal data as parameters. Depending on the circumstances, the causal event condition may be non-parented causal event condition (process 310, FIG. 17J) or maybe a parented causal event condition (process 330, FIG. 17K). Process 310 takes causal data converted to non-causal data by removing causal ID terms or non-causal data as arguments. Any causal ID terms passed to a condition that is designated as non-parented should ignore any causal ID terms because, by definition, the event cannot be triggered by another causal event or the input that triggered the event should not have a non-nil causal ID. Process 330 takes causal data or non-causal data converted to causal data with a nil causal ID as arguments. By definition parented causal events should have at least one input parameter that has a non-nil causal ID.

Process 310 for handling non-parented causal event conditions is explained in FIG. 17 J. At step 312, the processor begins evaluating a non-parented causal event condition, taking as parameters non-causal data. At step 314 non-causal expressions are evaluated and any results are sent to step 316. At step 316, the processor compares the expression result value to a condition that is known to potentially produce negative outcomes, such as an error condition. If the causal condition is not met, the processor, at step 324, should return, and may optionally include a success code with a nil causal ID term.

If a causal condition is met (such as an error condition), the processor begins the process for creating a new causal ID, at step 318. At step 318, the processor generates a suitably unique causal ID term and collects any diagnostic information relevant to the condition. The processor then generates and posts a new causal event entry to causal database, where: the event's causal ID is set to the just-generated unique causal ID; the event's parent causal ID term is set to a nil causal ID Term; the event's type is set to a type identifying this causal condition; and the event's diagnostic data is set to just-collected diagnostic data. The processor then sends the newly-generated causal ID to next step (320) as the causal ID term for the arguments passed.

At step 320, the processor executes actions that are known to potentially cause a negative outcome. This can be done by calling process 200 to execute the sequence needed to perform the action that can cause the negative outcome. The arguments passed include causal data with the causal ID terms set to the newly generated causal ID term or non-causal data. At step 322, the process returns. Values returned can optionally include causal data, such as failure codes where the causal ID term may be set to just-generated causal ID, etc.

Figure 17K:
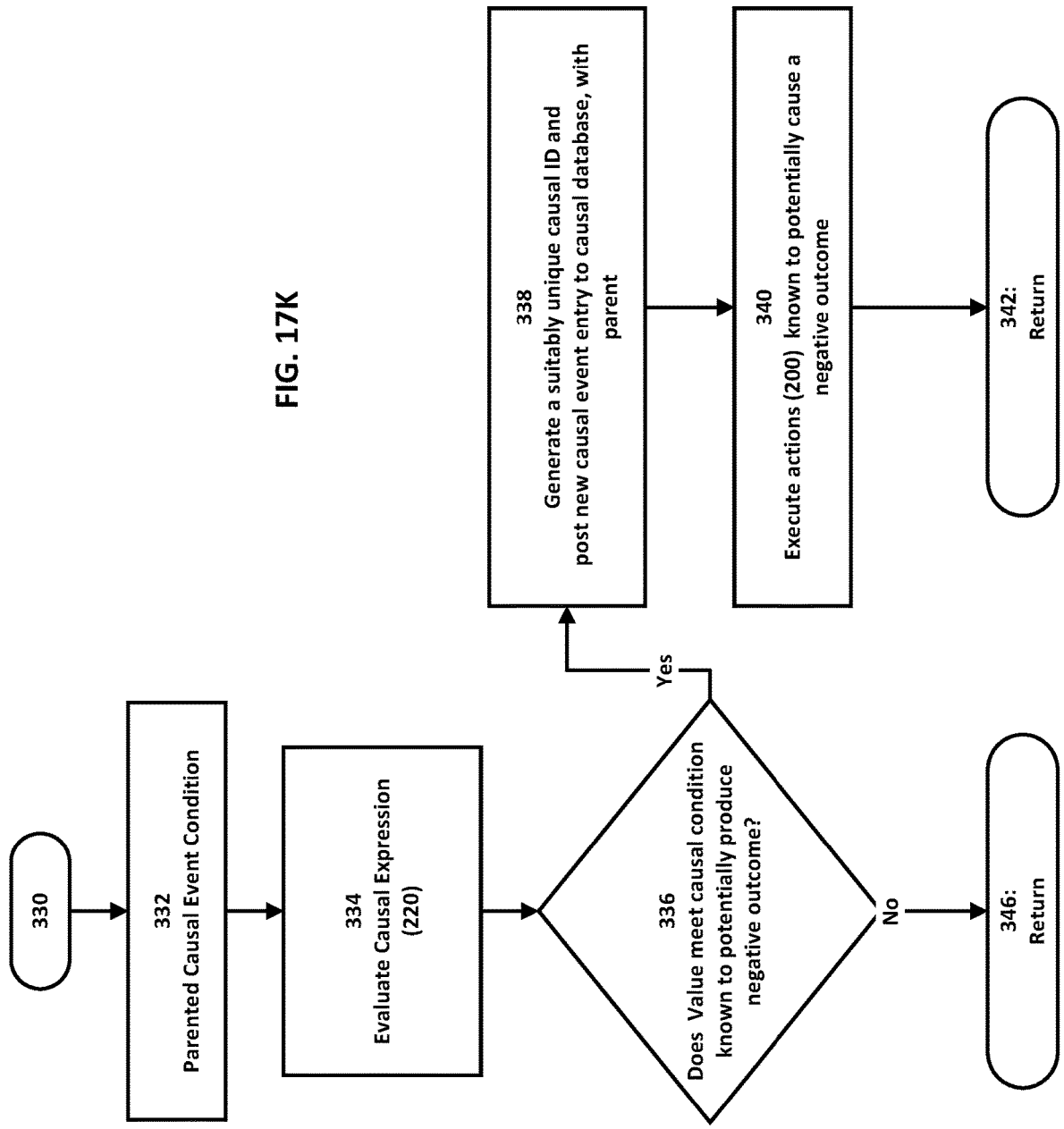
Figure 17L:
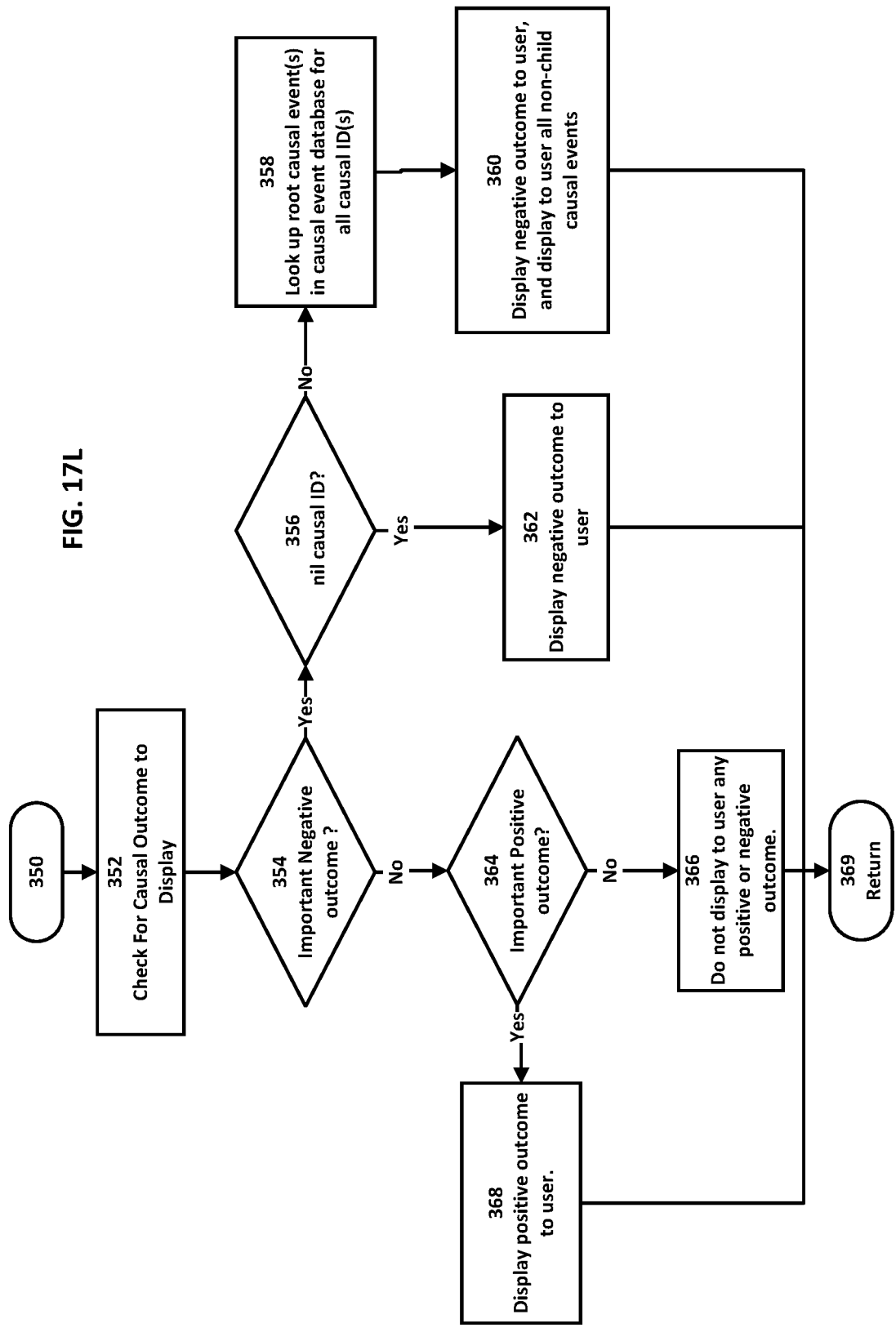

Process 330 for handling event conditions that have a causal parent is shown in FIG. 17K. At step 332, the processor begins evaluating a causal event condition that has causal data passed as a parameter. (Compare to step 312 where non-causal data is passed as a parameter.) Step 334 is substantially the same as step 220, where the processor evaluates a causal expression, taking causal data as arguments, and sending results to step 336. At step 336, the underlying value of the causal expression is compared to a condition that is known to potentially produce a negative outcome, similar to step 316. If not, the processor returns at step 346, and may optionally include a causal success code with the causal ID term set to nil. If so, at step 338, the processor posts a causal event to the causal database, similar to step 318, except the event will designate the causal ID term in the result of step 334 as the parent causal ID term for the event. That is, the processor will generate a suitably unique causal ID, collect diagnostic information about the condition, and create a new causal event entry in the causal database, using the newly generated causal ID, setting the parent causal ID term to the causal ID returned at step 334, setting a causal event type based on the causal condition, and including any diagnostic data in the event in the database. The just generated causal ID will be sent to the next step.

At step 340, the processor executes actions that are known to potentially cause a negative outcome. This can be done by calling process 200 to execute the sequence needed to perform the action that can cause the negative outcome. The arguments passed include causal data with the causal ID terms set to the newly generated causal ID term or non-causal data. At step 342, the processor returns. Values returned can optionally include causal data, such as failure codes where the causal ID term may be set to just-generated causal ID, etc.

Process 350, whereby the processor executes a check for a causal outcome, is illustrated in FIG. 17L. At step 352, the processor initiates a process to check for causal outcome to display, taking as parameters causal data or non-causal data converted to have a nil causal ID term.

At step 354, the processor determines whether the value of causal data represents an application-dependent negative outcome to be (immediately) displayed to the user. Certain negative outcomes may be more important than others, necessitating alerting the user. If display of a negative outcome is warranted, execution proceeds to step 356, and if not it proceeds to step 364. At step 356, the processor determines whether or not the causal ID term associated with the causal data is a nil causal ID term. If so, at step 362, the processor will display to the user of the application the application-dependent negative outcome, with no causal events (reasons) associated or displayed with this outcome.

If the causal ID term is not a nil ID, at step 358, the processor looks up causal events in the causal event database, based on the causal IDs in the causal term of the causal data. For all events that have non-nil parent causal IDs, these parent events will be looked up. This process continues, looking up all parent events for all newly looked up events, until all related non-child events have been found. Each of these non-child events is a potential root cause event. At step 360, the processor displays to the user the application dependent negative outcome—along with the root cause events found in step 358 as reasons for the negative outcome. In some embodiments, formatting and interpretation of causal events can be based on semantics contained in the source causal term, the application-dependent specifics, event types, or specific information contained in the causal event database associated with each causal ID. The GUI may also be configured to allow toggling of child events to provide a user additional context.

Returning to step 364, the processor can also determine whether the value of causal data represents an application-dependent positive outcome to be immediately displayed to the user. In some embodiments, certain positive events, such as successful completion of a task, can be displayed to the user. If the causal data represents such an outcome, execution proceeds to step 368, if not it proceeds to step 366. At step 368, the interface displays to the user application dependent positive outcomes. Generally, the display will not include any causal events associated with the outcome and ignores causal ID terms associated with the causal data. This is because positive events usually do not have what a user would consider a root cause, or the root causes are unimportant, and therefore can be confused by the user for important information. At step 366, when there is no positive outcome to display, the interface, under control of the processor, will not display any positive or negative outcomes to the user. Generally no causal events will be displayed, and causal ID terms will be ignored. At step 369, the process will return.

FIGS. 18A-H and 19A-C illustrate examples of how different data values and causal IDs can flow through the same and different expressions composed of the basic Boolean operations using the causal tables discussed throughout, and that the method produces the desired results. In these examples, the developer does not need to worry about whether true or false represents error or success at any given time, except when it comes time to display the final result. An exemplary function ReadingIsHigh( ) returns true if some reading is high, and false if the reading is low. In some cases, a high reading is good and a low reading is bad, and in other cases, a low reading is good and a high reading is bad—it depends on the expressions that process the reading. In this example, assume that a causal event is posted when ReadingIsHigh( ) is called that identifies the sensor and the reading, and the causal ID of that event is returned with the true/false result of the call. For example, Sensor A returns either {true, a} or {false, a}, where "a" is the causal ID of the causal event posted by the call to Sensor A's ReadingIsHigh( ) Sensor B returns either {true, b} or {false, b}, where "b" is the causal ID of the causal event posted by the call to Sensor b's ReadingIsHigh( ) and so on. The causal event referred to by "a" would name Sensor A as the source, and ideally include the sensor reading, the date/time, etc. Likewise, the causal event referred to by "b" would name Sensor B as the source, and ideally include the sensor reading, the date/time, and so on. ReadingIsHigh( ) has a causal value output that includes a sensor high/low value (true or false) and a causal ID associated with the event of reading the sensor. These examples show the causal outputs of each causal function, including causal ORs, causal ANDs, and causal NOTs, as the causal values propagate through the expressions.

Figures 18A, 18B:
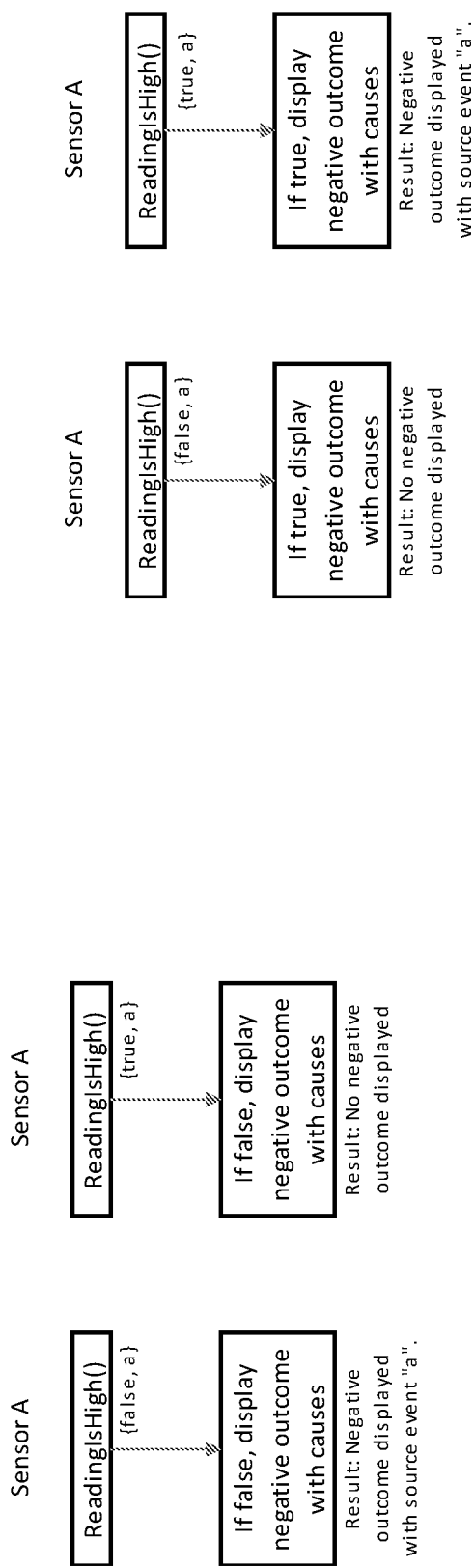
Figure 18C:
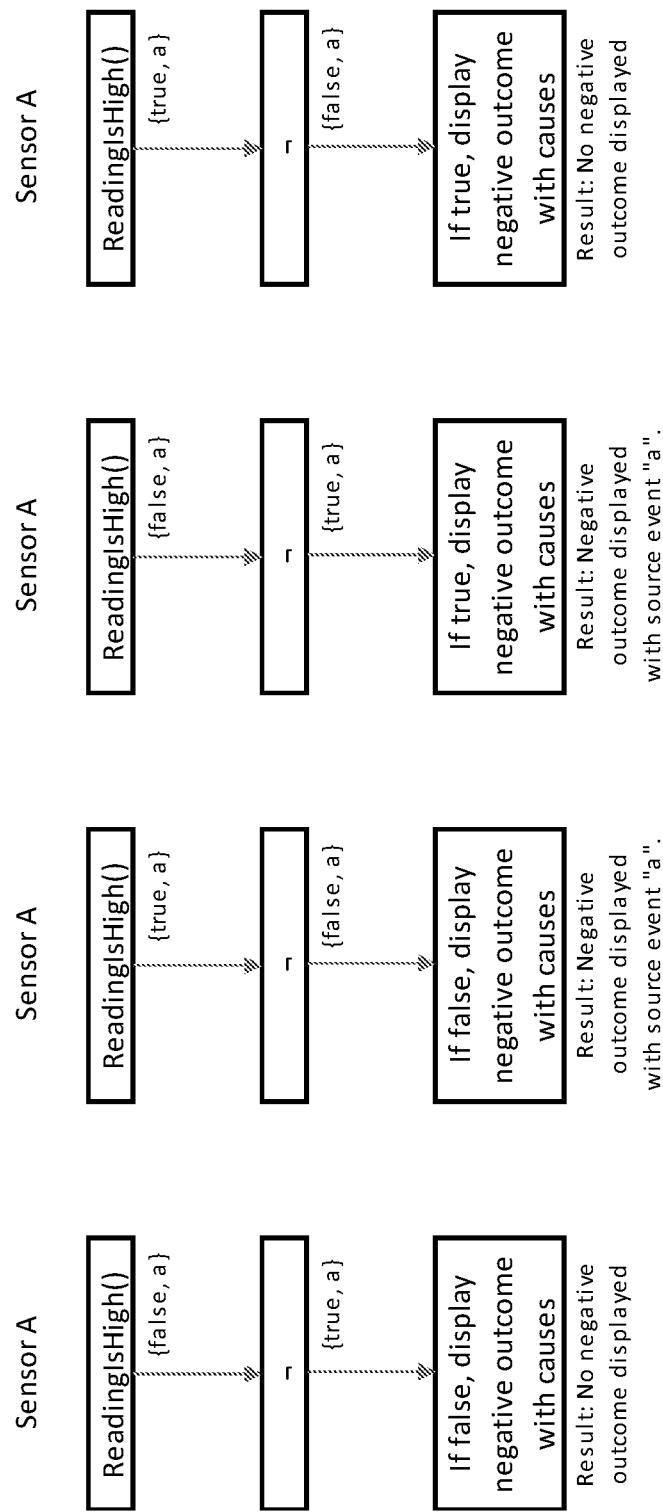

FIG. 18A shows two simple cases where reading sensor A determines whether or negative outcome should be displayed. If the result of the function is false, a negative outcome is displayed, while if the function result is true, no negative outcome is displayed. FIG. 18B shows the converse, where a negative outcome is displayed when the output of the function is true. FIG. 18C shows a similar rule as shown in FIGS. 18A and B, but with a causal NOT function added to the logic, which flips the outcomes.

Figure 18D:
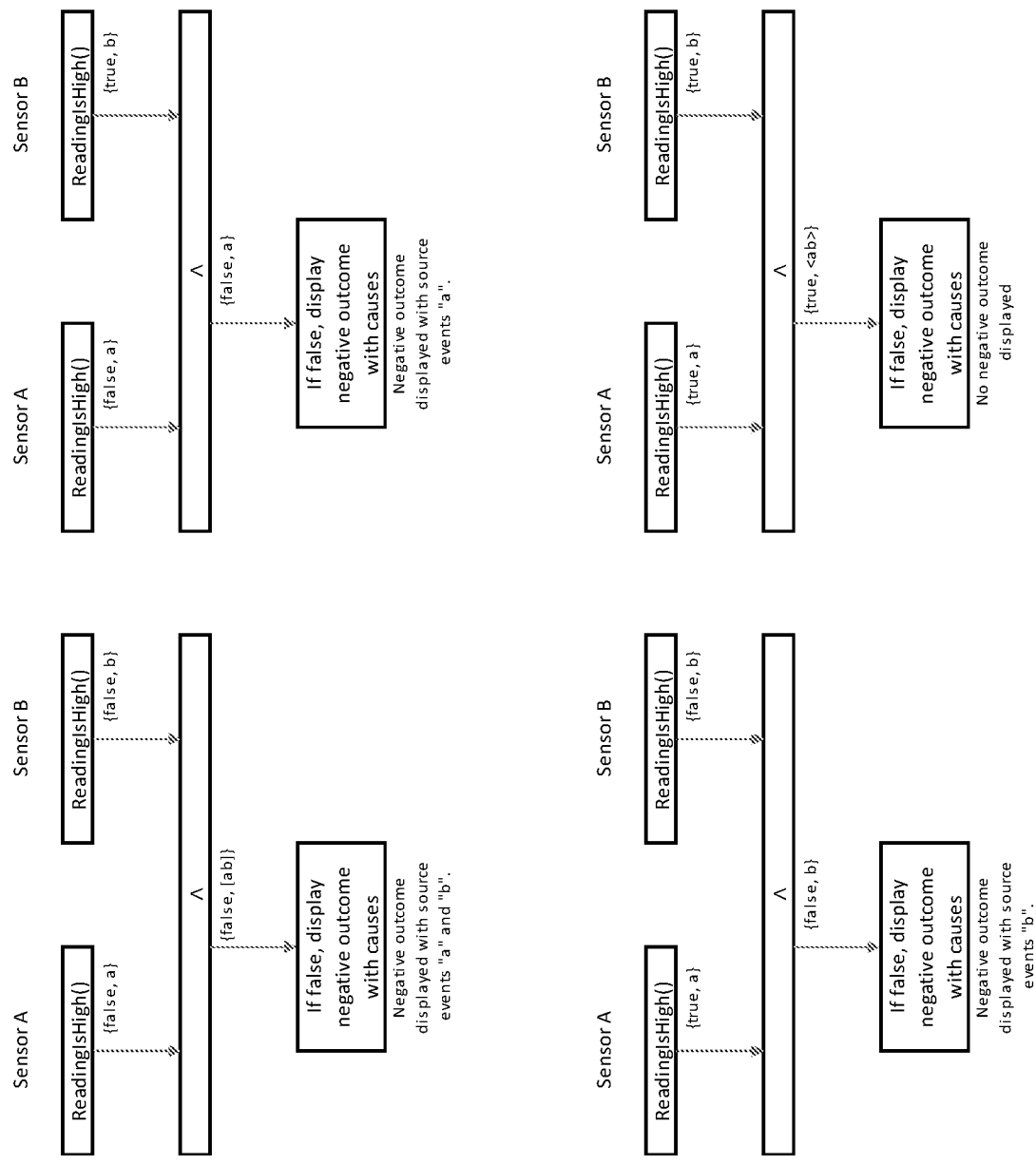

FIG. 18D shows a slightly more complicated example where two sensors are used, and their result is combined with a causal AND, the result of which causes an error if the function evaluates to false. Each of the four possible logical combinations of sensor reading function outputs is presented. Because the negative evaluation of the reading function for sensors A and B can be the cause the negative outcome, the negative outcome is displayed with source events pointing at which sensor failed to have a high reading. FIG. 18E shows a similar situation, where an error is displayed if the function evaluates to true. The negative outcomes displayed include an identification of both the sensors when both reading functions evaluated to true. Any other combination does not result in display of a negative outcome. In these examples, the rational cause is displayed based on an AND function that behaves in accordance with the logical tables discussed throughout.

Figure 18G:
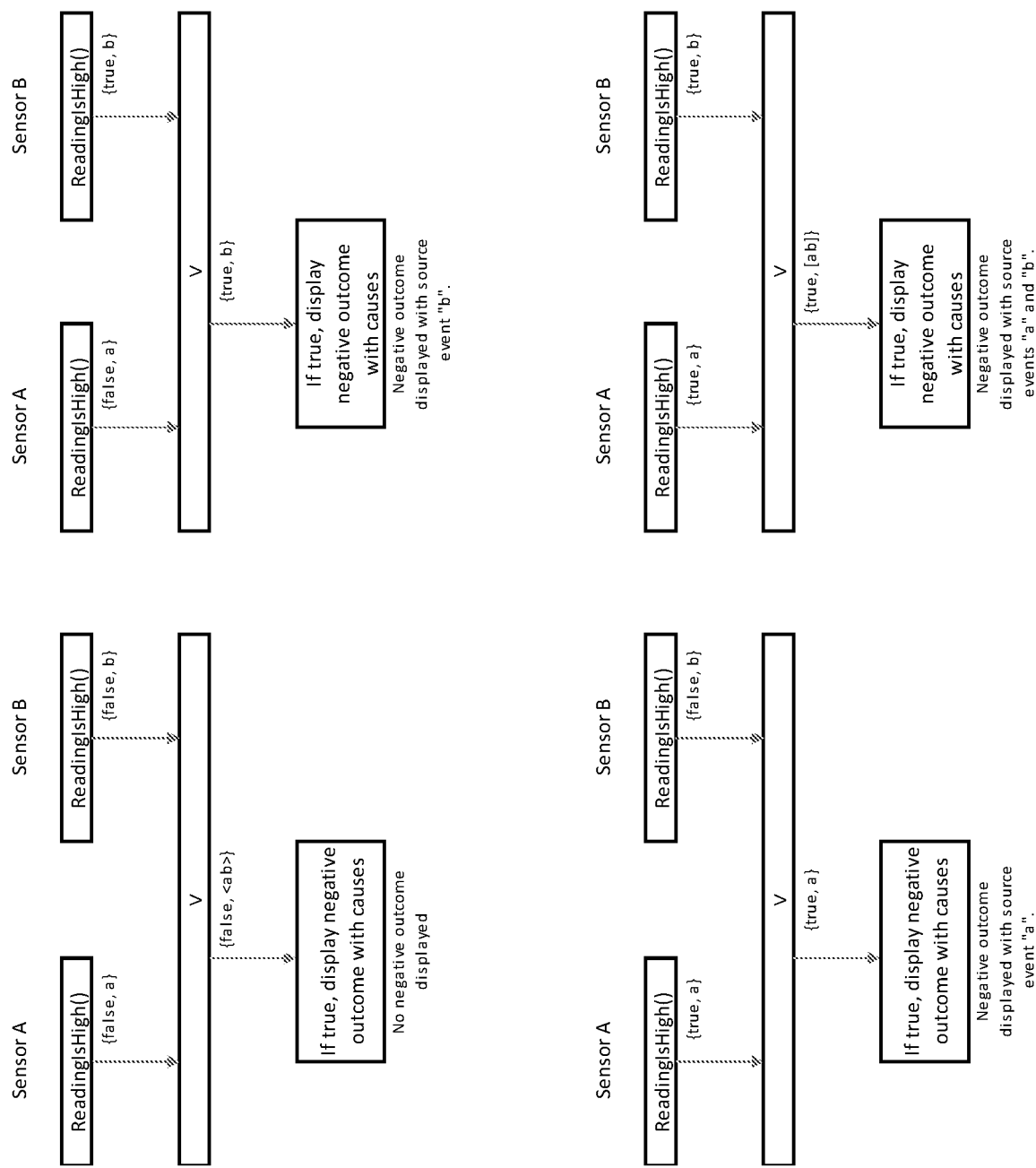

FIGS. 18F and 18G present two different examples where a causal OR is used. FIG. 18F shows the results of a scheme where a negative result is displayed if the OR evaluates to False; FIG. 18G shows the results of a scheme where a negative result is displayed if the OR evaluates to True. In these examples, the rational cause is displayed based on an OR function that behaves in accordance with the logical tables discussed throughout.

Figure 18H:
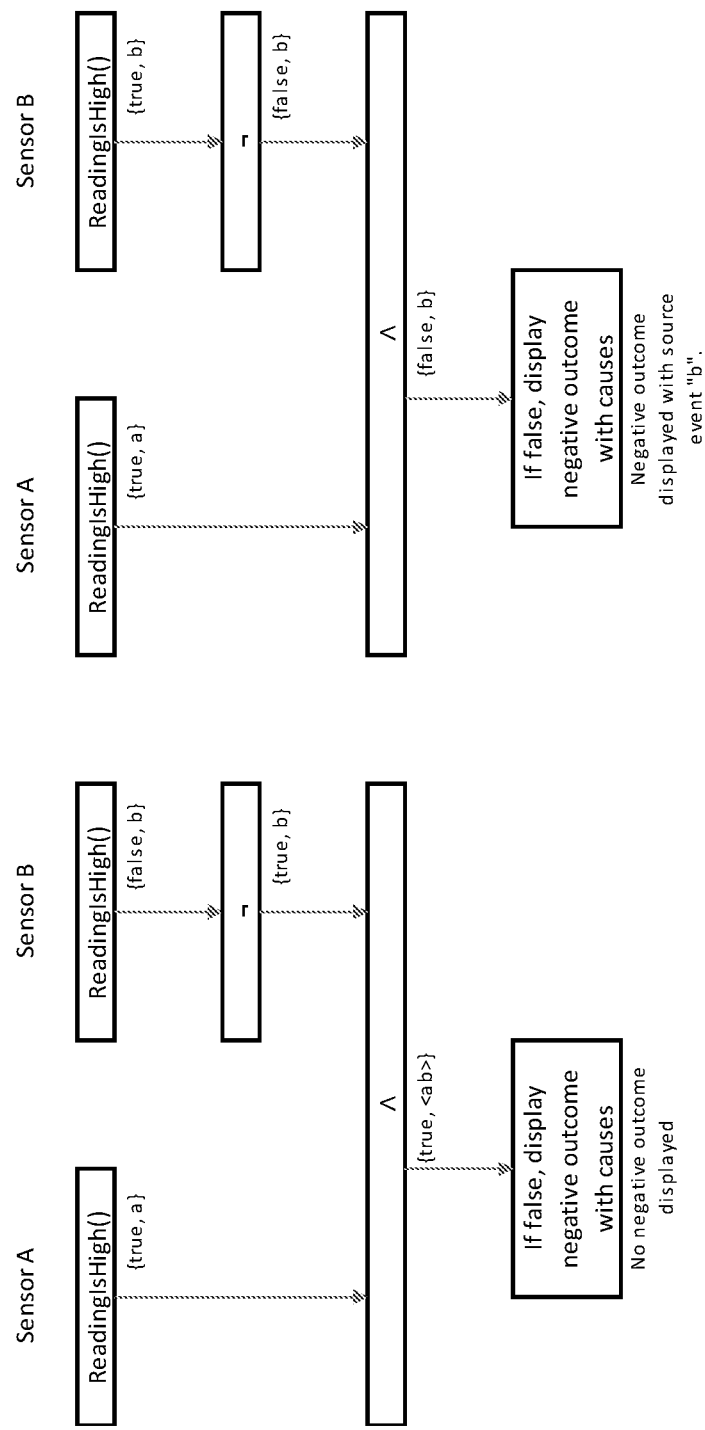

FIG. 18H shows an example where a compound logical expression is used to determine whether to display a negative outcome using a combination of causal versions of NOT and AND. The rational root cause is identified based on the propagation of causal IDs in accordance with these operations, as expected.

Figure 19A:
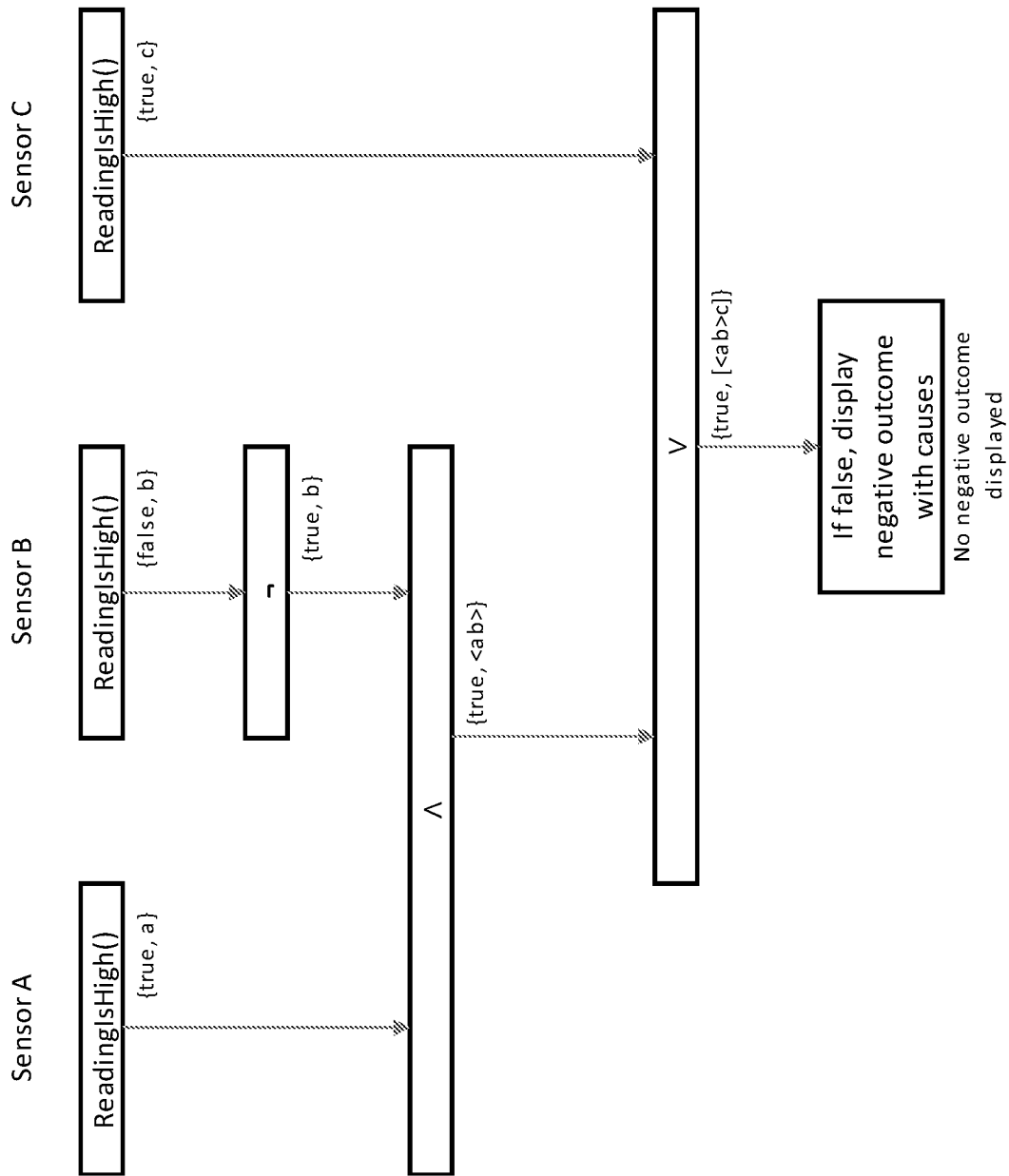
Figure 19B:
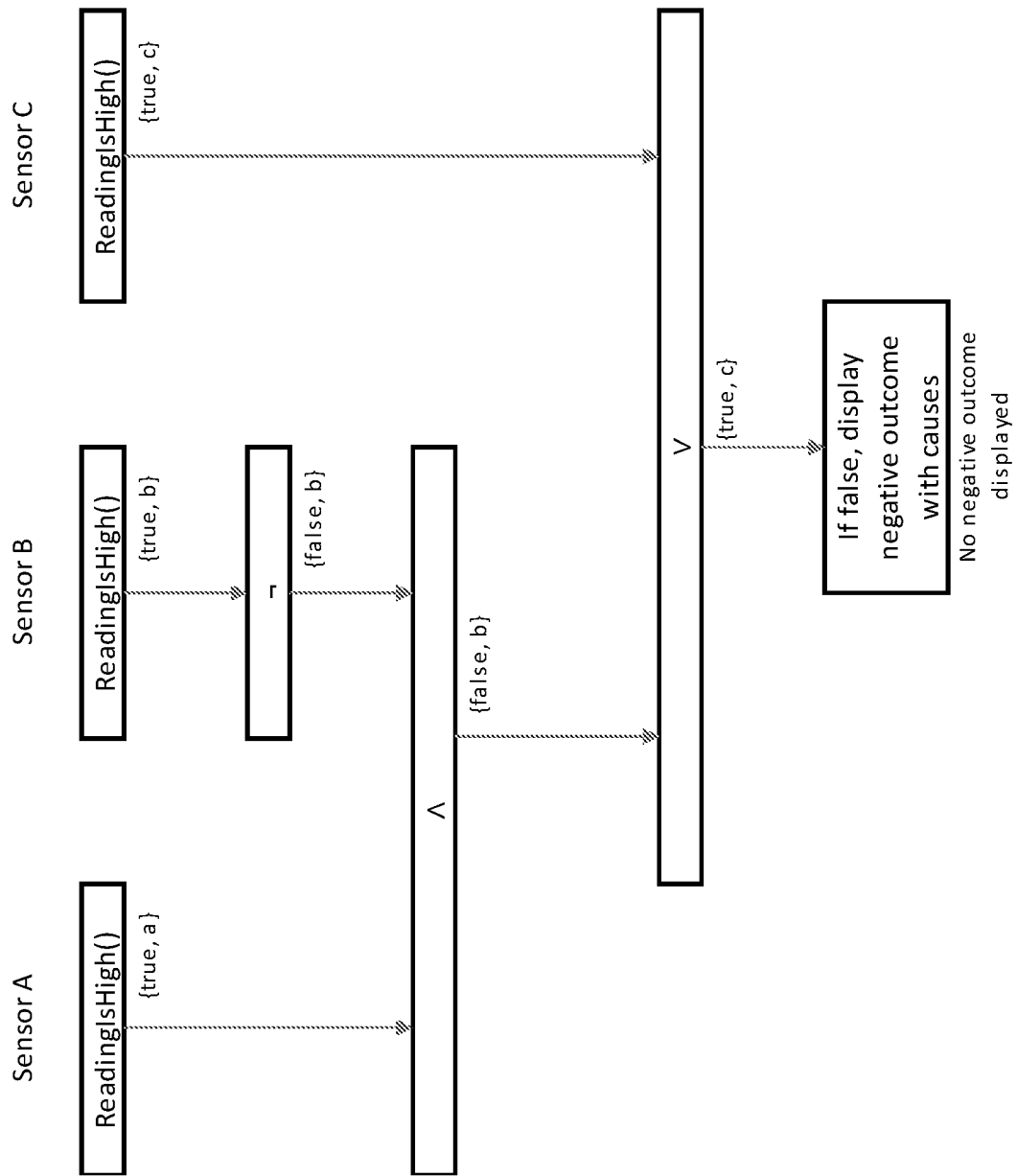
Figure 19C:
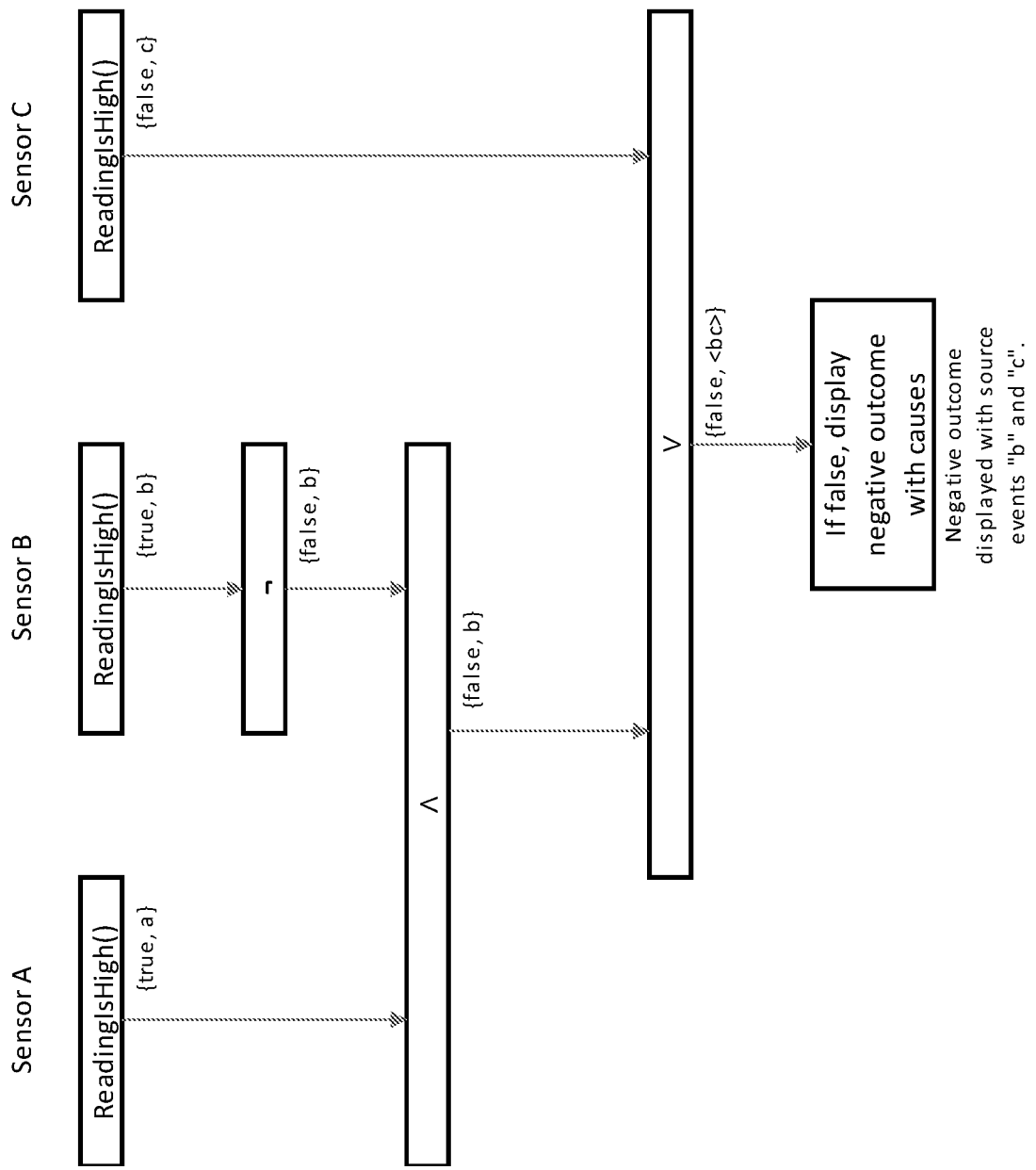

FIG. 19A-C shows an example where a compound logical expression is used to determine whether to display a negative outcome using a combination of causal versions of NOT, OR, and AND for three sensors. (Only a subset of possible combinations for outputs of the ReadingIsHigh( ) function are presented.) The rational root cause is identified based on the propagation of causal IDs in accordance with these operations, as expected.

As shown in FIG. 20, the computer system 710 may include a communication mechanism such as a system bus 721 or other communication mechanism for communicating information within the computer system 710. The computer system 710 further includes one or more processors 720 coupled with the system bus 721 for processing the information. The processors 720 may include one or more central processing units (CPUs), graphical processing units (GPUs), or any other processor known in the art.

The computer system 710 also includes a system memory 730 coupled to the bus 721 for storing information and instructions to be executed by processors 720. The system memory 730 may include computer readable storage media in the form of volatile and/or nonvolatile memory, such as read only memory (ROM) 731 and/or random access memory (RAM) 732. The system memory RAM 732 may include other dynamic storage device(s) (e.g., dynamic RAM, static RAM, and synchronous DRAM). The system memory ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system (BIOS) 733 contains the basic routines that help to transfer information between elements within computer system 710, such as during start-up, may be stored in ROM 731. RAM 732 may contain data and/or program modules that are immediately accessible to and/or presently being operated on by the processors 720. System memory 730 may additionally include, for example, operating system 734, application programs 735, other program modules 736 and program data 737. The application programs 735 may include, for example, the one or more executable applications such as the various causal threads discussed throughout and implementation of the causal ID database.

The computer system 710 also includes a disk controller 740 coupled to the system bus 721 to control one or more storage devices for storing information and instructions, such as a hard disk 741 and a removable media drive 742 (e.g., compact disc drive, solid state drive, etc.). The storage devices may be added to the computer system 710 using an appropriate device interface (e.g., a small computer system interface (SCSI), integrated device electronics, Universal Serial Bus (USB), or FireWire).

The computer system 710 may also include a display controller 765 coupled to the bus 721 to control a display 766, such as a liquid crystal display (LCD), for displaying information to a computer user tasked with programming or maintaining the controller computing system of the stationary robot system. The computer system includes an input interface 760 and one or more input devices, such as a keyboard 762 and a pointing device 761, for interacting with a computer user and providing information to the processors 720. The pointing device 761 may be, for example, a mouse or a pointing stick for communicating direction information and command selections to the processors 720 and for controlling cursor movement on the display 766. The display 766 may provide a touch screen interface which allows input to supplement or replace the communication of direction information and command selections by the pointing device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a hard disk 741 or a removable media drive 742. The hard disk 741 may contain one or more datastores and data files used by embodiments of the present invention. Datastore contents and data files may be encrypted to improve security. The processors 720 may also be employed in a multi-processing arrangement to execute the one or more sequences of instructions contained in system memory 730. In alternative embodiments, hardwired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processor 720 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 741 or removable media drive 742. Non-limiting examples of volatile media include dynamic memory, such as system memory 730. Non-limiting examples of transmission media include coaxial cables, copper wire, and fiber optics, including the wires that make up the bus 721. Transmission media may also take the form of acoustic or light waves, such as those generated during radio wave and infrared data communications.

When used in a networking environment, computer system 710 may include modem 772 for establishing communications over a network 771 with the cloud service 610 (see FIG. 6). Modem 772 may be connected to bus 721 via user network interface 770, or via another appropriate mechanism. Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers. The network 771 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention. An executable application, as used herein, comprises code or machine readable instructions for conditioning the processor to implement predetermined functions, such as those of an operating system, a context data acquisition system or other information processing system, for example, in response to user command or input.

An executable application is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for.

What is claimed is:

1. A method for tracking causal events in a software system comprising steps of:
    identifying by a processor a plurality of causal events that occur during operation of the system that meet one of a plurality of predefined causal conditions;
    assigning a substantially unique causal ID to each causal event and creating an entry for each causal event in a causal database;
    associating each causal ID with system state values describing a system state, by the processor;
    executing, by the processor, a plurality of causal Boolean operations that each take as input one or more input causal IDs and the associated system state values and output a Boolean value and a selected one or more of the input causal IDs, whereby an input causal ID is selected by the processor for output if changing the system state values associated with the input causal ID would change the output Boolean value; and
    displaying, to a user of the software system, an interface that conveys causal relationships of events to negative outcomes for the user in the software system based on the execution of the causal Boolean operations and the contents of the causal database.

2. The method of claim 1, wherein at least one of the causal Boolean operations is an AND operation that selects for output at least one causal ID associated with a false input state if the output is false and selects at least one input causal ID for output if the output is true.

3. The method of claim 2, wherein the AND operation outputs all input causal IDs if the output is true.

4. The method of claim 1, wherein at least one of the causal Boolean operations is an OR operation that selects for output at least one causal ID associated with a true input state if the output is true and selects at least one input causal ID for output if the output is false.

5. The method of claim 4, wherein the OR operation outputs all input causal IDs if the output is false.

6. The method of claim 1, wherein at least one of the causal Boolean operations is a NOT operation that selects for output at least one causal ID associated with a true input state if the output is false and selects at least one input causal ID for output if the output is true.

7. The method of claim 1, wherein the graphical interface allows a user to click a negative outcome to expand or collapse display of root cause events for that negative outcome.

8. The method of claim 1, wherein the processor associates causal IDs with system state values by maintaining a plurality of objects that include both a causal ID and one or more data about a system state as variables of each state object.

9. The method of claim 1, further comprising a step of executing non-Boolean causal operations that return an output value and selectively return any causal IDs associated with input values that are determined by processor to have contributed to the output value.

10. The method of claim 1, wherein the software system facilitates operation of a clinical analyzer.

11. A method for tracking causal events in a software system comprising steps of:
    identifying by a processor a plurality of causal events that occur during operation of the system that meet one of a plurality of predefined causal conditions;
    assigning a substantially unique causal ID to each causal event and creating an entry for each causal event in a causal database;
    associating, by the processor via the causal database, each causal ID with system state values describing a system state that results from the causal event to which the causal ID is assigned;
    executing, by the processor, a plurality of causal functions that each take as input one or more input system state values and the associated causal IDs and output a result that is defined by the causal function of the input system state values and a selected one or more of the input causal IDs, the selected input causal value being a causal ID associated with system state values that, if changed, would cause the result to change; and
    displaying, to a user of the software system, an interface that conveys relationships of events to negative outcomes for the user in the software system based on the one or more causal IDs associated with the one more states that led to the negative outcomes and the contents of the causal database.

12. The method of claim 11, wherein at least one of the plurality of causal functions is an AND operation that selects for output at least one causal ID associated with a false input state if the output is false and selects at least one input causal ID for output if the output is true.

13. The method of claim 12, wherein the AND operation outputs all input causal IDs if the output is true.

14. The method of claim 11, wherein at least one of the plurality of causal functions is an OR operation that selects for output at least one causal ID associated with a true input state if the output is true and selects at least one input causal ID for output if the output is false.

15. The method of claim 14, wherein the OR operation outputs all input causal IDs if the output is false.

16. The method of claim 11, wherein at least one of the causal Boolean operations is a NOT operation that selects for output at least one causal ID associated with a true input state if the output is false and selects at least one input causal ID for output if the output is true.

17. The method of claim 11, wherein the interface allows a user to click a negative outcome to expand or collapse display of root cause events for that negative outcome.

18. The method of claim 11, wherein the processor associates causal IDs with system state values by maintaining a plurality of objects that include both a causal ID and one or more data about a system state as variables of each state object in the causal database.

19. The method of claim 11, wherein the plurality of causal functions includes non-Boolean causal operations that return an output value and selectively return any causal IDs associated with input values that are determined by processor to have contributed to the output value.

20. The method of claim 11, wherein the software system facilitates operation of a clinical analyzer.

* * * * *